US012199241B2

(12) United States Patent
Takahashi et al.

(10) Patent No.: US 12,199,241 B2
(45) Date of Patent: Jan. 14, 2025

(54) ELECTROLYTE SOLUTION FOR NONAQUEOUS ELECTROLYTE BATTERIES, AND NONAQUEOUS ELECTROLYTE BATTERY USING SAME

(71) Applicant: Central Glass Company, Limited, Ube (JP)

(72) Inventors: Mikihiro Takahashi, Ube (JP); Ryosuke Kondo, Ube (JP); Takashi Mori, Fujimi (JP); Masahiro Miura, Ube (JP)

(73) Assignee: CENTRAL GLASS COMPANY, LIMITED, Ube (JP)

( * ) Notice: Subject to any disclaimer, the term of this patent is extended or adjusted under 35 U.S.C. 154(b) by 404 days.

(21) Appl. No.: 16/770,491

(22) PCT Filed: Dec. 6, 2018

(86) PCT No.: PCT/JP2018/044818
§ 371 (c)(1),
(2) Date: Jun. 5, 2020

(87) PCT Pub. No.: WO2019/111983
PCT Pub. Date: Jun. 13, 2019

(65) Prior Publication Data
US 2021/0184260 A1 Jun. 17, 2021

(30) Foreign Application Priority Data

Dec. 6, 2017 (JP) ................................ 2017-234526
Nov. 30, 2018 (JP) ................................ 2018-225009

(51) Int. Cl.
*H01M 10/0567* (2010.01)
*H01M 10/052* (2010.01)
(Continued)

(52) U.S. Cl.
CPC ...... *H01M 10/0567* (2013.01); *H01M 10/052* (2013.01); *H01M 10/0568* (2013.01); *H01M 10/0569* (2013.01); *H01M 2300/0028* (2013.01)

(58) Field of Classification Search
None
See application file for complete search history.

(56) References Cited

U.S. PATENT DOCUMENTS 5,626,981 A 5/1997 Simon et al.
7,135,252 B2 11/2006 Thackeray et al.
(Continued)

FOREIGN PATENT DOCUMENTS

EP 2 863 468 A1 4/2015
JP 8-45545 A 2/1996
(Continued)

OTHER PUBLICATIONS

Ushirogata et al., "Additive Effect on Reductive Decomposition and Binding of Carbonate-Based Solvent toward Solid Electrolyte Interphase Formation in Lithium-Ion Battery," Journal of the American Chemical Society, 2013, pp. 11967-11974, vol. 135, No. 32 (eight (8) pages).
(Continued)

*Primary Examiner* — Daniel S Gatewood
(74) *Attorney, Agent, or Firm* — Crowell & Moring LLP

(57) ABSTRACT

An electrolyte solution for a nonaqueous electrolyte battery according to the present invention includes the following components: (I) a nonaqueous organic solvent; (II) an ionic salt as a solute; (III) at least one additive compound represented by the general formula (1); and (IV) at least one additive compound represented by the general formula (2), wherein the concentration of the component (IV) is 0.05 to 25.0 mass % with respect to 100 mass % of the component (III)

(Continued)

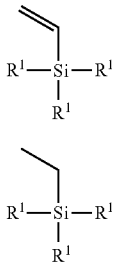

(1)

(2)

where $R^1$ are each independently a substituent group having at least one kind selected from unsaturated bond and aromatic ring.

22 Claims, 2 Drawing Sheets

(51) Int. Cl.
  *H01M 10/0568* (2010.01)
  *H01M 10/0569* (2010.01)

(56) References Cited

U.S. PATENT DOCUMENTS

| | | | |
|---|---|---|---|
| 2002/0076619 | A1 | 6/2002 | Yamada et al. |
| 2002/0081496 | A1 | 6/2002 | Tsujioka et al. |
| 2005/0208378 | A1 | 9/2005 | Mizutani et al. |
| 2006/0097691 | A1 | 5/2006 | Green |
| 2007/0009798 | A1 | 1/2007 | Inagaki et al. |
| 2007/0243470 | A1 | 10/2007 | Yamamoto et al. |
| 2008/0090154 | A1 | 4/2008 | Ihara et al. |
| 2010/0151324 | A1 | 6/2010 | Green et al. |
| 2010/0316910 | A1 | 12/2010 | Kajiyama et al. |
| 2013/0029217 | A1* | 1/2013 | Bhat ............... C07F 9/1415 429/188 |
| 2015/0194671 | A1 | 7/2015 | Nakahara et al. |
| 2015/0207142 | A1 | 7/2015 | Takijiri et al. |
| 2018/0034103 | A1* | 2/2018 | Kubo ............... H01M 10/0525 |
| 2019/0089004 | A1* | 3/2019 | Kim ............... H01M 4/525 |
| 2020/0052331 | A1* | 2/2020 | Lim ............... H01M 10/42 |

FOREIGN PATENT DOCUMENTS

| | | | |
|---|---|---|---|
| JP | 2002-110235 A | | 4/2002 |
| JP | 2002-134169 A | | 5/2002 |
| JP | 2002-151077 A | | 5/2002 |
| JP | 2002-329528 A | | 11/2002 |
| JP | 2007-18883 A | | 1/2007 |
| JP | 2007-335143 A | | 12/2007 |
| JP | 2008-16424 A | | 1/2008 |
| JP | 2008-181831 A | | 8/2008 |
| JP | 2008-270201 A | | 11/2008 |
| JP | 2009-137834 A | | 6/2009 |
| JP | 2009-176752 A | | 8/2009 |
| JP | 2013-30284 A | | 2/2013 |
| JP | 2013-166680 A | | 8/2013 |
| JP | 2015-125948 A | | 7/2015 |
| JP | 2016157679 A | * | 9/2016 ........... C07C 307/02 |
| JP | 2016-184462 A | | 10/2016 |
| KR | 10-2018-0034288 | | 4/2018 |
| WO | WO 2004/042851 A2 | | 5/2004 |
| WO | WO 2004/100293 A1 | | 11/2004 |
| WO | WO 2007/083155 A1 | | 7/2007 |
| WO | WO 2013/118661 A1 | | 8/2013 |
| WO | WO 2014/034043 A1 | | 3/2014 |
| WO | WO 2014/036026 A1 | | 3/2014 |

OTHER PUBLICATIONS

Korean-language Office Action issued in Korean Application No. 10-2020-7019256 dated Feb. 28, 2022 with English translation (10 pages).
Extended European Search Report issued in European Application No. 18886784.0 dated Dec. 14, 2020 (7 pages).
International Search Report (PCT/ISA/210) issued in PCT Application No. PCT/JP2018/044818 dated Jan. 22, 2019 with English translation (four (4) pages).
Japanese-language Written Opinion (PCT/ISA/237) issued in PCT Application No. PCT/JP2018/044818 dated Jan. 22, 2019 (three (3) pages).

* cited by examiner

ELECTROLYTE SOLUTION FOR NONAQUEOUS ELECTROLYTE BATTERIES, AND NONAQUEOUS ELECTROLYTE BATTERY USING SAME

FIELD OF THE INVENTION

The present invention relates to an electrolyte solution for a nonaqueous electrolyte battery and a nonaqueous electrolyte battery using the electrolyte solution.

BACKGROUND ART

In recent years, much attention has been focused on batteries as electrochemical devices for use in power storage systems of small, high-energy-density applications such as information processing and communication equipment, typified by personal computers, video cameras, digital cameras, mobile phones and smartphones, and for use in power storage systems of large power applications such as electric vehicles, hybrid vehicles, auxiliary power sources of fuel cell vehicles, power storage facilities and the like. Nonaqueous electrolyte secondary batteries, including lithium ion batteries each capable of achieving a high energy density, high voltage and high capacity, are considered as candidates for use in these power storage systems. The researches and developments of nonaqueous electrolyte secondary batteries are being actively pursued at the present time.

Electrolyte solutions for lithium nonaqueous electrolyte batteries (hereinafter also referred to as "nonaqueous electrolyte solutions") in which fluorine-containing electrolytes such as lithium hexafluorophosphate (hereinafter referred to as "$LiPF_6$"), lithium bis(fluorosulfonyl)imide (hereinafter referred to as "LiFSI") and lithium tetrafluoroborate (hereinafter referred to as "$LiBF_4$") as solutes are dissolved in solvents such as cyclic carbonate, chain carbonate and ester are suitable to achieve a high battery voltage and capacity, and thus are widely used. However, the lithium nonaqueous electrolyte batteries with such nonaqueous electrolyte solutions do not always achieve satisfactory cycle characteristics, output characteristics and other battery characteristics.

In the case of a lithium ion secondary battery, for example, when a lithium cation is inserted in the negative electrode during initial charging, a reaction occurs between the negative electrode and the lithium cation or between the negative electrode and the electrolyte solvent. As a result of the reaction, a coating film containing lithium oxide, lithium carbonate or lithium alkylcarbonate as a predominant component is formed on a surface of the negative electrode. The thus-formed coating film on the electrode surface is called a "Solid Electrolyte Interface (SEI)" whose properties have a large influence on battery characteristics to suppress further reduction decomposition of the solvent, prevent a deterioration of battery characteristics and the like. Similarly, a coating film of decomposition product is formed on a surface of the positive electrode and plays an important role to suppress oxidation decomposition of the solvent, prevent gas generation inside the battery and the like.

In order to improve battery characteristics such as cycle characteristics and low-temperature characteristics (at 0° C. or lower), it is important to form a stable SEI with a high ion conductivity and a low electron conductivity. Various attempts have been made to positively form a good SEI with the addition of a small amount (in general, 0.001 mass % to 10 mass %) of a compound called an additive into an electrolyte solution.

For example, Patent Document 1 discloses the use of vinylene carbonate (hereinafter referred to as "VC") as an additive for effective SEI formation. In this technique, however, there remains a problem that the input/output characteristics of the battery under low-temperature conditions (of 0° C. or lower) becomes deteriorated during use of the battery due to a large change rate of internal resistance even though the cycle characteristics of the battery can be improved.

Patent Document 2 discloses the use of an unsaturated cyclic sulfonic acid ester such as 1,3-propenesultone as an additive for effective SEI formation. Patent Documents 3 and 4 respectively disclose the use of phosphorus and boron complexes such as lithium bisoxalatoborate and lithium difluorooxalatoborate as additives for effective SEI formation. However, there is a problem that 1,3-propenesultone has a high carcinogenicity; and there is a problem that, depending on the kind of the electrode, the oxalato complex of boron or phosphorus may cause swelling of the battery by gas generation from an oxalic acid moiety in the molecule.

On the other hand, Patent Documents 5 and 6 disclose the use of an unsaturated bond-containing silicon compound. The unsaturated bond-containing silicon compound has a great advantage that a secondary battery using this compound shows a small deterioration of capacity due to repeated charging and discharging and a small change rate of internal resistance before and after cycle test under low-temperature conditions (of 0° C. or lower) whereby the input/output characteristics of the battery are unlikely to become deteriorated during use of the battery. Further, no report has been made about the carcinogenicity of the unsaturated bond-containing silicon compound. In addition, the unsaturated bond-containing silicon compound does not have an oxalic acid moiety in the molecule and thus does not cause gas generation from the oxalic acid moiety.

PRIOR ART DOCUMENTS

Patent Documents

Patent Document 1: Japanese Laid-Open Patent Publication No. H8-045545
Patent Document 2: Japanese Laid-Open Patent Publication No. 2002-329528
Patent Document 3: Japanese Laid-Open Patent Publication No. 2007-335143
Patent Document 4: Japanese Laid-Open Patent Publication No. 2002-110235
Patent Document 5: Japanese Laid-Open Patent Publication No. 2002-134169
Patent Document 6: Japanese Laid-Open Patent Publication No. 2008-181831
Patent Document 7: Japanese Laid-Open Patent Publication No. 2013-166680

Non-Patent Documents

Non-Patent Document 1: Journal of the American Chemical Society (2013), 135 (32)

SUMMARY OF THE INVENTION

Problems to be Solved by the Invention

However, the nonaqueous electrolyte battery using the unsaturated bond-containing silicon compound as the additive has an internal resistance (hereinafter referred to as "resistance") whose change rate before and after cycle test under low-temperature conditions (of 0° C. or lower) is small, but whose absolute value is equal to or larger than that of the nonaqueous electrolyte battery using the VC etc. There has been a strong demand to decrease the absolute value of the resistance for further improvements of the input/output characteristics of the battery.

In view of the foregoing, it is an object of the present invention to provide an electrolyte solution for a nonaqueous electrolyte battery, which allows a decrease of the absolute value of the resistance under low-temperature conditions (of 0° C. or lower, e.g., −20° C.) without largely impairing the cycle characteristics, and to provide a nonaqueous electrolyte battery using such an electrolyte solution.

Means for Solving the Problems

As a result of extensive research made in view of the above-mentioned problems, the present inventors have surprisingly found that an electrolyte solution for a nonaqueous electrolyte battery containing a nonaqueous organic solvent, an ionic salt as a solute and a silicon compound having at least one kind selected from unsaturated bonds and aromatic rings as represented by the after-mentioned general formula (1) as an additive, when admixed with a compound as represented by the after-mentioned formula (2) (that is, a compound obtained by replacing one ethenyl group of the general formula (1) with an ethyl group), allows a decrease of resistance under low-temperature conditions (of 0° C. or lower, e.g., −20° C.). The present invention is based on this finding.

Accordingly, one aspect of the present invention is directed to an electrolyte solution for a nonaqueous electrolyte battery (hereinafter also simply referred to as "nonaqueous electrolyte solution" or "electrolyte solution"), comprising the following components:
(I) a nonaqueous organic solvent;
(II) an ionic salt as a solute;
(III) at least one additive compound represented by the general formula (1) (hereinafter also referred to as "silicon compound (1)"); and
(IV) at least one additive compound represented by the general formula (2) (hereinafter also referred to as "silicon compound (2)"),
wherein the concentration of the component (IV) is 0.05 to 25.0 mass % with respect to 100 mass % of the component (III)

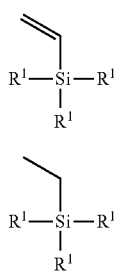

(1)

(2)

where $R^1$ are each independently a substituent group having at least one kind selected from unsaturated bonds and aromatic rings.

It is preferable that each of $R^1$ in the above general formula (1) is a group selected from an alkenyl group, an allyl group, an alkynyl group, an aryl group, an alkenyloxy group, an allyloxy group, an alkynyloxy group and an aryloxy group. The alkenyl group is preferably ethenyl. The allyl group is preferably 2-propenyl. The alkynyl group is preferably ethynyl. The aryl group is preferably phenyl, 2-methylphenyl, 4-methylphenyl, 4-fluorophenyl, 4-tert-butylphenyl or 4-tert-amylphenyl. The alkenyloxy group is preferably vinyloxy. The allyloxy group is preferably 2-propenyloxy. The alkynyloxy group is preferably propargyloxy. The aryloxy group is preferably phenoxy, 2-methylphenoxy, 4-methylphenoxy, 4-fluorophenoxy, 4-tert-butylphenoxy or 4-tert-amylphenoxy.

It is preferable that at least two of three $R^1$ in the above general formula (1) are ethenyl, ethynyl or both thereof in terms of the great durability improvement. Among the after-mentioned compounds (1a) to (1q), the compounds (1a) to (1d), (1f) to (1k) and (1m) to (1q) correspond to such a preferable compound.

More specifically, the silicon compound of the general formula (1) having at least one kind selected from unsaturated bonds and aromatic rings is preferably at least one kind selected from the group consisting of the following compounds (1a) to (1q). Among others, particularly preferred is at least one kind selected from the group consisting of the compounds (1a), (1b), (1c), (1e), (1f), (1g), (1h), (1i), (1j), (1k), (1p) and (1q) in terms of the stability of the compound.

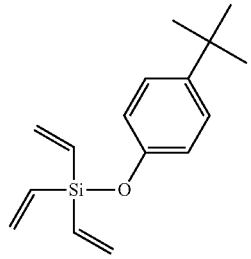

(1a)

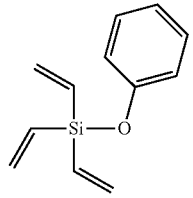

(1b)

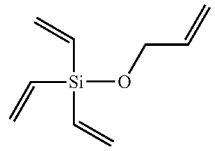

(1c)

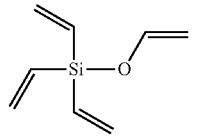

(1d)

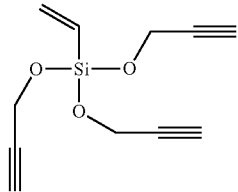

(1e)

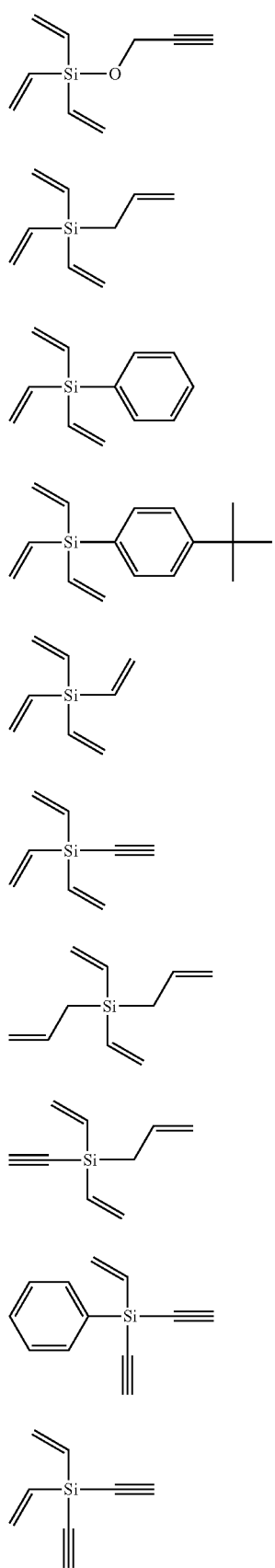
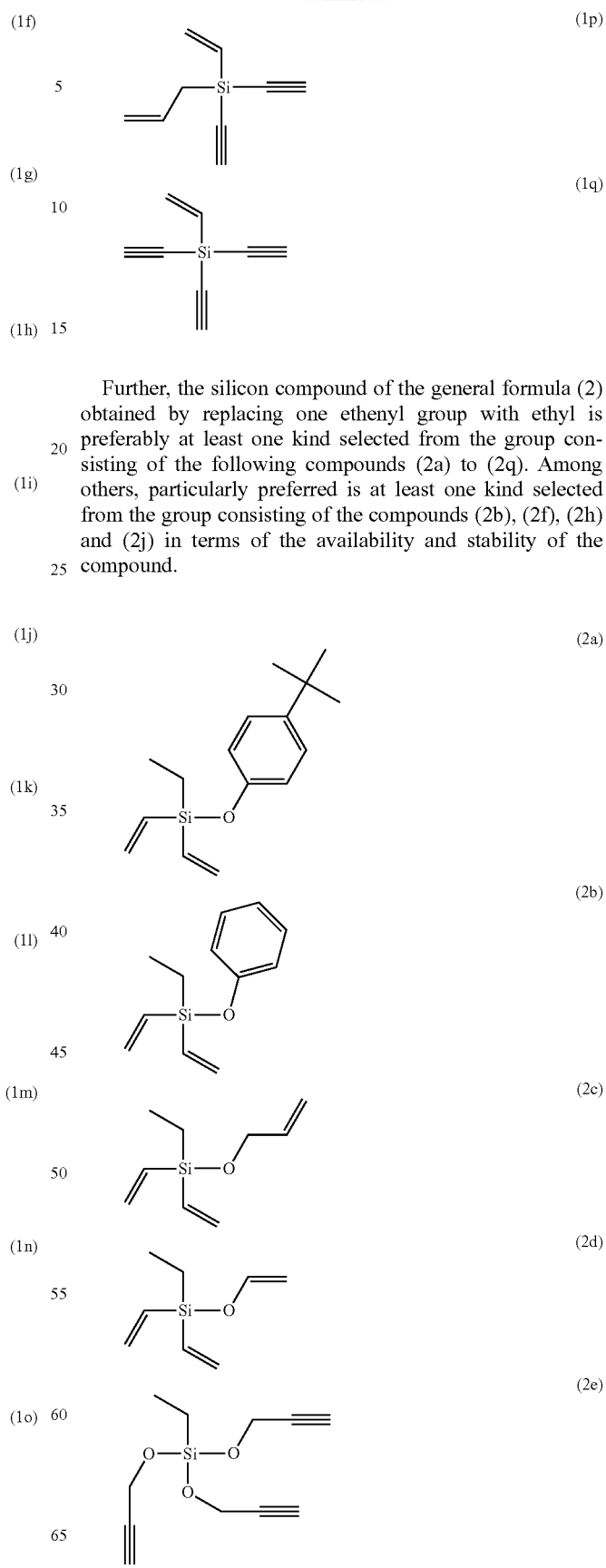

Further, the silicon compound of the general formula (2) obtained by replacing one ethenyl group with ethyl is preferably at least one kind selected from the group consisting of the following compounds (2a) to (2q). Among others, particularly preferred is at least one kind selected from the group consisting of the compounds (2b), (2f), (2h) and (2j) in terms of the availability and stability of the compound.

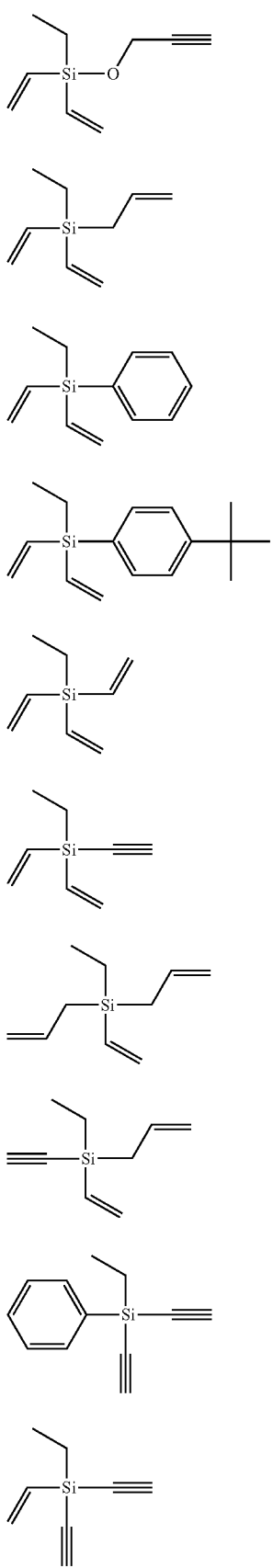
(2f) (2g) (2h) (2i) (2j) (2k) (2l) (2m) (2n) (2o)

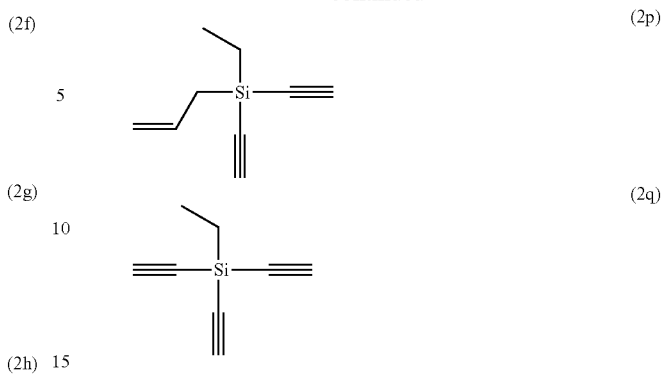
(2p) (2q)

Detailed research has been made on the mechanism for a commonly used additive VC to form a coating film on an electrode surface. For example, Non-Patent Document 1 proposes a mechanism in which VC captures a cyclic carbonate anion radial generated by reduction of a cyclic carbonate at the negative electrode so that a polymeric reaction product of the cyclic carbonate anion radial and the VC forms an SEI on the negative electrode while preventing further decomposition of the cyclic carbonate. It is easily assumed, in view of the number of substituent groups contained in the molecule of the silicon compound (1) and each having at least one kind selected from unsaturated bonds and aromatic rings, that the silicon compound (1) has an equal or higher level of reactivity with cyclic carbonate anion radial than that of the VC and shows an electrode protecting function. It is thus considered that, in the present invention, the cyclic characteristic improvement effect can be obtained by covering the negative electrode surface with a polymeric SEI derived from the silicon compound (1) as in the case of the VC. In terms of the reactivity with cyclic carbonate anion radical, it is preferable that at least two of three $R^1$ in the silicon compound (1) are unsaturated bond-containing groups.

There is seen a phenomenon that the absolute value of the resistance of the battery at −20° C. becomes decreased by adding into the electrolytic solution containing the silicon compound (1) a small amount of the silicon compound (2), which is obtained by replacing one ethenyl group of the silicon compound (1) with ethyl, although the reason for such a phenomenon is not certain. There is also seen a tendency that the cycle characteristics of the battery are impaired with increase in the amount of the silicon compound (2) added. It is therefore important to adjust the content ratio of the compound (1) as the component (III) and the compound (2) as the component (IV) such that "the concentration of the component (IV) ranges from 0.05 to 25.0 mass % with respect to 100 mass % of the component (III)" for the purpose of decreasing the absolute value of the resistance without largely impairing the cycle characteristics and thereby attaining good balance between these characteristics. In terms of the above, the concentration of the component (IV) is preferably in the range of 0.10 to 20.0 mass % with respect to 100 mass % of the component (III).

Effects of the Invention

According to the present invention, there are provided the electrolyte solution for the nonaqueous electrolyte battery, by which the absolute value of the resistance under low-temperature conditions (of 0° C. or lower, e.g., −20° C.) is decreased (for example, by more than 1%) without largely impairing the cycle characteristics of the battery, and the nonaqueous electrolyte battery using the electrolyte solution.

DESCRIPTION OF THE EMBODIMENTS

Figure 1:
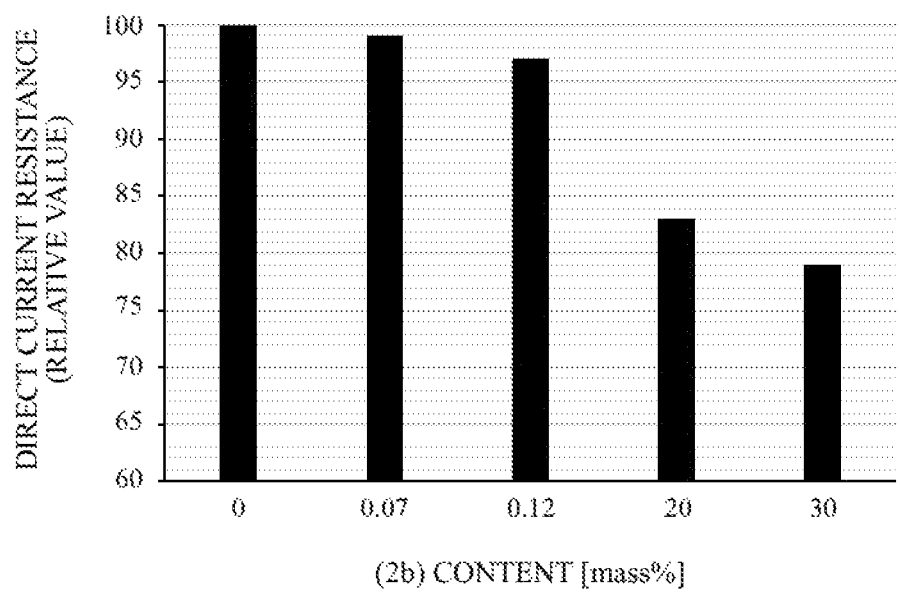
FIG. 1 is a graph of the direct current resistance (as a relative value) relative to the content of the silicon compound (2b).

In the following embodiment, the respective components and combination thereof are mere examples. Various additions, omissions, replacements and other changes of the components are possible within the range that does not depart from the spirit of the present invention. The scope of the present invention is not limited to the following embodiment and is limited only by the scope of claims.

1. Electrolyte Solution for Nonaqueous Electrolyte Battery

The electrolyte solution for the nonaqueous electrolyte battery according to the present invention includes at least the following components:
 (I) an aqueous organic solvent;
 (II) an ionic salt as a solute;
 (III) at least one additive compound represented by the above-mentioned general formula (1); and
 (IV) at least one additive compound represented by the above-mentioned general formula (2),
  wherein the concentration of the component (IV) is 0.05 to 25.0 mass % with respect to 100 mass % of the component (III).

Component (I): Nonaqueous Organic Solvent

In the present invention, there is no particular limitation on the kind of the nonaqueous organic solvent used in the electrolyte solution for the nonaqueous electrolyte battery. Any arbitrary nonaqueous organic solvent can be used. More specifically, the nonaqueous organic solvent is preferably at least one kind selected from the group consisting of ethyl methyl carbonate (hereinafter referred to as "EMC"), dimethyl carbonate (hereinafter referred to as "DMC"), diethyl carbonate (hereinafter referred to as "DEC"), methyl propyl carbonate, ethyl propyl carbonate, methyl butyl carbonate, 2,2,2-trifluoroethyl methyl carbonate, 2,2,2-trifluoroethyl ethyl carbonate, 2,2,2-trifluoroethyl propyl carbonate, bis(2,2,2-trifluoroethyl)carbonate, 1,1,1,3,3,3-hexafluoro-1-propyl methyl carbonate, 1,1,1,3,3,3-hexafluoro-1-propyl ethyl carbonate, 1,1,1,3,3,3-hexafluoro-1-propyl propyl carbonate, bis(1,1,1,3,3,3-hexafluoro-1-propyl)carbonate, ethylene carbonate (hereinafter referred to as "EC"), propylene carbonate (hereinafter referred to as "PC"), butylene carbonate, fluoroethylene carbonate (hereinafter referred to as "FEC"), difluoroethylene carbonate, methyl acetate, ethyl acetate, methyl propionate, ethyl propionate, methyl 2-fluoropropionate, ethyl 2-fluoropropionate, diethyl ether, dibutyl ether, diisopropyl ether, 1,2-dimethoxyethane, tetrahydrofuran, 2-methyltetrahydrofuran, furan, tetrahydropyran, 1,3-dioxane, 1,4-dioxane, N,N-dimethylformamide, acetonitrile, propionitrile, dimethylsulfoxide, sulfolane, γ-butyrolactone and γ-valerolactone.

For good high-temperature cycle characteristics, it is preferable that the nonaqueous organic solvent contains at least one kind selected from the group consisting of cyclic carbonate and chain carbonate. For good low-temperature input/output characteristics, it is preferable that the nonaqueous organic solvent contains at least one kind selected from the group consisting of esters.

Examples of the cyclic carbonate include EC, PC, butylene carbonate and FEC. Among others, at least one kind selected from the group consisting of EC, PC and FEC is preferred.

Examples of the chain carbonate include EMC, DMC, DEC, methyl propyl carbonate, ethyl propyl carbonate, 2,2,2-trifluoroethyl methyl carbonate, 2,2,2-trifluoroethyl ethyl carbonate, 1,1,1,3,3,3-hexafluoro-1-propyl methyl carbonate and 1,1,1,3,3,3-hexafluoro-1-propyl ethyl carbonate. Among others, at least one kind selected from the group consisting of EMC, DMC, DEC and methyl propyl carbonate is preferred.

Examples of the esters include methyl acetate, ethyl acetate, methyl propionate, ethyl propionate, methyl 2-fluoropropionate and ethyl 2-fluoropropionate.

The electrolyte solution for the nonaqueous electrolyte battery according to the present invention may contain a polymer, as is generally called a polymer solid electrolyte. Herein, the term "polymer solid electrolyte" includes those containing a nonaqueous organic solvent as a plasticizer.

There is no particular limitation on the polymer as long as the polymer is an aprotic polymer capable of dissolving therein the solute and the additive components. Examples of the polymer include a polymer having polyethylene oxide in its main chain or side chain, a homopolymer or copolymer of polyvinylidene fluoride, a methacrylate polymer and polyacrylonitrile. As the plasticizer added to the polymer, there can be preferably used an aprotic nonaqueous organic solvent among the above-mentioned nonaqueous organic solvents.

Component (II): Solute

The ionic salt is preferably any of those having: at least one kind of cation selected from the group consisting of alkali metal ions and alkaline-earth metal ions; and at least one kind of anion selected from the group consisting of hexafluorophosphate anion, tetrafluoroborate anion, trifluoromethanesulfonate anion, fluorosulfonate anion, bis(trifluoromethanesulfonyl)imide anion, bis(pentafluoroethanesulfonyl)imide anion, bis(fluorosulfonyl)imide anion, (trifluoromethanesulfonyl)(fluorosulfonyl)imide anion, bis(difluorophosphonyl)imide anion, (difluorophosphonyl)(fluorosulfonyl)imide anion and (difluorophosphonyl)(trifluoromethanesulfonyl)imide anion.

In terms of the solubility of the ionic salt in the nonaqueous organic solvent and the electrochemical stability of the ionic salt, the ionic salt as the solute is particularly preferably any of those having: lithium cation, sodium cation, potassium cation or magnesium cation; and at least one kind of anion selected from the group consisting of hexafluorophosphate anion, tetrafluoroborate anion, trifluoromethanesulfonate anion, bis(trifluoromethanesulfonyl)imide anion, bis(fluorosulfonyl)imide anion, bis(difluorophosphonyl)imide anion and (difluorophosphonyl)(fluorosulfonyl)imide anion.

There is no particular limitation on the suitable concentration of the solute. The lower limit of the concentration of the solute is generally 0.5 mol/L or more, preferably 0.7 mol/L or more, more preferably 0.9 mol/L or more. The upper limit of the concentration of the solute is generally 2.5 mol/L or less, preferably 2.2 mol/L or less, more preferably 2.0 mol/L or less. When the concentration of the solute is lower than 0.5 mol/L, the cycle characteristics and output characteristics of the nonaqueous electrolyte battery may be deteriorated with decrease in ion conductivity. When the concentration of the solute exceeds 2.5 mol/L, the viscosity of the electrolyte solution becomes high so that the cycle characteristics and output characteristics of the nonaqueous electrolyte battery may be deteriorated with decrease in ion conductivity. The above solutes can be used solely or in combination of two or more thereof.

When a large amount of the solute is dissolved at a time in the nonaqueous organic solvent, the temperature of the nonaqueous electrolyte solution may rise by the heat of dissolution of the solute. In the case of using $LiPF_6$ as the solute, for example, the decomposition of $LiPF_6$ may unfavorably proceed when the temperature of the nonaqueous electrolyte solution rises significantly. For this reason, the temperature at which the solute is dissolved in the nonaqueous organic temperature is not particularly limited but is preferably −20 to 50° C., more preferably 0 to 40° C.

In the nonaqueous electrolyte solution, the concentration of the component (III) is preferably 0.01 mass % to 3.0 mass %, more preferably 0.05 mass % to 2.0 mass %, still more preferably 0.1 mass % to 1.0 mass %, with respect to the total amount of the component (I) and (II). When the concentration of the component (III) is lower than 0.01 mass %, the nonaqueous electrolyte solution may not provide a sufficient characteristic improvement effect on the nonaqueous electrolyte battery. The nonaqueous electrolyte solution provides a very good durability improvement effect but causes a remarkable increase of resistance, which may lead to a significant deterioration of the low-temperature input/output characteristics, when the concentration of the component (III) is higher than 3.0 mass %.

Components (III) and (IV)

The combination of the components (III) and (IV) contained in the electrolyte solution can be selected such that respective $R^1$ in these components are of exactly the same structures (as in the case of the combination of the compounds (1a) and (2a)) or such that respective $R^1$ in these components are of different structures (as in the case of the combination of the compounds (1a) and (2b)). A plurality of kinds of compounds of the general formula (1) may be contained as the component (III). A plurality of kinds of compounds of the general formula (2) may be contained as the component (IV).

In the case of preparing the components (III) and (IV) by synthesis, it is preferable that respective $R^1$ in the components (III) and (IV) are of exactly the same structures in terms of the high efficiency of synthesis. In this case, particularly preferred is the combination of the compounds (1b) and (2b), the combination of the compounds (1h) and (2h) or the combination of the compounds (1j) and (2j) in terms of the ease of synthesis.

Other Additives

The electrolytic solution for the nonaqueous electrolyte battery according to the present invention may contain any other commonly used kind of additive at an arbitrary content within the range that does not impair the effects of the present invention.

Examples of the other additive include compounds having an overcharge preventing function, negative electrode coating film formation function, positive electrode coating film formation function etc., as typified by cyclohexylbenzene, cyclohexylfluorobenzene, fluorobenzene (hereinafter also referred to as "FB"), biphenyl, difluoroanisole, tert-butylbenzene, tert-amylbenzene, 2-fluorotoluene, 2-fluorobiphenyl, vinylene carbonate, dimethylvinylene carbonate, vinylethylene carbonate, fluoroethylene carbonate, methyl propargyl carbonate, ethyl propargyl carbonate, dipropargyl carbonate, maleic anhydride, succinic anhydride, propanesultone, 1,3-propanesultone (hereinafter also referred to as "PS"), butanesultone, methylene methane disulfonate, dimethylene methane disulfonate, trimethylene methane disulfonate, a compound represented by the following general formula (3) (such as a compound having an ethylene group as $R^2$ (hereinafter also referred to as "Dod"), a compound having a propylene group as $R^2$ (hereinafter also referred to as "Dad"), a compound having a butylene group as $R^2$, a compound having a pentylene group as $R^2$, a compound having a —$CH_2$—$CH(C_3H_7)$— group as $R^2$ (hereinafter also referred to as "pDod") etc.), methyl methanesulfonate, lithium difluorobis(oxalato)phosphate (hereinafter also referred to as "LDFBOP"), sodium difluorobis(oxalato)phosphate, potassium difluorobis(oxalato)phosphate, lithium difluorooxalatoborate (hereinafter also referred to as "LDFOB"), sodium difluorooxalatoborate, potassium difluorooxalatoborate, lithium dioxalatoborate, sodium dioxalatoborate, potassium dioxalatoborate, lithium tetrafluorooxalatophosphate (hereinafter also referred to as "LTFOP"), sodium tetrafluorooxalatophosphate, potassium tetrafluorooxalatophosphate, lithium tris(oxalato)phosphate, lithium difluorophosphate (hereinafter also referred to as "$LiPO_2F_2$"), lithium ethylfluorophosphate (hereinafter also referred to as "LEFP"), lithium propylfluorophosphate, lithium fluorophosphate, ethenesulfonyl fluoride (hereinafter also referred to as "ESF"), trifluoromethanesulfonyl fluoride (hereinafter also referred to as "TSF"), methanesulfonyl fluoride (hereinafter also referred to as "MSF") and phenyl difluorophosphate (hereinafter also referred to as "PDFP").

The amount of the other additive contained in the electrolyte solution is preferably in a range of 0.01 mass % to 8.00 mass %.

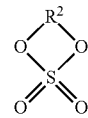

(3)

In the general formula (3), $R^2$ is a hydrocarbon group having 2 to 5 carbon atoms. The hydrocarbon group may be branched in the case of having 3 or more carbon atoms, and may contain a halogen atom, a hetero atom or an oxygen atom.

The ionic salt as the solute, when contained in the electrolyte solution in an amount smaller than the lower limit of the suitable concentration of the solute, that is, smaller than 0.5 mol/L, serves as an "other additive" to perform a negative electrode coating film formation function or positive electrode coating film formation function. In this case, the amount of the ionic salt as the other additive in the electrolyte solution is preferably in a range of 0.01 mass % to 3.0 mass %. Examples of the ionic salt usable as the other additive include lithium tetrafluoroborate (hereinafter also referred to as "$LiBF_4$"), sodium tetrafluoroborate, potassium tetrafluoroborate, magnesium tetrafluoroborate, lithium trifluoromethanesulfonate, sodium trifluoromethanesulfonate, potassium trifluoromethanesulfonate, magnesium trifluoromethanesulfonate, lithium fluorosulfonate (hereinafter also referred to as "$LiSO_3F$"), sodium fluorosulfonate, potassium fluorosulfonate, magnesium fluorosulfonate, lithium bis(trifluoromethanesulfonyl)imide (hereinafter also referred to as "LiTFSI"), sodium bis(trifluoromethanesulfonyl)imide, potassium bis(trifluoromethanesulfonyl)imide, magnesium bis(trifluoromethanesulfonyl)imide, lithium bis(pentafluoroethanesulfonyl)imide (hereinafter also referred to as "LiBETI"), sodium bis(pentafluoroethanesulfonyl)imide, potassium bis(pentafluoroethanesulfonyl)imide, magnesium bis(pentafluoroethanesulfonyl)imide, lithium bis(fluorosulfonyl)imide (hereinafter also referred to as "LiFSI"), sodium bis(fluorosulfonyl)imide, potassium bis(fluorosulfonyl)imide, magnesium bis(fluorosulfonyl)imide, lithium (trifluoromethanesulfonyl)(fluorosulfonyl)imide (hereinafter also referred to as "LTFFSI"), sodium (trifluoromethanesulfonyl)(fluorosulfonyl)imide, potassium (trifluoromethanesulfonyl)(fluorosulfonyl)imide, magnesium (trifluoromethanesulfonyl)(fluorosulfonyl)imide, lithium bis(difluorophosphonyl)imide (hereinafter also referred to as "LDFPI"), sodium bis(difluorophosphonyl)imide, potassium bis(difluorophosphonyl)imide, magnesium bis(difluorophosphonyl)imide, lithium (difluorophosphonyl)(fluorosulfonyl)imide (hereinafter also referred to as "LDFPFSI"), sodium (difluorophosphonyl)(fluorosulfonyl)imide, potassium (difluorophosphonyl)(fluorosulfonyl)imide, magnesium (difluorophosphonyl)(fluorosulfonyl)imide, lithium (difluorophosphonyl)(trifluoromethanesulfonyl)imide, sodium (difluorophosphonyl)(trifluoromethanesulfonyl)imide, potassium (difluorophosphonyl)(trifluoromethanesulfonyl)imide and magnesium (difluorophosphonyl)(trifluoromethanesulfonyl)imide. Among others, it is preferable to use $LiBF_4$, LiTFSI, LiBETI, LiFSI, LTFFSI, LDFPI or LDFPFSI as the "other additive" so as to attain a further improvement of the cycle characteristics and/or decrease of the absolute value of the resistance under low-temperature conditions without loss of the effects of the present invention (i.e. the production of the electrolyte solution for the nonaqueous electrolyte battery with good balance between the cycle characteristics and the decrease of the absolute value of the resistance under low-temperature conditions by the combined use of the silicon compounds of the general formulas (1) and (2)).

Among the aforementioned compounds, it is preferable to use at least one or more kinds selected from a lithium salt of oxalic acid group-containing boron complex, a lithium salt of oxalic acid group-containing phosphorus complex, a O=S—F bond-containing compound and a O=P—F bond-containing compound as the "other additive" so as to not only attain a further improvement of the cycle characteristics and decrease of the absolute value of the resistance under low-temperature conditions without loss of the effects of the present invention (i.e. the production of the electrolyte solution for the nonaqueous electrolyte battery with good balance between the cycle characteristics and the decrease of the absolute value of the resistance under low-temperature conditions by the combined use of the silicon compounds of the general formulas (1) and (2)), but also, in the case of using a Ni-containing electrode, reduce the elution of Ni from the electrode into the electrolyte solution.

To obtain a particularly great effect of reducing the Ni elution from the positive electrode in addition to a further improvement of the cycle characteristics and decrease of the absolute value of the resistance under low-temperature conditions, it is more preferable to use lithium difluorooxalatoborate as the lithium salt of oxalic acid group-containing boron complex; and it is more preferable to use at least one kind selected from the group consisting of lithium tetrafluorooxalatophosphate and lithium difluorobis(oxalato)phosphate as the lithium salt of oxalic acid group-containing phosphorus complex.

Examples of the O=S—F bond-containing compound include lithium fluorosulfonate, lithium bis(fluorosulfonyl)imide, lithium (trifluoromethanesulfonyl)(fluorosulfonyl)imide, propyl fluorosulfate, phenyl fluorosulfate, 4-fluorophenyl fluorosulfate, 4-tert-butylphenyl fluorosulfate, 4-tert-amylphenyl fluorosulfate, ethenesulfonyl fluoride, trifluoromethanesulfonyl fluoride, methanesulfonyl fluoride, benzenesulfonyl fluoride, 4-fluorophenylsulfonyl fluoride, 4-tert-butylphenylsulfonyl fluoride, 4-tert-amylphenylsulfonyl fluoride and 2-methylphenylsulfonyl fluoride. Among others, it is particularly preferable to use at least one kind selected from the group consisting of lithium fluorosulfonate, lithium bis(fluorosulfonyl)imide and lithium (trifluoromethanesulfonyl)(fluorosulfonyl)imide so as to not only minimize the Ni elution from the positive electrode and attain a further improvement of the cycle characteristics and decrease of the absolute value of the resistance under low-temperature conditions, but also suppress an increase of the resistance under low-temperature conditions after cycles.

Examples of the O=P—F bond-containing compound include lithium difluorophosphate, lithium ethylfluorophosphate, lithium bis(difluorophosphonyl)imide and phenyl difluorophosphate. Among others, it is particularly preferable to use at least one kind selected from the group consisting of lithium difluorophosphate, lithium ethylfluorophosphate and lithium bis(difluorophosphonyl)imide so as to ensure high productivity and low manufacturing cost as compared to the above-mentioned lithium salt of oxalic acid group-containing boron complex, lithium salt of oxalic acid group-containing phosphorus complex and O=S—F bond-containing compound, in addition to attaining a further improvement of the cycle characteristics, decrease of the absolute value of the resistance under low-temperature conditions and some effect of preventing the Ni elution from the positive electrode.

It is also preferable to use, among the aforementioned compounds, FB, PS, Dod, Dad or pDod as the "other additive" so as to attain a further improvement of the cycle characteristics and/or decrease of the absolute value of the resistance under low-temperature conditions without loss of the effects of the present invention (i.e. the production of the electrolyte solution for the nonaqueous electrolyte battery with good balance between the cycle characteristics and the decrease of the absolute value of the resistance under low-temperature conditions by the combined use of the silicon compounds of the general formulas (1) and (2)).

The electrolytic solution for the nonaqueous electrolyte battery may be used in a quasi-solid state with the addition of a gelling agent or a cross-linked polymer, as in a nonaqueous electrolyte battery called a polymer battery.

2. Nonaqueous Electrolyte Battery

The nonaqueous electrolyte battery according to the present invention has at least the following constituent elements: (A) the above-mentioned electrolyte solution for the nonaqueous electrolyte battery; (B) a positive electrode; and (C) a negative electrode including at least one kind selected from the group consisting of a negative electrode material containing lithium metal and a negative electrode material capable of occluding and releasing lithium, sodium, potassium or magnesium. The nonaqueous electrolyte battery may also have (D) a separator, an exterior member and the like.

[(B) Positive Electrode]

It is preferable that the positive electrode as the constituent element (B) includes at least one kind of oxide and/or polyanion compound as a positive electrode active material.

[Positive Electrode Active Material]

In the case of a lithium ion secondary battery in which lithium is predominantly contained as cation in the non-aqueous electrolyte solution, the kind of the positive electrode active material used for the positive electrode as the constituent element (B) is not particularly limited. For example, the positive electrode active material can contain at least one kind selected from: (A) a lithium-transition metal composite oxide containing at least one of nickel, manganese and cobalt and having a laminar structure; (B) a spinel-structured lithium-manganese composite oxide; (C) an olivine-type lithium-containing phosphate salt; and (D) a lithium rich-layered transition metal oxide having a laminar rocksalt-type structure.

((A) Lithium-Transition Metal Composite Oxide)

As the positive electrode active material (A): lithium-transition metal composite oxide containing at least one of nickel, manganese and cobalt and having a laminar structure, there can be used a lithium-cobalt composite oxide, a lithium-nickel composite oxide, a lithium-nickel-cobalt composite oxide, a lithium-nickel-cobalt-aluminum composite oxide, a lithium-cobalt-manganese composite oxide, a lithium-nickel-manganese composite oxide, a lithium-nickel-manganese-cobalt composite oxide or the like. There can alternatively be used any of those obtained by replacing a part of transition metal element of the above-mentioned lithium-transition metal composite oxide with another element such as Al, Ti, V, Cr, Fe, Cu, Zn, Mg, Ga, Zr, Si, B, Ba, Y, Sn etc.

Specific examples of the lithium-cobalt composite oxide and the lithium-nickel composite oxide include $LiCoO_2$, $LiNiO_2$, a lithium cobalt oxide doped with different kind of element such as Mg, Zr, Al or Ti (as typified by $LiCo_{0.98}Mg_{0.01}Zr_{0.01}O_2$, $LiCo_{0.98}Mg_{0.01}Al_{0.01}O_2$, $LiCo_{0.975}Mg_{0.01}Zr_{0.005}Al_{0.01}O_2$ etc.) and a lithium cobalt oxide having a surface to which a rare-earth compound is fixed as disclosed in International Application Publication No. WO 2014/034043. There can also be used a powder of $LiCoO_2$ particles whose surfaces are partially covered with aluminum oxide as disclosed in Japanese Laid-Open Patent Publication No. 2002-151077.

The lithium-nickel-cobalt composite oxide and the lithium-nickel-cobalt-aluminum composite oxide can be oxides represented by the general formula [1-1].

$$Li_aNi_{1-b-c}Co_bM^1_cO_2 \quad [1-1]$$

In the general formula [1-1], $M^1$ is at least one element selected from the group consisting of Al, Fe, Mg, Zr, Ti and B; a is a value satisfying the condition of $0.9 \leq a \leq 1.2$; and b and c are values satisfying the conditions of $0.1 \leq b \leq 0.3$ and $0 \leq c \leq 0.1$.

The above composite oxides can be prepared by a method disclosed in e.g. Japanese Laid-Open Patent Publication No. 2009-137834 or the like. Specific examples of the lithium-nickel-cobalt composite oxide and the lithium-nickel-cobalt-aluminum composite oxide include $LiNi_{0.8}Co_{0.2}O_2$, $LiNi_{0.85}Co_{0.10}Al_{0.05}O_2$, $LiNi_{0.87}Co_{0.10}Al_{0.03}O_2$ and $LiNi_{0.6}Co_{0.3}Al_{0.1}O_2$.

Specific examples of the lithium-cobalt-manganese composite oxide and the lithium-nickel-manganese composite oxide include $LiNi_{0.5}Mn_{0.5}O_2$ and $LiCo_{0.5}Mn_{0.5}O_2$.

The lithium-nickel-manganese-cobalt composite oxide can be a lithium-containing composite oxide represented by the general formula [1-2].

$$Li_dNi_eMn_fCo_gM^2_hO_2 \quad [1-2]$$

In the general formula [1-2], $M^2$ is at least one element selected from the group consisting of Al, Fe, Mg, Zr, Ti, B and Sn; d is a value satisfying the condition of $0.9 \leq d \leq 1.2$; and e, f, g and h are values satisfying the conditions of $e+f+g+h=1$, $0 \leq e \leq 0.7$, $0 \leq f \leq 0.5$, $0 \leq g \leq 0.5$ and $h \geq 0$.

In order to improve the safety of the lithium ion secondary battery under high-temperature conditions, the lithium-nickel-manganese-cobalt composite oxide is preferably of the kind containing manganese in the range of the general formula [1-2]. The lithium-nickel-manganese-cobalt composite oxide is more preferably of the kind further containing cobalt in the range of the general formula [1-2] in order to improve the high-rate characteristics of the lithium ion secondary battery.

Specific examples of the lithium-nickel-manganese-cobalt composite oxide are those having a charging/discharging region in a range of 4.3 V or higher, such as $Li[Ni_{1/3}Mn_{1/3}Co_{1/3}]O_2$, $Li[Ni_{0.45}Mn_{0.35}Co_{0.2}]O_2$, $Li[Ni_{0.5}Mn_{0.3}Co_{0.2}]O_2$, $Li[Ni_{0.6}Mn_{0.2}Co_{0.2}]O_2$, $Li[Ni_{0.49}Mn_{0.3}Co_{0.2}Zr_{0.01}]O_2$ and $Li[Ni_{0.49}Mn_{0.3}Co_{0.2}Mg_{0.01}]O_2$.

((B) Spinel-Structured Lithium-Manganese Composite Oxide)

As the positive electrode active material (B); spinel-structured lithium-manganese composite oxide, there can be used a spinel-structured lithium-manganese composite oxide represented by the general formula [1-3].

$$Li_j(Mn_{2-k}M^3_k)O_4 \quad [1-3]$$

In the general formula [1-3], $M^3$ is at least one metal element selected from the group consisting of Ni, Co, Fe, Mg, Cr, Cu, Al and Ti; j is a value satisfying the condition of $1.05 \leq j \leq 1.15$; and k is a value satisfying the condition of $0 \leq k \leq 0.20$.

Specific examples of the spinel-structured lithium-manganese composite oxide are $LiMnO_2$, $LiMn_2O_4$, $LiMn_{1.95}Al_{0.05}O_4$, $LiMn_{1.9}Al_{0.1}O_4$, $LiMn_{1.9}Ni_{0.1}O_4$ and $LiMn_{1.5}Ni_{0.5}O_4$.

((C) Olivine-Type Lithium-Containing Phosphate Salt)

As the positive electrode active material (C): olivine-type lithium-containing phosphate salt, there can be used a salt represented by the general formula [1-4].

$$LiFe_{1-n}M^4_nPO_4 \quad [1-4]$$

In the general formula [1-4], $M^4$ is at least one metal element selected from the group consisting of Co, Ni, Mn, Cu, Zn, Nb, Mg, Al, Ti, W, Zr and Cd; and n is a value satisfying the condition of $0 \leq n \leq 1$.

Specific examples of the olivine-type lithium-containing phosphate salt are $LiFePO_4$, $LiCoPO_4$, $LiNiPO_4$ and $LiMnPO_4$. Among others, $LiFePO_4$ and/or $LiMnPO_4$ is preferred.

((D) Lithium Rich-Layered Transition Metal Oxide)

As the positive electrode active material (D): lithium rich-layered transition metal oxide having a laminar rocksalt-type structure, there can be used an oxide represented by the general formula [1-5].

$$xLiM^5O_2 \cdot (1-x)Li_2M^6O_3 \quad [1-5]$$

In the general formula [1-5], x is a number satisfying the condition of $0<x<1$; $M^5$ is at least one kind of metal element having an average oxidation number of 3+; and $M^6$ is at least one kind of metal element having an average oxidation number of 4+.

In the general formula [1-5], $M^5$ is preferably at least one kind of three-valent metal element selected from Mn, Ni, Co, Fe, V and Cr although the average oxidation number of $M^5$ can be adjusted to three by using equal amounts of two-valent metal and four-valent metal. Further, $M^6$ is preferably at least one kind of metal element selected from Mn, Zr and Ti in the general formula [1-5].

Specific examples of the lithium rich-layered transition metal oxide are $0.5[LiNi_{0.5}Mn_{0.5}O_2]\cdot 0.5[Li_2MnO_3]$, $0.5[LiNi_{1/3}Co_{1/3}Mn_{1/3}O_2]\cdot 0.5[Li_2MnO_3]$, $0.5[LiNi_{0.375}Co_{0.25}Mn_{0.375}O_2]\cdot 0.5[Li_2MnO_3]$, $0.5[LiNi_{0.375}Co_{0.125}Fe_{0.125}Mn_{0.375}O_2]\cdot 0.5[Li_2MnO_3]$ and $0.45[LiNi_{0.375}Co_{0.25}Mn_{0.375}O_2]\cdot 0.10[Li_2TiO_3]\cdot 0.45[Li_2MnO_3]$.

It is known that the positive electrode active material compound (D) of the general formula [1-5] exhibits a high capacity by high-voltage charging at a Li-standard potential of 4.4 V or higher (see, for example, U.S. Pat. No. 7,135,252). The above positive electrode active material compounds can be prepared by a method disclosed in e.g. Japanese Laid-Open Patent Publication No. 2008-270201, International Application Publication No. WO 2013/118661, Japanese Laid-Open Patent Publication No. 2013-030284 or the like.

It suffices that the positive electrode active material includes at least one of the above compounds (A) to (D) as a predominant component. The positive electrode active material may contain any other compound. Examples of the other compound contained in the positive electrode active material are transition metal chalcogenides such as $FeS_2$, $TiS_2$, $TiO_2$, $V_2O_5$, $MoO_3$, $MoS_2$ etc., conductive polymers such as polyacetylene, poly(para-phenylene), polyaniline, polypyrrole etc., activated carbons, radical-generating polymers and carbon materials.

[Positive Electrode Collector]

The positive electrode (B) includes a positive electrode collector. Examples of the positive electrode collector include those made of aluminum, stainless steel, nickel, titanium and alloys thereof

[Positive Electrode Active Material Layer]

In the positive electrode (B), a positive electrode active material layer is formed on at least one side of the positive electrode collector. The positive electrode active material layer contains, for example, the above-mentioned positive electrode active material, a binder and optionally a conductive agent.

Examples of the binder usable in the positive electrode active material layer include polytetrafluoroethylene, polyvinylidene fluoride, tetrafluoroethylene-perfluoroalkylvinyl ether copolymer, styrene-butadiene rubber (SBR), carboxymethylcellulose, methylcellulose, cellulose acetate phthalate, hydroxypropylmethylcellulose and polyvinylalcohol.

Examples of the conductive agent usable in the positive electrode active material layer include carbon materials such as acetylene black, ketjen black, furnace black, carbon fibers, graphites (e.g. granular graphite, vein graphite etc.) and fluorinated graphites. In the positive electrode, it is preferable to use acetylene black or ketjen black, both of which are low in crystallinity.

[(C) Negative Electrode]

There is no particular limitation on the negative electrode material. In the case of a lithium battery or lithium ion battery, lithium metal, alloys and intermetallic compounds of lithium metal with other metals, various carbon materials (such as artificial graphite, natural graphite etc), metal oxides, metal nitrides, tin (as simple substance), tin compounds, silicon (as simple substance), silicon compounds, activated carbons, conductive polymers and the like are usable.

The carbon material refers to graphitizable carbon, non-graphitizable carbon (hard carbon) with a (002) plane spacing of 0.37 nm or greater, graphite with a (002) plane spacing of 0.34 nm or smaller or the like. Specific examples of the carbon materials include pyrolytic carbons, cokes, glassy carbon fibers, organic polymer compound fired substances, activated carbons and carbon blacks. The cokes include pitch coke, needle coke, petroleum coke etc. The organic polymer compound fired substances refer to those obtained by firing and carbonizing a phenol resin, a furan resin etc. at appropriate temperatures. It is preferable to use the carbon material because the carbon material shows a very small change of crystal structure caused by occluding and releasing of lithium and thus provides a high energy density and good cycle characteristics. The carbon material can be fibrous, spherical, granular or flake-shaped. An amorphous carbon material or a graphite material having a surface coated with amorphous carbon is more preferred for low reactivity between the material surface and the electrolyte solution.

[Negative Electrode Active Material]

The negative electrode as the constituent element (C) preferably includes at least one kind of negative electrode active material. In the case of a lithium ion secondary battery in which lithium is predominantly contained as cation in the nonaqueous electrolyte solution, the negative electrode active material used for the negative electrode as the constituent element (C) is of the kind capable of doping and dedoping lithium ion. For example, the negative electrode active material can contain at least one kind selected from: (E) a carbon material having a d-value of 0.340 nm or smaller for (002) lattice plane in X-ray diffraction; (F) a carbon material having a d-value of larger than 0.340 nm for (002) lattice plane in X-ray diffraction; (G) an oxide of one or more kinds of metal selected from Si, Sn and Al; (H) one or more kinds of metal selected from Si, Sn and Al, an alloy containing the one or more kinds of metal, or an alloy of the one or more kinds of metal or the alloy and lithium; and (I) a lithium-titanium oxide. These negative electrode active materials can be used solely or in combination of two or more kinds thereof.

((E) Carbon Material Having d-Value of 0.340 nm or Smaller for (002) Lattice Plane in X-Ray Diffraction)

As the negative electrode active material (E): carbon material having a d-value of 0.340 nm or smaller for (002) lattice plane in X-ray diffraction, there can be used a pyrolytic carbon, coke (such as pitch coke, needle coke, petroleum coke etc.), graphite, organic polymer compound fired substance (obtained by firing and carbonizing a phenol resin, a furan resin etc. at appropriate temperatures), carbon fiber, activated carbon or the like. There can alternatively be used any of those obtained by graphitization of the above carbon materials. Each of these carbon materials have a d-value of 0.340 nm or smaller for (002) lattice plane in X-ray diffraction. Among others, it is preferable to use a graphite material having a true density of 1.70 g/cm³ or higher or a highly crystalline carbon material having properties similar to those of such a graphite material.

((F) Carbon Material Having d-Value of Larger than 0.340 nm for (002) Lattice Plane in X-Ray Diffraction)

As the negative electrode active material (F): carbon material having a d-value of larger than 0.340 nm for (002)

lattice plane in X-ray diffraction, there can be used amorphous carbon. The amorphous carbon is a carbon material that causes almost no change of stacking order even when subjected to heat treatment at high temperatures of 200° C. Examples of the amorphous carbon are non-graphitizable carbon (hard carbon), mesocarbon microbeads (MCMB) baked at 1500° C. or lower, mesophase pitch carbon fibers (MCF), and the like. Carbotron P (trademark) manufactured by Kureha Corporation is a typical example of the amorphous carbon material.

((G) Oxide of One or More Kinds of Metal Selected from Si, Sn and Al)

As the negative electrode active material (G): oxide of one or more kinds of metal selected from Si, Sn and Al, there can be used silicon oxide or tin oxide capable of doping and dedoping lithium ion. There can also be used $SiO_x$ in which ultra fine particles of Si are dispersed in $SiO_2$. When the $SiO_x$ material is used as the negative electrode active material, charging and discharging proceed smoothly due to reaction of ultra fine Si particles with Li. In addition, a negative electrode active material layer-forming composition (paste) prepared using the $SiO_x$ material exhibits good applicability and good adhesion to negative electrode collector due to small surface area of $SiO_x$ particles. Since the $SiO_x$ material shows a large volume change caused by charging and discharging, the battery can attain both of high capacity and good charging/discharging cycle characteristics by using $SiO_x$ in combination with the graphite mentioned as the negative electrode active material (E) at a specific ratio.

((H) One or More Kinds of Metal Selected from Si, Sn and Al, Alloy Containing Metal, or Alloy of Metal or Alloy and Lithium)

As the negative electrode active material (H): one or more kinds of metal selected from Si, Sn and Al, alloy containing the one or more kinds of metal, or alloy of the one or more kinds of metal or the alloy and lithium, there can be used silicon, tin, aluminum, silicon alloy, tin alloy, aluminum alloy or the like. There can alternative be used any of those obtained by alloying these metals and alloys with lithium due to charging and discharging. Preferable examples of such a metal material include: metal as simple substance (in e.g. powdery form), such as silicon (Si), tin (Sn) etc., as disclosed in International Application Publication No. WO 2004/100293, Japanese Laid-Open Patent Publication No. 2008-016424 or the like; an alloy of the metal; a compound of the metal; and an alloy containing tin (Sn) and cobalt (Co) in the metal. It is preferable to use the metal because the metal, when used in the electrode, provides a high charge capacity and shows a relatively small volume expansion and contraction caused by charging and discharging. Further, the metal is preferred in that the metal material, when used in the electrode of the lithium ion secondary battery, is alloyed with Li during charging and thus provides a high charge capacity. There can alternatively be used a negative electrode active material made of silicon pillars of sub-micron diameter or a negative electrode active material made of silicon fibers as disclosed in International Application Publication No. WO 2004/042851 or WO 2007/083155.

((I) Lithium-Titanium Oxide)

As the negative electrode active material (I): lithium-titanium oxide, there can be used spinel-structured lithium titanate, ramsdellite-structured lithium titanate or the like. Specific examples of the spinel-structured lithium titanate are $Li_{4+\alpha}Ti_5O_{12}$ (where α varies in the range of 0≤α≤3 by charging/discharging reaction). Specific examples of the ramsdellite-structured lithium titanate are $Li_{2+\beta}Ti_3O_7$ (where β varies in the range of 0≤β≤3 by charging/discharging reaction). The above negative electrode active material compounds can be prepared by a method disclosed in e.g. Japanese Laid-Open Patent Publication No. 2007-018883, Japanese Laid-Open Patent Publication No. 2009-176752 or the like.

In the case of a sodium ion secondary battery in which sodium is predominantly contained as cation in the nonaqueous electrolyte solution, for example, the negative electrode active material used can be a hard carbon material, an oxide such as $TiO_2$, $V_2O_5$, $MoO_3$ etc. or the like; and the positive electrode active material used can be a sodium-containing transition metal composite oxide such as $NaFeO_2$, $NaCrO_2$, $NaNiO_2$, $NaMnO_2$, $NaCoO_2$ etc., a sodium-containing transition metal composite oxide with a plurality of transition metals such as Fe, Cr, Ni, Mn and Co, a composite oxide obtained by replacing a part of transition metal of the above-mentioned lithium-transition metal composite oxide with any metal other than transition metal, a transition metal phosphate compound such as $Na_2FeP_2O_7$, $NaCO_3(PO_4)_2P_2O_7$ etc., a sulfide such as $TiS_2$, $FeS_2$ etc., a conductive polymer such as polyacetylene, poly(para-phenylene), polyaniline, polypyrrole etc., an activated carbon, a radical-generating polymer, a carbon material or the like.

[Negative Electrode Collector]

The negative electrode (C) includes a negative electrode collector. Examples of the negative electrode collector are those made of copper, stainless steel, nickel, titanium and alloys thereof.

In the negative electrode (C), a negative electrode active material layer is formed on at least one side of the negative electrode collector. The negative electrode active material layer contains, for example, the above-mentioned negative electrode active material, a binder and optionally a conductive agent.

Examples of the binder usable in the negative electrode active material layer include polytetrafluoroethylene, polyvinylidene fluoride, tetrafluoroethylene-perfluoroalkylvinyl ether copolymer, styrene-butadiene rubber (SBR), carboxymethylcellulose, methylcellulose, cellulose acetate phthalate, hydroxypropylmethylcellulose and polyvinylalcohol.

Examples of the conductive agent usable in the negative electrode active material layer include carbon materials such as acetylene black, ketjen black, furnace black, carbon fibers, graphites (e.g. granular graphite, vein graphite etc.) and fluorinated graphites.

[Production Method of Electrodes (Positive Electrode (B) and Negative Electrode (C))]

The electrode is produced by forming the active material layer on the collector. The active material layer can be formed by dispersing and kneading the active material, the binder and optionally the conductive agent at a predetermined mixing ratio into a solvent such as N-methyl-2-pyrrolidone (NMP) or water, applying the resulting paste to the collector and drying the applied paste layer. It is preferable that the thus-produced electrode is subjected to compression by a roll press etc. and thereby adjusted to an adequate density.

[(D) Separator]

The nonaqueous electrolyte battery may be provided with (D) a separator. As the separator for preventing contact of the positive electrode (B) and the negative electrode (C), a film of polyolefin such as polypropylene or polyethylene, a nonwoven fabric film of cellulose, paper, glass fiber etc. or a film of porous material sheet is usable. It is preferable that the film used as the separator has a fine porous structure such that the separator can be impregnated with the electrolyte solution so as to facilitate ion permeation.

One example of the polyolefin separator is a fine porous polymer film such as porous polyolefin film capable of allowing permeation of lithium ion therethrough while providing electrical insulation between the positive electrode and the negative electrode. The porous polyolefin film can be a porous polyethylene film alone and a multilayer film in which a porous polyethylene film sheet and a porous polypropylene film sheet are laminated together. There can also be used a film in which a porous polyethylene film sheet and a polypropylene film sheet are combined together.

The exterior member as the constituent element of the nonaqueous electrolyte battery can be a metal can of coin shape, cylindrical shape, rectangular shape etc. or a laminate exterior package. Examples of the material of the metal can material include a nickel-plated steel plate, a stainless steel plate, a nickel-plated stainless steel plate, aluminum or alloy thereof, nickel and titanium. Examples of the material of the laminate exterior package include an aluminum laminate film, a SUS laminate film and a silica-coated laminate film of polypropylene, polyethylene etc.

There is no particular limitation on the configuration of the nonaqueous electrolyte battery according to the present embodiment. For example, the nonaqueous electrolyte battery can have a configuration in which the positive and negative electrodes are opposed to each other as an electrode unit and accommodated together with the nonaqueous electrolyte solution in the exterior member. There is also no particular limitation on the shape of the nonaqueous electrolyte battery. Using the above battery elements, the nonaqueous electrolyte battery can be assembled as an electrochemical device of coin shape, cylindrical shape, rectangular shape, aluminum laminate type etc.

Examples

The present invention will be described in more detail below by way of the following examples. It should however be understood that the following examples are not intended to limit the present invention thereto.

[Formation of NCM622 Positive Electrodes]

A positive electrode material mixture paste was prepared by mixing 91.0 mass % of a $LiNi_{0.6}Mn_{0.2}Co_{0.2}O_2$ powder with 4.5 mass % of polyvinylidene fluoride (hereinafter referred to as "PVDF") as a binder and 4.5 mass % of acetylene black as a conductive agent and adding N-methyl-2-pyrrolidone (hereinafter referred to as "NMP") to the mixed powder. NCM622 positive electrodes for test were each formed by applying the prepared paste to both surfaces of an aluminum foil (A1085), subjecting the applied paste layer to drying and pressing, and then, punching the resulting electrode body into a size of 4×5 cm.

[Formation of NCM811 Positive Electrodes]

A positive electrode material mixture paste was prepared by mixing 91.0 mass % of a $LiNi_{0.8}Mn_{0.1}Co_{0.1}O_2$ powder with 4.5 mass % of PVDF as a binder and 4.5 mass % of acetylene black as a conductive agent and adding NMP to the mixed powder. NCM811 positive electrodes for test were each formed by applying the prepared paste to both surfaces of an aluminum foil (A1085), subjecting the applied paste layer to drying and pressing, and then, punching the resulting electrode body into a size of 4×5 cm.

[Formation of NCA Positive Electrodes]

A positive electrode material mixture paste was prepared by mixing 89.0 mass % of a $LiNi_{0.87}Mn_{0.1}Co_{0.10}Al_{0.03}O_2$ powder with 5.0 mass % of PVDF as a binder and 6.0 mass % of acetylene black as a conductive agent and adding NMP to the mixed powder. NCA positive electrodes for test were each formed by applying the prepared paste to both surfaces of an aluminum foil (A1085), subjecting the applied paste layer to drying and pressing, and then, punching the resulting electrode body into a size of 4×5 cm.

[Formation of Graphite Negative Electrodes]

A negative electrode material mixture paste was prepared by mixing 92.0 mass % of a artificial graphite powder with 8.0 mass % of PVD as a binder and adding NMP to the mixed powder. Graphite negative electrodes for test were each formed by applying the prepared paste to one surface of a copper foil, subjecting the applied paste to drying and pressing, and then, punching the resulting electrode body into a size of 4×5 cm.

[Formation of Silicon-Containing Graphite Negative Electrodes]

A negative electrode material mixture paste was prepared by mixing 85 mass % of an artificial graphite powder with 7 mass % of nanosilicon, 3 mass % of a conductive agent (HS-100), 2 mass % of carbon nanotube (VGCF), 2 mass % of styrene-butadiene rubber, 1 mass % of sodium carboxymethylcellulose and water. Silicon-containing graphite negative electrodes for test were each formed by applying the prepared paste to one surface of a copper foil, subjecting the applied paste to drying and pressing, and then, punching the resulting electrode body into a size of 4×5 cm.

[Synthesis of Silicon Compounds of General Formulas (1) and (2) with at Least One Kind Selected from Unsaturated Bonds and Aromatic Rings]

The silicon compounds of the general formulas (1) and (2) each having a substituent group with at least one kind selected from unsaturated bonds or aromatic bonds can be produced by various methods. There is no particular limitation on the production methods of these silicon compounds.

For example, ethynyltrichlorosilane, triethynylchlorosilane and tetraethynylsilane (1j) were prepared by reacting silicon tetrachloride with ethynyl Grignard reagent in tetrahydrofuran at an internal temperature of 40° C. or lower. These silicon compounds were separately obtained by, after reacting the raw material with the adjusted amount of the ethynyl Grignard reagent, subjecting the reaction product to distillation under reduced pressure at an internal temperature of 100° C. or lower.

The silicon compounds (1a), (1b), (1c) and (1f) were each easily obtained by reacting triethynylchlorosilane as a raw material with 1 equivalent of the corresponding alcohol in the presence of a base such as triethylamine.

Similarly, the silicon compounds (1g), (1h), (1i) and (1k) were each obtained by reacting triethynylchlorosilane with 1 equivalent of the corresponding organic lithium reagent or Grignard reagent.

The silicon compounds (1e) and (1q) were each obtained by ethynyltrichlorosilane as a raw material with 3 equivalents of propargylalcohol or sodium acetylide.

The silicon compound (1p) was obtained by reacting ethynyltrichlorosilane with 1 equivalent of allyl Grignard reagent and further reacting the reaction product with 2 equivalents of sodium acetylide.

The silicon compounds (2b), (2f) and (2h) were each obtained by reacting ethyltrichlorosilane as a raw material with 2 equivalents of ethynyl Grignard reagent in cyclopentyl methyl ether and further reacting the reaction product with 1 equivalent of phenol and trimethylamine, with 1 equivalent of propargylalcohol and trimethylamine or with 1 equivalent of phenyllithium at an internal temperature of 10° C. or lower.

The silicon compound (2j) was obtained by reacting ethyltrichlorosilane as a raw material with 3 equivalents of ethynyl Grignard reagent in diethylene glycol diethyl ether.

[Preparation of $LiPF_6$ Solutions (DMC, MEC, DEC)]

According to a method disclosed in Patent Document 7, concentrated $LiPF_6$ solutions were prepared. More specifically, lithium hexachlorophosphate was formed by reaction of phosphorus trichloride, lithium chloride and chlorine in a carbonate ester (DMC, EMC or DEC), and then, subjected to fluorination by introduction of hydrogen fluoride. There were thus provided the solutions of $LiPF_6$, hydrogen chloride and unreacted hydrogen fluoride in DMC, in EMC and in DEC. The thus-provided solutions were concentrated under reduced pressure to remove almost all of hydrogen chloride and most of hydrogen fluoride, thereby yielding the concentrated $LiPF_6$ solutions. For removal of the residual hydrogen fluoride, each of the concentrated solutions was purified by, after diluting the solution to a concentration of 30.0 mass % with the addition of the carbonate ester and thereby lowering the viscosity of the solution, adding 10 mass % of a dehydrated ion exchange resin into 100 g of the solution. As a consequence, the solutions of $LiPF_6$ in the respective carbonate ester solvents were obtained.

[Preparation of Reference Electrolyte Solutions]

In a glove box of dew point −60° C. or lower, the above-prepared 30 mass % $LiPF_6$/EMC solution was mixed with EC, DMC and EMC as an nonaqueous solvent having a water content of 15 mass ppm or lower, such that the mixed solution had a $LiPF_6$ concentration of 1.0 M and a solvent ratio (volume ratio) of EC:DMC:EMC=3:3:4. The mixed solution was stirred for 1 hour. The thus-obtained solution was used as a reference electrolyte solution 1.

Similarly, a reference electrolyte solution 2 was prepared by mixing 30 mass % of the above-prepared $LiPF_6$/DMC solution with EC and DMC such that the mixed solution had a $LiPF_6$ concentration of 1.0 M and a solvent ratio (volume ratio) of EC:DMC=1:2, and then, stirring the mixed solution 1 hour.

A reference electrolyte solution 3 was prepared by mixing 30 mass % of the above-prepared $LiPF_6$/EMC solution with FEC, DMC and EMC such that the mixed solution had a $LiPF_6$ concentration of 1.0 M and a solvent ratio (volume ratio) of FEC:DMC:EMC=3:3:4, and then, stirring the mixed solution 1 hour.

A reference electrolyte solution 4 was prepared by mixing 30 mass % of the above-prepared $LiPF_6$/DEC solution with EC and DEC and with LiFSI such that the mixed solution had a $LiPF_6$ concentration of 0.7 M, a LiFSI concentration of 0.3 M and a solvent ratio (volume ratio) of EC:DEC=1:2, and then, stirring the mixed solution 1 hour.

A reference electrolyte solution 5 was prepared by mixing 30 mass % of the above-prepared $LiPF_6$/EMC solution with EC, FEC and EMC such that the mixed solution had a $LiPF_6$ concentration of 1.0 M and a solvent ratio (volume ratio) of EC:FEC:EMC=1:2:7, and then, stirring the mixed solution 1 hour.

The preparation of these reference electrolyte solutions were carried out while maintaining the temperature of the respective solution at 40° C. or lower.

TABLE 1

| Reference Electrolyte Solution | Solute | | Solvent (volume ratio) | | | | |
|---|---|---|---|---|---|---|---|
| | $LiPF_6$ | LiFSI | DMC | EMC | DEC | EC | FEC |
| 1 | 1.0 M | — | 3 | 4 | — | 3 | — |
| 2 | 1.0 M | — | 2 | — | — | 1 | — |
| 3 | 1.0 M | — | 3 | 4 | — | — | 3 |
| 4 | 0.7 M | 0.3 M | — | — | 2 | 1 | — |
| 5 | 1.0 M | — | — | 7 | — | 1 | 2 |

[Preparation of Electrolyte Solutions according to Examples and Comparative Examples]

Into the reference electrolyte solution 1, the silicon compound (1a) was added in an amount of 0.3 mass % and dissolved by stirring for 1 hour. This solution was used as a nonaqueous electrolyte solution 1-(1a)-100-(0).

Further, the silicon compound (1a) was mixed with the silicon compound (2b) such that the content of the silicon compound (2b) was 0.07 mass % with respect to 100 mass % of the silicon compound (1a). The mixture of the silicon compounds (1a) and (2b) was added in an amount of 0.3 mass % into the reference electrolyte solution 1, followed by dissolving the silicon compounds into the reference electrolyte solution with stirring for 1 hour. This solution was used as a nonaqueous electrolyte solution 1-(1a)-100-(2b)-0.07.

Similarly, nonaqueous electrolyte solutions were each prepared by mixing the silicon compounds (1) and (2) as shown in TABLES 2 to 27, adding the mixture in an amount of 0.3 mass % into the reference electrolyte solution 1, adding the other solute or additive component into the mixed electrolyte solution at a concentration shown in TABLES 2 to 27, and dissolving the added component in the mixed electrolyte solution with stirring.

Nonaqueous electrolyte solutions according to Comparative Examples, each of which contained the silicon compound (1) and the other solute or additive component but did not contain the silicon compound (2) as shown in TABLES 28 to 52, were prepared in the same manner as above.

Furthermore, nonaqueous electrolyte solutions according to Comparative Examples, each of which contained the silicon compound (1), the silicon compound (2) and the other solute or additive component such that the content of the silicon compound (2) was 30 mass % as shown in TABLES 53 to 77, were also prepared in the same manner as above.

TABLE 2

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1a)-100-(0) | (1a) | 100 | (2b) | none | none | |
| 1-(1a)-100-(2b)-0.07 | | | | 007 | | |
| 1-(1a)-100-(2b)-0.12 | | | | 0.12 | | |
| 1-(1b)-100-(0) | (1b) | 100 | | none | | |
| 1-(1b)-100-(2b)-0.07 | | | | 0.07 | | |
| 1-(1b)-100-(2b)-0.12 | | | | 0.12 | | |
| 1-(1b)-100-(2b)-20 | | | | 20 | | |
| 1-(1b)-100-(2b)-30 | | | | 30 | | |

TABLE 2-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1c)-100-(0) | (1c) | 100 | | none | | |
| 1-(1c)-100-(2b)-0.07 | | | | 0.07 | | |
| 1-(1c)-100-(2b)-0.12 | | | | 0.12 | | |
| 1-(1e)-100-(0) | (1e) | 100 | (2f) | none | | |
| 1-(1e)-100-(2f)-0.07 | | | | 0.07 | | |
| 1-(1e)-100-(2f)-0.12 | | | | 0.12 | | |
| 1-(1f)-100-(0) | (1f) | 100 | | none | | |
| 1-(1f)-100-(2f)-0.07 | | | | 0.07 | | |
| 1-(1f)-100-(2f)-0.12 | | | | 0.12 | | |
| 1-(1f)-100-(2f)-20 | | | | 20 | | |
| 1-(1f)-100-(2f)-30 | | | | 30 | | |
| 1-(1p)-100-(0) | (1p) | 100 | | none | | |
| 1-(1p)-100-(2f)-0.07 | | | | 0.07 | | |
| 1-(1p)-100-(2f)-0.12 | | | | 0.12 | | |
| 1-(1g)-100-(0) | (1g) | 100 | (2h) | none | | |
| 1-(1g)-100-(2h)-0.07 | | | | 0.07 | | |
| 1-(1g)-100-(2h)-0.12 | | | | 0.12 | | |
| 1-(1h)-100-(0) | (1h) | 100 | | none | | |
| 1-(1h)-100-(2h)-0.07 | | | | 0.07 | | |
| 1-(1h)-100-(2h)-0.12 | | | | 0.12 | | |
| 1-(1h)-100-(2h)-20 | | | | 20 | | |
| 1-(1h)-100-(2h)-30 | | | | 30 | | |
| 1-(1i)-100-(0) | (1i) | 100 | | none | | |
| 1-(1i)-100-(2h)-0.07 | | | | 0.07 | | |
| 1-(1i)-100-(2h)-0.12 | | | | 0.12 | | |
| 1-(1j)-100-(0) | (1j) | 100 | (2j) | none | | |
| 1-(1j)-100-(2h)-0.07 | | | | 0.07 | | |
| 1-(1j)-100-(2h)-0.12 | | | | 0.12 | | |
| 1-(1k)-100-(0) | (1k) | 100 | | none | | |
| 1-(1k)-100-(2j)-007 | | | | 0.07 | | |
| 1-(1k)-100-(2j)-0.12 | | | | 0.12 | | |
| 1-(1q)-100-(0) | (1q) | 100 | | none | | |
| 1-(1q)-100-(2j)-0.07 | | | | 0.07 | | |
| 1-(1q)-100-(2j)-0.12 | | | | 0.12 | | |
| 1-(1q)-100-(2j)-20 | | | | 20 | | |
| 1-(1q)-100-(2j)-30 | | | | 30 | | |
| 1-(1i)-100-(2j)-0.12 | (1i) | 100 | (2j) | 0.12 | | |
| 1-(1p)-100-(2h)-0.12 | (1p) | 100 | (2h) | 0.12 | | |
| 1-(1a)-100-(2f)-0.12 | (1a) | 100 | (2f) | 0.12 | | |
| 1-(1e)-100-(2b)-0.12 | (1e) | 100 | (2b) | 0.12 | | |
| 1-(1k)-100-(2b)-0.12 | (1k) | 100 | (2b) | 0.12 | | |
| 1-(1q)-100-(2h)-0.12 | (1q) | 100 | (2h) | 0.12 | | |

TABLE 3

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1b)-100-(2b)-0.12-LiFSI-2 | (1b) | 100 | (2b) | 0.12 | LiFSI | 2.0 |
| 1-(1b)-100-(2b)-0.12-LiSO$_3$F-1 | (1b) | 100 | (2b) | 0.12 | LiSO$_3$F | 1.0 |
| 1-(1b)-100-(2b)-0.12-LDFBOP-1 | (1b) | 100 | (2b) | 0.12 | LDFBOP | 1.0 |
| 1-(1b)-100-(2b)-0.12-ESF-0.5 | (1b) | 100 | (2b) | 0.12 | ESF | 0.5 |
| 1-(1b)-100-(2b)-0.12-LiPO$_2$F$_2$-1 | (1b) | 100 | (2b) | 0.12 | LiPO$_2$F$_2$ | 1.0 |
| 1-(1b)-100-(2b)-0.12-FB-5 | (1b) | 100 | (2b) | 0.12 | FB | 5.0 |
| 1-(1b)-100-(2b)-0.12-Dod-0.5 | (1b) | 100 | (2b) | 0.12 | Dod | 0.5 |
| 1-(1b)-100-(2b)-0.12-pDod-0.5 | (1b) | 100 | (2b) | 0.12 | pDod | 0.5 |
| 1-(1b)-100-(2b)-0.12-Dad-0.5 | (1b) | 100 | (2b) | 0.12 | Dad | 0.5 |
| 1-(1b)-100-(2b)-0.12-PS-1 | (1b) | 100 | (2b) | 0.12 | PS | 1.0 |

TABLE 3-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1b)-100-(2b)-0.12-LiFFSI-1 | (1b) | 100 | (2b) | 0.12 | LiTFSI | 1.0 |
| 1-(1b)-100-(2b)-0.12-LiBETI-1 | (1b) | 100 | (2b) | 0.12 | LiBET1 | 1.0 |
| 1-(1b)-100-(2b)-0.12-LiBF$_4$-1 | (1b) | 100 | (2b) | 0.12 | LiBF$_4$ | 1.0 |

TABLE 4

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1f)-100-(2f)-0.12-LiPO$_2$F$_2$-1 | (1f) | 100 | (2f) | 0.12 | LiPO$_2$F$_2$ | 1.0 |
| 1-(1f)-100-(2f)-0.12-LTFOP-1 | (1f) | 100 | (2f) | 0.12 | LTFOP | 1.0 |
| 1-(1f)-100-(2f)-0.12-LDFOP-1 | (1f) | 100 | (2f) | 0.12 | LDFOB | 1.0 |
| 1-(1f)-100-(2f)-0.12-TSF-0.5 | (1f) | 100 | (2f) | 0.12 | TSF | 0.5 |
| 1-(1f)-100-(2f)-0.12-LiSO$_3$F-1 | (1f) | 100 | (2f) | 0.12 | LiSO$_3$F | 1.0 |
| 1-(1f)-100-(2f)-0.12-FB-5 | (1f) | 100 | (2f) | 0.12 | FB | 5.0 |
| 1-(1f)-100-(2f)-0.12-Dod-0.5 | (1f) | 100 | (2f) | 0.12 | Dod | 0.5 |
| 1-(1f)-100-(2f)-0.12-pDod-0.5 | (1f) | 100 | (2f) | 0.12 | pDod | 0.5 |
| 1-(1f)-100-(2f)-0.12-Dad-0.5 | (1f) | 100 | (2f) | 0.12 | Dad | 0.5 |
| 1-(1f)-100-(2f)-0.12-PS-1 | (1f) | 100 | (2f) | 0.12 | PS | 1.0 |
| 1-(1f)-100-(2f)-0.12-LiFSI-1 | (1f) | 100 | (2f) | 0.12 | LiFSI | 1.0 |
| 1-(1f)-100-(2f)-0.12-LiTFSI-1 | (1f) | 100 | (2f) | 0.12 | LiTFSI | 1.0 |
| 1-(1f)-100-(2f)-0.12-LiBET1-1 | (1f) | 100 | (2f) | 0.12 | LiBETI | 1.0 |
| 1-(1f)-100-(2f)-0.12-LiBF$_4$-1 | (1f) | 100 | (2f) | 0.12 | LiBF$_4$ | 1.0 |

TABLE 5

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1h)-100-(2h)-0.12-LiSO$_3$F-1 | (1h) | 100 | (2h) | 0.12 | LiSO$_3$F | 1.0 |
| 1-(1h)-100-(2h)-0.12-LTFOP-1 | (1h) | 100 | (2h) | 0.12 | LTFOP | 1.0 |
| 1-(1h)-100-(2h)-0.12-LDFBOP-1 | (1h) | 100 | (2h) | 0.12 | LDFBOP | 1.0 |
| 1-(1h)-100-(2h)-0.12-PDFP-1 | (1h) | 100 | (2h) | 0.12 | PDFP | 1.0 |
| 1-(1h)-100-(2h)-0.12-LiPO$_2$F$_2$-1 | (1h) | 100 | (2h) | 0.12 | LPO$_2$F$_2$ | 1.0 |
| 1-(1h)-100-(2h)-0.12-MSF-0.5 | (1h) | 100 | (2h) | 0.12 | MSF | 0.5 |
| 1-(1h)-100-(2h)-0.12-FB-5 | (1h) | 100 | (2h) | 0.12 | FB | 5.0 |
| 1-(1h)-100-(2h)-0.12-Dod-0.5 | (1h) | 100 | (2h) | 0.12 | Dod | 0.5 |
| 1-(1h)-100-(2h)-0.12-pDod-0.5 | (1h) | 100 | (2h) | 0.12 | pDod | 0.5 |
| 1-(1h)-100-(2h)-0.12-Dad-0.5 | (1h) | 100 | (2h) | 0.12 | Dad | 0.5 |
| 1-(1h)-100-(2h)-0.12-PS-1 | (1h) | 100 | (2h) | 0.12 | PS | 1.0 |
| 1-(1h)-100-(2h)-0.12-LiFSI-1 | (1h) | 100 | (2h) | 0.12 | LiFSI | 1.0 |
| 1-(1h)-100-(2h)-0.12-LiTFSI-1 | (1h) | 100 | (2h) | 0.12 | LiTFSI | 1.0 |
| 1-(1h)-100-(2h)-0.12-LiBETI-1 | (1h) | 100 | (2h) | 0.12 | LiBETI | 1.0 |
| 1-(1h)-100-(2h)-0.12-LiBF$_4$-1 | (1h) | 100 | (2h) | 0.12 | LiBF$_4$ | 1.0 |

TABLE 6

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1j)-100-(2j)-0.12-LiSO₃F-1 | (1j) | 100 | (2j) | 0.12 | LiSO$_3$F | 1.0 |
| 1-(1j)-100-(2j)-0.12-LiPO₂F₂-1 | (1j) | 100 | (2j) | 0.12 | LiPO$_2$F$_2$ | 1.0 |
| 1-(1j)-100-(2j)-0.12-LDFOB-1 | (1j) | 100 | (2j) | 0.12 | LDFOB | 1.0 |
| 1-(1j)-100-(2j)-0.12-MSF-0.5 | (1j) | 100 | (2j) | 0.12 | MSF | 0.5 |
| 1-(1j)-100-(2j)-0.12-FB-5 | (1j) | 100 | (2j) | 0.12 | FB | 5.0 |
| 1-(1j)-100-(2j)-0.12-Dod-0.5 | (1j) | 100 | (2j) | 0.12 | Dod | 0.5 |
| 1-(1j)-100-(2j)-0.12-pDod-0.5 | (1j) | 100 | (2j) | 0.12 | pDod | 0.5 |
| 1-(1j)-100-(2j)-0.12-Dad-0.5 | (1j) | 100 | (2j) | 0.12 | Dad | 0.5 |
| 1-(1j)-100-(2j)-0.12-PS-1 | (1j) | 100 | (2j) | 0.12 | PS | 1.0 |
| 1-(1j)-100-(2j)-0.12-LiFSI-1 | (1j) | 100 | (2j) | 0.12 | LiFSI | 1.0 |
| 1-(1j)-100-(2j)-0.12-LiTFSI-1 | (1j) | 100 | (2j) | 0.12 | LiTFSI | 1.0 |
| 1-(1j)-100-(2j)-0.12-LiBETI-1 | (1j) | 100 | (2j) | 0.12 | LiBETI | 1.0 |
| 1-(1j)-100-(2j)-0.12-LiBF₄-1 | (1j) | 100 | (2j) | 0.12 | LiBF$_4$ | 1.0 |

TABLE 7

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1c)-100-(2b)-0.12-LiSO₃F-1 | (1c) | 100 | (2b) | 0.12 | LiSO$_3$F | 1.0 |
| 1-(1c)-100-(2b)-0.12-LiPO₂F₂-1 | (1c) | 100 | (2b) | 0.12 | LiPO$_2$F$_2$ | 1.0 |
| 1-(1g)-100-(2h)-0.12-LiFSI-2 | (1g) | 100 | (2h) | 0.12 | LiFSI | 2.0 |
| 1-(1g)-100-(2h)-0.12-LiSO₃F-1 | (1g) | 100 | (2h) | 0.12 | LiSO$_3$F | 1.0 |
| 1-(1i)-100-(2j)-0.12-LiFSI-2 | (1i) | 100 | (2j) | 0.12 | LiFSI | 2.0 |
| 1-(1i)-100-(2j)-0.12-LiSO₃F-1 | (1i) | 100 | (2j) | 0.12 | LiSO$_3$F | 1.0 |
| 1-(1p)-100-(2h)-0.12-LiSO₃F-1 | (1p) | 100 | (2h) | 0.12 | LiSO$_3$F | 1.0 |
| 1-(1p)-100-(2h)-0.12-LiPO₂F₂-1 | (1p) | 100 | (2h) | 0.12 | LiPO$_2$F$_2$ | 1.0 |
| 1-(1a)-100-(2f)-0.12-LiSO₃F-1 | (1a) | 100 | (2f) | 0.12 | LiSO$_3$F | 1.0 |
| 1-(1a)-100-(2f)-0.12-LTFOP-1 | (1a) | 100 | (2f) | 0.12 | LTFOP | 1.0 |
| 1-(1e)-100-(2b)-0.12-LiSO₃F-1 | (1e) | 100 | (2b) | 0.12 | LiSO$_3$F | 1.0 |
| 1-(1e)-100-(2b)-0.12-LTFOP-1 | (1e) | 100 | (2b) | 0.12 | LTFOP | 1.0 |
| 1-(1k)-100-(2b)-0.12-LiPO₂F₂-1 | (1k) | 100 | (2b) | 0.12 | LiPO$_2$F$_2$ | 1.0 |
| 1-(1k)-100-(2b)-0.12-LTFOP-1 | (1k) | 100 | (2b) | 0.12 | LTFOP | 1.0 |
| 1-(1q)-100-(2h)-0.12-LiPO₂F₂-1 | (1q) | 100 | (2h) | 0.12 | LiPO$_2$F$_2$ | 1.0 |
| 1-(1q)-100-(2h)-0.12-LTFOP-1 | (1q) | 100 | (2h) | 0.12 | LTFOP | 1.0 |

TABLE 8

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1b)-100-(2b)-0.12-LDFBOP-0.5-LiFSI-1 | (1b) | 100 | (2b) | 0.12 | LDFBOP | 0.5 |
| | | | | | LiFSI | 1.0 |
| 1-(1b)-100-(2b)-0.12-LDFBOP-1-LiPO₂F₂-0.5 | (1b) | 100 | (2b) | 0.12 | LDFBOP | 1.0 |
| | | | | | LiPO$_2$F$_2$ | 0.5 |
| 1-(1b)-100-(2b)-0.12-LDFBOP-1-ESF-0.5 | (1b) | 100 | (2b) | 0.12 | LDFBOP | 1.0 |
| | | | | | ESF | 0.5 |
| 1-(1b)-100-(2b)-0.12-LiPO₂F₂-0.5-FB-5 | (1b) | 100 | (2b) | 0.12 | LiPO$_2$F$_2$ | 0.5 |
| | | | | | FB | 5.0 |

TABLE 8-continued

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1b)-100-(2b)-0.12-LiPO$_2$F$_2$-0.5-Dod-0.5 | (1b) | 100 | (2b) | 0.12 | LiPO$_2$F$_2$<br>Dod | 0.5<br>0.5 |
| 1-(1b)-100-(2b)-0.12-LiPO$_2$F$_2$-0.5-pDod-0.5 | (1b) | 100 | (2b) | 0.12 | LiPO$_2$F$_2$<br>pDod | 0.5<br>0.5 |
| 1-(1b)-100-(2b)-0.12-LiPO$_2$F$_2$-0.5-Dad-0.5 | (1b) | 100 | (2b) | 0.12 | LiPO$_2$F$_2$<br>Dad | 0.5<br>0.5 |
| 1-(1b)-100-(2b)-0.12-LiPO$_2$F$_2$-0.5-PS-1 | (1b) | 100 | (2b) | 0.12 | LiPO$_2$F$_2$<br>PS | 0.5<br>1.0 |
| 1-(1b)-100-(2b)-0.12-LiPO$_2$F$_2$-0.5-LiBF$_4$-1 | (1b) | 100 | (2b) | 0.12 | LiPO$_2$F$_2$<br>LiBF$_4$ | 0.5<br>1.0 |
| 1-(1b)-100-(2b)-0.12-LiPO$_2$F$_2$-0.5-LiFSI-1 | (1b) | 100 | (2b) | 0.12 | LiPO$_2$F2<br>LiFSI | 0.5<br>1.0 |
| 1-(1b)-100-(2b)-0.12-LiPO$_2$F$_2$-0.5-LiTFSI-1 | (1b) | 100 | (2b) | 0.12 | LiPO$_2$F$_2$<br>LiTFSI | 0.5<br>1.0 |
| 1-(1b)-100-(2b)-0.12-LiPO$_2$F$_2$-0.5-LiBETI-1 | (1b) | 100 | (2b) | 0.12 | LiPO$_2$F$_2$<br>LiBETI | 0.5<br>1.0 |
| 1-(1b)-100-(2b)-0.12-LiPO$_2$F$_2$-0.5-LiSO$_3$F-1 | (1b) | 100 | (2b) | 0.12 | LiPO$_2$F$_2$<br>LiSO$_3$F | 0.5<br>1.0 |

TABLE 9

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1f)-100-(2f)-0.12-LDFBOP-0.5-LiSO$_3$F-1 | (1f) | 100 | (2f) | 0.12 | LDFBOP<br>LiSO$_3$F | 0.5<br>1.0 |
| 1-(1f)-100-(2f)-0.12-LDFBOP-1-LiPO$_2$F$_2$-0.5 | (1f) | 100 | (2f) | 0.12 | LDFBOP<br>LiPO$_2$F$_2$ | 1.0<br>0.5 |
| 1-(1f)-100-(2f)-0.12-LDFBOP-1-TSF-0.5 | (1f) | 100 | (2f) | 0.12 | LDFBOP<br>TSF | 1.0<br>0.5 |
| 1-(1f)-100-(2f)-0.12-LiPO$_2$F$_2$-0.5-FB-5 | (1f) | 100 | (2f) | 0.12 | LiPO$_2$F$_2$<br>FB | 0.5<br>5.0 |
| 1-(1f)-100-(2f)-0.12-LiPO$_2$F$_2$-0.5-Dod-0.5 | (1f) | 100 | (2f) | 0.12 | LiPO$_2$F$_2$<br>Dod | 0.5<br>0.5 |
| 1-(1f)-100-(2f)-0.12-LiPO$_2$F$_2$-0.5-pDod-0.5 | (1f) | 100 | (2f) | 0.12 | LiPO$_2$F$_2$<br>pDod | 0.5<br>0.5 |
| 1-(1f)-100-(2f)-0.12-LiPO$_2$F$_2$-0.5-Dad-0.5 | (1f) | 100 | (2f) | 0.12 | LiPO$_2$F$_2$<br>Dad | 0.5<br>0.5 |
| 1-(1f)-100-(2f)-0.12-LiPO$_2$F$_2$-0.5-PS-1 | (1f) | 100 | (2f) | 0.12 | LiPO$_2$F$_2$<br>PS | 0.5<br>1.0 |
| 1-(1f)-100-(2f)-0.12-LiPO$_2$F$_2$-0.5-LiBF$_4$-1 | (1f) | 100 | (2f) | 0.12 | LiPO$_2$F$_2$<br>LiBF$_4$ | 0.5<br>1.0 |
| 1-(1f)-100-(2f)-0.12-LiPO$_2$F$_2$-0.5-LiFSI-1 | (1f) | 100 | (2f) | 0.12 | LiPO$_2$F$_2$<br>LiFSI | 0.5<br>1.0 |
| 1-(1f)-100-(2f)-0.12-LiPO$_2$F$_2$-0.5-LiTFSI-1 | (1f) | 100 | (2f) | 0.12 | LiPO$_2$F$_2$<br>LiTFSI | 0.5<br>1.0 |
| 1-(1f)-100-(2f)-0.12-LiPO$_2$F$_2$-0.5-LiBETI-1 | (1f) | 100 | (2f) | 0.12 | LiPO$_2$F$_2$<br>LiBETI | 0.5<br>1.0 |
| 1-(1f)-100-(2f)-0.12-LiPO$_2$F$_2$-0.5-LiSO$_3$F-1 | (1f) | 100 | (2f) | 0.12 | LiPO$_2$F$_2$<br>LiSO$_3$F | 0.5<br>1.0 |

TABLE 10

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1h)-100-(2h)-0.12-LDFBOP-0.5-LiFS1-1 | (1h) | 100 | (2h) | 0.12 | LDFBOP<br>LiFSI | 0.5<br>1.0 |
| 1-(1h)-100-(2h)-0.12-LDFBOP-0.5-LiSO$_3$F-1 | (1h) | 100 | (2h) | 0.12 | LDFBOP<br>LiSO$_3$F | 0.5<br>1.0 |
| 1-(1h)-100-(2h)-0.12-LDFBOP-1-PDFP-0.5 | (1h) | 100 | (2h) | 0.12 | LDFBOP<br>PDFP | 1.0<br>0.5 |
| 1-(1h)-100-(2h)-0.12-LiPO$_2$F$_2$--0.5-FB-5 | (1h) | 100 | (2h) | 0.12 | LiPO$_2$F$_2$<br>FB | 0.5<br>5.0 |
| 1-(1h)-100-(2h)-0.12-LiPO$_2$F$_2$-0.5-Dod-0.5 | (1h) | 100 | (2h) | 0.12 | LiPO$_2$F$_2$<br>Dod | 0.5<br>0.5 |
| 1-(1h)-100-(2h)-0.12-LiPO$_2$F$_2$-0.5-pDod-0.5 | (1h) | 100 | (2h) | 0.12 | LiPO$_2$F$_2$<br>pDod | 0.5<br>0.5 |
| 1-(1h)-100-(2h)-0.12-LiPO$_2$F$_2$-0.5-Dad-0.5 | (1h) | 100 | (2h) | 0.12 | LiPO$_2$F$_2$<br>Dad | 0.5<br>0.5 |
| 1-(1h)-100-(2h)-0.12-LiPO$_2$F$_2$-0.5-PS-1 | (1h) | 100 | (2h) | 0.12 | LiPO$_2$F$_2$<br>PS | 0.5<br>1.0 |
| 1-(1h)-100-(2h)-0.12-LiPO$_2$F$_2$-0.5-LiBF$_4$-1 | (1h) | 100 | (2h) | 0.12 | LiPO$_2$F$_2$<br>LiBF$_4$ | 0.5<br>1.0 |
| 1-(1h)-100-(2h)-0.12-LiPO$_2$F$_2$-0.5-LiFSI-1 | (1h) | 100 | (2h) | 0.12 | LiPO$_2$F$_2$<br>LiFSI | 0.5<br>1.0 |
| 1-(1h)-100-(2h)-0.12-LiPO$_2$F$_2$-0.5-LiTFSI-1 | (1h) | 100 | (2h) | 0.12 | LiPO$_2$F$_2$<br>LiTFSI | 0.5<br>1.0 |
| 1-(1h)-100-(2h)-0.12-LiPO$_2$F$_2$-0.5-LiBETI-1 | (1h) | 100 | (2h) | 0.12 | LiPO$_2$F$_2$<br>LiBETI | 0.5<br>1.0 |
| 1-(1h)-100-(2h)-0.12-LiPO$_2$F$_2$-0.5-LiSO$_3$F-1 | (1h) | 100 | (2h) | 0.12 | LiPO$_2$F$_2$<br>LiSO$_3$F | 0.5<br>1.0 |

TABLE 11

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1j)-100-(2j)-0.12-LDFBOP-0.5-LDFPFSI-1 | (1j) | 100 | (2j) | 0.12 | LDFBOP<br>LDFPFSI | 0.5<br>1.0 |
| 1-(1j)-100-(2j)-0.12-LDFBOP-1-LiPO$_2$F$_2$-0.5 | (1j) | 100 | (2j) | 0.12 | LDFBOP<br>LiPO$_2$F$_2$ | 1.0<br>0.5 |
| 1-(1j)-100-(2j)-0.12-LDFBOP-1-MSF-0.5 | (1j) | 100 | (2j) | 0.12 | LDFBOP<br>MSF | 1.0<br>0.5 |
| 1-(1j)-100-(2j)-0.12-LiPO$_2$F$_2$-0.5-FB-5 | (1j) | 100 | (2j) | 0.12 | LiPO$_2$F$_2$<br>FB | 0.5<br>5.0 |
| 1-(1j)-100-(2j)-0.12-LiPO$_2$F$_2$-0.5-Dod-0.5 | (1j) | 100 | (2j) | 0.12 | LiPO$_2$F$_2$<br>Dod | 0.5<br>0.5 |
| 1-(1j)-100-(2j)-0.12-LiPO$_2$F$_2$-0.5-pDod-0.5 | (1j) | 100 | (2j) | 0.12 | LiPO$_2$F$_2$<br>pDod | 0.5<br>0.5 |
| 1-(1j)-100-(2j)-0.12-LiPO$_2$F$_2$-0.5-Dad-0.5 | (1j) | 100 | (2j) | 0.12 | LiPO$_2$F$_2$<br>Dad | 0.5<br>0.5 |
| 1-(1j)-100-(2j)-0.12-LiPO$_2$F$_2$-0.5-PS-1 | (1j) | 100 | (2j) | 0.12 | LiPO$_2$F$_2$<br>PS | 0.5<br>1.0 |
| 1-(1j)-100-(2j)-0.12-LiPO$_2$F$_2$-0.5-LiBF$_4$-1 | (1j) | 100 | (2j) | 0.12 | LiPO$_2$F$_2$<br>LiBF$_4$ | 0.5<br>1.0 |
| 1-(1j)-100-(2j)-0.12-LiPO$_2$F$_2$-0.5-LiFSI-1 | (1j) | 100 | (2j) | 0.12 | LiPO$_2$F$_2$<br>LiFSI | 0.5<br>1.0 |
| 1-(1j)-100-(2j)-0.12-LiPO$_2$F$_2$-0.5-LiTFSI-1 | (1j) | 100 | (2j) | 0.12 | LiPO$_2$F$_2$<br>LiTFSI | 0.5<br>1.0 |
| 1-(1j)-100-(2j)-0.12-LiPO$_2$F$_2$-0.5-LiBETI-1 | (1j) | 100 | (2j) | 0.12 | LiPO$_2$F$_2$<br>LiBETI | 0.5<br>1.0 |
| 1-(1j)-100-(2j)-0.12-LiPO$_2$F$_2$-0.5-LiSO$_3$F-1 | (1j) | 100 | (2j) | 0.12 | LiPO$_2$F$_2$<br>LiSO$_3$F | 0.5<br>1.0 |

TABLE 12

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | Concentration (mass %) in Electrolyte Solution | |
| | No. | mass ratio | No. | mass ratio | Kind | |
| 1-(1b)-100-(2b)-0.12-LiPO$_2$F$_2$-0.5-FB-5-Dod-0.5 | (1b) | 100 | (2b) | 0.12 | LiPO$_2$F$_2$<br>FB<br>Dod | 0.5<br>5.0<br>0.5 |
| 1-(1b)-100-(2b)-0.12-LiPO$_2$F$_2$-0.5-FB-5-pDod-0.5 | (1b) | 100 | (2b) | 0.12 | LiPO$_2$F$_2$<br>FB<br>pDod | 0.5<br>5.0<br>0.5 |
| 1-(1b)-100-(2b)-0.12-LiPO$_2$F$_2$-0.5-FB-5-Dad-0.5 | (1b) | 100 | (2b) | 0.12 | LiPO$_2$F$_2$<br>FB<br>Dad | 0.5<br>5.0<br>0.5 |
| 1-(1b)-100-(2b)-0.12-LiPO$_2$F$_2$-0.5-FB-5-PS-1 | (1b) | 100 | (2b) | 0.12 | LiPO$_2$F$_2$<br>FB<br>PS | 0.5<br>5.0<br>1.0 |
| 1-(1b)-100-(2b)-0.12-LiPO$_2$F$_2$-0.5-FB-5-LiBF$_4$-1 | (1b) | 100 | (2b) | 0.12 | LiPO$_2$F$_2$<br>FB<br>LiBF$_4$ | 0.5<br>5.0<br>1.0 |
| 1-(1b)-100-(2b)-0.12-LiPO$_2$F$_2$-0.5-FB-5-LiFSI-1 | (1b) | 100 | (2b) | 0.12 | LiPO$_2$F$_2$<br>FB<br>LiFSI | 0.5<br>5.0<br>1.0 |
| 1-(1b)-100-(2b)-0.12-LiPO$_2$F$_2$-0.5-FB-5-LiTFSI-1 | (1b) | 100 | (2b) | 0.12 | LiPO$_2$F$_2$<br>FB<br>LiTFSI | 0.5<br>5.0<br>1.0 |
| 1-(1b)-100-(2b)-0.12-LiPO$_2$F$_2$-0.5-FB-5-LiBETI-1 | (1b) | 100 | (2b) | 0.12 | LiPO$_2$F$_2$<br>FB<br>LiBETI | 0.5<br>5.0<br>1.0 |
| 1-(1b)-100-(2b)-0.12-LiPO$_2$F$_2$-0.5-FB-5-LiSO$_3$F-1 | (1b) | 100 | (2b) | 0.12 | LiPO$_2$F$_2$<br>FB<br>LiSO$_3$F | 0.5<br>5.0<br>1.0 |

TABLE 13

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | Concentration (mass %) in Electrolyte Solution | |
| | No. | mass ratio | No. | mass ratio | Kind | |
| 1-(1f)-100-(2f)-0.12-LiPO$_2$F$_2$-0.5-FB-5-Dod-0.5 | (1f) | 100 | (2f) | 0.12 | LiPO$_2$F$_2$<br>FB<br>Dod | 0.5<br>5.0<br>0.5 |
| 1-(1f)-100-(2f)-0.12-LiPO$_2$F$_2$-0.5-FB-5-pDod-0.5 | (1f) | 100 | (2f) | 0.12 | LiPO$_2$F$_2$<br>FB<br>pDod | 0.5<br>5.0<br>0.5 |
| 1-(1f)-100-(2f)-0.12-LiPO$_2$F$_2$-0.5-FB-5-Dad-0.5 | (1f) | 100 | (2f) | 0.12 | LiPO$_2$F$_2$<br>FB<br>Dad | 0.5<br>5.0<br>0.5 |
| 1-(1f)-100-(2f)-0.12-LiPO$_2$F$_2$-0.5-FB-5-PS-1 | (1f) | 100 | (2f) | 0.12 | LiPO$_2$F$_2$<br>FB<br>PS | 0.5<br>5.0<br>1.0 |
| 1-(1f)-100-(2f)-0.12-LiPO$_2$F$_2$-0.5-FB-5-LiBF$_4$-1 | (1f) | 100 | (2f) | 0.12 | LiPO$_2$F$_2$<br>FB<br>LiBF$_4$ | 0.5<br>5.0<br>1.0 |
| 1-(1f)-100-(2f)-0.12-LiPO$_2$F$_2$-0.5-FB-5-LiFSI-1 | (1f) | 100 | (2f) | 0.12 | LiPO$_2$F$_2$<br>FB<br>LiFSI | 0.5<br>5.0<br>1.0 |
| 1-(1f)-100-(2f)-0.12-LiPO$_2$F$_2$-0.5-FB-5-LiTFSI-1 | (1f) | 100 | (2f) | 0.12 | LiPO$_2$F$_2$<br>FB<br>LiTFSI | 0.5<br>5.0<br>1.0 |
| 1-(1f)-100-(2f)-0.12-LiPO$_2$F$_2$-0.5-FB-5-LiBETI-1 | (1f) | 100 | (2f) | 0.12 | LiPO$_2$F$_2$<br>FB<br>LiBETI | 0.5<br>5.0<br>1.0 |
| 1-(1f)-100-(2f)-0.12-LiPO$_2$F$_2$-0.5-FB-5-LiSO$_3$F-1 | (1f) | 100 | (2f) | 0.12 | LiPO$_2$F$_2$<br>FB<br>LiSO$_3$F | 0.5<br>5.0<br>1.0 |

TABLE 14

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | Concentration (mass %) in Electrolyte Solution | |
| | No. | mass ratio | No. | mass ratio | Kind | |
| 1-(1h)-100-(2h)-0.12-LiPO$_2$F$_2$-0.5-FB-5-Dod-0.5 | (1h) | 100 | (2h) | 0.12 | LiPO$_2$F$_2$<br>FB<br>Dod | 0.5<br>5.0<br>0.5 |
| 1-(1h)-100-(2h)-0.12-LiPO$_2$F$_2$-0.5-FB-5-pDod-0.5 | (1h) | 100 | (2h) | 0.12 | LiPO$_2$F$_2$<br>FB<br>pDod | 0.5<br>5.0<br>0.5 |
| 1-(1h)-100-(2h)-0.12-LiPO$_2$F$_2$-0.5-FB-5-Dad-0.5 | (1h) | 100 | (2h) | 0.12 | LiPO$_2$F$_2$<br>FB<br>Dad | 0.5<br>5.0<br>0.5 |
| 1-(1h)-100-(2h)-0.12-LiPO$_2$F$_2$-0.5-FB-5-PS-1 | (1h) | 100 | (2h) | 0.12 | LiPO$_2$F$_2$<br>FB<br>PS | 0.5<br>5.0<br>1.0 |
| 1-(1h)-100-(2h)-0.12-LiPO$_2$F$_2$-0.5-FB-5-LiBF$_4$-1 | (1h) | 100 | (2h) | 0.12 | LiPO$_2$F$_2$<br>FB<br>LiBF$_4$ | 0.5<br>5.0<br>1.0 |
| 1-(1h)-100-(2h)-0.12-LiPO$_2$F$_2$-0.5-FB-5-LiFSI-1 | (1h) | 100 | (2h) | 0.12 | LiPO$_2$F$_2$<br>FB<br>LiFSI | 0.5<br>5.0<br>1.0 |
| 1-(1h)-100-(2h)-0.12-LiPO$_2$F$_2$-0.5-FB-5-LiTFSI-1 | (1h) | 100 | (2h) | 0.12 | LiPO$_2$F$_2$<br>FB<br>LiTFSI | 0.5<br>5.0<br>1.0 |
| 1-(1h)-100-(2h)-0.12-LiPO$_2$F$_2$-0.5-FB-5-LiBETI-1 | (1h) | 100 | (2h) | 0.12 | LiPO$_2$F$_2$<br>FB<br>LiBETI | 0.5<br>5.0<br>1.0 |
| 1-(1h)-100-(2h)-0.12-LiPO$_2$F$_2$-0.5-FB-5-LiSO$_3$F-1 | (1h) | 100 | (2h) | 0.12 | LiPO$_2$F$_2$<br>FB<br>LiSO$_3$F | 0.5<br>5.0<br>1.0 |

TABLE 15

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | Concentration (mass %) in Electrolyte Solution | |
| | No. | mass ratio | No. | mass ratio | Kind | |
| 1-(1j)-100-(2j)-0.12-LiPO$_2$F$_2$-0.5-FB-5-Dod-0.5 | (1j) | 100 | (2j) | 0.12 | LiPO$_2$F$_2$<br>FB<br>Dod | 0.5<br>5.0<br>0.5 |
| 1-(1j)-100-(2j)-0.12-LiPO$_2$F$_2$-0.5-FB-5-pDod-0.5 | (1j) | 100 | (2j) | 0.12 | LiPO$_2$F$_2$<br>FB<br>pDod | 0.5<br>5.0<br>0.5 |
| 1-(1j)-100-(2j)-0.12-LiPO$_2$F$_2$-0.5-FB-5-Dad-0.5 | (1j) | 100 | (2j) | 0.12 | LiPO$_2$F$_2$<br>FB<br>Dad | 0.5<br>5.0<br>0.5 |
| 1-(1j)-100-(2j)-0.12-LiPO$_2$F$_2$-0.5-FB-5-PS-1 | (1j) | 100 | (2j) | 0.12 | LiPO$_2$F$_2$<br>FB<br>PS | 0.5<br>5.0<br>1.0 |
| 1-(1j)-100-(2j)-0.12-LiPO$_2$F$_2$-0.5-FB-5-LiBF$_4$-1 | (1j) | 100 | (2j) | 0.12 | LiPO$_2$F$_2$<br>FB<br>LiBF$_4$ | 0.5<br>5.0<br>1.0 |
| 1-(1j)-100-(2j)-0.12-LiPO$_2$F$_2$-0.5-FB-5-LiFSI-1 | (1j) | 100 | (2j) | 0.12 | LiPO$_2$F$_2$<br>FB<br>LiFSI | 0.5<br>5.0<br>1.0 |
| 1-(1j)-100-(2j)-0.12-LiPO$_2$F$_2$-0.5-FB-5-LiTFSI-1 | (1j) | 100 | (2j) | 0.12 | LiPO$_2$F$_2$<br>FB<br>LiTFSI | 0.5<br>5.0<br>1.0 |
| 1-(1j)-100-(2j)-0.12-LiPO$_2$F$_2$-0.5-FB-5-LiBETI-1 | (1j) | 100 | (2j) | 0.12 | LiPO$_2$F$_2$<br>FB<br>LiBETI | 0.5<br>5.0<br>1.0 |
| 1-(1j)-100-(2j)-0.12-LiPO$_2$F$_2$-0.5-FB-5-LiSO$_3$F-1 | (1j) | 100 | (2j) | 0.12 | LiPO$_2$F$_2$<br>FB<br>LiSO$_3$F | 0.5<br>5.0<br>1.0 |

TABLE 16

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1b)-100-(2b)-0.12-LiPO$_2$F$_2$-0.5-FB-5-Dod-0.5-PS-0.5 | (1b) | 100 | (2b) | 0.12 | LiPO$_2$F$_2$<br>FB<br>Dod<br>PS | 0.5<br>5.0<br>0.5<br>0.5 |
| 1-(1b)-100-(2b)-0.12-LiPO$_2$F$_2$-0.5-FB-5-Dod-0.5-LiBF$_4$-0.5 | (1b) | 100 | (2b) | 0.12 | LiPO$_2$F$_2$<br>FB<br>Dod<br>LiBF$_4$ | 0.5<br>5.0<br>0.5<br>0.5 |
| 1-(1b)-100-(2b)-0.12-LiPO$_2$F$_2$-0.5-FB-5-Dod-0.5-LiFSI-0.5 | (1b) | 100 | (2b) | 0.12 | LiPO$_2$F$_2$<br>FB<br>Dod<br>LiFSI | 0.5<br>5.0<br>0.5<br>0.5 |
| 1-(1b)-100-(2b)-0.12-LiPO$_2$F$_2$-0.5-FB-5-Dod-0.5-LiTFSI-0.5 | (1b) | 100 | (2b) | 0.12 | LiPO$_2$F$_2$<br>FB<br>Dod<br>LiTFSi | 0.5<br>5.0<br>0.5<br>0.5 |
| 1-(1b)-100-(2b)-0.12-LiPO$_2$F$_2$-0.5-FB-5-Dod-0.5-LiBETI-0.5 | (1b) | 100 | (2b) | 0.12 | LiPO$_2$F$_2$<br>FB<br>Dod<br>LiBETI | 0.5<br>5.0<br>0.5<br>0.5 |
| 1-(1b)-100-(2b)-0.12-LiPO$_2$F$_2$-0.5-FB-5-Dod-0.5-LiSO$_3$F-0.5 | (1b) | 100 | (2b) | 0.12 | LiPO$_2$F$_2$<br>FB<br>Dod<br>LiSO$_3$F | 0.5<br>5.0<br>0.5<br>0.5 |

TABLE 17

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1f)-100-(2f)-0.12-LiPO$_2$F$_2$-0.5-FB-5-Dod-0.5-PS-0.5 | (1f) | 100 | (2f) | 0.12 | LiPO$_2$F$_2$<br>FB<br>Dod<br>PS | 0.5<br>5.0<br>0.5<br>0.5 |
| 1-(1f)-100-(2f)-0.12-LiPO$_2$F$_2$-0.5-FB-5-Dod-0.5-LiBF$_4$-0.5 | (1f) | 100 | (2f) | 0.12 | LiPO$_2$F$_2$<br>FB<br>Dod<br>LiBF$_4$ | 0.5<br>5.0<br>0.5<br>0.5 |
| 1-(1f)-100-(2f)-0.12-LiPO$_2$F$_2$-0.5-FB-5-Dod-0.5-LiFSI-0.5 | (1f) | 100 | (2f) | 0.12 | LiPO$_2$F$_2$<br>FB<br>Dod<br>LiFSI | 0.5<br>5.0<br>0.5<br>0.5 |
| 1-(1f)-100-(2f)-0.12-LiPO$_2$F$_2$-0.5-FB-5-Dod-0.5-LiTFSI-0.5 | (1f) | 100 | (2f) | 0.12 | LiPO$_2$F$_2$<br>FB<br>Dod<br>LiTFSi | 0.5<br>5.0<br>0.5<br>0.5 |
| 1-(1f)-100-(2f)-0.12-LiPO$_2$F$_2$-0.5-FB-5-Dod-0.5-LiBETI-0.5 | (1f) | 100 | (2f) | 0.12 | LiPO$_2$F$_2$<br>FB<br>Dod<br>LiBETI | 0.5<br>5.0<br>0.5<br>0.5 |
| 1-(1f)-100-(2f)-0.12-LiPO$_2$F$_2$-0.5-FB-5-Dod-0.5-LiSO$_3$F-0.5 | (1f) | 100 | (2f) | 0.12 | LiPO$_2$F$_2$<br>FB<br>Dod<br>LiSO$_3$F | 0.5<br>5.0<br>0.5<br>0.5 |

TABLE 18

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1h)-100-(2h)-0.12-LiPO$_2$F$_2$-0.5-FB-5-Dod-0.5-PS-0.5 | (1h) | 100 | (2h) | 0.12 | LiPO$_2$F$_2$<br>FB<br>Dod<br>PS | 0.5<br>5.0<br>0.5<br>0.5 |
| 1-(1h)-100-(2h)-0.12-LiPO$_2$F$_2$-0.5-FB-5-Dod-0.5-LiBF$_4$-0.5 | (1h) | 100 | (2h) | 0.12 | LiPO$_2$F$_2$<br>FB<br>Dod<br>LiBF$_4$ | 0.5<br>5.0<br>0.5<br>0.5 |
| 1-(1h)-100-(2h)-0.12-LiPO$_2$F$_2$-0.5-FB-5-Dod-0.5-LiFSI-0.5 | (1h) | 100 | (2h) | 0.12 | LiPO$_2$F$_2$<br>FB<br>Dod<br>LiFSI | 0.5<br>5.0<br>0.5<br>0.5 |
| 1-(1h)-100-(2h)-0.12-LiPO$_2$F$_2$-0.5-FB-5-Dod-0.5-LiTFSI-0.5 | (1h) | 100 | (2h) | 0.12 | LiPO$_2$F$_2$<br>FB<br>Dod<br>LiTFSI | 0.5<br>5.0<br>0.5<br>0.5 |
| 1-(1h)-100-(2h)-0.12-LiPO$_2$F$_2$-0.5-FB-5-Dod-0.5-LiBETI-0.5 | (1h) | 100 | (2h) | 0.12 | LiPO$_2$F$_2$<br>FB<br>Dod<br>LiBETI | 0.5<br>5.0<br>0.5<br>0.5 |
| 1-(1h)-100-(2h)-0.12-LiPO$_2$F$_2$-0.5-FB-5-Dod-0.5-LiSO$_3$F-0.5 | (1h) | 100 | (2h) | 0.12 | LiPO$_2$F$_2$<br>FB<br>Dod<br>LiSO$_3$F | 0.5<br>5.0<br>0.5<br>0.5 |

TABLE 19

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1j)-100-(2j)-0.12-LiPO$_2$F$_2$-0.5-FB-5-Dod-0.5-PS-0.5 | (1j) | 100 | (2j) | 0.12 | LiPO$_2$F$_2$<br>FB<br>Dod<br>PS | 0.5<br>5.0<br>0.5<br>0.5 |
| 1-(1j)-100-(2j)-0.12-LiPO$_2$F$_2$-0.5-FB-5-Dod-0.5-LiBF$_4$-0.5 | (1j) | 100 | (2j) | 0.12 | LiPO$_2$F$_2$<br>FB<br>Dod<br>LiBF$_4$ | 0.5<br>5.0<br>0.5<br>0.5 |
| 1-(1j)-100-(2j)-0.12-LiPO$_2$F$_2$-0.5-FB-5-Dod-0.5-LiFSI-0.5 | (1j) | 100 | (2j) | 0.12 | LiPO$_2$F$_2$<br>FB<br>Dad<br>LiFSI | 0.5<br>5.0<br>0.5<br>0.5 |
| 1-(1j)-100-(2j)-0.12-LiPO$_2$F$_2$-0.5-FB-5-Dod-0.5-LiTFSI-0.5 | (1j) | 100 | (2j) | 0.12 | LiPO$_2$F$_2$<br>FB<br>Dod<br>LiTFSI | 0.5<br>5.0<br>0.5<br>0.5 |
| 1-(1j)-100-(2j)-0.12-LiPO$_2$F$_2$-0.5-FB-5-Dod-0.5-LiBETI-0.5 | (1j) | 100 | (2j) | 0.12 | LiPO$_2$F$_2$<br>FB<br>Dod<br>LiBETI | 0.5<br>5.0<br>0.5<br>0.5 |
| 1-(1j)-100-(2j)-0.12-LiPO$_2$F$_2$-0.5-FB-5-Dad-0.5-LiSO$_3$F-0.5 | (1j) | 100 | (2j) | 0.12 | LiPO$_2$F$_2$<br>FB<br>Dod<br>LiSO$_3$F | 0.5<br>5.0<br>0.5<br>0.5 |

TABLE 20

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1b)-100-(2b)-0.12-LiPO$_2$F$_2$-0.5-FB-5-Dod-0.5-PS-0.2-LiFSI-0.3 | (1b) | 100 | (2b) | 0.12 | LiPO$_2$F$_2$<br>FB<br>Dod<br>PS<br>LiFSI | 0.5<br>5.0<br>0.5<br>0.2<br>0.3 |
| 1-(1b)-100-(2b)-0.12-LiPO$_2$F$_2$-0.5-FB-5-Dod-0.5-PS-0.2-LiTFSI-0.3 | (1b) | 100 | (2b) | 0.12 | LiPO$_2$F$_2$<br>FB<br>Dod<br>PS<br>LiTFSI | 0.5<br>5.0<br>0.5<br>0.2<br>0.3 |
| 1-(1b)-100-(2b)-0.12-LiPO$_2$F$_2$-0.5-FB-5-Dod-0.5-PS-0.2-LiBETI-0.3 | (1b) | 100 | (2b) | 0.12 | LiPO$_2$F$_2$<br>FB<br>Dod<br>PS<br>LiBETI | 0.5<br>5.0<br>0.5<br>0.2<br>0.3 |
| 1-(1b)-100-(2b)-0.12-LiPO$_2$F$_2$-0.5-FB-5-Dod-0.5-PS-0.2-LiSO$_3$F-0.3 | (1b) | 100 | (2b) | 0.12 | LiPO$_2$F$_2$<br>FB<br>Dod<br>PS<br>LiSO$_3$F | 0.5<br>5.0<br>0.5<br>0.2<br>0.3 |
| 1-(1b)-100-(2b)-0.12-LiPO$_2$F$_2$-0.5-FB-5-Dod-0.5-PS-0.2-LiBF$_4$-0.3 | (1b) | 100 | (2b) | 0.12 | LiPO$_2$F$_2$<br>FB<br>Dod<br>PS<br>LiBF$_4$ | 0.5<br>6.0<br>0.5<br>0.2<br>0.3 |
| 1-(1b)-100-(2b)-0.12-LiPO$_2$F$_2$-0.5-FB-5-pDod-0.5-PS-0.2-LiFSI-0.3 | (1b) | 100 | (2b) | 0.12 | LiPO$_2$F$_2$<br>FB<br>pDod<br>PS<br>LiFSI | 0.5<br>5.0<br>0.5<br>0.2<br>0.3 |
| 1-(1b)-100-(2b)-0.12-LiPO$_2$F$_2$-0.5-FB-5-Dad-0.5-PS-0.2-LiTFSI-0.3 | (1b) | 100 | (2b) | 0.12 | LiPO$_2$F$_2$<br>FB<br>Dad<br>PS<br>LiTFSI | 0.5<br>5.0<br>0.5<br>0.2<br>0.3 |

TABLE 21

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1f)-100-(2f)-0.12-LiPO$_2$F$_2$-0.5-FB-5-Dod-0.5-PS-0.2-LiFSI-0.3 | (1f) | 100 | (2f) | 0.12 | LiPO$_2$F$_2$<br>FB<br>Dod<br>PS<br>LiFSI | 0.5<br>5.0<br>0.5<br>0.2<br>0.3 |
| 1-(1f)-100-(2f)-0.12-LiPO$_2$F$_2$-0.5-FB-5-Dod-0.5-PS-0.2-LiTFSI-0.3 | (1f) | 100 | (2f) | 0.12 | LiPO$_2$F$_2$<br>FB<br>Dod<br>PS<br>LiTFSI | 0.5<br>5.0<br>0.5<br>0.2<br>0.3 |
| 1-(1f)-140-(2f)-0.12-LiPO$_2$F$_2$-0.5-FB-5-Dod-0.5-PS-0.2-LiBETI-0.3 | (1f) | 100 | (2f) | 0.12 | LiPO$_2$F$_2$<br>FB<br>Dod<br>PS<br>LiBETI | 0.5<br>5.0<br>0.5<br>0.2<br>0.3 |
| 1-(1f)-100-(2f)-0.12-LiPO$_2$F$_2$-0.5-FB-5-Dod-0.5-PS-0.2-LiSO$_3$F-0.3 | (1f) | 100 | (2f) | 0.12 | LiPO$_2$F$_2$<br>FB<br>Dod<br>PS<br>LiSO$_3$F | 0.5<br>5.0<br>0.5<br>0.2<br>0.3 |

TABLE 21-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1f)-100-(2f)-0.12-LiPO$_2$F$_2$-0.5-FB-5-Dod-0.5-PS-0.2-LiBF$_4$-0.3 | (1f) | 100 | (2f) | 0.12 | LiPO$_2$F$_2$ | 0.5 |
| | | | | | FB | 5.0 |
| | | | | | Dod | 0.5 |
| | | | | | PS | 0.2 |
| | | | | | LiBF$_4$ | 0.3 |
| 1-(1f)-100-(2f)-0.12-LiPO$_2$F$_2$-0.5-FB-5-pDod-0.5-PS-0.2-LiFSI-0.3 | (1f) | 100 | (2f) | 0.12 | LiPO$_2$F$_2$ | 0.5 |
| | | | | | FB | 5.0 |
| | | | | | pDod | 0.5 |
| | | | | | PS | 0.2 |
| | | | | | LiFSI | 0.3 |
| 1-(1f)-100-(2f)-0.12-LiPO$_2$F$_2$-0.5-FB-5-Dad-0.5-PS-0.2-LiTFSI-0.3 | (1f) | 100 | (2f) | 0.12 | LiPO$_2$F$_2$ | 0.5 |
| | | | | | FB | 5.0 |
| | | | | | Dad | 0.5 |
| | | | | | PS | 0.2 |
| | | | | | LiTFSI | 0.3 |

TABLE 22

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1h)-100-(2h)-0.12-LiPO$_2$F$_2$-0.5-FB-5-Dod-0.5-PS-0.2-LiFSI-0.3 | (1h) | 100 | (2h) | 0.12 | LiPO$_2$F$_2$ | 0.5 |
| | | | | | FB | 5.0 |
| | | | | | Dod | 0.5 |
| | | | | | PS | 0.2 |
| | | | | | LiFSI | 0.3 |
| 1-(1h)-100-(2h)-0.12-LiPO$_2$F$_2$-0.5-FB-5-Dod-0.5-PS-0.2-LiTFSI-0.3 | (1h) | 100 | (2h) | 0.12 | LiPO$_2$F$_2$ | 0.5 |
| | | | | | FB | 5.0 |
| | | | | | Dod | 0.5 |
| | | | | | PS | 0.2 |
| | | | | | LiTFSI | 0.3 |
| 1-(1h)-100-(2h)-0.12-LiPO$_2$F$_2$-0.5-FB-5-Dod-0.5-PS-0.2-LiBETI-0.3 | (1h) | 100 | (2h) | 0.12 | LiPO$_2$F$_2$ | 0.5 |
| | | | | | FB | 5.0 |
| | | | | | Dod | 0.5 |
| | | | | | PS | 12 |
| | | | | | LiBETI | 0.3 |
| 1-(1h)-100-(2h)-0.12-LiPO$_2$F$_2$-0.5-FB-5-Dod-0.5-PS-0.2-LiSO$_3$F-0.3 | (1h) | 100 | (2h) | 0.12 | LiPO$_2$F$_2$ | 0.5 |
| | | | | | FB | 5.0 |
| | | | | | Dod | 0.5 |
| | | | | | PS | 0.2 |
| | | | | | LiSO$_3$F | 0.3 |
| 1-(1h)-100-(2h)-0.12-LiPO$_2$F$_2$-0.5-FB-5-Dod-0.5-PS-0.2-LiBF$_4$-0.3 | (1h) | 100 | (2h) | 0.12 | LiPO$_2$F$_2$ | 0.5 |
| | | | | | FB | 5.0 |
| | | | | | Dod | 0.5 |
| | | | | | PS | 0.2 |
| | | | | | LiBF$_4$ | 0.3 |
| 1-(1h)-100-(2h)-0.12-LiPO$_2$F$_2$-0.5-FB-5-pDod-0.5-PS-0.2-LiFSI-0.3 | (1h) | 100 | (2h) | 0.12 | LiPO$_2$F$_2$ | 0.5 |
| | | | | | FB | 5.0 |
| | | | | | pOod | 0.5 |
| | | | | | PS | 0.2 |
| | | | | | LiFSI | 0.3 |
| 1-(1h)-100-(2h)-0.12-LiPO$_2$F$_2$-0.5-FB-5-Dad-0.5-PS-0.2-LiTFSI-0.3 | (1h) | 100 | (2h) | 0.12 | LiPO$_2$F$_2$ | 0.5 |
| | | | | | FB | 5.0 |
| | | | | | Dad | 0.5 |
| | | | | | PS | 0.2 |
| | | | | | LiTFSI | 0.3 |

TABLE 23

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1j)-100-(2j)-0.12-LiPO$_2$F$_2$-0.5-FB-5-Dod-0.5-PS-0.2-LiFSI-0.3 | (1j) | 100 | (2j) | 0.12 | LiPO$_2$F$_2$<br>FS<br>Dod<br>PS<br>LiFSI | 0.5<br>5.0<br>0.5<br>0.2<br>0.3 |
| 1-(1j)-100-(2j)-0.12-LiPO$_2$F$_2$-0.5-FB-5-Dod-0.5-PS-0.2-LiTFSI-0.3 | (1j) | 100 | (2j) | 0.12 | LiPO$_2$F$_2$<br>FB<br>Dod<br>PS<br>LiTFSI | 0.5<br>5.0<br>0.5<br>0.2<br>0.3 |
| 1-(1j)-100-(2j)-0.12-LiPO$_2$F$_2$-0.5-FB-5-Dod-0.5-PS-0.2-LiBETI-0.3 | (1j) | 100 | (2j) | 0.12 | LiPO$_2$F$_2$<br>FB<br>Dod<br>PS<br>LiBETI | 0.5<br>5.0<br>0.5<br>0.2<br>0.3 |
| 1-(1j)-100-(2j)-0.12-LiPO$_2$F$_2$-0.5-FB-5-Dod-0.5-PS-0.2-LiSO$_3$F-0.3 | (1j) | 100 | (2j) | 0.12 | LiPO$_2$F$_2$<br>FB<br>Dod<br>PS<br>LiSO$_3$F | 0.5<br>5.0<br>0.5<br>0.2<br>0.3 |
| 1-(1j)-100-(2j)-0.12-LiPO$_2$F$_2$-0.5-FB-5-Dod-0.5-PS-0.2-LiBF$_4$-0.3 | (1j) | 100 | (2j) | 0.12 | LiPO$_2$F$_2$<br>FB<br>Dod<br>PS<br>LiBF$_4$ | 0.5<br>5.0<br>0.5<br>0.2<br>0.3 |
| 1-(1j)-100-(2j)-0.12-LiPO$_2$F$_2$-0.5-FB-5-pDod-0.5-PS-0.2-LiFSI-0.3 | (1j) | 100 | (2j) | 0.12 | LiPO$_2$F$_2$<br>FB<br>pDod<br>PS<br>LiFSI | 0.5<br>5.0<br>0.5<br>0.2<br>0.3 |
| 1-(1j)-100-(2j)-0.12-LiPO$_2$F$_2$-0.5-FB-5-Dad-0.5-PS-0.2-LiTFSI-0.3 | (1j) | 100 | (2j) | 0.12 | LiPO$_2$F$_2$<br>FB<br>Dad<br>PS<br>LiTFSI | 0.5<br>5.0<br>0.5<br>0.2<br>0.3 |

TABLE 24

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1b)-100-(2b)-0.12-LiPO$_2$F$_2$-0.5-FB-5-pDoc1-0.3-PS-0.2-LiBF$_4$-0.3-LiSO$_3$F-0.2 | (1b) | 100 | (2b) | 0.12 | LiPO$_2$F$_2$<br>FB<br>pDod<br>PS<br>LiBF$_4$<br>LiSO$_3$F | 0.5<br>5.0<br>0.3<br>0.2<br>0.3<br>0.2 |
| 1-(1b)-100-(2b)-0.12-LiPO$_2$F$_2$-0.5-FB-5-Dad-02-PS-0.2-LiBF$_4$-0.3-LiSO$_3$F-0.2 | (1b) | 100 | (2b) | 0.12 | LiPO$_2$F$_2$<br>FB<br>Dad<br>PS<br>LiBF$_4$<br>LiSO$_3$F | 0.5<br>5.0<br>0.3<br>0.2<br>0.3<br>0.2 |
| 1-(1b)-100-(2b)-0.12-LiPO$_2$F$_2$-0.5-FB-5-Dod-0.3-PS-0.2-LiBF$_4$-0.3-LiSO$_3$F-0.2 | (1b) | 100 | (2b) | 0.12 | LiPO$_2$F$_2$<br>FB<br>Dod<br>PS<br>LiBF$_4$<br>LiSO$_3$F | 0.5<br>5.0<br>0.3<br>0.2<br>0.3<br>0.2 |

TABLE 24-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1b)-100-(2b)-0.12-LiPO$_2$F$_2$-0.5-FB-5-Dod-0.3-PS-0.2-LiBF$_4$-0.3-LiFSI-0.2 | (1b) | 100 | (2b) | 0.12 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiFSI | 0.2 |
| 1-(1b)-100-(2b)-0.12-LiPO$_2$F$_2$-0.5-FB-5-Dod-0.3-PS-0.2-LiBF$_4$-0.3-LiTFSI-0.2 | (1b) | 100 | (2b) | 0.12 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiTFSI | 0.2 |
| 1-(1b)-100-(2b)-0.12-LiPO$_2$F$_2$-0.5-FB-5-Dod-0.3-PS-0.2-LiBF$_4$-0.3-LiBETI-0.2 | (1b) | 100 | (2b) | 0.12 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiBETI | 0.2 |

TABLE 25

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1f)-100-(2f)-0.12-LiPO$_2$F$_2$-0.5-FB-5-pDod-0.3-PS-0.2-LiBF$_4$-0.3-LiSO$_3$F-0.2 | (1f) | 100 | (2f) | 0.12 | LiPO$_2$F$_2$ | 0.5 |
| | | | | | FB | 5.0 |
| | | | | | pDod | 0.3 |
| | | | | | PS | 0.2 |
| | | | | | LiBF$_4$ | 0.3 |
| | | | | | LiSO$_3$F | 0.2 |
| 1-(1f)-100-(2f)-0.12-LiPO$_2$F$_2$-0.5-FB-5-Dad-0.3-PS-0.2-LiBF$_4$-0.3-LiSO$_3$F-0.2 | (1f) | 100 | (2f) | 0.12 | LiPO$_2$F$_2$ | 0.5 |
| | | | | | FB | 5.0 |
| | | | | | Dad | 0.3 |
| | | | | | PS | 0.2 |
| | | | | | LiBF$_4$ | 0.3 |
| | | | | | LiSO$_3$F | 0.2 |
| 1-(1f)-100-(2f)-0.12-LiPO$_2$F$_2$-0.5-FB-5-Dod-0.3-PS-0.2-LiBF$_4$-0.3-LiSO$_3$F-0.2 | (1f) | 100 | (2f) | 0.12 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiSO$_3$F | 0.2 |
| 1-(1f)-100-(2f)-0.12-LiPO$_2$F$_2$-0.5-FB-5-Dod-0.3-PS-0.2-LiBF$_4$-0.3-LiFSI-0.2 | (1f) | 100 | (2f) | 0.12 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiFSI | 0.2 |
| 1-(1f)-100-(2f)-0.12-LiPO$_2$F$_2$-0.5-FB-5-Dod-03-PS-0.2-LiBF$_4$-0.3-LiTFSI-0.2 | (1f) | 100 | (2f) | 0.12 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiTFSI | 0.2 |
| 1-(1f)-100-(2f)-0.12-LiPO$_2$F$_2$-0.5-FB-5-Dod-0.3-PS-02-LiBF$_4$-0.3-LiBETI-0.2 | (1f) | 100 | (2f) | 0.12 | LiPO$_2$F$_2$ | 0.5 |
| | | | | | FB | 5.0 |
| | | | | | Dad | 0.3 |
| | | | | | PS | 0.2 |
| | | | | | LiBF$_4$ | 0.3 |
| | | | | | LiBETI | 0.2 |

TABLE 26

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | Concentration (mass %) in Electrolyte | |
| | No. | mass ratio | No. | mass ratio | Kind | Solution |
| 1-(1h)-100-(2h)-0.12-LiPO$_2$F$_2$-0.5-FB-5-pDod-0.3-PS-0.2-LiBF$_4$-0.3-LiSO$_3$F-0.2 | (1h) | 100 | (2h) | 0.12 | LiPO$_2$F$_2$ | 0.5 |
| | | | | | FB | 5.0 |
| | | | | | pDod | 0.3 |
| | | | | | PS | 0.2 |
| | | | | | LiBF$_4$ | 0.3 |
| | | | | | LiSO$_3$F | 0.2 |
| 1-(1h)-100-(2h)-0.12-LiPO$_2$F$_2$-0.5-FB-5-Dad-0.3-PS-0.2-LiBF$_4$-0.3-LiSO$_2$F-0.2 | (1h) | 100 | (2h) | 0.12 | LiPO$_2$F$_2$ | 0.5 |
| | | | | | FB | 5.0 |
| | | | | | Dad | 0.3 |
| | | | | | PS | 0.2 |
| | | | | | LiBF$_4$ | 0.3 |
| 1-(1h)-100-(2h)-0.12-LiPO$_2$F$_2$-0.5-FB-5-Dod-0.3-PS-0.2-LiBF$_4$-0.3-LiSO$_3$F-0.2 | (1h) | 100 | (2h) | 0.12 | LiSO$_3$F | 0.2 |
| | | | | | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| 1-(1h)-100-(2h)-0.12-LiPO$_2$F$_2$-0.5-FB-5-Dod-0.3-PS-0.2-LiBF$_4$-0.3-LiFSI-0.2 | (1h) | 100 | (2h) | 0.12 | LiSO$_2$F | 0.2 |
| | | | | | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiFSI | 0.2 |
| 1-(1h)-100-(2h)-0.12-LiPO$_2$F$_2$-0.5-FB-5-Dod-0.3-PS-0.2-LiBF$_4$-0.3-LiTFSI-0.2 | (1h) | 100 | (2h) | 0.12 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiTFSI | 0.2 |
| 1-(1h)-100-(2h)-0.12-LiPO$_2$F$_2$-0.5-FB-5-Dod-0.3-PS-0.2-LiBF$_4$-0.3-LiBETI-0.2 | (1h) | 100 | (2h) | 0.12 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiBETI | 0.2 |

TABLE 27

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | Concentration (mass %) in Electrolyte | |
| | No. | mass ratio | No. | mass ratio | Kind | Solution |
| 1-(1j)-100-(2j)-0.12-LiPO$_2$F$_2$-0.5-FB-5-pDod-0.3-PS-0.2-LiBF$_4$-0.3-LiSO$_3$F-0.2 | (1j) | 100 | (2j) | 0.12 | LiPO$_2$F$_2$ | 0.5 |
| | | | | | FB | 5.0 |
| | | | | | pDod | 0.3 |
| | | | | | PS | 0.2 |
| | | | | | LiBF$_4$ | 0.3 |
| | | | | | LiSO$_3$F | 0.2 |
| 1-(1j)-100-(2j)-0.12-LiPO$_2$F$_2$-0.5-FB-5-Dad-0.3-PS-0.2-LiBF$_4$-0.3-LiSO$_3$F-0.2 | (1j) | 100 | (2j) | 0.12 | LiPO$_2$F$_2$ | 0.5 |
| | | | | | FB | 5.0 |
| | | | | | Dad | 0.3 |
| | | | | | PS | 0.2 |
| | | | | | LiBF$_4$ | 0.3 |
| | | | | | LiSO$_3$F | 0.2 |

TABLE 27-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1j)-100-(2j)-0.12-LiPO$_2$F$_2$-0.5-FB-5-Dod-0.3-PS-0.2-LiBF$_4$-0.3-LiSO$_3$F-0.2 | (1j) | 100 | (2j) | 0.12 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiSO$_3$F | 0.2 |
| 1-(1j)-100-(2j)-0.12-LiPO$_2$F$_2$-0.5-FB-5-Dod-0.3-PS-0.2-LiBF$_4$-0.3-LiFSI-0.2 | (1j) | 100 | (2j) | 0.12 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiFSI | 0.2 |
| 1-(1j)-100-(2j)-0.12-LiPO$_2$F$_2$-0.5-FB-5-Dod-0.3-PS-0.2-LiBF$_4$-0.3-LiTFSI-0.2 | (1j) | 100 | (2j) | 0.12 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiTFSI | 0.2 |
| 1-(1j)-100-(2j)-0.12-LiPO$_2$F$_2$-0.5-FB-5-Dod-0.3-PS-0.2-LiBF$_4$-0.3-LiBETI-0.2 | (1j) | 100 | (2j) | 0.12 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiBETI | 0.2 |

TABLE 28

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1b)-100-(0)-LiFSI-2 | (1b) | 100 | none | | LiFSI | 2.0 |
| 1-(1b)-100-(0)-LiSO$_3$F-1 | (1b) | 100 | | | LiSO$_3$F | 1.0 |
| 1-(1b)-100-(0)-LDFBOP-1 | (1b) | 100 | | | LDFBOP | 1.0 |
| 1-(1b)-100-(0)-ESF-0.5 | (1b) | 100 | | | ESF | 0.5 |
| 1-(1b)-100-(0)-LiPO$_2$F$_2$-1 | (1b) | 100 | | | LiPO$_2$F$_2$ | 1.0 |
| 1-(1b)-100-(0)-FB-5 | (1b) | 100 | | | FB | 5.0 |
| 1-(1b)-100-(0)-Dod-0.5 | (1b) | 100 | | | Pod | 0.5 |
| 1-(1b)-100-(0)-pDod-0.5 | (1b) | 100 | | | pDod | 0.5 |
| 1-(1b)-100-(0)-Dad-0.5 | (1b) | 100 | | | Dad | 0.5 |
| 1-(1b)-100-(0)-PS-1 | (1b) | 100 | | | PS | 1.0 |
| 1-(1b)-100-(0)-LiTFSI-1 | (1b) | 100 | | | LiTFSI | 1.0 |
| 1-(1b)-100-(0)-LiBETI | (1b) | 100 | | | LiBETI | 1.0 |
| 1-(1b)-100-(0)-LiBF$_4$-1 | (1b) | 100 | | | LiBF$_4$ | 1.0 |

TABLE 29

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1f)-100-(0)-LiPO$_2$F$_2$-1 | (1f) | 100 | | none | LiPO$_2$F$_2$ | 1.0 |
| 1-(1f)-100-(0)-LTFOP-1 | (1f) | 100 | | | LTFOP | 1.0 |
| 1-(1f)-100-(0)-LDFOB-1 | (1f) | 100 | | | LDFOB | 1.0 |
| 1-(1f)-100-(0)-TSF-0.5 | (1f) | 100 | | | TSF | 0.5 |
| 1-(1f)-100-(0)-LiSO$_3$F-1 | (1f) | 100 | | | LiSO$_3$F | 1.0 |
| 1-(1f)-100-(0)-FB-5 | (1f) | 100 | | | FB | 5.0 |
| 1-(1f)-100-(0)-Dod-0.5 | (1f) | 100 | | | Dod | 0.5 |
| 1-(1f)-100-(0)-pDod-0.5 | (1f) | 100 | | | pDod | 0.5 |
| 1-(1f)-100-(0)-Dad-0.5 | (1f) | 100 | | | Dad | 0.5 |
| 1-(1f)-100-(0)-PS-1 | (1f) | 100 | | | PS | 1.0 |
| 1-(1f)-100-(0)-LiFSI-1 | (1f) | 100 | | | LiFSI | 1.0 |
| 1-(1f)-100-(0)-LiTFSI-1 | (1f) | 100 | | | LiTFSI | 1.0 |
| 1-(1f)-100-(0)-LiBETI-1 | (1f) | 100 | | | LiBETI | 1.0 |
| 1-(1f)-100-(0)-LiBF$_4$-1 | (1f) | 100 | | | LiBF$_4$ | 1.0 |

TABLE 30

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1h)-100-(0)-LiSO$_2$F-1 | (1h) | 100 | | none | LiSO$_3$F | 1.0 |
| 1-(1h)-100-(0)-LTFOP-1 | (1h) | 100 | | | LTFOP | 1.0 |
| 1-(1h)-100-(0)-LDFBOP-1 | (1h) | 100 | | | LDFBOP | 1.0 |
| 1-(1h)-100-(0)-PDFP-1 | (1h) | 100 | | | PDFP | 1.0 |
| 1-(1h)-100-(0)-LiPO$_2$F$_2$-1 | (1h) | 100 | | | LiPO$_2$F$_2$ | 1.0 |
| 1-(1h)-100-(0)-MSF-0.5 | (1h) | 100 | | | MSF | 0.5 |
| 1-(1h)-100-(0)-FB-5 | (1h) | 100 | | | FB | 5.0 |
| 1-(1h)-100-(0)-Dod-0.5 | (1h) | 100 | | | Dod | 0.5 |
| 1-(1h)-100-(0)-pDod-0.5 | (1h) | 100 | | | pDod | 0.5 |
| 1-(1h)-100-(0)-Dad-0.5 | (1h) | 100 | | | Dad | 0.5 |
| 1-(1h)-100-(0)-PS-1 | (1h) | 100 | | | PS | 1.0 |
| 1-(1h)-100-(0)-LiFSI-1 | (1h) | 100 | | | LiFSI | 1.0 |
| 1-(1h)-100-(0)-LiTFSI-1 | (1h) | 100 | | | LiTFSI | 1.0 |
| 1-(1h)-100-(0)-LiBETI-1 | (1h) | 100 | | | LiBETI | 1.0 |
| 1-(1h)-100-(0)-LiBF$_4$-1 | (1h) | 100 | | | LiBF$_4$ | 1.0 |

TABLE 31

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1j)-100-(0)-LiSO$_3$F-1 | (1j) | 100 | | none | LiSO$_3$F | 1.0 |
| 1-(1j)-100-(0)-LiPO$_2$F$_2$-1 | (1j) | 100 | | | LiPO$_2$F$_2$ | 1.0 |
| 1-(1j)-100-(0)-LDFOB-1 | (1j) | 100 | | | LDFOB | 1.0 |
| 1-(1j)-100-(0)-MSF-0.5 | (1j) | 100 | | | MSF | 0.5 |
| 1-(1j)-100-(0)-FB-5 | (1j) | 100 | | | FB | 5.0 |
| 1-(1j)-100-(0)-Dod-0.5 | (1j) | 100 | | | Dod | 0.5 |
| 1-(1j)-100-(0)-pDod-0.5 | (1j) | 100 | | | pDod | 0.5 |
| 1-(1j)-100-(0)-Dad-0.5 | (1j) | 100 | | | Dad | 0.5 |
| 1-(1j)-100-(0)-PS-1 | (1j) | 100 | | | PS | 1.0 |

TABLE 31-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1j)-100-(0)-LiFSI-1 | (1j) | 100 | | | LiFSI | 1.0 |
| 1-(1j)-100-(0)-LiTFSI-1 | (1j) | 100 | | | LiTFSI | 1.0 |
| 1-(1j)-100-(0)-LiBETI-1 | (1j) | 100 | | | LiBETI | 1.0 |
| 1-(1j)-100-(0)-LiBF$_4$-1 | (1j) | 100 | | | LiBF$_4$ | 1.0 |

TABLE 32

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1c)-100-(0)-LiSO$_3$F-1 | (1c) | 100 | | none | LiSO$_3$F | 1.0 |
| 1-(1c)-100-(0)-LiPO$_2$F$_2$-1 | (1c) | 100 | | | LiPO$_2$F$_2$ | 1.0 |
| 1-(1g)-100-(0)-LiFSI-2 | (1g) | 100 | | | LiFSI | 2.0 |
| 1-(1g)-100-(0)-LiSO$_3$F-1 | (1g) | 100 | | | LiSO$_3$F | 1.0 |
| 1-(1i)-100-(0)-LiFSI-2 | (1i) | 100 | | | LiFSI | 2.0 |
| 1-(1i)-100-(0)-LiSO$_3$F-1 | (1i) | 100 | | | LiSO$_3$F | 1.0 |
| 1-(1p)-100-(0)-LiSO$_3$F-1 | (1p) | 100 | | | LiSO$_3$F | 1.0 |
| 1-(1p)-100-(0)-LiPO$_2$F$_2$-1 | (1p) | 100 | | | LiPO$_2$F$_2$ | 1.0 |
| 1-(1a)-100-(0)-LiSO$_3$F-1 | (1a) | 100 | | | LiSO$_3$F | 1.0 |
| 1-(1a)-100-(0)-LTFOP-1 | (1a) | 100 | | | LTFOP | 1.0 |
| 1-(1e)-100-(0)-LiSO$_3$F-1 | (1e) | 100 | | | LiSO$_3$F | 1.0 |
| 1-(1e)-100-(0)-LTFOP-1 | (1e) | 100 | | | LTFOP | 1.0 |
| 1-(1k)-100-(0)-LiPO$_2$F$_2$-1 | (1k) | 100 | | | LiPO$_2$F$_2$ | 1.0 |
| 1-(1k)-100-(0)-LTFOP-1 | (1k) | 100 | | | LTFOP | 1.0 |
| 1-(1q)-100-(0)-LiPO$_2$F$_2$-1 | (1q) | 100 | | | LiPO$_2$F$_2$ | 1.0 |
| 1-(1q)-100-(0)-LTFOP-1 | (1q) | 100 | | | LTFOP | 1.0 |

TABLE 33

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1b)-100-(0)-LDFBOP-0.5-LiFSI-1 | (1b) | 100 | | none | LDFBOP | 0.5 |
| | | | | | LiFSI | 1.0 |
| 1-(1b)-100-(0)-LDFBOP-1-LiPO$_2$F$_2$-0.5 | (1b) | 100 | | | LDFBOP | 1.0 |
| | | | | | LiPO$_2$F$_2$ | 0.5 |
| 1-(1b)-100-(0)-LDFBOP-1-ESF-0.5 | (1b) | 100 | | | LDFBOP | 1.0 |
| | | | | | ESF | 0.5 |
| 1-(1b)-100-(0)-LiPO$_2$F$_2$-0.5-FB-5 | (1b) | 100 | | | LiPO$_2$F$_2$ | 0.5 |
| | | | | | FB | 5.0 |
| 1-(1b)-100-(0)-LiPO$_2$F$_2$-0.5-Dod-0.5 | (1b) | 100 | | | LiPO$_2$F$_2$ | 0.5 |
| | | | | | Dod | 0.5 |
| 1-(1b)-100-(0)-LiPO$_2$F$_2$-0.5-pDod-0.5 | (1b) | 100 | | | LiPO$_2$F$_2$ | 0.5 |
| | | | | | pDod | 0.5 |
| 1-(1b)-100-(0)-LiPO$_2$F$_2$-0.5-Dad-0.5 | (1b) | 100 | | | LiPO$_2$F$_2$ | 0.5 |
| | | | | | Dad | 0.5 |
| 1-(1b)-100-(0)-LiPO$_2$F$_2$-0.5-PS-1 | (1b) | 100 | | | LiPO$_2$F$_2$ | 0.5 |
| | | | | | PS | 1.0 |
| 1-(1b)-100-(0)-LiPO$_2$F$_2$-0.5-LiBF$_4$-1 | (1b) | 100 | | | LiPO$_2$F$_2$ | 0.5 |
| | | | | | LiBF$_4$ | 1.0 |

TABLE 33-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1b)-100-(0)-LiPO$_2$F$_2$-0.5-LiFSI-1 | (1b) | 100 | | | LiPO$_2$F$_2$<br>LiFSI | 0.5<br>1.0 |
| 1-(1b)-100-(0)-LiPO$_2$F$_2$-0.5-LiTFSI-1 | (1b) | 100 | | | LiPO$_2$F$_2$<br>LiTFSI | 0.5<br>1.0 |
| 1-(1b)-100-(0)-LiPO$_2$F$_2$-0.5-LiBETI-1 | (1b) | 100 | | | LiPO$_2$F$_2$<br>LiBETI | 0.5<br>1.0 |
| 1-(1b)-100-(0)-LiPO$_2$F$_2$-0.5-LiSO$_3$F-1 | (1b) | 100 | | | LiPO$_2$F$_2$<br>LiSO$_3$F | 0.5<br>1.0 |

TABLE 34

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in |
| | No. | mass ratio | No. | mass ratio | Kind | Electrolyte Solution |
| 1-(1f)-100-(0)-LDFBOP-0.5-LiSO$_3$F-1 | (1f) | 100 | none | | LDFBOP<br>LiSO$_3$F | 0.5<br>1.0 |
| 1-(1f)-100-(0)-LDFBOP-1-LiPO$_2$F$_2$-0.5 | (1f) | 100 | | | LDFBOP<br>LiPO2F2 | 1.0<br>0.5 |
| 1-(1f)-100-(0)-LDFBOP-1-TSF-0.5 | (1f) | 100 | | | LDFBOP<br>TSF | 1.0<br>0.5 |
| 1-(1f)-100-(0)-LiPO$_2$F$_2$-0.5-FB-5 | (1f) | 100 | | | LiPO$_2$F$_2$<br>FB | 0.5<br>5.0 |
| 1-(1f)-100-(0)-LiPO$_2$F$_2$-0.5-Dod-0.5 | (1f) | 100 | | | LiPO$_2$F$_2$<br>Dod | 0.5<br>0.5 |
| 1-(1f)-100-(0)-LiPO$_2$F$_2$-0.5-pDod-0.5 | (1f) | 100 | | | LiPO$_2$F$_2$<br>pDod | 0.5<br>0.5 |
| 1-(1f)-100-(0)-LiPO$_2$F$_2$-0.5-Dad-0.5 | (1f) | 100 | | | LiPO$_2$F$_2$<br>Dad | 0.5<br>0.5 |
| 1-(1f)-100-(0)-LiPO$_2$F$_2$-0.5-PS-1 | (1f) | 100 | | | LPO$_2$F$_2$<br>PS | 0.5<br>1.0 |
| 1-(1f)-100-(0)-LiPO$_2$F$_2$-0.5-LiBF$_4$-1 | (1f) | 100 | | | LiPO$_2$F$_2$<br>LiBF$_4$ | 0.5<br>1.0 |
| 1-(1f)-100-(0)-LiPO$_2$F$_2$-0.5-LiFSI-1 | (1f) | 100 | | | LiPO$_2$F$_2$<br>LiFSI | 0.5<br>1.0 |
| 1-(1f)-100-(0)-LiPO$_2$F$_2$-0.5-LiTFSI-1 | (1f) | 100 | | | LiPO$_2$F$_2$<br>LiTISI | 0.5<br>1.0 |
| 1-(1f)-100-(0)-LiPO$_2$F$_2$-0.5-LiBETI-1 | (1f) | 100 | | | LiPO$_2$F$_2$<br>LiBETI | 0.5<br>1.0 |
| 1-(1f)-100-(0)-LiPO$_2$F$_2$-0.5-LiSO$_3$F-1 | (1f) | 100 | | | LiPO$_2$F$_2$<br>LiSO$_3$F | 0.5<br>1.0 |

TABLE 35

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in |
| | No. | mass ratio | No. | mass ratio | Kind | Electrolyte Solution |
| 1-(1h)-100-(0)-LDFBOP-0.5-LiFSI-1 | (1h) | 100 | none | | LDFBOP<br>LiFSI | 0.5<br>1.0 |
| 1-(1h)-100-(0)-LDFBOP-0.5-LiSO$_3$F-1 | (1h) | 100 | | | LDFBOP<br>LiSO$_3$F | 0.5<br>1.0 |

TABLE 35-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in |
| | No. | mass ratio | No. | mass ratio | Kind | Electrolyte Solution |
| 1-(1h)-100-(0)-LDFBOP-1-PDFP-0.5 | (1h) | 100 | | | LDFBOP | 1.0 |
| | | | | | TSF | 0.5 |
| 1-(1h)-100-(0)-LiPO$_2$F$_2$-0.5-FB-5 | (1h) | 100 | | | LiPO$_2$F$_2$ | 0.5 |
| | | | | | FB | 5.0 |
| 1-(1h)-100-(0)-LiPO$_2$F$_2$-0.5-Dod-0.5 | (1h) | 100 | | | LiPO$_2$F$_2$ | 0.5 |
| | | | | | Dod | 0.5 |
| 1-(1h)-100-(0)-LiPO$_2$F$_2$-0.5-pDod-0.5 | (1h) | 100 | | | LiPO$_2$F$_2$ | 0.5 |
| | | | | | pDod | 0.5 |
| 1-(1h)-100-(0)-LiPO$_2$F$_2$-0.5-Dad-0.5 | (1h) | 100 | | | LiPO$_2$F$_2$ | 0.5 |
| | | | | | Dad | 0.5 |
| 1-(1h)-100-(0)-LiPO$_2$F$_2$-0.5-PS-1 | (1h) | 100 | | | LiPO$_2$F$_2$ | 0.5 |
| | | | | | PS | 1.0 |
| 1-(1h)-100-(0)-LiPO$_2$F$_2$-0.5-LiBF$_4$-1 | (1h) | 100 | | | LiPO$_2$F$_2$ | 0.5 |
| | | | | | LiBF$_4$ | 1.0 |
| 1-(1h)-100-(0)-LiPO$_2$F$_2$-0.5-LiFSI-1 | (1h) | 100 | | | LiPO$_2$F$_2$ | 0.5 |
| | | | | | LiFSI | 1.0 |
| 1-(1h)-100-(0)-LiPO$_2$F$_2$-0.5-LiTFSI-1 | (1h) | 100 | | | LiPO$_2$F$_2$ | 0.5 |
| | | | | | LiTISI | 1.0 |
| 1-(1h)-100-(0)-LiPO$_2$F$_2$-0.5-LiBETI-1 | (1h) | 100 | | | LiPO$_2$F$_2$ | 0.5 |
| | | | | | LiBETI | 1.0 |
| 1-(1h)-100-(0)-LiPO$_2$F$_2$-0.5-LiSO$_3$F-1 | (1h) | 100 | | | LiPO$_2$F$_2$ | 0.5 |
| | | | | | LiSO$_3$F | 1.0 |

TABLE 36

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in |
| | No. | mass ratio | No. | mass ratio | Kind | Electrolyte Solution |
| 1-(1b)-100-(0)-LiPO$_2$F$_2$-0.5-FB-5-Dod-0.5 | (1b) | 100 | | none | LiPO$_2$F$_2$ | 0.5 |
| | | | | | FB | 5.0 |
| | | | | | Dod | 0.5 |
| 1-(1b)-100-(0)-LiPO$_2$F$_2$-0.5-FB-5-pDod-0.5 | (1b) | 100 | | | LiPO$_2$F$_2$ | 1.0 |
| | | | | | FB | 0.5 |
| | | | | | pDod | 0.5 |
| 1-(1b)-100-(0)-LiPO$_2$F$_2$-0.5-FB-5-Dad-0.5 | (1b) | 100 | | | LiPO$_2$F$_2$ | 1.0 |
| | | | | | FB | 0.5 |
| | | | | | Dad | 0.5 |
| 1-(1b)-100-(0)-LiPO$_2$F$_2$-0.5-FB-5-PS-1 | (1b) | 100 | | | LiPO$_2$F$_2$ | 0.5 |
| | | | | | FB | 5.0 |
| | | | | | PS | 1.0 |
| 1-(1b)-100-(0)-LiPO$_2$F$_2$-0.5-FB-5-LiBF$_4$-1 | (1b) | 100 | | | LiPO$_2$F$_2$ | 0.5 |
| | | | | | FB | 5.0 |
| | | | | | LiBF$_4$ | 1.0 |
| 1-(1b)-100-(0)-LiPO$_2$F$_2$-0.5-FB-5-LiFSI-1 | (1b) | 100 | | | LiPO$_2$F$_2$ | 0.5 |
| | | | | | FB | 5.0 |
| | | | | | LiFSI | 1.0 |
| 1-(1b)-100-(0)-LiPO$_2$F$_2$-0.5-FB-5-LiTFSI-1 | (1b) | 100 | | | LiPO$_2$F$_2$ | 0.5 |
| | | | | | FB | 5.0 |
| | | | | | LiTFSI | 1.0 |
| 1-(1b)-100-(0)-LiPO$_2$F$_2$-0.5-FB-5-LiBETI-1 | (1b) | 100 | | | LiPO$_2$F$_2$ | 0.5 |
| | | | | | FB | 5.0 |
| | | | | | LiBETI | 1.0 |
| 1-(1b)-100-(0)-LiPO$_2$F$_2$-0.5-FB-5-LiSO$_3$F-1 | (1b) | 100 | | | LiPO$_2$F$_2$ | 0.5 |
| | | | | | FB | 5.0 |
| | | | | | LiSO$_3$F | 1.0 |

TABLE 38

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in |
| | No. | mass ratio | No. | mass ratio | Kind | Electrolyte Solution |
| 1-(1f)-100-(0)-LiPO$_2$F$_2$-0.5-FB-5-Dod-0.5 | (1f) | 100 | | none | LiPO$_2$F$_2$<br>FB<br>Dod | 0.5<br>5.0<br>0.5 |
| 1-(1f)-100-(0)-LiPO$_2$F$_2$-0.5-FB-5-pDod-0.5 | (1f) | 100 | | | LiPO$_2$F$_2$<br>FB<br>pDod | 0.5<br>5.0<br>0.5 |
| 1-(1f)-100-(0)-LiPO$_2$F$_2$-0.5-FB-5-Dad-0.5 | (1f) | 100 | | | LiPO$_2$F$_2$<br>FB<br>Dad | 0.5<br>5.0<br>0.5 |
| 1-(1f)-100-(0)-LiPO$_2$F$_2$-0.5-FB-5-PS-1 | (1f) | 100 | | | LiPO$_2$F$_2$<br>FB<br>PS | 0.5<br>5.0<br>1.0 |
| 1-(1f)-100-(0)-LiPO$_2$F$_2$-0.5-FB-5-LiBF$_4$-1 | (1f) | 100 | | | LiPO$_2$F$_2$<br>FB<br>LiBF$_4$ | 0.5<br>5.0<br>1.0 |
| 1-(1f)-100-(0)-LiPO$_2$F$_2$-0.5-FB-5-LiFSI-1 | (1f) | 100 | | | LiPO$_2$F$_2$<br>FB<br>LiFSI | 0.5<br>5.0<br>1.0 |
| 1-(1f)-100-(0)-LiPO$_2$F$_2$-0.5-FB-5-LiTFSI-1 | (1f) | 100 | | | LiPO$_2$F$_2$<br>FB<br>LiTFSI | 0.5<br>5.0<br>1.0 |
| 1-(1f)-100-(0)-LiPO$_2$F$_2$-0.5-FB-5-LiBETI-1 | (1f) | 100 | | | LiPO$_2$F$_2$<br>FB<br>LiBETI | 0.5<br>5.0<br>1.0 |
| 1-(1f)-100-(0)-LiPO$_2$F$_2$-0.5-FB-LiSO$_3$F-1 | (1f) | 100 | | | LiPO$_2$F$_2$<br>FB<br>LiSO$_3$F | 0.5<br>5.0<br>1.0 |

TABLE 39

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in |
| | No. | mass ratio | No. | mass ratio | Kind | Electrolyte Solution |
| 1-(1h)-100-(0)-LiPO$_2$F$_2$-0.5-FB-5-Dod-0.5 | (1h) | 100 | | none | LiPO$_2$F$_2$<br>FB<br>Dod | 0.5<br>5.0<br>0.5 |
| 1-(1h)-100-(0)-LiPO$_2$F$_2$-1-FB-5-pDod-0.5 | (1h) | 100 | | | LiPO$_2$F$_2$<br>FB<br>pDod | 0.5<br>5.0<br>0.5 |
| 1-(1h)-100-(0)-LiPO$_2$F$_2$-1-FB-5-Dad-0.5 | (1h) | 100 | | | LiPO$_2$F$_2$<br>FB<br>Dad | 0.5<br>5.0<br>0.5 |
| 1-(1h)-100-(0)-LiPO$_2$F$_2$-0.5-FB-5-PS-1 | (1h) | 100 | | | LiPO$_2$F$_2$<br>FB<br>PS | 0.5<br>5.0<br>1.0 |
| 1-(1h)-100-(0)-LiPO$_2$F$_2$-0.5-FB-5-LiBF$_4$-1 | (1h) | 100 | | | LiPO$_2$F$_2$<br>FB<br>LiBF$_4$ | 0.5<br>5.0<br>1.0 |
| 1-(1h)-100-(0)-LiPO$_2$F$_2$-0.5-FB-5-LiFSI-1 | (1h) | 100 | | | LiPO$_2$F$_2$<br>FB<br>LiFSI | 0.5<br>5.0<br>1.0 |
| 1-(1h)-100-(0)-LiPO$_2$F$_2$-0.5-FB-5-LiTFSI-1 | (1h) | 100 | | | LiPO$_2$F$_2$<br>FB<br>LiTFSI | 0.5<br>5.0<br>1.0 |
| 1-(1h)-100-(0)-LiPO$_2$F$_2$-0.5-FB-5-LiBETI-1 | (1h) | 100 | | | LiPO$_2$F$_2$<br>FB<br>LiBETI | 0.5<br>5.0<br>1.0 |
| 1-(1h)-100-(0)-LiPO$_2$F$_2$-0.5-FB-5-LiSO$_3$F-1 | (1h) | 100 | | | LiPO$_2$F$_2$<br>FB<br>LiSO$_3$F | 0.5<br>5.0<br>1.0 |

TABLE 40

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in |
| | No. | mass ratio | No. | mass ratio | Kind | Electrolyte Solution |
| 1-(1j)-100-(0)-LiPO$_2$F$_2$-0.5-FB-5-Dod-0.5 | (1j) | 100 | | none | LiPO$_2$F$_2$<br>FB<br>Dod | 0.5<br>5.0<br>0.5 |
| 1-(1j)-100-(0)-LiPO$_2$F$_2$-0.5-FB-5-pDod-0.5 | (1j) | 100 | | | LiPO$_2$F$_2$<br>FB<br>pDod | 0.5<br>5.0<br>0.5 |
| 1-(1j)-100-(0)-LiPO$_2$F$_2$-0.5-FB-5-Dad-0.5 | (1j) | 100 | | | LiPO$_2$F$_2$<br>FB<br>Dad | 0.5<br>5.0<br>0.5 |
| 1-(1j)-100-(0)-LiPO$_2$F$_2$-0.5-FB-5-PS-1 | (1j) | 100 | | | LiPO$_2$F$_2$<br>FB<br>PS | 0.5<br>5.0<br>1.0 |
| 1-(1j)-100-(0)-LiPO$_2$F$_2$-0.5-FB-5-LiBF$_4$-1 | (1j) | 100 | | | LiPO$_2$F$_2$<br>FB<br>LiBF$_4$ | 0.5<br>5.0<br>1.0 |
| 1-(1j)-100-(0)-LiPO$_2$F$_2$-0.5-FB-5-LiFSI-1 | (1j) | 100 | | | LiPO$_2$F$_2$<br>FB<br>LiFSI | 0.5<br>5.0<br>1.0 |
| 1-(1j)-100-(0)-LiPO$_2$F$_2$-0.5-FB-5-LiTFSI-1 | (1j) | 100 | | | LiPO$_2$F$_2$<br>FB<br>LiTFSI | 0.5<br>5.0<br>1.0 |
| 1-(1j)-100-(0)-LiPO$_2$F$_2$-0.5-FB-LiBETI-1 | (1j) | 100 | | | LPO$_2$F$_2$<br>FB<br>LiBETI | 0.5<br>5.0<br>1.0 |
| 1-(1j)-100-(0)-LiPO$_2$F$_2$-0.5-FB-5-LiSO$_3$F-1 | (1j) | 100 | | | LiPO$_2$F$_2$<br>FB<br>LiSO$_3$F | 0.5<br>5.0<br>1.0 |

TABLE 41

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in |
| | No. | mass ratio | No. | mass ratio | Kind | Electrolyte Solution |
| 1-(1b)-100-(0)-LiPO$_2$F$_2$-0.5-FB-5-Dod-0.5-PS-0.5 | (1b) | 100 | | none | LiPO$_2$F$_2$<br>FB<br>Dod<br>PS | 0.5<br>5.0<br>0.5<br>0.5 |
| 1-(1b)-100-(0)-LiPO$_2$F$_2$-0.5-FB-5-Dod-0.5-LiBF$_4$-0.5 | (1b) | 100 | | | LiPO$_2$F$_2$<br>FB<br>pDod<br>LiBF$_4$ | 0.5<br>5.0<br>0.5<br>0.5 |
| 1-(1b)-100-(0)-LiPO$_2$F$_2$-0.5-FB-5-Dod-0.5-LiFSI-0.5 | (1b) | 100 | | | LiPO$_2$F$_2$<br>FB<br>Dod<br>LiFSI | 0.5<br>5.0<br>0.5<br>0.5 |
| 1-(1b)-100-(0)-LiPO$_2$F$_2$-0.5-FB-5-Dod-0.5-LiTFSI-0.5 | (1b) | 100 | | | LiPO$_2$F$_2$<br>FB<br>Dod<br>LiTFSI | 0.5<br>5.0<br>0.5<br>0.5 |
| 1-(1b)-100-(0)-LiPO$_2$F$_2$-0.5-FB-5-Dod-0.5-LiBETI-0.5 | (1b) | 100 | | | LiPO$_2$F$_2$<br>FB<br>Dod<br>LiBETI | 0.5<br>5.0<br>0.5<br>0.5 |
| 1-(1b)-100-(0)-LiPO$_2$F$_2$-0.5-FB-5-Dod-0.5-LiSO$_3$F-0.5 | (1b) | 100 | | | LiPO$_2$F$_2$<br>FB<br>Dod<br>LiSO$_3$F | 0.5<br>5.0<br>0.5<br>0.5 |

TABLE 42

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1f)-100-(0)-LiPO$_2$F$_2$-0.5-FB-5-Dod-0.5-PS-0.5 | (1f) | 100 | | none | LiPO$_2$F$_2$<br>FB<br>Dod<br>PS | 0.5<br>5.0<br>0.5<br>0.5 |
| 1-(1f)-100-(0)-LiPO$_2$F$_2$-0.5-FB-5-Dod-0.5-LiBF$_4$-0.5 | (1f) | 100 | | | LiPO$_2$F$_2$<br>FB<br>pDod<br>LiBF$_4$ | 0.5<br>5.0<br>0.5<br>0.5 |
| 1-(1f)-100-(0)-LiPO$_2$F$_2$-0.5-FB-5-Dod-0.5-LiFSI-0.5 | (1f) | 100 | | | LiPO$_2$F$_2$<br>FB<br>Dod<br>LiFSI | 0.5<br>5.0<br>0.5<br>0.5 |
| 1-(1f)-100-(0)-LiPO$_2$F$_2$-0.5-FB-5-Dod-0.5-LiTFSI-0.5 | (1f) | 100 | | | LiPO$_2$F$_2$<br>FB<br>Dod<br>LiTFSI | 0.5<br>5.0<br>0.5<br>0.5 |
| 1-(1f)-100-(0)-LiPO$_2$F$_2$-0.5-FB-5-Dod-0.5-LiBETI-0.5 | (1f) | 100 | | | LiPO$_2$F$_2$<br>FB<br>Dod<br>LiBETI | 0.5<br>5.0<br>0.5<br>0.5 |
| 1-(1f)-100-(0)-LiPO$_2$F$_2$-0.5-FB-5-Dod-0.5-LiSO$_3$F-0.5 | (1f) | 100 | | | LiPO$_2$F$_2$<br>FB<br>Dod<br>LiSO$_3$F | 0.5<br>5.0<br>0.5<br>0.5 |

TABLE 43

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1h)-100-(0)-LiPO$_2$F$_2$-0.5-FB-5-Dod-0.5-PS-0.5 | (1h) | 100 | | none | LiPO$_2$F$_2$<br>FB<br>Dod<br>PS | 0.5<br>5.0<br>0.5<br>0.5 |
| 1-(1h)-100-(0)-LiPO$_2$F$_2$-0.5-FB-5-Dod-0.5-LiBF$_4$-0.5 | (1h) | 100 | | | LiPO$_2$F$_2$<br>FB<br>pDod<br>LiBF$_4$ | 0.5<br>5.0<br>0.5<br>0.5 |
| 1-(1h)-100-(0)-LiPO$_2$F$_2$-0.5-FB-5-Dod-0.5-LiFSI-0.5 | (1h) | 100 | | | LiPO$_2$F$_2$<br>FB<br>Dod<br>LiFSI | 0.5<br>5.0<br>0.5<br>0.5 |
| 1-(1h)-100-(0)-LiPO$_2$F$_2$-0.5-FB-5-Dod-0.5-LiTFSI-0.5 | (1h) | 100 | | | LiPO$_2$F$_2$<br>FB<br>Dod<br>LiTFSI | 0.5<br>5.0<br>0.5<br>0.5 |
| 1-(1h)-100-(0)-LiPO$_2$F$_2$-0.5-FB-5-Dod-0.5-LiBETI-0.5 | (1h) | 100 | | | LiPO$_2$F$_2$<br>FB<br>Dod<br>LiBETI | 0.5<br>5.0<br>0.5<br>0.5 |
| 1-(1h)-100-(0)-LiPO$_2$F$_2$-0.5-FB-5-Dod-0.5-LiSO$_3$F-0.5 | (1h) | 100 | | | LiPO$_2$F$_2$<br>FB<br>Dod<br>LiSO$_3$F | 0.5<br>5.0<br>0.5<br>0.5 |

TABLE 44

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in |
| | No. | mass ratio | No. | mass ratio | Kind | Electrolyte Solution |
| 1-(1j)-100-(0)-LiPO$_2$F$_2$-0.5-FB-5-Dod-0.5-PS-0.5 | (1j) | 100 | none | | LiPO$_2$F$_2$ | 0.5 |
| | | | | | FB | 5.0 |
| | | | | | Dod | 0.5 |
| | | | | | PS | 0.5 |
| 1-(1j)-100-(0)-LiPO$_2$F$_2$-0.5-FB-5-Dod-0.5-LiBF$_4$-0.5 | (1j) | 100 | | | LiPO$_2$F$_2$ | 0.5 |
| | | | | | FB | 5.0 |
| | | | | | pDod | 0.5 |
| | | | | | LiBF$_4$ | 0.5 |
| 1-(1j)-100-(0)-LiPO$_2$F$_2$-0.5-FB-5-Dod-0.5-LiFSI-0.5 | (1j) | 100 | | | LiPO$_2$F$_2$ | 0.5 |
| | | | | | FB | 5.0 |
| | | | | | Dod | 0.5 |
| | | | | | LiFSI | 0.5 |
| 1-(1j)-100-(0)-LiPO$_2$F$_2$-0.5-FB-5-Dod-0.5-LiTFSI-0.5 | (1j) | 100 | | | LiPO$_2$F$_2$ | 0.5 |
| | | | | | FB | 5.0 |
| | | | | | Dod | 0.5 |
| | | | | | LiTFSI | 0.5 |
| 1-(1j)-100-(0)-LiPO$_2$F$_2$-0.5-FB-5-Dod-0.5-LiBETI-0.5 | (1j) | 100 | | | LiPO$_2$F$_2$ | 0.5 |
| | | | | | FB | 5.0 |
| | | | | | Dod | 0.5 |
| | | | | | LiBETI | 0.5 |
| 1-(1j)-100-(0)-LiPO$_2$F$_2$-0.5-FB-5-Dod-0.5-LiSO$_3$F-0.5 | (1j) | 100 | | | LiPO$_2$F$_2$ | 0.5 |
| | | | | | FB | 5.0 |
| | | | | | Dod | 0.5 |
| | | | | | LiSO$_3$F | 0.5 |

TABLE 45

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in |
| | No. | mass ratio | No. | mass ratio | Kind | Electrolyte Solution |
| 1-(1b)-100-(0)-LiPO$_2$F$_2$-0.5-FB-5-Dod-0.5-PS-0.2-LiFSI-0.3 | (1b) | 100 | none | | LiPO$_2$F$_2$ | 0.5 |
| | | | | | FB | 5.0 |
| | | | | | Dod | 0.5 |
| | | | | | PS | 0.2 |
| | | | | | LiFSI | 0.3 |
| 1-(1b)-100-(0)-LiPO$_2$F$_2$-0.5-FB-5-Dod-0.5-PS-0.2-LiTFSI-0.3 | (1b) | 100 | | | LiPO$_2$F$_2$ | 0.5 |
| | | | | | FB | 5.0 |
| | | | | | pDod | 0.5 |
| | | | | | PS | 0.2 |
| | | | | | LiTFSI | 0.3 |
| 1-(1b)-100-(0)-LiPO$_2$F$_2$-0.5-FB-5-Dod-0.5-PS-0.2-LiBETI-0.3 | (1b) | 100 | | | LiPO$_2$F$_2$ | 0.5 |
| | | | | | FB | 5.0 |
| | | | | | Dod | 0.5 |
| | | | | | PS | 0.2 |
| | | | | | LiBETI | 0.3 |
| 1-(1b)-100-(0)-LiPO$_2$F$_2$-0.5-FB-5-Dod-0.5-PS-0.2-LiSO$_3$F-0.3 | (1b) | 100 | | | LiPO$_2$F$_2$ | 0.5 |
| | | | | | FB | 5.0 |
| | | | | | Dod | 0.5 |
| | | | | | PS | 0.2 |
| | | | | | LiSO$_3$F | 0.3 |
| 1-(1b)-100-(0)-LiPO$_2$F$_2$-0.5-FB-5-Dod-0.5-PS-0.2-LiBF$_4$-0.3 | (1b) | 100 | | | LiPO$_2$F$_2$ | 0.5 |
| | | | | | FB | 5.0 |
| | | | | | Dod | 0.5 |
| | | | | | PS | 0.2 |
| | | | | | LiBF$_4$ | 0.3 |

TABLE 45-continued

| | Combination of Silicon Compounds (1) and (2) | | | | Other Solute or Additive Component | |
| --- | --- | --- | --- | --- | --- | --- |
| | Silicon Compound (1) | | Silicon Compound (2) | | | Concentration (mass %) in |
| Nonaqueous Electrolyte Solution No. | No. | mass ratio | No. | mass ratio | Kind | Electrolyte Solution |
| 1-(1b)-100-(0)-LiPO$_2$F$_2$-0.5-FB-5-Dod-0.5-PS-0.2-LiFSI-0.3 | (1b) | 100 | | | LiPO$_2$F$_2$<br>FB<br>Dod<br>PS<br>LiFSI | 0.5<br>5.0<br>0.5<br>0.2<br>0.3 |
| 1-(1b)-100-(0)-LiPO$_2$F$_2$-0.5-FB-5-Dod-0.5-PS-0.2-LiTFSI-0.3 | (1b) | 100 | | | LiPO$_2$F$_2$<br>FB<br>Dod<br>PS<br>LiTFSI | 0.5<br>5.0<br>0.5<br>0.2<br>0.3 |

TABLE 46

| | Combination of Silicon Compounds (1) and (2) | | | | Other Solute or Additive Component | |
| --- | --- | --- | --- | --- | --- | --- |
| | Silicon Compound (1) | | Silicon Compound (2) | | | Concentration (mass %) in |
| Nonaqueous Electrolyte Solution No. | No. | mass ratio | No. | mass ratio | Kind | Electrolyte Solution |
| 1-(1f)-100-(0)-LiPO$_2$F$_2$-0.5-FB-5-Dod-0.5-PS-0.2-LiFSI-0.3 | (1f) | 100 | none | | LiPO$_2$F$_2$<br>FB<br>Dod<br>PS<br>LiFSI | 0.5<br>5.0<br>0.5<br>0.2<br>0.3 |
| 1-(1f)-100-(0)-LiPO$_2$F$_2$-0.5-FB-5-Dod-0.5-PS-0.2-LiTFSI-0.3 | (1f) | 100 | | | LiPO$_2$F$_2$<br>FB<br>pDod<br>PS<br>LiTFSI | 0.5<br>5.0<br>0.5<br>0.2<br>0.3 |
| 1-(1f)-100-(0)-LiPO$_2$F$_2$-0.5-FB-5-Dod-0.5-PS-0.2-LiBETI-0.3 | (1f) | 100 | | | LiPO$_2$F$_2$<br>FB<br>Dod<br>PS<br>LiBETI | 0.5<br>5.0<br>0.5<br>0.2<br>0.3 |
| 1-(1f)-100-(0)-LiPO$_2$F$_2$-0.5-FB-5-Dod-0.5-PS-0.2-LiSO$_3$F-0.3 | (1f) | 100 | | | LiPO2F2<br>FB<br>Dod<br>PS<br>LiSO$_3$F | 0.5<br>5.0<br>0.5<br>0.2<br>0.3 |
| 1-(1f)-100-(0)-LiPO$_2$F$_2$-0.5-FB-5-Dod-0.5-PS-0.2-LiBF$_4$-0.3 | (1f) | 100 | | | LiPO$_2$F$_2$<br>FB<br>Dod<br>PS<br>LiBF$_4$ | 0.5<br>5.0<br>0.5<br>0.2<br>0.3 |
| 1-(1f)-100-(0)-LiPO$_2$F$_2$-0.5-FB-5-Dod-0.5-PS-0.2-LiFSI-0.3 | (1f) | 100 | | | LiPO$_2$F$_2$<br>FB<br>Dod<br>PS<br>LiFSI | 0.5<br>5.0<br>0.5<br>0.2<br>0.3 |
| 1-(1f)-100-(0)-LiPO$_2$F$_2$-0.5-FB-5-Dod-0.5-PS-0.2-LiTFSI-0.3 | (1f) | 100 | | | LiPO$_2$F$_2$<br>FB<br>Dod<br>PS<br>LiTFSI | 0.5<br>5.0<br>0.5<br>0.2<br>0.3 |

TABLE 47

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1h)-100-(0)-LiPO₂F₂-0.5-FB-5-Dod-0.5-PS-0.2-LiFSI-0.3 | (1h) | 100 | none | | LiPO₂F₂<br>FB<br>Dod<br>PS<br>LiFSI | 0.5<br>5.0<br>0.5<br>0.2<br>0.3 |
| 1-(1h)-100-(0)-LiPO₂F₂-0.5-FB-5-Dod-0.5-PS-0.2-LiTFSI-0.3 | (1h) | 100 | | | LiPO₂F₂<br>FB<br>pDod<br>PS<br>LiTFSI | 0.5<br>5.0<br>0.5<br>0.2<br>0.3 |
| 1-(1h)-100-(0)-LiPO₂F₂-0.5-FB-5-Dod-0.5-PS-0.2-LiBETI-0.3 | (1h) | 100 | | | LiPO₂F₂<br>FB<br>Dod<br>PS<br>LiBETI | 0.5<br>5.0<br>0.5<br>0.2<br>0.3 |
| 1-(1h)-100-(0)-LiPO₂F₂-0.5-FB-5-Dod-0.5-PS-0.2-LiSO₃F-0.3 | (1h) | 100 | | | LiPO₂F₂<br>FB<br>Dod<br>PS<br>LiSO₃F | 0.5<br>5.0<br>0.5<br>0.2<br>0.3 |
| 1-(1h)-100-(0)-LiPO₂F₂-0.5-FB-5-Dod-0.5-PS-0.2-LiBF₄-0.3 | (1h) | 100 | | | LiPO₂F₂<br>FB<br>Dod<br>PS<br>LiBF₄ | 0.5<br>5.0<br>0.5<br>0.2<br>0.3 |
| 1-(1h)-100-(0)-LiPO₂F₂-0.5-FB-5-Dod-0.5-PS-0.2-LiFSI-0.3 | (1h) | 100 | | | LiPO₂F₂<br>FB<br>Dod<br>PS<br>LiFSI | 0.5<br>5.0<br>0.5<br>0.2<br>0.3 |
| 1-(1h)-100-(0)-LiPO₂F₂-0.5-FB-5-Dod-0.5-PS-0.2-LiTFSI-0.3 | (1h) | 100 | | | LiPO₂F₂<br>FB<br>Dod<br>PS<br>LiTFSI | 0.5<br>5.0<br>0.5<br>0.2<br>0.3 |

TABLE 48

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1j)-100-(0)-LiPO₂F₂-0.5-FB-5-Dod-0.5-PS-0.2-LiFSI-0.3 | (1j) | 100 | none | | LiPO₂F₂<br>FB<br>Dod<br>PS<br>LiFSI | 0.5<br>5.0<br>0.5<br>0.2<br>0.3 |
| 1-(1j)-100-(0)-LiPO₂F₂-0.5-FB-5-Dod-0.5-PS-0.2-LiTFSI-0.3 | (1j) | 100 | | | LiPO₂F₂<br>FB<br>pDod<br>PS<br>LiTFSI | 0.5<br>5.0<br>0.5<br>0.2<br>0.3 |
| 1-(1j)-100-(0)-LiPO₂F₂-0.5-FB-5-Dod-0.5-PS-0.2-LiBETI-0.3 | (1j) | 100 | | | LiPO₂F₂<br>FB<br>Dod<br>PS<br>LiBETI | 0.5<br>5.0<br>0.5<br>0.2<br>0.3 |
| 1-(1j)-100-(0)-LiPO₂F₂-0.5-FB-5-Dod-0.5-PS-0.2-LiSO₃F-0.3 | (1j) | 100 | | | LiPO₂F₂<br>FB<br>Dod<br>PS<br>LiSO₃F | 0.5<br>5.0<br>0.5<br>0.2<br>0.3 |

TABLE 48-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in |
| | No. | mass ratio | No. | mass ratio | Kind | Electrolyte Solution |
| 1-(1j)-100-(0)-LiPO$_2$F$_2$-0.5-FB-5-Dod-0.5-PS-0.2-LiBF$_4$-0.3 | (1j) | 100 | | | LiPO$_2$F$_2$<br>FB<br>Dod<br>PS<br>LiBF$_4$ | 0.5<br>5.0<br>0.5<br>0.2<br>0.3 |
| 1-(1j)-100-(0)-LiPO$_2$F$_2$-0.5-FB-5-Dod-0.5-PS-0.2-LiFSI-0.3 | (1j) | 100 | | | LiPO$_2$F$_2$<br>FB<br>Dod<br>PS<br>LiFSI | 0.5<br>5.0<br>0.5<br>0.2<br>0.3 |
| 1-(1j)-100-(0)-LiPO$_2$F$_2$-0.5-FB-5-Dod-0.5-PS-0.2-LiTFSI-0.3 | (1j) | 100 | | | LiPO$_2$F$_2$<br>FB<br>Dod<br>PS<br>LiTFSI | 0.5<br>5.0<br>0.5<br>0.2<br>0.3 |

TABLE 49

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in |
| | No. | mass ratio | No. | mass ratio | Kind | Electrolyte Solution |
| 1-(1b)-100-(0)-LiPO$_2$F$_2$-0.5-FB-5-pDod-0.3-PS-0.2-LiBF$_4$-0.3-LiSO$_3$F-0.2 | (1b) | 100 | none | | LiPO$_2$F$_2$<br>FB<br>pDod<br>PS<br>LiBF$_4$<br>LiSO$_3$F | 0.5<br>5.0<br>0.3<br>0.2<br>0.3<br>0.2 |
| 1-(1b)-100-(0)-LiPO$_2$F$_2$-0.5-FB-5-Dad-0.3-PS-0.2-LiBF$_4$-0.3-LiSO$_3$F-0.2 | (1b) | 100 | none | | LiPO$_2$F$_2$<br>FB<br>Dad<br>PS<br>LiBF$_4$<br>LiSO$_3$F | 0.5<br>5.0<br>0.3<br>0.2<br>0.3<br>0.2 |
| 1-(1b)-100-(0)-LiPO$_2$F$_2$-0.5-FB-5-Dod-0.3-PS-0.2-LiBF$_4$-0.3-LiSO$_3$F-0.2 | (1b) | 100 | none | | LiPO$_2$F$_2$<br>FB<br>Dod<br>PS<br>LiBF$_4$<br>LiSO$_3$F | 0.5<br>5.0<br>0.3<br>0.2<br>0.3<br>0.2 |
| 1-(1b)-100-(0)-LiPO$_2$F$_2$-0.5-FB-5-Dod-0.3-PS-0.2-LiBF$_4$-0.3-LiFSI-0.2 | (1b) | 100 | none | | LiPO$_2$F$_2$<br>FB<br>Dod<br>PS<br>LiBF$_4$<br>LiTFSI | 0.5<br>5.0<br>0.3<br>0.2<br>0.3<br>0.2 |
| 1-(1b)-100-(0)-LiPO$_2$F$_2$-0.5-FB-5-Dod-0.3-PS-0.2-LiBF$_4$-0.3-LiTFSI-0.2 | (1b) | 100 | none | | LiPO$_2$F$_2$<br>FB<br>Dod<br>PS<br>LiBF$_4$<br>LiTFSI | 0.5<br>5.0<br>0.3<br>0.2<br>0.3<br>0.2 |
| 1-(1b)-100-(0)-LiPO$_2$F$_2$-0.5-FB-5-Dod-0.3-PS-0.2-LiBF$_4$-0.3-LiBETI-0.2 | (1b) | 100 | none | | LiPO$_2$F$_2$<br>FB<br>Dod<br>PS<br>LiBF$_4$<br>LiBETI | 0.5<br>5.0<br>0.3<br>0.2<br>0.3<br>0.2 |

TABLE 50

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1f)-100-(0)-LiPO$_2$F$_2$-0.5-FB-5-pDod-0.3-PS-0.2-LiBF$_4$-0.3-LiSO$_3$F-0.2 | (1f) | 100 | none | | LiPO$_2$F$_2$<br>FB<br>pDod<br>PS<br>LiBF$_4$<br>LiSO$_3$F | 0.5<br>5.0<br>0.3<br>0.2<br>0.3<br>0.2 |
| 1-(1f)-100-(0)-LiPO$_2$F$_2$-0.5-FB-5-Dad-0.3-PS-0.2-LiBF$_4$-0.3-LiSO$_3$F-0.2 | (1f) | 100 | | | LiPO$_2$F$_2$<br>FB<br>Dad<br>PS<br>LiBF$_4$<br>LiSO$_3$F | 0.5<br>5.0<br>0.3<br>0.2<br>0.3<br>0.2 |
| 1-(1f)-100-(0)-LiPO$_2$F$_2$-0.5-FB-5-Dod-0.3-PS-0.2-LiBF$_4$-0.3-LiSO$_3$F-0.2 | (1f) | 100 | | | LiPO$_2$F$_2$<br>FB<br>Dod<br>PS<br>LiBF$_4$<br>LiSO$_3$F | 0.5<br>5.0<br>0.3<br>0.2<br>0.3<br>0.2 |
| 1-(1f)-100-(0)-LiPO$_2$F$_2$-0.5-FB-5-Dod-0.3-PS-0.2-LiBF$_4$-0.3-LiFSI-0.2 | (1f) | 100 | | | LiPO$_2$F$_2$<br>FB<br>Dod<br>PS<br>LiBF$_4$<br>LiFSI | 0.5<br>5.0<br>0.3<br>0.2<br>0.3<br>0.2 |
| 1-(1f)-100-(0)-LiPO$_2$F$_2$-0.5-FB-5-Dod-0.3-PS-0.2-LiBF$_4$-0.3-LiTFSI-0.2 | (1f) | 100 | | | LiPO$_2$F$_2$<br>FB<br>Dod<br>PS<br>LiBF$_4$<br>LiTFSI | 0.5<br>5.0<br>0.3<br>0.2<br>0.3<br>0.2 |
| 1-(1f)-100-(0)-LiPO$_2$F$_2$-0.5-FB-5-Dod-0.3-PS-0.2-LiBF$_4$-0.3-LiBETI-0.2 | (1f) | 100 | | | LiPO$_2$F$_2$<br>FB<br>Dod<br>PS<br>LiBF$_4$<br>LiBETI | 0.5<br>5.0<br>0.3<br>0.2<br>0.3<br>0.2 |

TABLE 51

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1h)-100-(0)-LiPO$_2$F$_2$-0.5-FB-5-pDod-0.3-PS-0.2-LiBF$_4$-0.3-LiSO$_3$F-0.2 | (1h) | 100 | none | | LiPO$_2$F$_2$<br>FB<br>pDod<br>PS<br>LiBF$_4$<br>LiSO$_3$F | 0.5<br>5.0<br>0.3<br>0.2<br>0.3<br>0.2 |
| 1-(1h)-100-(0)-LiPO$_2$F$_2$-0.5-FB-5-Dad-0.3-PS-0.2-LiBF$_4$-0.3-LiSO$_3$F-0.2 | (1h) | 100 | | | LiPO$_2$F$_2$<br>FB<br>Dad<br>PS<br>LiBF$_4$<br>LiSO$_3$F | 0.5<br>5.0<br>0.3<br>0.2<br>0.3<br>0.2 |

TABLE 51-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1h)-100-(0)-LiPO$_2$F$_2$-0.5-FB-5-Dod-0.3-PS-0.2-LiBF$_4$-0.3-LiSO$_3$F-0.2 | (1h) | 100 | | | LiPO$_2$F$_2$<br>FB<br>Dod<br>PS<br>LiBF$_4$<br>LiSO$_3$F | 0.5<br>5.0<br>0.3<br>0.2<br>0.3<br>0.2 |
| 1-(1h)-100-(0)-LiPO$_2$F$_2$-0.5-FB-5-Dod-0.3-PS-0.2-LiBF$_4$-0.3-LiFSI-0.2 | (1h) | 100 | | | LiPO$_2$F$_2$<br>FB<br>Dod<br>PS<br>LiBF$_4$<br>LiFSI | 0.5<br>5.0<br>0.3<br>0.2<br>0.3<br>0.2 |
| 1-(1h)-100-(0)-LiPO$_2$F$_2$-0.5-FB-5-Dod-0.3-PS-0.2-LiBF$_4$-0.3-LiTFSI-0.2 | (1h) | 100 | | | LiPO$_2$F$_2$<br>FB<br>Dod<br>PS<br>LiBF$_4$<br>LiTFSI | 0.5<br>5.0<br>0.3<br>0.2<br>0.3<br>0.2 |
| 1-(1h)-100-(0)-LiPO$_2$F$_2$-0.5-FB-5-Dod-0.3-PS-0.2-LiBF$_4$-0.3-LiBETI-0.2 | (1h) | 100 | | | LiPO$_2$F$_2$<br>FB<br>Dod<br>PS<br>LiBF$_4$<br>LiBETI | 0.5<br>5.0<br>0.3<br>0.2<br>0.3<br>0.2 |

TABLE 52

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1j)-100-(0)-LiPO$_2$F$_2$-0.5-FB-5-pDod-0.3-PS-0.2-LiBF$_4$-0.3-LiSO$_3$F-0.2 | (1j) | 100 | none | | LiPO$_2$F$_2$<br>FB<br>pDod<br>PS<br>LiBF$_4$<br>LiSO$_3$F | 0.5<br>5.0<br>0.3<br>0.2<br>0.3<br>0.2 |
| 1-(1j)-100-(0)-LiPO$_2$F$_2$-0.5-FB-5-Dad-0.3-PS-0.2-LiBF$_4$-0.3-LiSO$_3$F-0.2 | (1j) | 100 | | | LiPO$_2$F$_2$<br>FB<br>Dad<br>PS<br>LiBF$_4$<br>LiSO$_3$F | 0.5<br>5.0<br>0.3<br>0.2<br>0.3<br>0.2 |
| 1-(1j)-100-(0)-LiPO$_2$F$_2$-0.5-FB-5-Dod-0.3-PS-0.2-LiBF$_4$-0.3-LiSO$_3$F-0.2 | (1j) | 100 | | | LiPO$_2$F$_2$<br>FB<br>Dod<br>PS<br>LiBF$_4$<br>LiSO$_3$F | 0.5<br>5.0<br>0.3<br>0.2<br>0.3<br>0.2 |
| 1-(1j)-100-(0)-LiPO$_2$F$_2$-0.5-FB-5-Dod-0.3-PS-0.2-LiBF$_4$-0.3-LiFSI-0.2 | (1j) | 400 | | | LiPO$_2$F$_2$<br>FB<br>Dod<br>PS<br>LiBF$_4$<br>LiFSI | 0.5<br>5.0<br>0.3<br>0.2<br>0.3<br>0.2 |
| 1-(1j)-100-(0)-LiPO$_2$F$_2$-0.5-FB-5-Dod-0.3-PS-0.2-LiBF$_4$-0.3-LiTFSI-0.2 | (1j) | 100 | | | LiPO$_2$F$_2$<br>FB<br>Dod<br>PS<br>LiBF$_4$<br>LiTFSI | 0.5<br>5.0<br>0.3<br>0.2<br>0.3<br>0.2 |

TABLE 52-continued

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1j)-100-(0)-LiPO$_2$F$_2$-0.5-FB-5-Dod-0.3-PS-0.2-LiBF$_4$-03-LiBETI-0.2 | (1j) | 100 | | | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiBETI | 0.2 |

TABLE 53

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1b)-100-(2b)-30-LiFSI-2 | (1b) | 100 | (2b) | 30 | LiFSI | 2.0 |
| 1-(1b)-100-(2b)-30-LiSO$_3$F-1 | (1b) | 100 | (2b) | 30 | LiSO$_3$F | 1.0 |
| 1-(1b)-100-(2b)-30-LDFBOP-1 | (1b) | 100 | (2b) | 30 | LDFBOP | 1.0 |
| 1-(1b)-100-(2b)-30-ESF-0.5 | (1b) | 100 | (2b) | 30 | ESF | 0.5 |
| 1-(1b)-100-(2b)-30-LIPO$_2$F$_2$-1 | (1b) | 100 | (2b) | 30 | LiPO$_2$F$_2$ | 1.0 |
| 1-(1b)-100-(2b)-30-FB-5 | (1b) | 100 | (2b) | 30 | FB | 5.0 |
| 1-(1b)-100-(2b)-30-Dod--0.5 | (1b) | 100 | (2b) | 30 | Dod | 0.5 |
| 1-(1b)-100-(2b)-30-pDod-0.5 | (1b) | 100 | (2b) | 30 | pDod | 0.5 |
| 1-(1b)-100-(2b)-30-Dad-0.5 | (1b) | 100 | (2b) | 30 | Dad | 0.5 |
| 1-(1b)-100-(2b)-30-PS-1 | (1b) | 100 | (2b) | 30 | PS | 1.0 |
| 1-(1b)-100-(2b)-30-LiTFSI-1 | (1b) | 100 | (2b) | 30 | LiTFSI | 1.0 |
| 1-(1b)-100-(2b)-30-LiBETI-1 | (1b) | 100 | (2b) | 30 | LiBETI | 1.0 |
| 1-(1b)-100-(2b)-30-LiBF$_4$-1 | (1b) | 100 | (2b) | 30 | LiSF$_4$ | 1.0 |

TABLE 54

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1f)-100-(2f)-30-LiPO$_2$F$_2$-1 | (1f) | 100 | (2f) | 30 | LiPO$_2$F$_2$ | 1.0 |
| 1-(1f)-100-(2f)-30-LTFOP-1 | (1f) | 100 | (2f) | 30 | LTFOP | 1.0 |
| 1-(1f)-100-(2f)-30-LDFOB-1 | (1f) | 100 | (2f) | 30 | LDFOB | 1.0 |
| 1-(1f)-100-(2f)-30-TSF-0.5 | (1f) | 100 | (2f) | 30 | TSF | 0.5 |
| 1-(1f)-100-(2f)-30-LiSO$_3$F-1 | (1f) | 100 | (2f) | 30 | LiSO$_3$F | 1.0 |
| 1-(1f)-100-(2f)-30-FB-5 | (1f) | 100 | (2f) | 30 | FB | 5.0 |
| 1-(1f)-100-(2f)-30-Dod-0.5 | (1f) | 100 | (2f) | 30 | Dod | 0.5 |
| 1-(1f)-100-(2f)-30-pDod-0.5 | (1f) | 100 | (2f) | 30 | pDod | 0.5 |
| 1-(1f)-100-(2f)-30-Dad-0.5 | (1f) | 100 | (2f) | 30 | Dad | 0.5 |
| 1-(1f)-100-(2f)-30-PS-1 | (1f) | 100 | (2f) | 30 | PS | 1.0 |
| 1-(1f)-100-(2f)-30-LiFSI-1 | (1f) | 100 | (2f) | 30 | LiFSI | 1.0 |
| 1-(1f)-100-(2f)-30-LiTFSI-1 | (1f) | 100 | (2f) | 30 | LiTFSI | 1.0 |
| 1-(1f)-100-(2f)-30-LiBETI-1 | (1f) | 100 | (2f) | 30 | LiBETI | 1.0 |
| 1-(1f)-100-(2f)-30-LiBF$_4$-1 | (1f) | 100 | (2f) | 30 | LiBF$_4$ | 1.0 |

TABLE 55

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1h)-100-(2h)-30-LiSO$_3$F-1 | (1h) | 100 | (2h) | 30 | LiSO$_3$F | 1.0 |
| 1-(1h)-100-(2h)-30-LTFOP-1 | (1h) | 100 | (2h) | 30 | LTFOP | 1.0 |
| 1-(1h)-100-(2h)-30-LDFBOP-1 | (1h) | 100 | (2h) | 30 | LDFBOP | 1.0 |
| 1-(1h)-100-(2h)-30-PDFP-1 | (1h) | 100 | (2h) | 30 | PDFP | 1.0 |
| 1-(1h)-100-(2h)-30-LiPO$_2$F$_2$-1 | (1h) | 100 | (2h) | 30 | LiPO$_2$F$_2$ | 1.0 |
| 1-(1h)-100-(2h)-30-MSF-0.5 | (1h) | 100 | (2h) | 30 | MSF | 0.5 |
| 1-(1h)-100-(2h)-30-FB-5 | (1h) | 100 | (2h) | 30 | FB | 5.0 |
| 1-(1h)-100-(2h)-30-Dod-0.5 | (1h) | 100 | (2h) | 30 | Dod | 0.5 |
| 1-(1h)-100-(2h)-30-pDod-0.5 | (1h) | 100 | (2h) | 30 | pDod | 0.5 |
| 1-(1h)-100-(2h)-30-Dad-0.5 | (1h) | 100 | (2h) | 30 | Dad | 0.5 |
| 1-(1h)-100-(2h)-30-PS-1 | (1h) | 100 | (2h) | 30 | PS | 1.0 |
| 1-(1h)-100-(2h)-30-LiFSI-1 | (1h) | 100 | (2h) | 30 | LiFSI | 1.0 |
| 1-(1h)-100-(2h)-30-LiTFSI-1 | (1h) | 100 | (2h) | 30 | LiTFSI | 1.0 |
| 1-(1h)-100-(2h)-30-LiBETI-1 | (1h) | 100 | (2h) | 30 | LiBETI | 1.0 |
| 1-(1h)-100-(2h)-30-LiBF$_4$-1 | (1h) | 100 | (2h) | 30 | LiBF$_4$ | 1.0 |

TABLE 56

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1j)-100-(2j)-30-LiSO$_3$P-1 | (1j) | 100 | (2j) | 30 | LiSO$_3$F | 1.0 |
| 1-(1j)-100-(2j)-30-LiPO$_2$F$_2$-1 | (1j) | 100 | (2j) | 30 | LiPO$_2$F$_2$ | 1.0 |
| 1-(1j)-100-(2j)-30-LDFOB-1 | (1j) | 100 | (2j) | 30 | LDFOB | 1.0 |
| 1-(1j)-100-(2j)-30-MSF-0.5 | (1j) | 100 | (2j) | 30 | MSF | 0.5 |
| 1-(1j)-100-(2j)-30-FB-5 | (1j) | 100 | (2j) | 30 | FB | 5.0 |
| 1-(1j)-100-(2j)-30-Dod-0.5 | (1j) | 100 | (2j) | 30 | Dod | 0.5 |
| 1-(1j)-100-(2j)-30-pDod-0.5 | (1j) | 100 | (2j) | 30 | pDod | 0.5 |
| 1-(1j)-100-(2j)-30-Dad-0.5 | (1j) | 100 | (2j) | 30 | Dad | 0.5 |
| 1-(1j)-100-(2j)-30-PS-1 | (1j) | 100 | (2j) | 30 | PS | 1.0 |
| 1-(1j)-100-(2j)-30-LiFSI-1 | (1j) | 100 | (2j) | 30 | LiFSI | 1.0 |
| 1-(1j)-100-(2j)-30-LiTFSI-1 | (1j) | 100 | (2j) | 30 | LiTFSI | 1.0 |
| 1-(1j)-100-(2j)-30-LiBETI-1 | (1j) | 100 | (2j) | 30 | LiBETI | 1.0 |
| 1-(1j)-100-(2j)-30-LiBF$_4$-1 | (1j) | 100 | (2j) | 30 | LiBF$_4$ | 1.0 |

TABLE 57

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1c)-100-(2b)-30-LiSO$_3$F-1 | (1c) | 100 | (2b) | 30 | LiSO$_3$F | 1.0 |
| 1-(1c)-100-(2b)-30-LiPO$_2$F$_2$-1 | (1c) | 100 | (2b) | 30 | LiPO$_2$F$_2$ | 1.0 |
| 1-(1g)-100-(2h)-30-LiFSI-2 | (1g) | 100 | (2h) | 30 | LiFSI | 2.0 |
| 1-(1g)-100-(2h)-30-LiSO$_3$F-1 | (1g) | 100 | (2h) | 30 | LiSO$_3$F | 1.0 |
| 1-(1i)-100-(2j)-30-LiFSI-2 | (1i) | 100 | (2j) | 30 | LiFSI | 2.0 |
| 1-(1i)-100-(2j)-30-LiSO$_3$F-1 | (1i) | 100 | (2j) | 30 | LiSO$_3$F | 1.0 |
| 1-(1p)-100-(2h)-30-LiSO$_3$F-1 | (1p) | 100 | (2h) | 30 | LiSO$_3$F | 1.0 |

TABLE 57-continued

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1p)-100-(2h)-30-LiPO$_2$F$_2$-1 | (1p) | 100 | (2h) | 30 | LiPO$_2$F$_2$ | 1.0 |
| 1-(1a)-100-(2l)-30-LiSO$_3$F-1 | (1a) | 100 | (2f) | 30 | LiSO$_3$F | 1.0 |
| 1-(1a)-100-(2f)-30-LTFOP-1 | (1a) | 100 | (2f) | 30 | LTFOP | 1.0 |
| 1-(1e)-100-(2b)-30-LiSO$_3$F-1 | (1e) | 100 | (2b) | 30 | LiSO$_3$F | 1.0 |
| 1-(1e)-100-(2b)-30-LTFOP-1 | (1e) | 100 | (2b) | 30 | LTFOP | 1.0 |
| 1-(1k)-100-(2b)-30-LiPO$_2$F$_2$-1 | (1k) | 100 | (2b) | 30 | LiPO$_2$F$_2$ | 1.0 |
| 1-(1k)-100-(2b)-30-LTFOP-1 | (1k) | 100 | (2b) | 30 | LTFOP | 1.0 |
| 1-(1q)-100-(2h)-30-LiPO$_2$F$_2$-1 | (1q) | 100 | (2h) | 30 | LiPO$_2$F$_2$ | 1.0 |
| 1-(1q)-100-(2h)-30-LTFOP-1 | (1q) | 100 | (2h) | 30 | LTFOP | 1.0 |

TABLE 58

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1b)-100-(2b)-30-LDFBOP-0.5-LiFSI-1 | (1b) | 100 | (2b) | 30 | LDFBOP<br>LiFSI | 0.5<br>1.0 |
| 1-(1b)-100-(2b)-30-LDFBOP-1-LiPO$_2$F$_2$-0.5 | (1b) | 100 | (2b) | 30 | LDFBOP<br>LiPO$_2$F$_2$ | 1.0<br>0.5 |
| 1-(1b)-100-(2b)-30-LDFBOP-1-ESF-0.5 | (1b) | 100 | (2b) | 30 | LDFBOP<br>ESF | 1.0<br>0.5 |
| 1-(1b)-100-(2b)-30-LiPO$_2$F$_2$-0.5-FB-5 | (1b) | 100 | (2b) | 30 | LiPO$_2$F$_2$<br>FB | 0.5<br>5.0 |
| 1-(1b)-100-(2b)-30-LiPO$_2$F$_2$-0.5-Dod-0.5 | (1b) | 100 | (2b) | 30 | LiPO$_2$F$_2$<br>Dod | 0.5<br>0.5 |
| 1-(1b)-100-(20-30-LiPO$_2$F$_2$-0.5-pDod-0.5 | (1b) | 100 | (2b) | 30 | LiPO$_2$F$_2$<br>pDod | 0.5<br>0.5 |
| 1-(1b)-100-(2b)-30-LiPO$_2$F$_2$-0.5-Dad-0.5 | (1b) | 100 | (2b) | 30 | LiPO$_2$F$_2$<br>Dad | 0.5<br>0.5 |
| 1-(1b)-100-(2b)-30-LiPO$_2$F$_2$-0.5-PS-1 | (1b) | 100 | (26) | 30 | LiPO$_2$F$_2$<br>PS | 0.5<br>1.0 |
| 1-(1b)-100-(2b)-30-LiPO$_2$F$_2$-0.5-LiBF$_4$-1 | (1b) | 100 | (2b) | 30 | LiPO$_2$F$_2$<br>LiBF$_4$ | 0.5<br>1.0 |
| 1-(1b)-100-(2b)-30-LiPO$_2$F$_2$-0.5-LiFSI-1 | (1b) | 100 | (2b) | 30 | LiPO$_2$F$_2$<br>LiFSI | 0.5<br>1.0 |
| 1-(1b)-100-(2b)-30-LiPO$_2$F$_2$-0.5-LiTFSI-1 | (1b) | 100 | (2b) | 30 | LiPO$_2$F$_2$<br>LiTFSI | 4.5<br>1.0 |
| 1-(1b)-100-(2b)-30-LiPO$_2$F$_2$-0.5-LiBETH | (1b) | 100 | (2b) | 30 | LiPO$_2$F$_2$<br>LiBETI | 0.5<br>1.0 |
| 1-(1b)-100-(2b)-30-LiPO$_2$F$_2$-0.5-LiSO$_3$F-1 | (1b) | 100 | (2b) | 30 | LiPO$_2$F$_2$<br>LiSO$_3$F | 0.5<br>1.0 |

TABLE 59

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1f)-100-(2f)-30-LDFBOP-0.5-LiSO$_3$F-1 | (1f) | 100 | (2f) | 30 | LDFBOP<br>LiSO$_3$F | 0.5<br>1.0 |

TABLE 59-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1f)-100-(2f)-30-LDFBOP-1-LiPO$_2$F$_2$-0.5 | (1f) | 100 | (2f) | 30 | LDFBOP<br>LiPO$_2$F$_2$ | 1.0<br>0.5 |
| 1-(1f)-100-(2f)-30-LDFBOP-1-TSF-0.5 | (1f) | 100 | (2f) | 30 | LDFBOP<br>TSF | 1.0<br>0.5 |
| 1-(1f)-100-(2f)-30-LiPO$_2$F$_2$-0.5-FB-5 | (1f) | 100 | (2f) | 30 | LiPO$_2$F$_2$<br>FB | 0.5<br>5.0 |
| 1-(1f)-100-(2f)-30-LiPO$_2$F$_2$-0.5-Dod-0.5 | (1f) | 100 | (2f) | 30 | LiPO$_2$F$_2$<br>Dod | 0.5<br>0.5 |
| 1-(1f)-100-(2f)-30-LiPO$_2$F$_2$-0.5-pDod-0.5 | (1f) | 100 | (2f) | 30 | LiPO$_2$F$_2$<br>pDod | 0.5<br>0.5 |
| 1-(1f)-100-(2f)-30-LiPO$_2$F$_2$-0.5-Dad-0.5 | (1f) | 100 | (2f) | 30 | LiPO$_2$F$_2$<br>Dad | 0.5<br>0.5 |
| 1-(1f)-100-(2f)-30-LiPO$_2$F$_2$-0.5-PS-1 | (1f) | 100 | (2f) | 30 | LiPO$_2$F$_2$<br>PS | 0.5<br>1.0 |
| 1-(1f)-100-(2f)-30-LiPO$_2$F$_2$-0.5-LiBF$_4$-1 | (1f) | 100 | (2f) | 30 | LiPO$_2$F$_2$<br>LiBF$_4$ | 0.5<br>1.0 |
| 1-(1f)-100-(2f)-30-LiPO$_2$F$_2$-0.5-LiFSI-1 | (1f) | 100 | (2f) | 30 | LiPO$_2$F$_2$<br>LiFSI | 0.5<br>1.0 |
| 1-(1f)-100-(2f)-30-LiPO$_2$F$_2$-0.5-LiTFSI-1 | (1f) | 100 | (2f) | 30 | LiPO$_2$F$_2$<br>LiTFSI | 0.5<br>1.0 |
| 1-(1f)-100-(2f)-30-LiPO$_2$F$_2$-0.5-LiBETI-1 | (1f) | 100 | (2f) | 30 | LiPO$_2$F$_2$<br>LiBETI | 0.5<br>1.0 |
| 1-(1f)-100-(2f)-30-LiPO$_2$F$_2$-0.5-LiSO$_3$F-1 | (1f) | 100 | (2f) | 30 | LiPO$_2$F$_2$<br>LiSO$_3$F | 0.5<br>1.0 |

TABLE 60

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1h)-100-(2h)-30-LDFBOP-0.5-LiFSI-1 | (1h) | 100 | (2h) | 30 | LDFBCP<br>LiFSI | 0.5<br>1.0 |
| 1-(1h)-100-(21)-30-LDFBOP-0.5-LiSO$_3$F-1 | (1h) | 100 | (2h) | 30 | LDFBOP<br>LiSO$_3$F | 0.5<br>1.0 |
| 1-(1h)-100-(2h)-30-LDFEIOP-1-PDFP-13.5 | (1h) | 100 | (2h) | 30 | LDFBOP<br>PDFP | 1.0<br>0.5 |
| 1-(11)-100-(2h)-30-LiPO$_2$F$_2$-0.5-FB-5 | (1h) | 100 | (2h) | 30 | LiPO$_2$F$_2$<br>FB | 0.5<br>5.0 |
| 1-(1h)-100-(2h)-30-LiPO$_2$F$_2$-0.5-Dod-0.5 | (1h) | 100 | (2h) | 30 | LiPO$_2$F$_2$<br>Dod | 0.5<br>0.5 |
| 1-(1h)-100-(2h)-30-LiPO$_2$F$_2$-0.5-pDod-0.5 | (1h) | 100 | (2h) | 30 | LiPO$_2$F$_2$<br>pDod | 0.5<br>0.5 |
| 1-(1h)-100-(2h)-30-LiPO$_2$F$_2$-0.5-Dad-0.5 | (1h) | 100 | (2h) | 30 | LiPO$_2$F$_2$<br>Dad | 0.5<br>0.5 |
| 1-(1h)-100-(2h)-30-LiPO$_2$F$_2$-0.5-PS-1 | (1h) | 100 | (2h) | 30 | LiPO$_2$F$_2$<br>PS | 0.5<br>1.0 |
| 1-(1h)-100-(2h)-30-LiPO$_2$F$_2$-0.5-LiBF$_4$-1 | (1h) | 100 | (2h) | 30 | LiPO$_2$F$_2$<br>LiBF$_4$ | 0.5<br>1.0 |
| 1-(1h)-100-(2h)-30-LiPO$_2$F$_2$-0.5-LiFSI-1 | (1h) | 100 | (2h) | 30 | LiPO$_2$F$_2$<br>LiFSI | 0.5<br>1.0 |
| 1-(1h)-100-(2h)-30-LiPO$_2$F$_2$-0.5-LiTFSI-1 | (1h) | 100 | (2h) | 30 | LiPO$_2$F$_2$<br>LiTFSI | 0.5<br>1.0 |
| 1-(1h)-100-(2h)-30-LiPO$_2$F$_2$-0.5-LiBETI-1 | (1h) | 100 | (2h) | 30 | LiPO$_2$F$_2$<br>LiBETI | 0.5<br>1.0 |
| 1-(1h)-100-(2h)-30-LiPO$_2$F$_2$-0.5-LiSO$_3$F-1 | (1h) | 100 | (2h) | 30 | LiPO$_2$F$_2$<br>LiSO$_3$F | 0.5<br>1.0 |

TABLE 61

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1j)-100-(2j)-30-LDFBOP-0.5-LDFPFSI-1 | (1j) | 100 | (2j) | 30 | LDFBOP<br>LDFPFSI | 0.5<br>1.0 |
| 1-(1j)-100-(2j)-30-LDFBOP-1-LiPO$_2$F$_2$-0.5 | (1j) | 100 | (2j) | 30 | LDFBOP<br>LiPO$_2$F$_2$ | 1.0<br>0.5 |
| 1-(1j)-100-(2j)-30-LDFBOP-1-MSF-0.5 | (1j) | 100 | (2j) | 30 | LDFBOP<br>ESF | 1.0<br>0.5 |
| 1-(1j)-100-(2j)-30-LiPO$_2$F$_2$-0.5-FB-5 | (1j) | 100 | (2j) | 30 | LiPO$_2$F$_2$<br>FB | 0.5<br>5.0 |
| 1-(1j)-100-(2j)-30-LiPO$_2$F$_2$-0.5-Dod-0.5 | (1j) | 100 | (2j) | 30 | LiPO$_2$F$_2$<br>Dod | 0.5<br>0.5 |
| 1-(1j)-100-(2j)-30-LiPO$_2$F$_2$-0.5-pDod-0.5 | (1j) | 100 | (2j) | 30 | LiPO$_2$F$_2$<br>pDod | 0.5<br>0.5 |
| 1-(1j)-100-(2j)-30-LiPO$_2$F$_2$-0.5-Dad-0.5 | (1j) | 100 | (2j) | 30 | LiPO$_2$F$_2$<br>Dad | 0.5<br>0.5 |
| 1-(1j)-100-(2j)-30-LiPO$_2$F$_2$-0.5-PS-1 | (1j) | 100 | (2j) | 30 | LiPO$_2$F$_2$<br>PS | 0.5<br>1.0 |
| 1-(1j)-100-(2j)-30-LiPO$_2$F$_2$-0.5-LiBF$_4$-1 | (1j) | 100 | (2j) | 30 | LiPO$_2$F$_2$<br>LiBF$_4$ | 0.5<br>1.0 |
| 1-(1j)-100-(2j)-30-LiPO$_2$F$_2$-0.5-LiFSI-1 | (1j) | 100 | (2j) | 30 | LiPO$_2$F$_2$<br>LiFSI | 0.5<br>1.0 |
| 1-(1j)-100-(2j)-30-LiPO$_2$F$_2$-0.5-LiTFSI-1 | (1j) | 100 | (2j) | 30 | LiPO$_2$F$_2$<br>LiTFSI | 0.5<br>1.0 |
| 1-(1j)-100-(2j)-30-LiPO$_2$F$_2$-0.5-LiBETI-1 | (1j) | 100 | (2j) | 30 | LiPO$_2$F$_2$<br>LiBETI | 0.5<br>1.0 |
| 1-(1j)-100-(2j)-30-LiPO$_2$F$_2$-0.5-LiSO$_3$F-1 | (1j) | 100 | (2j) | 30 | LiPO$_2$F$_2$<br>LiSO$_3$F | 0.5<br>1.0 |

TABLE 62

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1b)-100-(2b)-30-LiPO$_2$F$_2$-0.5-FB-5-Dod-0.5 | (1b) | 100 | (2b) | 30 | LiPO$_2$F$_2$<br>FB<br>Dod | 0.5<br>5.0<br>0.5 |
| 1-(1b)-100-(2b)-30-LiPO$_2$F$_2$-0.5-FB-5-pDod-0.5 | (1b) | 100 | (2b) | 30 | LiPO$_2$F$_2$<br>FB<br>pDod | 0.5<br>5.0<br>0.5 |
| 1-(1b)-100-(2b)-30-LiPO$_2$F$_2$-0.5-FB-5-Dad-0.5 | (lb) | 100 | (2b) | 30 | LiPO$_2$F$_2$<br>FB<br>Dad | 0.5<br>5.0<br>0.5 |
| 1-(1b)-100-(2b)-30-LiPO$_2$F$_2$-0.5-FB-5-PS-1 | (1b) | 100 | (2b) | 30 | LiPO$_2$F$_2$<br>FB<br>PS | 0.5<br>5.0<br>1.0 |
| 1-(1b)-100-(2b)-30-LiPO$_2$F$_2$-0.5-FB-5-LiBF$_4$-1 | (1b) | 100 | (2b) | 30 | LiPO$_2$F$_2$<br>FB<br>LiBF$_4$ | 0.5<br>5.0<br>1.0 |
| 1-(1b)-100-(2b)-30-LiPO$_2$F$_2$-0.5-FB-5-LiFSI-1 | (1b) | 100 | (2b) | 30 | LiPO$_2$F$_2$<br>FB<br>LiFSI | 0.5<br>5.0<br>1.0 |
| 1-(1b)-100-(2b)-30-LiPO$_2$F$_2$-0.5-FB-5-LiTFSI-1 | (1b) | 100 | (2b) | 30 | LiPO$_2$F$_2$<br>FB<br>LiTFSI | 0.5<br>5.0<br>1.0 |
| 1-(1b)-100-(2b)-30-LiPO$_2$F$_2$-0.5-FB-5-LiBETI-1 | (1b) | 100 | (2b) | 30 | LiPO$_2$F$_2$<br>FB<br>LiBETI | 0.5<br>5.0<br>1.0 |
| 1-(1b)-100-(2b)-30-LiPO$_2$F$_2$-0.5-FB-5-LiSO$_3$F-1 | (1b) | 100 | (2b) | 30 | LiPO$_2$F$_2$<br>FB<br>LiSO$_3$F | 0.5<br>5.0<br>1.0 |

TABLE 63

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1f)-100-(2f)-30-LiPO$_2$F$_2$-0.5-FB-5-Dod-0.5 | (1f) | 100 | (2f) | 30 | LiPO$_2$F$_2$<br>FB<br>Dod | 0.5<br>5.0<br>0.5 |
| 1-(1f)-100-(2f)-30-LiPO$_2$F$_2$-0.5-FB-5-pDod-0.5 | (11) | 100 | (2f) | 30 | LiPO$_2$F$_2$<br>FB<br>pDod | 0.5<br>5.0<br>0.5 |
| 1-(1f)-100-(2f)-30-LiPO$_2$F$_2$-0.5-FB-5-Dad-0.5 | (1f) | 100 | (2f) | 30 | LiPO$_2$F$_2$<br>FB<br>Dad | 0.5<br>5.0<br>0.5 |
| 1-(1f)-100-(2f)-30-LiPO$_2$F$_2$-0.5-FB-5-PS-1 | (1f) | 100 | (2f) | 30 | LiPO$_2$F$_2$<br>FB<br>PS | 0.5<br>5.0<br>1.0 |
| 1-(1f)-100-(2f)-30-LiPO$_2$F$_2$-0.5-FB-5-LiBF$_4$-1 | (1f) | 100 | (2f) | 30 | LiPO$_2$F$_2$<br>FB<br>LiBF$_4$ | 0.5<br>5.0<br>1.0 |
| 1-(1f)-100-(2f)-30-LiPO$_2$F$_2$-0.5-FB-5-LiFSI-1 | (1f) | 100 | (2f) | 30 | LiPO$_2$F$_2$<br>FB<br>LiFSI | 0.5<br>5.0<br>1.0 |
| 1-(1f)-100-(2f)-30-LiPO$_2$F$_2$-0.5-FB-5-LiTFSI-1 | (1f) | 100 | (2f) | 30 | LiPO$_2$F$_2$<br>FB<br>LiTFSI | 0.5<br>5.0<br>1.0 |
| 1-(1f)-100-(2f)-30-LiPO$_2$F$_2$-0.5-FB-LiBETI-1 | (1f) | 100 | (2f) | 30 | LiPO$_2$F$_2$<br>FB<br>LiBETI | 0.5<br>5.0<br>1.0 |
| 1-(1f)-100-(2f)-30-LiPO$_2$F$_2$-0.5-FB-LiSO$_3$F-1 | (1f) | 100 | (2f) | 30 | LiPO$_2$F$_2$<br>FB<br>LiSO$_3$F | 0.5<br>5.0<br>1.0 |

TABLE 64

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1h)-100-(2h)-30-LiPO$_2$F$_2$-0.5-FB-5-Dod-0.5 | (1h) | 100 | (2h) | 30 | LiPO$_2$F$_2$<br>FB<br>Dod | 0.5<br>5.0<br>0.5 |
| 1-(1h)-100-(2h)-30-LiPO$_2$F$_2$-0.5-FB-5-pDod-0.5 | (1h) | 100 | (2h) | 30 | LiPO$_2$F$_2$<br>FB<br>pDod | 0.5<br>5.0<br>0.5 |
| 1-(1h)-100-(2h)-30-LiPO$_2$F$_2$-0.5-FB-5-Dad-0.5 | (1h) | 100 | (2h) | 30 | LiPO$_2$F$_2$<br>FB<br>Dad | 0.5<br>5.0<br>0.5 |
| 1-(1h)-100-(2h)-30-LiPO$_2$F$_2$-0.5-FB-5-PS-1 | (1h) | 100 | (2h) | 30 | LiPO$_2$F$_2$<br>FB<br>PS | 0.5<br>5.0<br>1.0 |
| 1-(1h)-100-(2h)-30-LiPO$_2$F$_2$-0.5-FB-5-LiBF$_4$-1 | (1h) | 100 | (2h) | 30 | LiPO$_2$F$_2$<br>FB<br>LiBF$_4$ | 0.5<br>5.0<br>1.0 |
| 1-(1h)-100-(2h)-30-LiPO$_2$F$_2$-0.5-FB-5-LiFSI-1 | (1h) | 100 | (2h) | 30 | LiPO$_2$F$_2$<br>FB<br>LiFSI | 0.5<br>5.0<br>1.0 |
| 1-(1h)-100-(2h)-30-LiPO$_2$F$_2$-0.5-FB-5-LiTFSI-1 | (1h) | 100 | (2h) | 30 | LiPO$_2$F$_2$<br>FB<br>LiTFSI | 0.5<br>5.0<br>1.0 |
| 1-(1h)-100-(2h)-30-LiPO$_2$F$_2$-0.5-FB-5-LiBETI-1 | (1h) | 100 | (2h) | 30 | LiPO$_2$F$_2$<br>FB<br>LiBETI | 0.5<br>5.0<br>1.0 |
| 1-(1h)-100-(2h)-30-LiPO$_2$F$_2$-0.5-FB-5-LiSO$_3$F-1 | (1h) | 100 | (2h) | 30 | LiPO$_2$F$_2$<br>FB<br>LiSO$_3$F | 0.5<br>5.0<br>1.0 |

TABLE 65

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1j)-100-(2j)-30-LiPO$_2$F$_2$-0.5-FB-5-Dod-0.5 | (1j) | 100 | (2j) | 30 | LiPO$_2$F$_2$<br>FB<br>Dod | 0.5<br>5.0<br>0.5 |
| 1-(1j)-100-(2j)-30-LiPO$_2$F$_2$-0.5-FB-5-pDod-0.5 | (1j) | 100 | (2j) | 30 | LiPO$_2$F$_2$<br>FB<br>pDod | 0.5<br>5.0<br>0.5 |
| 1-(1j)-100-(2j)-30-LiPO$_2$F$_2$-0.5-FB-5-Dad-0.5 | (1j) | 100 | (2j) | 30 | LiPO$_2$F$_2$<br>FB<br>Dad | 0.5<br>5.0<br>0.5 |
| 1-(1j)-100-(2j)-30-LiPO$_2$F$_2$-0.5-FB-5-PS-1 | (1j) | 100 | (2j) | 30 | LiPO$_2$F$_2$<br>FB<br>PS | 0.5<br>5.0<br>1.0 |
| 1-(1j)-100-(2j)-30-LiPO$_2$F$_2$-0.5-FB-5-LiBF$_4$-1 | (1j) | 100 | (2j) | 30 | LiPO$_2$F$_2$<br>FB<br>LiBF$_4$ | 0.5<br>5.0<br>1.0 |
| 1-(1j)-100-(2j)-30-LiPO$_2$F$_2$-0.5-FB-5-LiFSI-1 | (1j) | 100 | (2j) | 30 | LiPO$_2$F$_2$<br>FB<br>LiFSI | 0.5<br>5.0<br>1.0 |
| 1-(1j)-100-(2j)-30-LiPO$_2$F$_2$-0.5-FB-5-LiTFSI-1 | (1j) | 100 | (2j) | 30 | LiPO$_2$F$_2$<br>FB<br>LiTFSI | 0.5<br>5.0<br>1.0 |
| 1-(1j)-100-(2j)-30-LiPO$_2$F$_2$-0.5-FB-5-LiBETI-1 | (1j) | 100 | (2j) | 30 | LiPO$_2$F$_2$<br>FB<br>LiBETI | 0.5<br>5.0<br>1.0 |
| 1-(1j)-100-(2j)-30-LiPO$_2$F$_2$-0.5-FB-5-LiSO$_3$F-1 | (1j) | 100 | (2j) | 30 | LiPO$_2$F$_2$<br>FB<br>LiSO$_3$F | 0.5<br>5.0<br>1.0 |

TABLE 66

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1b)-100-(2b)-30-LiPO$_2$F$_2$-0.5-FB-5-Dod-0.5-PS-0.5 | (1b) | 100 | (2b) | 30 | LiPO$_2$F$_2$<br>FB<br>Dod<br>PS | 0.5<br>5.0<br>0.5<br>0.5 |
| 1-(1b)-100-(2b)-30-LiPO$_2$F$_2$-0.5-FB-5-Dod-0.5-LiSF$_4$-0.5 | (1b) | 100 | (2b) | 30 | LiPO$_2$F$_2$<br>FS<br>Dod<br>LiBF$_4$ | 0.5<br>5.0<br>0.5<br>0.5 |
| 1-(1b)-100-(2b)-30-LiPO$_2$F$_2$-0.5-FB-5-Dod-0.5-LiFSI-0.5 | (1b) | 100 | (2b) | 30 | LiPO$_2$F$_2$<br>FB<br>Dod<br>LiFSI | 0.5<br>5.0<br>0.5<br>0.5 |
| 1-(1b)-100-(2b)-30-LiPO$_2$F$_2$-0.5-FB-5-Dod-0.5-LiTFSI-0.5 | (1b) | 100 | (2b) | 30 | LiPO$_2$F$_2$<br>FB<br>Dod<br>LiTFSI | 0.5<br>5.0<br>0.5<br>0.5 |
| 1-(1b)-100-(2b)-30-LiPO$_2$F$_2$-0.5-FS-5-Dod-0.5-LiBETI-0.5 | (1b) | 100 | (2b) | 30 | LiPO$_2$F$_2$<br>FB<br>Dod<br>LiBETI | 0.5<br>5.0<br>0.5<br>0.5 |
| 1-(1b)-100-(2b)-30-LiPO$_2$F$_2$-0.5-FB-5-Dod-0.5-LiSO$_3$F-0.5 | (1b) | 100 | (2b) | 30 | LiPO$_2$F$_2$<br>FB<br>Dod<br>LiSO$_3$F | 0.5<br>5.0<br>0.5<br>0.5 |

TABLE 67

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1f)-100-(2f)-30-LiPO$_2$F$_2$-0.5-FB-5-Dod-0.5-PS-0.5 | (1f) | 100 | (2f) | 30 | LiPO$_2$F$_2$ | 0.5 |
| | | | | | FB | 5.0 |
| | | | | | Dad | 0.5 |
| | | | | | PS | 0.5 |
| 1-(1f)-100-(2f)-30-LiPO$_2$F$_2$-0.5-FB-5-Dod-0.5-LiBF$_4$-0.5 | (1f) | 100 | (2f) | 30 | LiPO$_2$F$_2$ | 0.5 |
| | | | | | FB | 5.0 |
| | | | | | Dod | 0.5 |
| | | | | | LiBF$_4$ | 0.5 |
| 1-(1f)-100-(2f)-30-LiPO$_2$F$_2$-0.5-FB-5-Dod-0.5-LiFSI-0.5 | (1f) | 100 | (2f) | 30 | LiPO$_2$F$_2$ | 0.5 |
| | | | | | FB | 5.0 |
| | | | | | Dad | 0.5 |
| | | | | | LiFSI | 0.5 |
| 1-(1f)-100-(2f)-30-LiPO$_2$F$_2$-0.5-FB-5-Dod-0.5-LiTFSI-0.5 | (1f) | 100 | (2f) | 30 | LiPO$_2$F$_2$ | 0.5 |
| | | | | | FB | 5.0 |
| | | | | | Dod | 0.5 |
| | | | | | LiTFSI | 0.5 |
| 1-(1f)-100-(2f)-30-LiPO$_2$F$_2$-0.5-FB-5-Dod-0.5-LiBETI-0.5 | (1f) | 100 | (2f) | 30 | LiPO$_2$F$_2$ | 0.5 |
| | | | | | FB | 5.0 |
| | | | | | Dod | 0.5 |
| | | | | | LiBETI | 0.5 |
| 1-(1f)-100-(2f)-30-LiPO$_2$F$_2$-0.5-FB-5-Dod-0.5-LiSO$_3$F-0.5 | (1f) | 100 | (2f) | 30 | LiPO$_2$F$_2$ | 0.5 |
| | | | | | FB | 5.0 |
| | | | | | Dod | 0.5 |
| | | | | | LiSO$_3$F | 0.5 |

TABLE 68

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1h)-100-(2h)-30-LiPO$_2$F$_2$-0.5-FB-5-Dod-0.5-PS-0.5 | (1h) | 100 | (2h) | 30 | LiPO$_2$F$_2$ | 0.5 |
| | | | | | FB | 5.0 |
| | | | | | Dod | 0.5 |
| | | | | | PS | 0.5 |
| 1-(1h)-100-(2h)-30-LiPO$_2$F$_2$-0.5-FB-5-Dod-0.5-LiBF$_4$-0.5 | (1h) | 100 | (2h) | 30 | LiPO$_2$F$_2$ | 0.5 |
| | | | | | FB | 5.0 |
| | | | | | Dod | 0.5 |
| | | | | | LiBF$_4$ | 0.5 |
| 1-(1h)-100-(2h)-30-LiPO$_2$F$_2$-0.5-FB-5-Dod-0.5-LiFSI-0.5 | (1h) | 100 | (2h) | 30 | LiPO$_2$F$_2$ | 0.5 |
| | | | | | FB | 5.0 |
| | | | | | Dod | 0.5 |
| | | | | | LiFSI | 0.5 |
| 1-(1h)-100-(2h)-30-LiPO$_2$F$_2$-0.5-FB-5-Dod-0.5-LiTFSI-0.5 | (1h) | 100 | (2h) | 30 | LiPO$_2$F$_2$ | 0.5 |
| | | | | | FB | 5.0 |
| | | | | | Dod | 0.5 |
| | | | | | LiTFSI | 0.5 |
| 1-(1h)-100-(2h)-30-LiPO$_2$F$_2$-0.5-FB-5-Dod-0.5-LiBETI-0.5 | (1h) | 100 | (2h) | 30 | LiPO$_2$F$_2$ | 0.5 |
| | | | | | FB | 5.0 |
| | | | | | Dod | 0.5 |
| | | | | | LiBETI | 0.5 |
| 1-(1h)-100-(2h)-30-LiPO$_2$F$_2$-0.5-FB-5-Dod-0.5-LiSO$_3$F-0.5 | (1h) | 100 | (2h) | 30 | LiPO$_2$F$_2$ | 0.5 |
| | | | | | FB | 5.0 |
| | | | | | Dod | 0.5 |
| | | | | | LiSO$_3$F | 0.5 |

TABLE 69

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1j)-100-(2j)-30-LiPO$_2$F$_2$-0.5-FB-5-Dod-0.5-PS-0.5 | (1j) | 100 | (2j) | 30 | LiPO$_2$F$_2$<br>FB<br>Dad<br>PS | 0.5<br>5.0<br>0.5<br>0.5 |
| 1-(1j)-100-(2j)-30-LiPO$_2$F$_2$-0.5-FB-5-Dod-0.5-LiBF$_4$-0.5 | (1j) | 100 | (2j) | 30 | LiPO$_2$F$_2$<br>FB<br>Dod<br>LiBF$_4$ | 0.5<br>5.0<br>0.5<br>0.5 |
| 1-(1j)-100-(2j)-30-LiPO$_2$F$_2$-0.5-FB-5-Dod-0.5-LiFSI-0.5 | (1j) | 100 | (2j) | 30 | LiPO$_2$F$_2$<br>FB<br>Dod<br>LiFSI | 0.5<br>5.0<br>0.5<br>0.5 |
| 1-(1j)-100-(2j)-30-LiPO$_2$F$_2$-0.5-FB-5-Dod-0.5-LiTFSI-0.5 | (1j) | 100 | (2j) | 30 | LiPO$_2$F$_2$<br>FB<br>Dod<br>LiTFSI | 0.5<br>5.0<br>0.5<br>0.5 |
| 1-(1j)-100-(2j)-30-LiPO$_2$F$_2$-0.5-FB-5-Dod-0.5-LiBETI-0.5 | (1j) | 100 | (2j) | 30 | LiPO$_2$F$_2$<br>FB<br>Dod<br>LiBETI | 05<br>5.0<br>0.5<br>0.5 |
| 1-(1j)-100-(2j)-30-LiPO$_2$F$_2$-0.5-FB-5-Dod-0.5-LiSO$_3$F-0.5 | (1j) | 100 | (2j) | 30 | LiPO$_2$F$_2$<br>FB<br>Dod<br>LiSO$_3$F | 0.5<br>5.0<br>0.5<br>0.5 |

TABLE 70

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1b)-100-(2b)-30-LiPO$_2$F$_2$-0.5-FB-5-Dod-0.5-PS-0.2-LiFSI-0.3 | (1b) | 100 | (2b) | 30 | LiPO$_2$F$_2$<br>FB<br>Dod<br>PS<br>LiFSI | 0.5<br>5.0<br>0.5<br>0.2<br>0.3 |
| 1-(1b)-100-(2b)-30-LiPO$_2$F$_2$-0.5-FB-5-Dod-0.5-PS-0.2-LiTFSI-0.3 | (1b) | 100 | (2b) | 30 | LiPO$_2$F$_2$<br>FB<br>Dod<br>PS<br>LiTFSI | 0.5<br>5.0<br>0.5<br>0.2<br>0.3 |
| 1-(1b)-100-(2b)-30-LiPO$_2$F$_2$-0.5-FB-5-Dod-0.5-PS-0.2-LiBETI-0.3 | (1b) | 100 | (2b) | 30 | LiPO$_2$F$_2$<br>FB<br>Dod<br>PS<br>LiBETI | 0.5<br>5.0<br>0.5<br>0.2<br>0.3 |
| 1-(1b)-100-(2b)-30-LiPO$_2$F$_2$-0.5-FB-5-Dod-0.5-PS-0.2-LiSO$_3$F-0.3 | (1b) | 100 | (2b) | 30 | LiPO$_2$F$_2$<br>FB<br>Dod<br>PS<br>LiSO$_3$F | 0.5<br>5.0<br>0.5<br>0.2<br>0.3 |
| 1-(1b)-100-(2b)-30-LiPO$_2$F$_2$-0.5-FB-5-Dod-0.5-PS-0.2-LiBF$_4$-0.3 | (1b) | 100 | (2b) | 30 | LiPO$_2$F$_2$<br>FB<br>Dod<br>PS<br>LiBF$_4$ | 0.5<br>5.0<br>0.5<br>0.2<br>0.3 |
| 1-(1b)-100-(2b)-30-LiPO$_2$F$_2$-0.5-FB-5-pDod-0.5-PS-0.2-LiFSI-0.3 | (1b) | 100 | (2b) | 30 | LiPO$_2$F$_2$<br>FB<br>Dod<br>PS<br>LiFSI | 0.5<br>5.0<br>0.5<br>0.2<br>0.3 |

TABLE 70-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1b)-100-(2b)-30-LiPO$_2$F$_2$-0.5-FB-5-Dad-0.5-PS-0.2-LiTFSI-0.3 | (1b) | 100 | (2b) | 30 | LiPO$_2$F$_2$<br>FB<br>Dad<br>PS<br>LiTFSI | 0.5<br>5.0<br>0.5<br>0.2<br>0.3 |

TABLE 71

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1f)-100-(2f)-30-LiPO$_2$F$_2$-0.5-FB-5-Dod-0.5-PS-0.2-LiFSI-0.3 | (1f) | 100 | (2f) | 30 | LiPO$_2$F$_2$<br>FB<br>Dod<br>PS<br>LiFSI | 0.5<br>5.0<br>0.5<br>0.2<br>0.3 |
| 1-(1f)-100-(2f)-30-LiPO$_2$F$_2$-0.5-FB-5-Dod-0.5-PS-0.2-LiTFSI-0.3 | (1f) | 100 | (2f) | 30 | LiPO$_2$F$_2$<br>FB<br>Dod<br>PS<br>LiTFSI | 0.5<br>5.0<br>0.5<br>0.2<br>0.3 |
| 1-(1f)-100-(2f)-30-LiPO$_2$F$_2$-0.5-FB-5-Dod-0.5-PS-0.2-LiBETI-0.3 | (1f) | 100 | (2f) | 30 | LiPO$_2$F$_2$<br>FB<br>Dod<br>PS<br>LiBETI | 0.5<br>5.0<br>0.5<br>0.2<br>0.3 |
| 1-(1f)-100-(2f)-30-LiPO$_2$F$_2$-0.5-FB-5-Dod-0.5-PS-0.2-LiSO$_3$F-0.3 | (1f) | 100 | (2f) | 30 | LiPO$_2$F$_2$<br>FB<br>Dod<br>PS<br>LiSO$_3$F | 0.5<br>5.0<br>0.5<br>0.2<br>0.3 |
| 1-(1f)-100-(2f)-30-LiPO$_2$F$_2$-0.5-F8-5-Dod-0.5-PS-0.2-LiBF$_4$-0.3 | (1f) | 100 | (2f) | 30 | LiPO$_2$F$_2$<br>FB<br>Dod<br>PS<br>LiBF$_4$ | 0.5<br>5.0<br>0.5<br>0.2<br>0.3 |
| 1-(1f)-100-(2f)-30-LiPO$_2$F$_2$-0.5-FB-5-pDod-0.5-PS-0.2-LiFSI-0.3 | (1f) | 100 | (2f) | 30 | LiPO$_2$F$_2$<br>FB<br>pDod<br>PS<br>LiFSI | 0.5<br>5.0<br>0.5<br>0.2<br>0.3 |
| 1-(1f)-100-(2f)-30-LiPO$_2$F$_2$-0.5-FB-5-Dad-0.5-PS-0.2-LiTFSI-0.3 | (1f) | 100 | (2f) | 30 | LiPO$_2$F$_2$<br>FB<br>Dad<br>PS<br>LiTFSI | 0.5<br>5.0<br>0.5<br>0.2<br>0.3 |

TABLE 72

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1h)-100-(2h)-30-LiPO$_2$F$_2$-0.5-FB-5-Dod-0.5-PS-0.2-LiFSI-0.3 | (1h) | 100 | (2h) | 30 | LiPO$_2$F$_2$<br>FB<br>Dod<br>PS<br>LiFSI | 0.5<br>5.0<br>0.5<br>0.2<br>0.3 |
| 1-(1h)-100-(2h)-30-LiPO$_2$F$_2$-0.5-FB-5-Dod-0.5-PS-0.2-LiTFSI-0.3 | (1h) | 100 | (2h) | 30 | LiPO$_2$F$_2$<br>FB<br>Dod<br>PS<br>LiTFSI | 0.5<br>5.0<br>0.5<br>0.2<br>0.3 |
| 1-(1h)-100-(2h)-30-LiPO$_2$F$_2$-0.5-FB-5-Dod-0.5-PS-0.2-LiBETI-0.3 | (1h) | 100 | (2h) | 30 | LiPO$_2$F$_2$<br>FB<br>Dod<br>PS<br>LiBETI | 0.5<br>5.0<br>0.5<br>0.2<br>0.3 |
| 1-(1h)-100-(2h)-30-LiPO$_2$F$_2$-0.5-FB-5-Dod-0.5-PS-0.2-LiSO$_3$F-0.3 | (1h) | 100 | (2h) | 30 | LiPO$_2$F$_2$<br>FB<br>Dod<br>PS<br>LiSO$_3$F | 0.5<br>5.0<br>0.5<br>0.2<br>0.3 |
| 1-(1h)-100-(2h)-30-LiPO$_2$F$_2$-0.5-FB-5-Dod-0.5-PS-0.2-LiBF$_4$-0.3 | (1h) | 100 | (2h) | 30 | LiPO$_2$F$_2$<br>FB<br>Dod<br>PS<br>LiBF$_4$ | 0.5<br>5.0<br>0.5<br>0.2<br>0.3 |
| 1-(1h)-100-(2h)-30-LiPO$_2$F$_2$-0.5-FB-5-pDod-0.5-PS-0.2-LiFSI-0.3 | (1h) | 100 | (2h) | 30 | LiPO$_2$F$_2$<br>FB<br>pDod<br>PS<br>LiFSI | 0.5<br>5.0<br>0.5<br>0.2<br>0.3 |
| 1-(1h)-100-(2h)-30-LiPO$_2$F$_2$-0.5-FB-5-Dad-0.5-PS-0.2-LiTFSI-0.3 | (1h) | 100 | (2h) | 30 | LiPO$_2$F$_2$<br>FB<br>Dad<br>PS<br>LiTFSI | 0.5<br>5.0<br>0.5<br>0.2<br>0.3 |

TABLE 73

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1j)-100-(2j)-30-LiPO$_2$F$_2$-0.5-FB-5-Docf-0.5-PS-0.2-LiFSI-0.3 | (1j) | 100 | (2j) | 30 | LiPO$_2$F$_2$<br>FB<br>Dod<br>PS<br>LiFSI | 0.5<br>5.0<br>0.5<br>0.2<br>0.3 |
| 1-(1j)-100-(2j)-30-LiPO$_2$F$_2$-0.5-FB-5-Dod-0.5-PS-0.2-LiTFSI-0.3 | (1j) | 100 | (2j) | 30 | LiPO$_2$F$_2$<br>FB<br>Dod<br>PS<br>LiTFSI | 0.5<br>5.0<br>0.5<br>0.2<br>0.3 |
| 1-(1j)-100-(2j)-30-LiPO$_2$F$_2$-0.5-FB-5-Dod-0.5-PS-0.2-LiBETI-0.3 | (1j) | 100 | (2j) | 30 | LiPO$_2$F$_2$<br>FB<br>Dad<br>PS<br>LiBETI | 0.5<br>5.0<br>0.5<br>0.2<br>0.3 |
| 1-(1j)-100-(2j)-30-LiPO$_2$F$_2$-0.5-FB-5-Dod-0.5-PS-0.2-LiSO$_3$F-0.3 | (1j) | 100 | (2j) | 30 | LiPO$_2$F$_2$<br>FB<br>Dad<br>PS<br>LiSO$_3$F | 0.5<br>5.0<br>0.5<br>0.2<br>0.3 |

TABLE 73-continued

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1j)-100-(2j)-30-LiPO$_2$F$_2$-0.5-FB-5-Dod-0.5-PS-0.2-LiBF$_4$-0.3 | (1j) | 100 | (2j) | 30 | LiPO$_2$F$_2$<br>FB<br>Dod<br>PS<br>LiBF$_4$ | 0.5<br>5.0<br>0.5<br>0.2<br>0.3 |
| 1-(1j)-100-(2j)-30-LiPO$_2$F$_2$-0.5-FB-5-pDod-0.5-PS-0.2-LiFSI-0.3 | (1j) | 100 | (2j) | 30 | LiPO$_2$F$_2$<br>FB<br>Dod<br>PS<br>LiFSI | 0.5<br>5.0<br>0.5<br>0.2<br>0.3 |
| 1-(1j)-100-(2j)-30-LiPO$_2$F$_2$-0.5-FB-5-Dad-0.5-PS-02-LiTFSI-0.3 | (1j) | 100 | (2j) | 30 | LiPO$_2$F$_2$<br>FB<br>Dad<br>PS<br>LiTFSI | 0.5<br>5.0<br>0.5<br>0.2<br>0.3 |

TABLE 74

| Nonaqueous Electrolyte Solution No. | Combination of Silicon Compounds (1) and (2) | | | | Other Solute or Additive Component | Concentration (mass %) in Electrolyte Solution |
|---|---|---|---|---|---|---|
| | Silicon Compound (1) | | Silicon Compound (2) | | | |
| | No. | mass ratio | No. | mass ratio | Kind | |
| 1-(1b)-100-(2b)-30-LiPO$_2$F$_2$-0.5-FB-5-pDod-0.3-PS-0.2-LiBF$_4$-0.3-LiSO$_3$F-0.2 | (1b) | 100 | (2b) | 30 | LiPO$_2$F$_2$<br>FB<br>pDod<br>PS<br>LiBF$_4$<br>LiSO$_3$F | 0.5<br>5.0<br>0.3<br>0.2<br>0.3<br>0.2 |
| 1-(1b)-100-(2b)-30-LiPO$_2$F$_2$-0.5-FB-5-Dad-0.3-PS-0.2-LiBF$_4$-0.3-LiSO$_3$F-0.2 | (1b) | 100 | (2b) | 30 | LiPO$_2$F$_2$<br>FB<br>Dad<br>PS<br>LiBF$_4$<br>LiSO$_3$F | 0.5<br>5.0<br>0.3<br>0.2<br>0.3<br>0.2 |
| 1-(1b)-100-(2b)-30-LiPO$_2$F$_2$-0.5-FB-5-Dod-0.3-PS-0.2-LIBF$_4$-0.3-LiSO$_3$F-0.2 | (1b) | 100 | (2b) | 30 | LiPO$_2$F$_2$<br>FB<br>Dod<br>PS<br>LiBF$_4$<br>LiSO$_3$F | 0.5<br>5.0<br>0.3<br>0.2<br>0.3<br>0.2 |
| 1-(1b)-100-(2b)-30-LiPO$_2$F$_2$-0.5-FB-5-Dod-0.3-PS-0.2-LiBF$_4$-0.3-LiFSI-0.2 | (1b) | 100 | (2b) | 30 | LiPO$_2$F$_2$<br>FB<br>Dod<br>PS<br>LiBF$_4$<br>LiFSI | 0.5<br>5.0<br>0.3<br>0.2<br>0.3<br>0.2 |
| 1-(1b)-100-(2b)-30-LiPO$_2$F$_2$-0.5-FB-5-Dod-0.3-PS-0.2-LiBF$_4$-0.3-LiTFSI-0.2 | (1b) | 100 | (2b) | 30 | LiPO$_2$F$_2$<br>FB<br>Dod<br>PS<br>LiBF$_4$<br>LiTFSI | 0.5<br>5.0<br>0.3<br>0.2<br>0.3<br>0.2 |
| 1-(1b)-100-(2b)-30-LiPO$_2$F$_2$-0.5-FB-5-Dod-0.3-PS-0.2-LiBF$_4$-0.3-LiBETI-0.2 | (1b) | 100 | (2b) | 30 | LiPO$_2$F$_2$<br>FB<br>Dad<br>PS<br>LiBF$_4$<br>LiBETI | 0.5<br>5.0<br>0.3<br>0.2<br>0.3<br>0.2 |

TABLE 75

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | Concentration (mass %) in Electrolyte | |
| | No. | mass ratio | No. | mass ratio | Kind | Solution |
| 1-(1f)-100-(2f)-30-LiPO$_2$F$_2$-0.5-FB-5-pDod-0.3-PS-0.2-LiBF$_4$-0.3-LiSO$_3$F-0.2 | (1f) | 100 | (2f) | 30 | LiPO$_2$F$_2$ | 0.5 |
| | | | | | FB | 5.0 |
| | | | | | pDod | 0.3 |
| | | | | | PS | 0.2 |
| | | | | | LiBF$_4$ | 0.3 |
| | | | | | LiSO$_3$F | 0.2 |
| 1-(1f)-100-(2f)-30-LiPO$_2$F$_2$-0.5-FB-5-Dad-0.3-PS-0.2-LiBF$_4$-0.3-LiSO$_3$F-0.2 | (1f) | 100 | (2f) | 30 | LiPO$_2$F$_2$ | 0.5 |
| | | | | | FB | 5.0 |
| | | | | | Dad | 0.3 |
| | | | | | PS | 0.2 |
| | | | | | LiBF$_4$ | 0.3 |
| | | | | | LiSO$_3$F | 0.2 |
| 1-(1f)-100-(2f)-30-LiPO$_2$F$_2$-0.5-FB-5-Dod-0.3-PS-0.9-LiBF$_4$-0.3-LiSO$_3$F-0.9 | (1f) | 100 | (2f) | 30 | LiPO$_2$F$_2$ | 0.5 |
| | | | | | FB | 5.0 |
| | | | | | Dod | 0.3 |
| | | | | | PS | 0.9 |
| | | | | | LiBF$_4$ | 0.3 |
| | | | | | LiSO$_3$F | 0.2 |
| 1-(1f)-100-(2f)-30-LiPO$_2$F$_2$-0.5-FB-5-Dod-0.3-PS-0.2-LiBF$_4$-0.3-LiFSI-0.2 | (1f) | 100 | (2f) | 30 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiFSI | 0.2 |
| 1-(1f)-100-(2f)-30-LiPO$_2$F$_2$-0.5-FB-5-Dod-0.3-PS-0.2-LiBF$_4$-0.3-LiTFSI-0.2 | (1f) | 100 | (2f) | 30 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiTFSI | 0.2 |
| 1-(1f)-100-(2f)-30-LiPO$_2$F$_2$-0.5-FB-5-Dod-0.3-PS-0.2-LiBF$_4$-0.3-LiBETI-0.2 | (1f) | 100 | (2f) | 30 | LiPO$_2$F$_2$ | 0.5 |
| | | | | | FB | 5.0 |
| | | | | | Dod | 0.3 |
| | | | | | PS | 0.2 |
| | | | | | LiBF$_4$ | 0.3 |
| | | | | | LiBETI | 0.2 |

TABLE 76

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | Concentration (mass %) in Electrolyte | |
| | No. | mass ratio | No. | mass ratio | Kind | Solution |
| 1-(1h)-100-(2h)-30-LiPO$_2$F$_2$-0.5-FB-5-pDod-0.3-PS-0.2-LiBF$_4$-0.3-LiSO$_3$F-0.2 | (1h) | 100 | (2h) | 30 | LiPO$_2$F$_2$ | 0.5 |
| | | | | | FB | 5.0 |
| | | | | | pDod | 0.3 |
| | | | | | PS | 0.2 |
| | | | | | LiBF$_4$ | 0.3 |
| | | | | | LiSO$_3$F | 0.2 |
| 1-(1h)-100-(2h)-30-LiPO$_2$F$_2$-0.5-FB-5-Dad-0.3-PS-0.2-LiBF$_4$-0.3-LiSO$_3$F-0.2 | (1h) | 100 | (2h) | 30 | LiPO$_2$F$_2$ | 0.5 |
| | | | | | FB | 5.0 |
| | | | | | Dad | 0.3 |
| | | | | | PS | 6.2 |
| | | | | | LiBF$_4$ | 0.3 |
| | | | | | LiSO$_3$F | 0.2 |
| 1-(1h)-100-(2h)-30-LiPO$_2$F$_2$-0.5-FB-5-Dod-0.3-PS-0.2-LiBF$_4$-0.3-LiSO$_3$F-0.2 | (1h) | 100 | (2h) | 30 | LiPO$_2$F$_2$ | 0.5 |
| | | | | | FB | 5.0 |
| | | | | | Dad | 0.3 |
| | | | | | PS | 0.2 |
| | | | | | LiBF$_4$ | 0.3 |
| | | | | | LiSO$_3$F | 0.2 |

TABLE 76-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1h)-100-(2h)-30-LiPO₂F₂-0.5-FB-5-Dod-0.3-PS-0.2-LiBF₄-0.3-LiFSI-0.2 | (1h) | 100 | (2h) | 30 | $LiPO_2F_2$ | 0.5 |
| | | | | | FB | 5.0 |
| | | | | | Dod | 0.3 |
| | | | | | PS | 0.2 |
| | | | | | $LiBF_4$ | 0.3 |
| | | | | | LiFSI | 0.2 |
| 1-(1h)-100-(2h)-30-LiPO₂F₂-0.5-FB-5-Dod-0.3-PS-0.2-LiBF₄-0.3-LiTFSI-0.2 | (1h) | 100 | (2h) | 30 | $LiPO_2F_2$ | 0.5 |
| | | | | | FB | 5.0 |
| | | | | | Dod | 0.3 |
| | | | | | PS | 0.2 |
| | | | | | $LiBF_4$ | 0.3 |
| | | | | | LiTFSI | 0.2 |
| 1-(1h)-100-(2h)-30-LiPO₂F₂-0.5-FB-5-Dod-0.3-PS-0.2-LiBF₄-03-LiBETI-0.2 | (1h) | 100 | (2h) | 30 | $LiPO_2F_2$ | 0.5 |
| | | | | | FB | 5.0 |
| | | | | | Dod | 0.3 |
| | | | | | PS | 0.2 |
| | | | | | $LiBF_4$ | 0.3 |
| | | | | | LiBETI | 0.2 |

TABLE 77

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte |
| | No. | mass ratio | No. | mass ratio | Kind | Solution |
| 1-(1j)-100-(2j)-30-LiPO₂F₂-0.5-FB-5-pDod-0.3-PS-0.2-LiBF₄-0.3-LiSO₃F-0.2 | (1j) | 100 | (2j) | 30 | $LiPO_2F_2$ | 0.5 |
| | | | | | FB | 5.0 |
| | | | | | pDod | 0.3 |
| | | | | | PS | 0.2 |
| | | | | | $LiBF_4$ | 0.3 |
| | | | | | $LiSO_3F$ | 0.2 |
| 1-(1j)-100-(2j)-30-LiPO₂F₂-0.5-FB-5-Dad-0.3-PS-0.2-LiBF₄-0.3-LiSO₃F-0.2 | (1j) | 100 | (2j) | 30 | $LiPO_2F_2$ | 0.5 |
| | | | | | FB | 5.0 |
| | | | | | Dad | 0.3 |
| | | | | | PS | 0.2 |
| | | | | | $LiBF_4$ | 0.3 |
| | | | | | $LiSO_3F$ | 0.2 |
| 1-(1j)-100-(2j)-30-LiPO₂F₂-0.5-FB-5-Dod-0.3-PS-0.2-LiBF₄-0.3-LiSO₃F-0.2 | (1j) | 100 | (2j) | 30 | $LiPO_2F_2$ | 0.5 |
| | | | | | FB | 5.0 |
| | | | | | Dod | 0.3 |
| | | | | | PS | 0.2 |
| | | | | | $LiBF_4$ | 0.3 |
| | | | | | $LiSO_3F$ | 0.2 |
| 1-(1j)-100-(2j)-30-LiPO₂F₂-0.5-FB-5-Dod-0.3-PS-0.2-LiBF₄-0.3-LiFSI-0.2 | (1j) | 100 | (2j) | 30 | $LiPO_2F_2$ | 0.5 |
| | | | | | FB | 5.0 |
| | | | | | Dod | 0.3 |
| | | | | | PS | 0.2 |
| | | | | | $LiBF_4$ | 0.3 |
| | | | | | LiFSI | 0.2 |
| 1-(1j)-100-(2j)-30-LiPO₂F₂-0.5-FB-5-Dod-0.3-PS-0.2-LiBF₄-0.3-LiTFSI-0.2 | (1j) | 100 | (2j) | 30 | $LiPO_2F_2$ | 0.5 |
| | | | | | FB | 5.0 |
| | | | | | Dod | 0.3 |
| | | | | | PS | 0.2 |
| | | | | | $LiBF_4$ | 0.3 |
| | | | | | LiTFSI | 0.2 |
| 1-(1j)-100-(2j)-30-LiPO₂F₂-0.5-FB-5-Dod-0.3-PS-0.2-LiBF₄-0.3-LiBETI-0.2 | (1j) | 100 | (2j) | 30 | $LiPO_2F_2$ | 0.5 |
| | | | | | FB | 5.0 |
| | | | | | Dod | 0.3 |
| | | | | | PS | 0.2 |
| | | | | | $LiBF_4$ | 0.3 |
| | | | | | LiBETI | 0.2 |

[Production of Nonaqueous Electrolyte Batteries] NCM622/Graphite

In an argon atmosphere of dew point −50° C. or lower, the above-formed NCM622 positive electrode to which terminals had been welded was stacked between two sheets of polyethylene separator film (5×6 cm), followed by stacking two of the above-formed graphite negative electrodes to which terminals had been welded on outer sides of the positive electrode-separator stack such that the negative electrode active material layers were respectively opposed to the positive electrode active material layers. Into an aluminum laminate with one side open, the thus-obtained electrode assembly was placed. The nonaqueous electrolyte solution was then charged, under vacuum, into the aluminum laminate bag. After that, the open side of the aluminum laminate bag was sealed by heat.

By the above-mentioned procedure, aluminum laminate type batteries according to Examples and Comparative Examples shown in TABLES 78 to 103 were produced. The nonaqueous electrolyte solutions used in the respective batteries were those shown in TABLES 78 to 103.

[Initial Charging and Discharging]

The capacity of each of the produced batteries as normalized by the weight of the positive electrode active material was 65 mAh.

Each of the batteries was placed in a thermostat of 25° C. and, in this state, was connected to a charging/discharging device. Then, the battery was charged to 4.3 V at a charging rate of 0.2 C (i.e. a current value with which the battery with a capacity of 65 mAh was fully charged for 5 hours). After the voltage of the battery was maintained at 4.3 V for 1 hour, the battery was discharged to 3.0 V at a discharging rate of 0.2 C. Assuming this charging and discharging operation as one cycle of charging and discharging, the batteries was stabilized by performing total three cycles of charging and discharging.

[Direct Current Resistance Measurement Test After Initial Charging and Discharging (Low-Temperature Resistance Evaluation)]

After the completion of the initial charging and discharging, the battery was disconnected from the charging/discharging device and taken out of the thermostat. Then, the battery was connected to an electrochemical measurement device and placed in a thermostat of −20° C. In this state, the battery was left still for 1 hour. After that, IV measurement was performed on the battery, thereby determining the absolute value of the direct current resistance of the battery.

Assuming the electrolyte solution compositions in which the silicon compound (2) was not contained as Comparative Examples, the absolute value of the direct current resistance in each Example is expressed as a relative value in TABLES 78 to 103, with the absolute value of the direct current resistance in the corresponding Comparative Example being defined as 100.

[Capacity Measurement Test After 400 Cycles (Cycle Characteristic Evaluation)]

The battery, after the completion of the above direct current resistance measurement test at −20° C., was disconnected from the electrochemical measurement device and taken out of the thermostat of −20° C. The battery was connected to a charging/discharging device and placed in a thermostat of 50° C. In this state, the battery was left still for 2 hours. After the battery was charged to 4.3 V at a charging rate of 2 C, the voltage of the battery was maintained 4.3 V for 1 hour. Then, the battery was discharged to 3.0 V at a discharging rate of 2 C. In this manner, the battery was repeatedly subjected to 400 cycles of charging and discharging under the environment of 50° C. The degree of deterioration of the battery was evaluated based on the discharge capacity of the battery after 400 cycles of charging and discharging.

Assuming the electrolyte solution compositions in which the silicon compound (2) was not contained as Comparative Examples, the capacity after 400 cycles in each Example is expressed as a relative value in TABLES 78 to 103, with the capacity after 400 cycles in the corresponding Comparative Example being defined as 100.

TABLE 78

|  | Nonaqueous Electrolyte Solution No. | DC Resistance (Relative Value) After Initial Charging and Discharging at −20° C. | Capacity (Relative Value) After 400 Cycles at 50° C. |
| --- | --- | --- | --- |
| Comp. Ex. 1-0-1 | 1-(1a)-100-(0) | 100 | 100 |
| Ex. 1-0-1 | 1-(1a)-100-(2b)-0.07 | 98 | 100 |
| Ex. 1-0-2 | 1-(1a)-100-(2b)-0.12 | 93 | 99 |
| Ex. 1-0-3 | 1-(1a)-100-(2f)-0.12 | 95 | 100 |
| Comp. Ex. 1-0-2 | 1-(1b)-100-(0) | 100 | 100 |
| Ex. 1-0-4 | 1-(1b)-100-(2b)-0.07 | 99 | 100 |
| Ex. 1-0-5 | 1-(1b)-100-(2b)-0.12 | 97 | 99 |
| Ex. 1-0-6 | 1-(1b)-100-(2b)-20 | 83 | 88 |
| Comp. Ex. 1-0-3 | 1-(1b)-100-(2b)-30 | 79 | 72 |
| Comp. Ex. 1-0-4 | 1-(1c)-100-(0) | 100 | 100 |
| Ex. 1-0-7 | 1-(1c)-100-(2b)-0.07 | 98 | 100 |
| Ex. 1-0-8 | 1-(1c)-100-(2b)-0.12 | 92 | 99 |
| Comp. Ex. 1-0-5 | 1-(1e)-100-(0) | 100 | 100 |
| Ex. 1-0-9 | 1-(1e)-100-(2f)-0.07 | 99 | 100 |
| Ex. 1-0-10 | 1-(1e)-100-(2f)-0.12 | 94 | 100 |
| Ex. 1-0-11 | 1-(1e)-100-(2b)-0.12 | 93 | 99 |
| Comp. Ex. 1-0-6 | 1-(1f)-100-(0) | 100 | 100 |
| Ex. 1-0-12 | 1-(1f)-100-(2f)-0.07 | 95 | 100 |
| Ex. 1-0-13 | 1-(1f)-100-(2f)-0.12 | 91 | 100 |
| Ex. 1-0-14 | 1-(1f)-100-(2f)-20 | 71 | 91 |
| Comp. Ex. 1-0-7 | 1-(1f)-100-(2f)-30 | 69 | 80 |
| Comp. Ex. 1-0-8 | 1-(1p)-100-(0) | 100 | 100 |
| Ex. 1-0-15 | 1-(1p)-100-(2f)-0.07 | 95 | 100 |
| Ex. 1-0-16 | 1-(1p)-100-(2f)-0.12 | 88 | 100 |
| Ex. 1-0-17 | 1-(1p)-100-(2h)-0.12 | 86 | 99 |

TABLE 78-continued

| Solution No. | Nonaqueous Electrolyte | DC Resistance (Relative Value) After Initial Charging and Discharging at −20° C. | Capacity (Relative Value) After 400 Cycles at 50° C. |
|---|---|---|---|
| Comp. Ex. 1-0-9 | 1-(1g)-100-(0) | 100 | 100 |
| Ex. 1-0-18 | 1-(1g)-100-(2h)-0.07 | 94 | 100 |
| Ex. 1-0-19 | 1-(1g)-100-(2h)-0.12 | 80 | 99 |
| Comp. Ex. 1-0-10 | 1-(1h)-100-(0) | 100 | 100 |
| Ex. 1-0-20 | 1-(1h)-100-(2h)-0.07 | 96 | 100 |
| Ex. 1-0-21 | 1-(1h)-100-(2h)-0.12 | 82 | 99 |
| Ex. 1-0-22 | 1-(1h)-100-(2h)-20 | 73 | 86 |
| Comp. Ex. 1-0-11 | 1-(1h)-100-(2h)-30 | 68 | 71 |
| Comp. Ex. 1-0-12 | 1-(1i)-100-(0) | 100 | 100 |
| Ex. 1-0-23 | 1-(1i)-100-(2h)-0.07 | 93 | 100 |
| Ex. 1-0-24 | 1-(1i)-100-(2h)-0.12 | 84 | 99 |
| Ex. 1-0-25 | 1-(1i)-100-(2j)-0.12 | 82 | 98 |
| Comp. Ex. 1-0-13 | 1-(1j)-100-(0) | 100 | 100 |
| Ex. 1-0-26 | 1-(1j)-100-(2j)-0.07 | 96 | 100 |
| Ex. 1-0-27 | 1-(1j)-100-(2j)-0.12 | 86 | 100 |
| Comp. Ex. 1-0-14 | 1-(1k)-100-(0) | 100 | 100 |
| Ex. 1-0-28 | 1-(1k)-100-(2j)-0.07 | 95 | 100 |
| Ex. 1-0-29 | 1-(1k)-100-(2j)-0.12 | 90 | 100 |
| Ex. 1-0-30 | 1-(1k)-100-(2b)-0.12 | 92 | 100 |
| Comp. Ex. 1-0-15 | 1-(1q)-100-(0) | 100 | 100 |
| Ex. 1-0-31 | 1-(1q)-100-(2j)-0.07 | 97 | 100 |
| Ex. 1-0-32 | 1-(1q)-100-(2j)-0.12 | 91 | 100 |
| Ex. 1-0-33 | 1-(1q)-100-(2j)-20 | 79 | 94 |
| Comp. Ex. 1-0-16 | 1-(1q)-100-(2j)-30 | 77 | 82 |
| Ex. 1-0-34 | 1-(1q)-100-(2h)-0.12 | 76 | 99 |

A lower value of DC resistance means better performance.
A higher value of capacity means better performance.

TABLE 79

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-1-1 | 1-(1b)-100-(0)-LiFSI-2 | 100 | 100 |
| Ex. 1-1-1 | 1-(1b)-100-(2b)-0.12-LiFSI-2 | 96 | 100 |
| Comp. Ex. 1-1-2 | 1-(1b)-100-(2b)-30-LiFSI-2 | 84 | 93 |
| Comp. Ex. 1-1-3 | 1-(1b)-100-(0)-LiSO₃F-1 | 100 | 100 |
| Ex. 1-1-2 | 1-(1b)-100-(2b)-0.12-LiSO₃F-1 | 97 | 100 |
| Comp. Ex. 1-1-4 | 1-(1b)-100-(2b)-30-LiSO₃F-1 | 85 | 98 |
| Comp. Ex. 1-1-5 | 1-(1b)-100-(0)-LDFBOP-1 | 100 | 100 |
| Ex. 1-1-3 | 1-(1b)-100-(2b)-0.12-LDFBOP-1 | 97 | 100 |
| Comp. Ex. 1-1-6 | 1-(1b)-100-(2b)-30-LDFBOP-1 | 86 | 97 |
| Comp. Ex. 1-1-7 | 1-(1b)-100-(0)-ESF-0.5 | 100 | 100 |
| Ex. 1-1-4 | 1-(1b)-100-(2b)-0.12-ESF-0.5 | 97 | 100 |
| Comp. Ex. 1-1-8 | 1-(1b)-100-(2b)-30-ESF-0.5 | 91 | 96 |
| Comp. Ex. 1-1-9 | 1-(1b)-100-(0)-LiPO₂F₂-1 | 100 | 100 |
| Ex. 1-1-5 | 1-(1b)-100-(2b)-0.12-LiPO₂F₂-1 | 97 | 100 |
| Comp. Ex. 1-1-10 | 1-(1b)-100-(2b)-30-LiPO₂F₂-1 | 95 | 95 |
| Comp. Ex. 1-1-11 | 1-(1b)-100-(0)-FB-5 | 100 | 100 |
| Ex. 1-1-6 | 1-(1b)-100-(2b)-0.12-FB-5 | 98 | 99 |
| Comp. Ex. 1-1-12 | 1-(1b)-100-(2b)-30-FB-5 | 90 | 90 |
| Comp. Ex. 1-1-13 | 1-(1b)-100-(0)-Dod-0.5 | 100 | 100 |
| Ex. 1-1-7 | 1-(1b)-100-(2b)-0.12-Dod-0.5 | 99 | 100 |
| Comp. Ex. 1-1-14 | 1-(1b)-100-(2b)-30-Dod-0.5 | 96 | 96 |
| Comp. Ex. 1-1-15 | 1-(1b)-100-(0)-pDod-0.5 | 100 | 100 |
| Ex. 1-1-8 | 1-(1b)-100-(2b)-0.12-pDod-0.5 | 98 | 100 |
| Comp. Ex. 1-1-16 | 1-(1b)-100-(2b)-30-pDod-0.5 | 92 | 97 |
| Comp. Ex. 1-1-17 | 1-(1b)-100-(0)-Dad-0.5 | 100 | 100 |
| Ex. 1-1-9 | 1-(1b)-100-(2b)-0.12-Dad-0.5 | 97 | 100 |
| Comp. Ex. 1-1-18 | 1-(1b)-100-(2b)-30-Dad-0.5 | 93 | 96 |
| Comp. Ex. 1-1-19 | 1-(1b)-100-(0)-PS-1 | 100 | 100 |
| Ex. 1-1-10 | 1-(1b)-100-(2b)-0.12-PS-1 | 99 | 100 |
| Comp. Ex. 1-1-20 | 1-(1b)-100-(2b)-30-PS-1 | 98 | 98 |
| Comp. Ex. 1-1-21 | 1-(1b)-100-(0)-LiTFSI-1 | 100 | 100 |
| Ex. 1-1-11 | 1-(1b)-100-(2b)-0.12-LiTFSI-1 | 95 | 100 |
| Comp. Ex. 1-1-22 | 1-(1b)-100-(2b)-30-LiTFSI-1 | 83 | 92 |
| Comp. Ex. 1-1-23 | 1-(1b)-100-(0)-LiBETI-1 | 100 | 100 |
| Ex. 1-1-12 | 1-(1b)-100-(2b)-0.12-LiBETI-1 | 97 | 100 |

TABLE 79-continued

| Nonaqueous Electrolyte Solution No. | DC Resistance (Relative Value) After Initial Charging and Discharging at −20° C. | Capacity (Relative Value) After 400 Cycles at 50° C. |
|---|---|---|
| Comp. Ex. 1-1-24 | 1-(1b)-100-(2b)-30-LiBETI-1 | 91 | 90 |
| Comp. Ex. 1-1-25 | 1-(1b)-100-(0)-LiBF$_4$-1 | 100 | 100 |
| Ex. 1-1-13 | 1-(1b)-100-(2b)-0.12-LiBF$_4$-1 | 97 | 100 |
| Comp. Ex. 1-1-26 | 1-(1b)-100-(2b)-30-LiBF$_4$-1 | 88 | 90 |

A lower value of DC resistance means better performance.
A higher value of capacity means better performance.

TABLE 80

| Nonaqueous Electrolyte Solution No. | DC Resistance (Relative Value) After Initial Charging and Discharging at −20° C. | Capacity (Relative Value) After 400 Cycles at 50° C. |
|---|---|---|
| Comp. Ex. 1-1-27 | 1-(1f)-100-(0)-LiPO$_2$F$_2$-1 | 100 | 100 |
| Ex. 1-1-14 | 1-(1f)-100-(2f)-0.12-LiPO$_2$F$_2$-1 | 95 | 100 |
| Comp. Ex. 1-1-28 | 1-(1f)-100-(2f)-30-LiPO$_2$F$_2$-1 | 76 | 94 |
| Comp. Ex. 1-1-29 | 1-(1f)-100-(0)-LTFOP-1 | 100 | 100 |
| Ex. 1-1-15 | 1-(1f)-100-(2f)-0.12-LTFOP-1 | 94 | 100 |
| Comp. Ex. 1-1-30 | 1-(1f)-100-(2f)-30-LTFOP-1 | 72 | 98 |
| Comp. Ex. 1-1-31 | 1-(1f)-100-(0)-LDFOB-1 | 100 | 100 |
| Ex. 1-1-16 | 1-(1f)-100-(2f)-0.12-LDFOB-1 | 93 | 100 |
| Comp. Ex. 1-1-32 | 1-(1f)-100-(2f)-30-LDFOB-1 | 71 | 95 |
| Comp. Ex. 1-1-33 | 1-(1f)-100-(0)-TSF-0.5 | 100 | 100 |
| Ex. 1-1-17 | 1-(1f)-100-(2f)-0.12-TSF-0.5 | 95 | 100 |
| Comp. Ex. 1-1-34 | 1-(1f)-100-(2f)-30-TSF-0.5 | 76 | 95 |
| Comp. Ex. 1-1-35 | 1-(1f)-100-(0)-LiSO$_3$F-1 | 100 | 100 |
| Ex. 1-1-18 | 1-(1f)-100-(2f)-0.12-LiSO$_3$F-1 | 96 | 100 |
| Comp. Ex. 1-1-36 | 1-(1f)-100-(2f)-30-LiSO$_3$F-1 | 86 | 98 |
| Comp. Ex. 1-1-37 | 1-(1f)-100-(0)-FB-5 | 100 | 100 |
| Ex. 1-1-19 | 1-(1f)-100-(2f)-0.12-FB-5 | 97 | 100 |
| Comp. Ex. 1-1-38 | 1-(1f)-100-(2f)-30-FB-5 | 91 | 92 |
| Comp. Ex. 1-1-39 | 1-(1f)-100-(0)-Dod-0.5 | 100 | 100 |
| Ex. 1-1-20 | 1-(1f)-100-(2f)-0.12-Dod-0.5 | 99 | 100 |
| Comp. Ex. 1-1-40 | 1-(1f)-100-(2f)-30-Dod-0.5 | 95 | 97 |
| Comp. Ex. 1-1-41 | 1-(1f)-100-(0)-pDod-0.5 | 100 | 100 |
| Ex. 1-1-21 | 1-(1f)-100-(2f)-0.12-pDod-0.5 | 98 | 100 |
| Comp. Ex. 1-1-42 | 1-(1f)-100-(2f)-30-pDod-0.5 | 94 | 97 |
| Comp. Ex. 1-1-43 | 1-(1f)-100-(0)-Dad-0.5 | 100 | 100 |
| Ex. 1-1-22 | 1-(1f)-100-(2f)-0.12-Dad-0.5 | 98 | 100 |
| Comp. Ex. 1-1-44 | 1-(1f)-100-(2f)-30-Dad-0.5 | 96 | 96 |
| Comp. Ex. 1-1-45 | 1-(1f)-100-(0)-PS-1 | 100 | 100 |
| Ex. 1-1-23 | 1-(1f)-100-(2f)-0.12-PS-1 | 98 | 100 |
| Comp. Ex. 1-1-46 | 1-(1f)-100-(2f)-30-PS-1 | 97 | 98 |
| Comp. Ex. 1-1-47 | 1-(1f)-100-(0)-LiFSI-1 | 100 | 100 |
| Ex. 1-1-24 | 1-(1f)-100-(2f)-0.12-LiFSI-1 | 96 | 100 |
| Comp. Ex. 1-1-48 | 1-(1f)-100-(2f)-30-LiFSI-1 | 83 | 93 |
| Comp. Ex. 1-1-49 | 1-(1f)-100-(0)-LiTFSI-1 | 100 | 100 |
| Ex. 1-1-25 | 1-(1f)-100-(2f)-0.12-LiTFSI-1 | 94 | 100 |
| Comp. Ex. 1-1-50 | 1-(1f)-100-(2f)-30-LiTFSI-1 | 84 | 91 |
| Comp. Ex. 1-1-51 | 1-(1f)-100-(0)-LiBETI-1 | 100 | 100 |
| Ex. 1-1-26 | 1-(1f)-100-(2f)-0.12-LiBETI-1 | 97 | 100 |
| Comp. Ex. 1-1-52 | 1-(1f)-100-(2f)-30-LiBETI-1 | 90 | 90 |
| Comp. Ex. 1-1-53 | 1-(1f)-100-(0)-LiBF$_4$-1 | 100 | 100 |
| Ex. 1-1-27 | 1-(1f)-100-(2f)-0.12-LiBF$_4$-1 | 97 | 100 |
| Comp. Ex. 1-1-54 | 1-(1f)-100-(2f)-30-LiBF$_4$-1 | 88 | 89 |

A lower value of DC resistance means better performance.
A higher value of capacity means better performance.

TABLE 81

| Nonaqueous Electrolyte Solution No. | DC Resistance (Relative Value) After Initial Charging and Discharging at −20° C. | Capacity (Relative Value) After 400 Cycles at 50° C. |
|---|---|---|
| Comp. Ex. 1-1-55 | 1-(1h)-100-(0)-LiSO$_3$F-1 | 100 | 100 |
| Ex. 1-1-28 | 1-(1h)-100-(2h)-0.12-LiSO$_3$F-1 | 92 | 100 |

TABLE 81-continued

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-1-56 | 1-(1h)-100-(2h)-30-LiSO$_3$F-1 | 77 | 97 |
| Comp. Ex. 1-1-57 | 1-(1h)-100-(0)-LTFOP-1 | 100 | 100 |
| Ex. 1-1-29 | 1-(1h)-100-(2h)-0.12-LTFOP-1 | 93 | 100 |
| Comp. Ex. 1-1-58 | 1-(1h)-100-(2h)-30-LTFOP-1 | 82 | 96 |
| Comp. Ex. 1-1-59 | 1-(1h)-100-(0)-LDFBOP-1 | 100 | 100 |
| Ex. 1-1-30 | 1-(1h)-100-(2h)-0.12-LDFBOP-1 | 95 | 100 |
| Comp. Ex. 1-1-60 | 1-(1h)-100-(2h)-30-LDFBOP-1 | 86 | 97 |
| Comp. Ex. 1-1-61 | 1-(1h)-100-(0)-PDFP-1 | 100 | 100 |
| Ex. 1-1-31 | 1-(1h)-100-(2h)-0.12-PDFP-1 | 93 | 100 |
| Comp. Ex. 1-1-62 | 1-(1h)-100-(2h)-30-PDFP-1 | 77 | 93 |
| Comp. Ex. 1-1-63 | 1-(1h)-100-(0)-LiPO$_2$F$_2$-1 | 100 | 100 |
| Ex. 1-1-32 | 1-(1h)-100-(2h)-0.12-LiPO$_2$F$_2$-1 | 98 | 100 |
| Comp. Ex. 1-1-64 | 1-(1h)-100-(2h)-30-LiPO$_2$F$_2$-1 | 95 | 92 |
| Comp. Ex. 1-1-65 | 1-(1h)-100-(0)-MSF-0.5 | 100 | 100 |
| Ex. 1-1-33 | 1-(1h)-100-(2h)-0.12-MSF-0.5 | 98 | 100 |
| Comp. Ex. 1-1-66 | 1-(1h)-100-(2h)-30-MSF-0.5 | 91 | 93 |
| Comp. Ex. 1-1-67 | 1-(1h)-100-(0)-FB-5 | 100 | 100 |
| Ex. 1-1-34 | 1-(1h)-100-(2h)-0.12-FB-5 | 97 | 100 |
| Comp. Ex. 1-1-68 | 1-(1h)-100-(2h)-30-FB-5 | 90 | 91 |
| Comp. Ex. 1-1-69 | 1-(1h)-100-(0)-Dod-0.5 | 100 | 100 |
| Ex. 1-1-35 | 1-(1h)-100-(2h)-0.12-Dod-0.5 | 99 | 100 |
| Comp. Ex. 1-1-70 | 1-(1h)-100-(2h)-30-Dod-0.5 | 97 | 96 |
| Comp. Ex. 1-1-71 | 1-(1h)-100-(0)-pDod-0.5 | 100 | 100 |
| Ex. 1-1-36 | 1-(1h)-100-(2h)-0.12-pDod-0.5 | 98 | 100 |
| Comp. Ex. 1-1-72 | 1-(1h)-100-(2h)-30-pDod-0.5 | 95 | 97 |
| Comp. Ex. 1-1-73 | 1-(1h)-100-(0)-Dad-0.5 | 100 | 100 |
| Ex. 1-1-37 | 1-(1h)-100-(2h)-0.12-Dad-0.5 | 97 | 100 |
| Comp. Ex. 1-1-74 | 1-(1h)-100-(2h)-30-Dad-0.5 | 95 | 97 |
| Comp. Ex. 1-1-75 | 1-(1h)-100-(0)-PS-1 | 100 | 100 |
| Ex. 1-1-38 | 1-(1h)-100-(2h)-0.12-PS-1 | 99 | 100 |
| Comp. Ex. 1-1-76 | 1-(1h)-100-(2h)-30-PS-1 | 96 | 98 |
| Comp. Ex. 1-1-77 | 1-(1h)-100-(0)-LiFSI-1 | 100 | 100 |
| Ex. 1-1-39 | 1-(1h)-100-(2h)-0.12-LiFSI-1 | 95 | 100 |
| Comp. Ex. 1-1-78 | 1-(1h)-100-(2h)-30-LiFSI-1 | 86 | 93 |
| Comp. Ex. 1-1-79 | 1-(1h)-100-(0)-LiTFSI-1 | 100 | 100 |
| Ex. 1-1-40 | 1-(1h)-100-(2h)-0.12-LiTFSI-1 | 94 | 100 |
| Comp. Ex. 1-1-80 | 1-(1h)-100-(2h)-30-LiTFSI-1 | 85 | 92 |
| Comp. Ex. 1-1-81 | 1-(1h)-100-(0)-LiBETI-1 | 100 | 100 |
| Ex. 1-1-41 | 1-(1h)-100-(2h)-0.12-LiBETI-1 | 96 | 100 |
| Comp. Ex. 1-1-82 | 1-(1h)-100-(2h)-30-LiBETI-1 | 90 | 92 |
| Comp. Ex. 1-1-83 | 1-(1h)-100-(0)-LiBF$_4$-1 | 100 | 100 |
| Ex. 1-1-42 | 1-(1h)-100-(2h)-0.12-LiBF$_4$-1 | 97 | 100 |
| Comp. Ex. 1-1-84 | 1-(1h)-100-(2h)-30-LiBF$_4$-1 | 88 | 90 |

A lower value of DC resistance means better performance.
A higher value of capacity means better performance.

TABLE 82

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-1-85 | 1-(1j)-100-(0)-LiSO$_3$F-1 | 100 | 100 |
| Ex. 1-1-43 | 1-(1j)-100-(2j)-0.12-LiSO$_3$F-1 | 93 | 100 |
| Comp. Ex. 1-1-86 | 1-(1j)-100-(2j)-30-LiSO$_3$F-1 | 86 | 97 |
| Comp. Ex. 1-1-87 | 1-(1j)-100-(0)-LiPO$_2$F$_2$-1 | 100 | 100 |
| Ex. 1-1-44 | 1-(1j)-100-(2j)-0.12-LiPO$_2$F$_2$-1 | 95 | 100 |
| Comp. Ex. 1-1-88 | 1-(1j)-100-(2j)-30-LiPO$_2$F$_2$-1 | 89 | 92 |
| Comp. Ex. 1-1-89 | 1-(1j)-100-(0)-LDFOB-1 | 100 | 100 |
| Ex. 1-1-45 | 1-(1j)-100-(2j)-0.12-LDFOB-1 | 93 | 100 |
| Comp. Ex. 1-1-90 | 1-(1j)-100-(2j)-30-LDFOB-1 | 87 | 95 |
| Comp. Ex. 1-1-91 | 1-(1j)-100-(0)-MSF-0.5 | 100 | 100 |
| Ex. 1-1-46 | 1-(1j)-100-(2j)-0.12-MSF-0.5 | 96 | 100 |
| Comp. Ex. 1-1-92 | 1-(1j)-100-(2j)-30-MSF-0.5 | 90 | 92 |
| Comp. Ex. 1-1-93 | 1-(1j)-100-(0)-FB-5 | 100 | 100 |
| Ex. 1-1-47 | 1-(1j)-100-(2j)-0.12-FB-5 | 98 | 100 |
| Comp. Ex. 1-1-94 | 1-(1j)-100-(2j)-30-FB-5 | 91 | 90 |
| Comp. Ex. 1-1-95 | 1-(1j)-100-(0)-Dod-0.5 | 100 | 100 |
| Ex. 1-1-48 | 1-(1j)-100-(2j)-0.12-Dod-0.5 | 99 | 100 |
| Comp. Ex. 1-1-96 | 1-(1j)-100-(2j)-30-Dod-0.5 | 96 | 95 |
| Comp. Ex. 1-1-97 | 1-(1j)-100-(0)-pDod-0.5 | 100 | 100 |
| Ex. 1-1-49 | 1-(1j)-100-(2j)-0.12-pDod-0.5 | 98 | 100 |

TABLE 82-continued

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-1-98 | 1-(1j)-100-(2j)-30-pDod-0.5 | 93 | 97 |
| Comp. Ex. 1-1-99 | 1-(1j)-100-(0)-Dad-0.5 | 100 | 100 |
| Ex. 1-1-50 | 1-(1j)-100-(2j)-0.12-Dad-0.5 | 98 | 100 |
| Comp. Ex. 1-1-100 | 1-(1j)-100-(2j)-30-Dad-0.5 | 95 | 97 |
| Comp. Ex. 1-1-101 | 1-(1j)-100-(0)-PS-1 | 100 | 100 |
| Ex. 1-1-51 | 1-(1j)-100-(2j)-0.12-PS-1 | 98 | 100 |
| Comp. Ex. 1-1-102 | 1-(1j)-100-(2j)-30-PS-1 | 95 | 98 |
| Comp. Ex. 1-1-103 | 1-(1j)-100-(0)-LiFSI-1 | 100 | 100 |
| Ex. 1-1-52 | 1-(1j)-100-(2j)-0.12-LiFSI-1 | 96 | 100 |
| Comp. Ex. 1-1-104 | 1-(1j)-100-(2j)-30-LiFSI-1 | 84 | 93 |
| Comp. Ex. 1-1-105 | 1-(1j)-100-(0)-LiTFSI-1 | 100 | 100 |
| Ex. 1-1-53 | 1-(1j)-100-(2j)-0.12-LiTFSI-1 | 95 | 100 |
| Comp. Ex. 1-1-106 | 1-(1j)-100-(2j)-30-LiTFSI-1 | 85 | 93 |
| Comp. Ex. 1-1-107 | 1-(1j)-100-(0)-LiBETI-1 | 100 | 100 |
| Ex. 1-1-54 | 1-(1j)-100-(2j)-0.12-LiBETI-1 | 97 | 100 |
| Comp. Ex. 1-1-108 | 1-(1j)-100-(2j)-30-LiBETI-1 | 93 | 92 |
| Comp. Ex. 1-1-109 | 1-(1j)-100-(0)-LiBF$_4$-1 | 100 | 100 |
| Ex. 1-1-55 | 1-(1j)-100-(2j)-0.12-LiBF$_4$-1 | 97 | 100 |
| Comp. Ex. 1-1-110 | 1-(1j)-100-(2j)-30-LiBF$_4$-1 | 90 | 91 |

A lower value of DC resistance means better performance.
A higher value of capacity means better performance.

TABLE 83

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-1-111 | 1-(1c)-100-(0)-LiSO$_3$F-1 | 100 | 100 |
| Ex. 1-1-56 | 1-(1c)-100-(2b)-0.12-LiSO$_3$F-1 | 96 | 100 |
| Comp. Ex. 1-1-112 | 1-(1c)-100-(2b)-30-LiSO$_3$F-1 | 83 | 99 |
| Comp. Ex. 1-1-113 | 1-(1c)-100-(0)-LiPO$_2$F$_2$-1 | 100 | 100 |
| Ex. 1-1-57 | 1-(1c)-100-(2b)-0.12-LiPO$_2$F$_2$-1 | 96 | 100 |
| Comp. Ex. 1-1-114 | 1-(1c)-100-(2b)-30-LiPO$_2$F$_2$-1 | 88 | 94 |
| Comp. Ex. 1-1-115 | 1-(1g)-100-(0)-LiFSI-2 | 100 | 100 |
| Ex. 1-1-58 | 1-(1g)-100-(2h)-0.12-LiFSI-2 | 90 | 100 |
| Comp. Ex. 1-1-116 | 1-(1g)-100-(2h)-30-LiFSI-2 | 79 | 93 |
| Comp. Ex. 1-1-117 | 1-(1g)-100-(0)-LiSO$_3$F-1 | 100 | 100 |
| Ex. 1-1-59 | 1-(1g)-100-(2h)-0.12-LiSO$_3$F-1 | 91 | 100 |
| Comp. Ex. 1-1-118 | 1-(1g)-100-(2h)-30-LiSO$_3$F-1 | 76 | 97 |
| Comp. Ex. 1-1-119 | 1-(1i)-100-(0)-LiFSI-2 | 100 | 100 |
| Ex. 1-1-60 | 1-(1i)-100-(2j)-0.12-LiFSI-2 | 93 | 100 |
| Comp. Ex. 1-1-120 | 1-(1i)-100-(2j)-30-LiFSI-2 | 83 | 93 |
| Comp. Ex. 1-1-121 | 1-(1i)-100-(0)-LiSO$_3$F-1 | 100 | 100 |
| Ex. 1-1-61 | 1-(1i)-100-(2j)-0.12-LiSO$_3$F-1 | 93 | 100 |
| Comp. Ex. 1-1-122 | 1-(1i)-100-(2j)-30-LiSO$_3$F-1 | 87 | 96 |
| Comp. Ex. 1-1-123 | 1-(1p)-100-(0)-LiSO$_3$F-1 | 100 | 100 |
| Ex. 1-1-62 | 1-(1p)-100-(2h)-0.12-LiSO$_3$F-1 | 91 | 100 |
| Comp. Ex. 1-1-124 | 1-(1p)-100-(2h)-30-LiSO$_3$F-1 | 75 | 95 |
| Comp. Ex. 1-1-125 | 1-(1p)-100-(0)-LiPO$_2$F$_2$-1 | 100 | 100 |
| Ex. 1-1-63 | 1-(1p)-100-(2h)-0.12-LiPO$_2$F$_2$-1 | 94 | 100 |
| Comp. Ex. 1-1-126 | 1-(1p)-100-(2h)-30-LiPO$_2$F$_2$-1 | 81 | 90 |
| Comp. Ex. 1-1-127 | 1-(1a)-100-(0)-LiSO$_3$F-1 | 100 | 100 |
| Ex. 1-1-64 | 1-(1a)-100-(2f)-0.12-LiSO$_3$F-1 | 93 | 100 |
| Comp. Ex. 1-1-128 | 1-(1a)-100-(2f)-30-LiSO$_3$F-1 | 77 | 98 |
| Comp. Ex. 1-1-129 | 1-(1a)-100-(0)-LTFOP-1 | 100 | 100 |
| Ex. 1-1-65 | 1-(1a)-100-(2f)-0.12-LTFOP-1 | 92 | 100 |
| Comp. Ex. 1-1-130 | 1-(1a)-100-(2f)-30-LTFOP-1 | 83 | 97 |
| Comp. Ex. 1-1-131 | 1-(1e)-100-(0)-LiSO$_3$F-1 | 100 | 100 |
| Ex. 1-1-66 | 1-(1e)-100-(2b)-0.12-LiSO$_3$F-1 | 94 | 100 |
| Comp. Ex. 1-1-132 | 1-(1e)-100-(2b)-30-LiSO$_3$F-1 | 87 | 98 |
| Comp. Ex. 1-1-133 | 1-(1e)-100-(0)-LTFOP-1 | 100 | 100 |
| Ex. 1-1-67 | 1-(1e)-100-(2b)-0.12-LTFOP-1 | 97 | 100 |
| Comp. Ex. 1-1-134 | 1-(1e)-100-(2b)-30-LTFOP-1 | 89 | 96 |
| Comp. Ex. 1-1-135 | 1-(1k)-100-(0)-LiPO$_2$F$_2$-1 | 100 | 100 |
| Ex. 1-1-68 | 1-(1k)-100-(2b)-0.12-LiPO$_2$F$_2$-1 | 97 | 100 |
| Comp. Ex. 1-1-136 | 1-(1k)-100-(2b)-30-LiPO$_2$F$_2$-1 | 88 | 91 |
| Comp. Ex. 1-1-137 | 1-(1k)-100-(0)-LTFOP-1 | 100 | 100 |
| Ex. 1-1-69 | 1-(1k)-100-(2b)-0.12-LTFOP-1 | 97 | 100 |
| Comp. Ex. 1-1-138 | 1-(1k)-100-(2b)-30-LTFOP-1 | 83 | 96 |
| Comp. Ex. 1-1-139 | 1-(1q)-100-(0)-LiPO$_2$F$_2$-1 | 100 | 100 |
| Ex. 1-1-70 | 1-(1q)-100-(2h)-0.12-LiPO$_2$F$_2$-1 | 96 | 100 |

TABLE 83-continued

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-1-140 | 1-(1q)-100-(2h)-30-LiPO$_2$F$_2$-1 | 88 | 93 |
| Comp. Ex. 1-1-141 | 1-(1q)-100-(0)-LTFOP-1 | 100 | 100 |
| Ex. 1-1-71 | 1-(1q)-100-(2h)-0.12-LTFOP-1 | 94 | 100 |
| Comp. Ex. 1-1-142 | 1-(1q)-100-(2h)-30-LTFOP-1 | 88 | 97 |

A lower value of DC resistance means better performance.
A higher value of capacity means better performance.

TABLE 84

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-2-1 | 1-(1b)-100-(0)-LDFBOP-0.5-LiFSI-1 | 100 | 100 |
| Ex. 1-2-1 | 1-(1b)-100-(2b)-0.12-LDFBOP-0.5-LiFSI-1 | 97 | 100 |
| Comp. Ex. 1-2-2 | 1-(1b)-100-(2b)-30-LDFBOP-0.5-LiFSI-1 | 90 | 95 |
| Comp. Ex. 1-2-3 | 1-(1b)-100-(0)-LDFBOP-1-LiPO$_2$F$_2$-0.5 | 100 | 100 |
| Ex. 1-2-2 | 1-(1b)-100-(2b)-0.12-LDFBOP-1-LiPO$_2$F$_2$-0.5 | 97 | 100 |
| Comp. Ex. 1-2-4 | 1-(1b)-100-(2b)-30-LDFBOP-1-LiPO$_2$F$_2$-0.5 | 89 | 94 |
| Comp. Ex. 1-2-5 | 1-(1b)-100-(0)-LDFBOP-1-ESF-0.5 | 100 | 100 |
| Ex. 1-2-3 | 1-(1b)-100-(2b)-0.12-LDFBOP-1-ESF-0.5 | 96 | 100 |
| Comp. Ex. 1-2-6 | 1-(1b)-100-(2b)-30-LDFBOP-1-ESF-0.5 | 89 | 96 |
| Comp. Ex. 1-2-7 | 1-(1b)-100-(0)-LiPO$_2$F$_2$-0.5-FB-5 | 100 | 100 |
| Ex. 1-2-4 | 1-(1b)-100-(2b)-0.12-LiPO$_2$F$_2$-0.5-FB-5 | 97 | 100 |
| Comp. Ex. 1-2-8 | 1-(1b)-100-(2b)-30-LiPO$_2$F$_2$-0.5-FB-5 | 93 | 95 |
| Comp. Ex. 1-2-9 | 1-(1b)-100-(0)-LiPO$_2$F$_2$-0.5-Dod-0.5 | 100 | 100 |
| Ex. 1-2-5 | 1-(1b)-100-(2b)-0.12-LiPO$_2$F$_2$-0.5-Dod-0.5 | 98 | 100 |
| Comp. Ex. 1-2-10 | 1-(1b)-100-(2b)-30-LiPO$_2$F$_2$-0.5-Dod-0.5 | 90 | 97 |
| Comp. Ex. 1-2-11 | 1-(1b)-100-(0)-LiPO$_2$F$_2$-0.5-pDod-0.5 | 100 | 100 |
| Ex. 1-2-6 | 1-(1b)-100-(2b)-0.12-LiPO$_2$F$_2$-0.5-pDod-0.5 | 97 | 100 |
| Comp. Ex. 1-2-12 | 1-(1b)-100-(2b)-30-LiPO$_2$F$_2$-0.5-pDod-0.5 | 89 | 96 |
| Comp. Ex. 1-2-13 | 1-(1b)-100-(0)-LiPO$_2$F$_2$-0.5-Dad-0.5 | 100 | 100 |
| Ex. 1-2-7 | 1-(1b)-100-(2b)-0.12-LiPO$_2$F$_2$-0.5-Dad-0.5 | 98 | 100 |
| Comp. Ex. 1-2-14 | 1-(1b)-100-(2b)-30-LiPO$_2$F$_2$-0.5-Dad-0.5 | 88 | 96 |
| Comp. Ex. 1-2-15 | 1-(1b)-100-(0)-LiPO$_2$F$_2$-0.5-PS-1 | 100 | 100 |
| Ex. 1-2-8 | 1-(1b)-100-(2b)-0.12-LiPO$_2$F$_2$-0.5-PS-1 | 97 | 100 |
| Comp. Ex. 1-2-16 | 1-(1b)-100-(2b)-30-LiPO$_2$F$_2$-0.5-PS-1 | 89 | 98 |
| Comp. Ex. 1-2-17 | 1-(1b)-100-(0)-LiPO$_2$F$_2$-0.5-LiBF$_4$-1 | 100 | 100 |
| Ex. 1-2-9 | 1-(1b)-100-(2b)-0.12-LiPO$_2$F$_2$-0.5-LiBF$_4$-1 | 98 | 100 |
| Comp. Ex. 1-2-18 | 1-(1b)-100-(2b)-30-LiPO$_2$F$_2$-0.5-LiBF$_4$-1 | 93 | 93 |
| Comp. Ex. 1-2-19 | 1-(1b)-100-(0)-LiPO$_2$F$_2$-0.5-LiFSI-1 | 100 | 100 |
| Ex. 1-2-10 | 1-(1b)-100-(2b)-0.12-LiPO$_2$F$_2$-0.5-LiFSI-1 | 97 | 100 |
| Comp. Ex. 1-2-20 | 1-(1b)-100-(2b)-30-LiPO$_2$F$_2$-0.5-LiFSI-1 | 94 | 96 |
| Comp. Ex. 1-2-21 | 1-(1b)-100-(0)-LiPO$_2$F$_2$-0.5-LiTFSI-1 | 100 | 100 |
| Ex. 1-2-11 | 1-(1b)-100-(2b)-0.12-LiPO$_2$F$_2$-0.5-LiTFSI-1 | 98 | 100 |
| Comp. Ex. 1-2-22 | 1-(1b)-100-(2b)-30-LiPO$_2$F$_2$-0.5-LiTFSI-1 | 93 | 93 |
| Comp. Ex. 1-2-23 | 1-(1b)-100-(0)-LiPO$_2$F$_2$-0.5-LiBETI-1 | 100 | 100 |
| Ex. 1-2-12 | 1-(1b)-100-(2b)-0.12-LiPO$_2$F$_2$-0.5-LiBETI-1 | 98 | 100 |
| Comp. Ex. 1-2-24 | 1-(1b)-100-(2b)-30-LiPO$_2$F$_2$-0.5-LiBETI-1 | 90 | 94 |
| Comp. Ex. 1-2-25 | 1-(1b)-100-(0)-LiPO$_2$F$_2$-0.5-LiSO$_3$F-1 | 100 | 100 |
| Ex. 1-2-13 | 1-(1b)-100-(2b)-0.12-LiPO$_2$F$_2$-0.5-LiSO$_3$F-1 | 98 | 100 |
| Comp. Ex. 1-2-26 | 1-(1b)-100-(2b)-30-LiPO$_2$F$_2$-0.5-LiSO$_3$F-1 | 91 | 97 |

A lower value of DC resistance means better performance.
A higher value of capacity means better performance.

TABLE 85

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-2-27 | 1-(1f)-100-(0)-LDFBOP-0.5-LiSO$_3$F-1 | 100 | 100 |
| Ex. 1-2-14 | 1-(1f)-100-(2f)-0.12-LDFBOP-0.5-LiSO$_3$F-1 | 95 | 100 |
| Comp. Ex. 1-2-28 | 1-(1f)-100-(2f)-30-LDFBOP-0.5-LiSO$_3$F-1 | 90 | 95 |
| Comp. Ex. 1-2-29 | 1-(1f)-100-(0)-LDFBOP-1-LiPO$_2$F$_2$-0.5 | 100 | 100 |
| Ex. 1-2-15 | 1-(1f)-100-(2f)-0.12-LDFBOP-1-LiPO$_2$F$_2$-0.5 | 98 | 100 |

TABLE 85-continued

|  | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-2-30 | 1-(1f)-100-(2f)-30-LDFBOP-1-LiPO$_2$F$_2$-0.5 | 92 | 94 |
| Comp. Ex. 1-2-31 | 1-(1f)-100-(0)-LDFBOP-1-TSF-0.5 | 100 | 100 |
| Ex. 1-2-16 | 1-(1f)-100-(2f)-0.12-LDFBOP-1-TSF-0.5 | 96 | 100 |
| Comp. Ex. 1-2-32 | 1-(1f)-100-(2f)-30-LDFBOP-1-TSF-0.5 | 88 | 96 |
| Comp. Ex. 1-2-33 | 1-(1f)-100-(0)-LiPO$_2$F$_2$-0.5-FB-5 | 100 | 100 |
| Ex. 1-2-17 | 1-(1f)-100-(2f)-0.12-LiPO$_2$F$_2$-0.5-FB-5 | 98 | 100 |
| Comp. Ex. 1-2-34 | 1-(1f)-100-(2f)-30-LiPO$_2$F$_2$-0.5-FB-5 | 92 | 96 |
| Comp. Ex. 1-2-35 | 1-(1f)-100-(0)-LiPO$_2$F$_2$-0.5-Dod-0.5 | 100 | 100 |
| Ex. 1-2-18 | 1-(1f)-100-(2f)-0.12-LiPO$_2$F$_2$-0.5-Dod-0.5 | 97 | 100 |
| Comp. Ex. 1-2-36 | 1-(1f)-100-(2f)-30-LiPO$_2$F$_2$-0.5-Dod-0.5 | 90 | 97 |
| Comp. Ex. 1-2-37 | 1-(1f)-100-(0)-LiPO$_2$F$_2$-0.5-pDod-0.5 | 100 | 100 |
| Ex. 1-2-19 | 1-(1f)-100-(2f)-0.12-LiPO$_2$F$_2$-0.5-pDod-0.5 | 97 | 100 |
| Comp. Ex. 1-2-38 | 1-(1f)-100-(2f)-30-LiPO$_2$F$_2$-0.5-pDod-0.5 | 91 | 96 |
| Comp. Ex. 1-2-39 | 1-(1f)-100-(0)-LiPO$_2$F$_2$-0.5-Dad-0.5 | 100 | 100 |
| Ex. 1-2-20 | 1-(1f)-100-(2f)-0.12-LiPO$_2$F$_2$-0.5-Dad-0.5 | 98 | 100 |
| Comp. Ex. 1-2-40 | 1-(1f)-100-(2f)-30-LiPO$_2$F$_2$-0.5-Dad-0.5 | 88 | 97 |
| Comp. Ex. 1-2-41 | 1-(1f)-100-(0)-LiPO$_2$F$_2$-0.5-PS-1 | 100 | 100 |
| Ex. 1-2-21 | 1-(1f)-100-(2f)-0.12-LiPO$_2$F$_2$-0.5-PS-1 | 98 | 100 |
| Comp. Ex. 1-2-42 | 1-(1f)-100-(2f)-30-LiPO$_2$F$_2$-0.5-PS-1 | 89 | 98 |
| Comp. Ex. 1-2-43 | 1-(1f)-100-(0)-LiPO$_2$F$_2$-0.5-LiBF$_4$-1 | 100 | 100 |
| Ex. 1-2-22 | 1-(1f)-100-(2f)-0.12-LiPO$_2$F$_2$-0.5-LiBF$_4$-1 | 98 | 100 |
| Comp. Ex. 1-2-44 | 1-(1f)-100-(2f)-30-LiPO$_2$F$_2$-0.5-LiBF$_4$-1 | 94 | 93 |
| Comp. Ex. 1-2-45 | 1-(1f)-100-(0)-LiPO$_2$F$_2$-0.5-LiFSI-1 | 100 | 100 |
| Ex. 1-2-23 | 1-(1f)-100-(2f)-0.12-LiPO$_2$F$_2$-0.5-LiFSI-1 | 98 | 100 |
| Comp. Ex. 1-2-46 | 1-(1f)-100-(2f)-30-LiPO$_2$F$_2$-0.5-LiFSI-1 | 92 | 94 |
| Comp. Ex. 1-2-47 | 1-(1f)-100-(0)-LiPO$_2$F$_2$-0.5-LiTFSI-1 | 100 | 100 |
| Ex. 1-2-24 | 1-(1f)-100-(2f)-0.12-LiPO$_2$F$_2$-0.5-LiTFSI-1 | 97 | 100 |
| Comp. Ex. 1-2-48 | 1-(1f)-100-(2f)-30-LiPO$_2$F$_2$-0.5-LiTFSI-1 | 91 | 93 |
| Comp. Ex. 1-2-49 | 1-(1f)-100-(0)-LiPO$_2$F$_2$-0.5-LiBETI-1 | 100 | 100 |
| Ex. 1-2-25 | 1-(1f)-100-(2f)-0.12-LiPO$_2$F$_2$-0.5-LiBETI-1 | 96 | 100 |
| Comp. Ex. 1-2-50 | 1-(1f)-100-(2f)-30-LiPO$_2$F$_2$-0.5-LiBETI-1 | 88 | 92 |
| Comp. Ex. 1-2-51 | 1-(1f)-100-(0)-LiPO$_2$F$_2$-0.5-LiSO$_3$F-1 | 100 | 100 |
| Ex. 1-2-26 | 1-(1f)-100-(2f)-0.12-LiPO$_2$F$_2$-0.5-LiSO$_3$F-1 | 97 | 100 |
| Comp. Ex. 1-2-52 | 1-(1f)-100-(2f)-30-LiPO$_2$F$_2$-0.5-LiSO$_3$F-1 | 90 | 97 |

A lower value of DC resistance means better performance.
A higher value of capacity means better performance.

TABLE 86

|  | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-2-53 | 1-(1h)-100-(0)-LDFBOP-0.5-LiFSI-1 | 100 | 100 |
| Ex. 1-2-27 | 1-(1h)-100-(2h)-0.12-LDFBOP-0.5-LiFSI-1 | 97 | 100 |
| Comp. Ex. 1-2-54 | 1-(1h)-100-(2h)-30-LDFBOP-0.5-LiFSI-1 | 91 | 95 |
| Comp. Ex. 1-2-55 | 1-(1h)-100-(0)-LDFBOP-0.5-LiSO$_3$F-1 | 100 | 100 |
| Ex. 1-2-28 | 1-(1h)-100-(2h)-0.12-LDFBOP-0.5-LiSO$_3$F-1 | 95 | 100 |
| Comp. Ex. 1-2-56 | 1-(1h)-100-(2h)-30-LDFBOP-0.5-LiSO$_3$F-1 | 90 | 95 |
| Comp. Ex. 1-2-57 | 1-(1h)-100-(0)-LDFBOP-1-PDFP-0.5 | 100 | 100 |
| Ex. 1-2-29 | 1-(1h)-100-(2h)-0.12-LDFBOP-1-PDFP-0.5 | 96 | 100 |
| Comp. Ex. 1-2-58 | 1-(1h)-100-(2h)-30-LDFBOP-1-PDFP-0.5 | 91 | 96 |
| Comp. Ex. 1-2-59 | 1-(1h)-100-(0)-LiPO$_2$F$_2$-0.5-FB-5 | 100 | 100 |
| Ex. 1-2-30 | 1-(1h)-100-(2h)-0.12-LiPO$_2$F$_2$-0.5-FB-5 | 98 | 100 |
| Comp. Ex. 1-2-60 | 1-(1h)-100-(2h)-30-LiPO$_2$F$_2$-0.5-FB-5 | 90 | 93 |
| Comp. Ex. 1-2-61 | 1-(1h)-100-(0)-LiPO$_2$F$_2$-0.5-Dod-0.5 | 100 | 100 |
| Ex. 1-2-31 | 1-(1h)-100-(2h)-0.12-LiPO$_2$F$_2$-0.5-Dod-0.5 | 97 | 100 |
| Comp. Ex. 1-2-62 | 1-(1h)-100-(2h)-30-LiPO$_2$F$_2$-0.5-Dod-0.5 | 91 | 96 |
| Comp. Ex. 1-2-63 | 1-(1h)-100-(0)-LiPO$_2$F$_2$-0.5-pDod-0.5 | 100 | 100 |
| Ex. 1-2-32 | 1-(1h)-100-(2h)-0.12-LiPO$_2$F$_2$-0.5-pDod-0.5 | 96 | 100 |
| Comp. Ex. 1-2-64 | 1-(1h)-100-(2h)-30-LiPO$_2$F$_2$-0.5-pDod-0.5 | 90 | 97 |
| Comp. Ex. 1-2-65 | 1-(1h)-100-(0)-LiPO$_2$F$_2$-0.5-Dad-0.5 | 100 | 100 |
| Ex. 1-2-33 | 1-(1h)-100-(2h)-0.12-LiPO$_2$F$_2$-0.5-Dad-0.5 | 97 | 100 |
| Comp. Ex. 1-2-66 | 1-(1h)-100-(2h)-30-LiPO$_2$F$_2$-0.5-Dad-0.5 | 91 | 96 |
| Comp. Ex. 1-2-67 | 1-(1h)-100-(0)-LiPO$_2$F$_2$-0.5-PS-1 | 100 | 100 |
| Ex. 1-2-34 | 1-(1h)-100-(2h)-0.12-LiPO$_2$F$_2$-0.5-PS-1 | 97 | 100 |
| Comp. Ex. 1-2-68 | 1-(1h)-100-(2h)-30-LiPO$_2$F$_2$-0.5-PS-1 | 91 | 98 |
| Comp. Ex. 1-2-69 | 1-(1h)-100-(0)-LiPO$_2$F$_2$-0.5-LiBF$_4$-1 | 100 | 100 |
| Ex. 1-2-35 | 1-(1h)-100-(2h)-0.12-LiPO$_2$F$_2$-0.5-LiBF$_4$-1 | 98 | 100 |
| Comp. Ex. 1-2-70 | 1-(1h)-100-(2h)-30-LiPO$_2$F$_2$-0.5-LiBF$_4$-1 | 94 | 93 |
| Comp. Ex. 1-2-71 | 1-(1h)-100-(0)-LiPO$_2$F$_2$-0.5-LiFSI-1 | 100 | 100 |
| Ex. 1-2-36 | 1-(1h)-100-(2h)-0.12-LiPO$_2$F$_2$-0.5-LiFSI-1 | 96 | 100 |

TABLE 86-continued

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-2-72 | 1-(1h)-100-(2h)-30-$LiPO_2F_2$-0.5-LiFSI-1 | 95 | 94 |
| Comp. Ex. 1-2-73 | 1-(1h)-100-(0)-$LiPO_2F_2$-0.5-LiTFSI-1 | 100 | 100 |
| Ex. 1-2-37 | 1-(1h)-100-(2h)-0.12-$LiPO_2F_2$-0.5-LiTFSI-1 | 96 | 100 |
| Comp. Ex. 1-2-74 | 1-(1h)-100-(2h)-30-$LiPO_2F_2$-0.5-LiTFSI-1 | 92 | 92 |
| Comp. Ex. 1-2-75 | 1-(1h)-100-(0)-$LiPO_2F_2$-0.5-LiBETI-1 | 100 | 100 |
| Ex. 1-2-38 | 1-(1h)-100-(2h)-0.12-$LiPO_2F_2$-0.5-LiBETI-1 | 97 | 100 |
| Comp. Ex. 1-2-76 | 1-(1h)-100-(2h)-30-$LiPO_2F_2$-0.5-LiBETI-1 | 91 | 93 |
| Comp. Ex. 1-2-77 | 1-(1h)-100-(0)-$LiPO_2F_2$-0.5-$LiSO_3F$-1 | 100 | 100 |
| Ex. 1-2-39 | 1-(1h)-100-(2h)-0.12-$LiPO_2F_2$-0.5-$LiSO_3F$-1 | 96 | 100 |
| Comp. Ex. 1-2-78 | 1-(1h)-100-(2h)-30-$LiPO_2F_2$-0.5-$LiSO_3F$-1 | 91 | 98 |

A lower value of DC resistance means better performance.
A higher value of capacity means better performance.

TABLE 87

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-2-79 | 1-(1j)-100-(0)-LDFBOP-0.5-LDFPFSI-1 | 100 | 100 |
| Ex. 1-2-40 | 1-(1j)-100-(2j)-0.12-LDFBOP-0.5-LDFPFSI-1 | 98 | 100 |
| Comp. Ex. 1-2-80 | 1-(1j)-100-(2j)-30-LDFBOP-0.5-LDFPFSI-1 | 92 | 95 |
| Comp. Ex. 1-2-81 | 1-(1j)-100-(0)-LDFBOP-1-$LiPO_2F_2$-0.5 | 100 | 100 |
| Ex. 1-2-41 | 1-(1j)-100-(2j)-0.12-LDFBOP-1-$LiPO_2F_2$-0.5 | 97 | 100 |
| Comp. Ex. 1-2-82 | 1-(1j)-100-(2j)-30-LDFBOP-1-$LiPO_2F_2$-0.5 | 90 | 94 |
| Comp. Ex. 1-2-83 | 1-(1j)-100-(0)-LDFBOP-1-MSF-0.5 | 100 | 100 |
| Ex. 1-2-42 | 1-(1j)-100-(2j)-0.12-LDFBOP-1-MSF-0.5 | 97 | 100 |
| Comp. Ex. 1-2-84 | 1-(1j)-100-(2j)-30-LDFBOP-1-MSF-0.5 | 91 | 96 |
| Comp. Ex. 1-2-85 | 1-(1j)-100-(0)-$LiPO_2F_2$-0.5-FB-5 | 100 | 100 |
| Ex. 1-2-43 | 1-(1j)-100-(2j)-0.12-$LiPO_2F_2$-0.5-FB-5 | 98 | 100 |
| Comp. Ex. 1-2-86 | 1-(1j)-100-(2j)-30-$LiPO_2F_2$-0.5-FB-5 | 93 | 94 |
| Comp. Ex. 1-2-87 | 1-(1j)-100-(0)-$LiPO_2F_2$-0.5-Dod-0.5 | 100 | 100 |
| Ex. 1-2-44 | 1-(1j)-100-(2j)-0.12-$LiPO_2F_2$-0.5-Dod-0.5 | 96 | 100 |
| Comp. Ex. 1-2-88 | 1-(1j)-100-(2j)-30-$LiPO_2F_2$-0.5-Dod-0.5 | 90 | 97 |
| Comp. Ex. 1-2-89 | 1-(1j)-100-(0)-$LiPO_2F_2$-0.5-pDod-0.5 | 100 | 100 |
| Ex. 1-2-45 | 1-(1j)-100-(2j)-0.12-$LiPO_2F_2$-0.5-pDod-0.5 | 95 | 100 |
| Comp. Ex. 1-2-90 | 1-(1j)-100-(2j)-30-$LiPO_2F_2$-0.5-pDod-0.5 | 89 | 97 |
| Comp. Ex. 1-2-91 | 1-(1j)-100-(0)-$LiPO_2F_2$-0.5-Dad-0.5 | 100 | 100 |
| Ex. 1-2-46 | 1-(1j)-100-(2j)-0.12-$LiPO_2F_2$-0.5-Dad-0.5 | 97 | 100 |
| Comp. Ex. 1-2-92 | 1-(1j)-100-(2j)-30-$LiPO_2F_2$-0.5-Dad-0.5 | 91 | 97 |
| Comp. Ex. 1-2-93 | 1-(1j)-100-(0)-$LiPO_2F_2$-0.5-PS-1 | 100 | 100 |
| Ex. 1-2-47 | 1-(1j)-100-(2j)-0.12-$LiPO_2F_2$-0.5-PS-1 | 96 | 100 |
| Comp. Ex. 1-2-94 | 1-(1j)-100-(2j)-30-$LiPO_2F_2$-0.5-PS-1 | 90 | 98 |
| Comp. Ex. 1-2-95 | 1-(1j)-100-(0)-$LiPO_2F_2$-0.5-$LiBF_4$-1 | 100 | 100 |
| Ex. 1-2-48 | 1-(1j)-100-(2j)-0.12-$LiPO_2F_2$-0.5-$LiBF_4$-1 | 97 | 100 |
| Comp. Ex. 1-2-96 | 1-(1j)-100-(2j)-30-$LiPO_2F_2$-0.5-$LiBF_4$-1 | 93 | 94 |
| Comp. Ex. 1-2-97 | 1-(1j)-100-(0)-$LiPO_2F_2$-0.5-LiFSI-1 | 100 | 100 |
| Ex. 1-2-49 | 1-(1j)-100-(2j)-0.12-$LiPO_2F_2$-0.5-LiFSI-1 | 96 | 100 |
| Comp. Ex. 1-2-98 | 1-(1j)-100-(2j)-30-$LiPO_2F_2$-0.5-LiFSI-1 | 94 | 95 |
| Comp. Ex. 1-2-99 | 1-(1j)-100-(0)-$LiPO_2F_2$-0.5-LiTFSI-1 | 100 | 100 |
| Ex. 1-2-50 | 1-(1j)-100-(2j)-0.12-$LiPO_2F_2$-0.5-LiTFSI-1 | 97 | 100 |
| Comp. Ex. 1-2-100 | 1-(1j)-100-(2j)-30-$LiPO_2F_2$-0.5-LiTFSI-1 | 92 | 92 |
| Comp. Ex. 1-2-101 | 1-(1j)-100-(0)-$LiPO_2F_2$-0.5-LiBETI-1 | 100 | 100 |
| Ex. 1-2-51 | 1-(1j)-100-(2j)-0.12-$LiPO_2F_2$-0.5-LiBETI-1 | 96 | 100 |
| Comp. Ex. 1-2-102 | 1-(1j)-100-(2j)-30-$LiPO_2F_2$-0.5-LiBETI-1 | 90 | 92 |
| Comp. Ex. 1-2-103 | 1-(1j)-100-(0)-$LiPO_2F_2$-0.5-$LiSO_3F$-1 | 100 | 100 |
| Ex. 1-2-52 | 1-(1j)-100-(2j)-0.12-$LiPO_2F_2$-0.5-$LiSO_3F$-1 | 97 | 100 |
| Comp. Ex. 1-2-104 | 1-(1j)-100-(2j)-30-$LiPO_2F_2$-0.5-$LiSO_3F$-1 | 92 | 97 |

A lower value of DC resistance means better performance.
A higher value of capacity means better performance.

TABLE 88

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-3-1 | 1-(1b)-100-(0)-LiPO$_2$F$_2$-0.5-FB-5-Dod-0.5 | 100 | 100 |
| Ex. 1-3-1 | 1-(1b)-100-(2b)-0.12-LiPO$_2$F$_2$-0.5-FB-5-Dod-0.5 | 97 | 100 |
| Comp. Ex. 1-3-2 | 1-(1b)-100-(2b)-30-LiPO$_2$F$_2$-0.5-FB-5-Dod-0.5 | 89 | 93 |
| Comp. Ex. 1-3-3 | 1-(1b)-100-(0)-LiPO$_2$F$_2$-0.5-FB-5-pDod-0.5 | 100 | 100 |
| Ex. 1-3-2 | 1-(1b)-100-(2b)-0.12-LiPO$_2$F$_2$-0.5-FB-5-pDod-0.5 | 96 | 100 |
| Comp. Ex. 1-3-4 | 1-(1b)-100-(2b)-30-LiPO$_2$F$_2$-0.5-FB-5-pDod-0.5 | 90 | 92 |
| Comp. Ex. 1-3-5 | 1-(1b)-100-(0)-LiPO$_2$F$_2$-0.5-FB-5-Dad-0.5 | 100 | 100 |
| Ex. 1-3-3 | 1-(1b)-100-(2b)-0.12-LiPO$_2$F$_2$-0.5-FB-5-Dad-0.5 | 97 | 100 |
| Comp. Ex. 1-3-6 | 1-(1b)-100-(2b)-30-LiPO$_2$F$_2$-0.5-FB-5-Dad-0.5 | 89 | 93 |
| Comp. Ex. 1-3-7 | 1-(1b)-100-(0)-LiPO$_2$F$_2$-0.5-FB-5-PS-1 | 100 | 100 |
| Ex. 1-3-4 | 1-(1b)-100-(2b)-0.12-LiPO$_2$F$_2$-0.5-FB-5-PS-1 | 97 | 100 |
| Comp. Ex. 1-3-8 | 1-(1b)-100-(2b)-30-LiPO$_2$F$_2$-0.5-FB-5-PS-1 | 90 | 94 |
| Comp. Ex. 1-3-9 | 1-(1b)-100-(0)-LiPO$_2$F$_2$-0.5-FB-5-LiBF$_4$-1 | 100 | 100 |
| Ex. 1-3-5 | 1-(1b)-100-(2b)-0.12-LiPO$_2$F$_2$-0.5-FB-5-LiBF$_4$-1 | 97 | 100 |
| Comp. Ex. 1-3-10 | 1-(1b)-100-(2b)-30-LiPO$_2$F$_2$-0.5-FB-5-LiBF$_4$-1 | 91 | 93 |
| Comp. Ex. 1-3-11 | 1-(1b)-100-(0)-LiPO$_2$F$_2$-0.5-FB-5-LiFSI-1 | 100 | 100 |
| Ex. 1-3-6 | 1-(1b)-100-(2b)-0.12-LiPO$_2$F$_2$-0.5-FB-5-LiFSI-1 | 95 | 100 |
| Comp. Ex. 1-3-12 | 1-(1b)-100-(2b)-30-LiPO$_2$F$_2$-0.5-FB-5-LiFSI-1 | 90 | 92 |
| Comp. Ex. 1-3-13 | 1-(1b)-100-(0)-LiPO$_2$F$_2$-0.5-FB-5-LiTFSI-1 | 100 | 100 |
| Ex. 1-3-7 | 1-(1b)-100-(2b)-0.12-LiPO$_2$F$_2$-0.5-FB-5-LiTFSI-1 | 96 | 100 |
| Comp. Ex. 1-3-14 | 1-(1b)-100-(2b)-30-LiPO$_2$F$_2$-0.5-FB-5-LiTFSI-1 | 90 | 93 |
| Comp. Ex. 1-3-15 | 1-(1b)-100-(0)-LiPO$_2$F$_2$-0.5-FB-5-LiBETI-1 | 100 | 100 |
| Ex. 1-3-8 | 1-(1b)-100-(2b)-0.12-LiPO$_2$F$_2$-0.5-FB-5-LiBETI-1 | 97 | 100 |
| Comp. Ex. 1-3-16 | 1-(1b)-100-(2b)-30-LiPO$_2$F$_2$-0.5-FB-5-LiBETI-1 | 89 | 92 |
| Comp. Ex. 1-3-17 | 1-(1b)-100-(0)-LiPO$_2$F$_2$-0.5-FB-5-LiSO$_3$F-1 | 100 | 100 |
| Ex. 1-3-9 | 1-(1b)-100-(2b)-0.12-LiPO$_2$F$_2$-0.5-FB-5-LiSO$_3$F-1 | 97 | 100 |
| Comp. Ex. 1-3-18 | 1-(1b)-100-(2b)-30-LiPO$_2$F$_2$-0.5-FB-5-LiSO$_3$F-1 | 90 | 93 |

A lower value of DC resistance means better performance.
A higher value of capacity means better performance.

TABLE 89

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-3-19 | 1-(1f)-100-(0)-LiPO$_2$F$_2$-0.5-FB-5-Dod-0.5 | 100 | 100 |
| Ex. 1-3-10 | 1-(1f)-100-(2f)-0.12-LiPO$_2$F$_2$-0.5-FB-5-Dod-0.5 | 96 | 100 |
| Comp. Ex. 1-3-20 | 1-(1f)-100-(2f)-30-LiPO$_2$F$_2$-0.5-FB-5-Dod-0.5 | 88 | 91 |
| Comp. Ex. 1-3-21 | 1-(1f)-100-(0)-LiPO$_2$F$_2$-0.5-FB-5-pDod-0.5 | 100 | 100 |
| Ex. 1-3-11 | 1-(1f)-100-(2f)-0.12-LiPO$_2$F$_2$-0.5-FB-5-pDod-0.5 | 95 | 100 |

TABLE 89-continued

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-3-22 | 1-(1f)-100-(2f)-30-LiPO$_2$F$_2$-0.5-FB-5-pDod-0.5 | 89 | 88 |
| Comp. Ex. 1-3-23 | 1-(1f)-100-(0)-LIPO$_2$F$_2$-0.5-FB-5-Dod-0.5 | 100 | 100 |
| Ex. 1-3-12 | 1-(1f)-100-(2f)-0.12-LiPO$_2$F$_2$-0.5-FB-5-Dod-0.5 | 95 | 100 |
| Comp. Ex. 1-3-24 | 1-(1f)-100-(2f)-30-LiPO$_2$F$_2$-0.5-FB-5-Dod-0.5 | 88 | 90 |
| Comp. Ex. 1-3-25 | 1-(1f)-100-(0)-LiPO$_2$F$_2$-0.5-FB-5-PS-1 | 100 | 100 |
| Ex. 1-3-13 | 1-(1f)-100-(2f)-0.12-LiPO$_2$F$_2$-0.5-FB-5-PS-1 | 94 | 100 |
| Comp. Ex. 1-3-26 | 1-(1f)-100-(2f)-30-LiPO$_2$F$_2$-0.5-FB-5-PS-1 | 90 | 91 |
| Comp. Ex. 1-3-27 | 1-(1f)-100-(0)-LiPO$_2$F$_2$-0.5-FB-5-LiBF$_4$-1 | 100 | 100 |
| Ex. 1-3-14 | 1-(1f)-100-(2f)-0.12-LiPO$_2$F$_2$-0.5-FB-5-LiBF$_4$-1 | 95 | 100 |
| Comp. Ex. 1-3-28 | 1-(1f)-100-(2f)-30-LiPO$_2$F$_2$-0.5-FB-5-LiBF$_4$-1 | 88 | 89 |
| Comp. Ex. 1-3-29 | 1-(1f)-100-(0)-LiPO$_2$F$_2$-0.5-FB-5-LiFSI-1 | 100 | 100 |
| Ex. 1-3-15 | 1-(1f)-100-(2f)-0.12-LiPO$_2$F$_2$-0.5-FB-5-LiFSI-1 | 96 | 100 |
| Comp. Ex. 1-3-30 | 1-(1f)-100-(2f)-30-LiPO$_2$F$_2$-0.5-FB-5-LiFFSI-1 | 89 | 88 |
| Comp. Ex. 1-3-31 | 1-(1f)-100-(0)-LiPO$_2$F$_2$-0.5-FB-5-LiTFSI-1 | 100 | 100 |
| Ex. 1-3-16 | 1-(1 f)-100-(2f)-0.12-LiPO$_2$F$_2$-0.5-FB-5-LiTFSI-1 | 95 | 100 |
| Comp. Ex. 1-3-32 | 1-(1f)-100-(2f)-30-LiPO$_2$F$_2$-0.5-FB-5-LiTFSI-1 | 89 | 89 |
| Comp. Ex. 1-3-33 | 1-(1f)-100-(0)-LiPO$_2$F$_2$-0.5-FB-5-LiBETI-1 | 100 | 100 |
| Ex. 1-3-17 | 1-(1f)-100-(2f)-0.12-LiPO$_2$F$_2$-0.5-FB-5-LiBETI-1 | 95 | 100 |
| Comp. Ex. 1-3-34 | 1-(1f)-100-(2f)-30-LiPO$_2$F$_2$-0.5-F13-5-LiBETI-1 | 88 | 90 |
| Comp. Ex. 1-3-35 | 1-(1f)-100-(0)-LiPO$_2$F$_2$-0.5-FB-5-LiSO$_3$F-1 | 100 | 100 |
| Ex. 1-3-18 | 1-(1f)-100-(2f)-0.12-LiPO$_2$F$_2$-0.5-FB-5-LiSO$_3$F-1 | 95 | 100 |
| Comp. Ex. 1-3-36 | 1-(1f)-100-(2f)-30-LiPO$_2$F$_2$-0.5-FB-5-LiSO$_3$F-1 | 90 | 90 |

A lower value of DC resistance means better performance.
A higher value of capacity means better performance.

TABLE 90

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-3-37 | 1-(1h)-100-(0)-LiPO$_2$F$_2$-0.5-FB-5-Dod-0.5 | 100 | 100 |
| Ex. 1-3-19 | 1-(1h)-100-(2h)-0.12-LiPO$_2$F$_2$-0.5-FB-5-Dod-0.5 | 98 | 100 |
| Comp. Ex. 1-3-38 | 1-(1h)-100-(2h)-30-LiPO$_2$F$_2$-0.5-FB-5-Dod-0.5 | 91 | 94 |
| Comp. Ex. 1-3-39 | 1-(1h)-100-(0)-LiPO$_2$F$_2$-0.5-FB-5-pDod-0.5 | 100 | 100 |
| Ex. 1-3-20 | 1-(1h)-100-(2h)-0.12-LiPO$_2$F$_2$-0.5-FB-5-pDod-0.5 | 97 | 100 |
| Comp. Ex. 1-3-40 | 1-(1h)-100-(2h)-30-LiPO$_2$F$_2$-0.5-FB-5-pDod-0.5 | 90 | 93 |
| Comp. Ex. 1-3-41 | 1-(1h)-100-(0)-LiPO$_2$F$_2$-0.5-FB-5-Dad-0.5 | 100 | 100 |
| Ex. 1-3-21 | 1-(1h)-100-(2h)-0.12-LiPO$_2$F$_2$-0.5-FB-5-Dad-0.5 | 97 | 100 |
| Comp. Ex. 1-3-42 | 1-(1h)-100 -(2h)-30-LiPO$_2$F$_2$-0.5-FB-5-Dad-0.5 | 90 | |

TABLE 90-continued

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-3-43 | 1-(1h)-100-(0)-LiPO$_2$F$_2$-0.5-FB-5-PS-1 | 100 | 100 |
| Ex. 1-3-22 | 1-(1h)-100-(2h)-0.12-LiPO$_2$F$_2$-0.5-FB-5-PS-1 | 97 | 100 |
| Comp. Ex. 1-3-44 | 1-(1h)-100-(2h)-30-LiPO$_2$F$_2$-0.5-FB-5-PS-1 | 92 | 95 |
| Comp. Ex. 1-3-45 | 1-(1h)-100-(0)-LiPO$_2$F$_2$-0.5-FB-5-LiBF$_4$-1 | 100 | 100 |
| Ex. 1-3-23 | 1-(1h)-100-(2h)-0.12-LiPO$_2$F$_2$-0.5-FB-5-LiBF$_4$-1 | 97 | 100 |
| Comp. Ex. 1-3-46 | 1-(1h)-100-(2h)-30-LiPO$_2$F$_2$-0.5-FB-5-LiBF$_4$-1 | 91 | 94 |
| Comp. Ex. 1-3-47 | 1-(1h)-100-(0)-LiPO$_2$F$_2$-0.5-FB-5-LiFSI-1 | 100 | 100 |
| Ex. 1-3-24 | 1-(1h)-100-(2h)-0.12-LiPO$_2$F$_2$-0.5-FB-5-LiFSI-1 | 97 | 100 |
| Comp. Ex. 1-3-48 | 1-(1h)-100-(2h)-30-LiPO$_2$F$_2$-0.5-FB-5-LiFSI-1 | 92 | 94 |
| Comp. Ex. 1-3-49 | 1-(2h)-100-(0)-LiPO$_2$F$_2$-0.5-FB-5-LiFSI-1 | 100 | 100 |
| Ex. 1-3-25 | 1-(1h)-100-(2h)-0.12-LiPO$_2$F$_2$-0.5-FB-5-LiTFSI-1 | 96 | 100 |
| Comp. Ex. 1-3-50 | 1-(1h)-100-(2h)-30-LiPO$_2$F$_2$-0.5-FB-5-LiTFSI-1 | 92 | 95 |
| Comp. Ex. 1-3-51 | 1-(1h)-100-(0)-LiPO$_2$F$_2$-0.5-FB-5-LiBETI-1 | 100 | 100 |
| Ex. 1-3-26 | 1-(1h)-100-(2h)-0.12-LiPO$_2$F$_2$-0.5-FB-6-LiBETI-1 | 97 | 100 |
| Comp. Ex. 1-3-52 | 1-(1h)-100-(2h)-30-LiPO$_2$F$_2$-0.5-FB-5-LiBETI-1 | 90 | 92 |
| Comp. Ex. 1-3-53 | 1-(1h)-100-(0)-LiPO$_2$F$_2$-0.5-FB-5-LiSO$_3$F-1 | 100 | 100 |
| Ex. 1-3-27 | 1-(1h)-100-(2h)-0.12-LiPO$_2$F$_2$-0.5-FB-5-LiSO$_3$F-1 | 97 | 100 |
| Comp. Ex. 1-3-54 | 1-(1h)-100-(2h)-30-LiPO$_2$F$_2$-0.5-FB-5-LiSO$_3$F-1 | 91 | 94 |

A lower value of DC resistance means better performance.
A higher value of capacity means better performance.

TABLE 91

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-3-55 | 1-(1j)-100-(0)-LiPO$_2$F$_2$-0.5-FB-5-Dod-0.5 | 100 | 100 |
| Ex. 1-3-28 | 1-(1j)-100-(2j)-0.12-LiPO$_2$F$_2$-0.5-FB-5-Dod-0.5 | 95 | 100 |
| Comp. Ex. 1-3-56 | 1-(1j)-100-(2j)-30-LiPO$_2$F$_3$-0.5-FB-5-Dod-0.5 | 87 | 88 |
| Comp. Ex. 1-3-57 | 1-(1j)-100-(0)-LiPO$_2$F$_2$-0.5-FB-5-pDod-0.5 | 100 | 100 |
| Ex. 1-3-29 | 1-(1j)-100-(2j)-0.12-LiPO$_2$F$_2$-0.5-FB-5-pDod-0.5 | 95 | 100 |
| Comp. Ex. 1-3-58 | 1-(1j)-100-(2j)-30-LiPO$_2$F$_2$-0.5-FB-5-pDod-0.5 | 86 | 87 |
| Comp. Ex. 1-3-59 | 1-(1j)-100-(0)-LiPO$_2$F$_2$-0.5-FB-5-Dad-0.5 | 100 | 100 |
| Ex. 1-3-30 | 1-(1j)-100-(2j)-0.12-LiPO$_2$F$_2$-0.5-FB-5-Dad-0.5 | 92 | 100 |
| Comp. Ex. 1-3-60 | 1-(1j)-100-(2j)-30-LiPO$_2$F2-0.5-FB-5-Dad-0.5 | 83 | 89 |
| Comp. Ex. 1-3-61 | 1-(1j)-100-(0)-LiPO$_2$F$_2$-0.5-FB-5-PS-1 | 100 | 100 |
| Ex. 1-3-31 | 1-(1j)-100-(2j)-0.12-LiPO$_2$F$_2$-0.5-FB-5-PS-1 | 91 | 100 |
| Comp. Ex. 1-3-62 | 1-(1j)-100-(2j)-30-LiPO$_2$F$_2$-0.5-FB-5-PS-1 | 85 | 86 |
| Comp. Ex. 1-3-63 | 1-(1j)-100-(0)-LiPO$_2$F$_3$-0.5-FB-5-LiBF$_4$-1 | 100 | 100 |
| Ex. 1-3-32 | 1-(1j)-100-(2j)-0.12-LiPO$_2$F$_2$-0.5-FB-5-LiBF$_4$-1 | 92 | 100 |

TABLE 91-continued

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-3-64 | 1-(ii)-100-(2j)-30-LiPO$_2$F$_2$-0.5-FB-5-LiBF$_4$-1 | 86 | 88 |
| Comp. Ex. 1-3-65 | 1-(1j)-100-(0)-LiPO$_2$F$_2$-0.5-FB-5-LiFSI-1 | 100 | 100 |
| Ex. 1-3-33 | 1-(1j)-100-(2_0-0.12-LiPO$_2$F$_2$-0.5-FB-5-LiFSI-1 | 94 | 100 |
| Comp. Ex. 1-3-66 | 1-(1j)-100-(2j)-30-LiPO$_2$F$_2$-0.5-FB-5-LiFSI-1 | 84 | 87 |
| Comp. Ex. 1-3-67 | 1-(1j)-100-(0)-LiPO$_2$F$_2$-0.5-FB-5-LiTFSI-1 | 100 | 100 |
| Ex. 1-3-34 | 1-(1j)-100-(2j)-0.12-LiPO$_2$F$_2$-0.5-FB-5-LiTFSI-1 | 92 | 100 |
| Comp. Ex. 1-3-68 | 1-(1j)-100-(2j)-30-LiPO$_2$F$_2$-0.5-FB-5-LiTFSI-1 | 83 | 88 |
| Comp. Ex. 1-3-69 | 1-(1j)-100-(0)-LiPO$_2$F$_2$-0.5-FB-5-LiBETI-1 | 100 | 100 |
| Ex. 1-3-35 | 1-(1j)-100-(2)-0.12-LiPO$_2$F$_2$-0.5-FB-5-LiBETI-1 | 91 | 100 |
| Comp. Ex. 1-3-70 | 1-(0-100-(2j)-30-LiPO$_3$F$_2$-0.5-FB-5-LiBETI-1 | 81 | 87 |
| Comp. Ex. 1-3-71 | 1-(0-100-(0)-LiPO$_2$F$_2$-0.5-FB-5-LiSO$_3$F-1 | 100 | 100 |
| Ex. 1-3-36 | 1-(1j)-100-(2j)-0.12-LiPO$_2$F$_2$-0.5-FB-5-LiSO$_3$F-1 | 94 | 100 |
| Comp. Ex. 1-3-72 | 1-(1j)-100-(2j)-30-LiPO$_2$F$_2$-0.5-FB-5-LiSO$_3$F-1 | 88 | 89 |

A lower value of DC resistance means better performance.
A higher value of capacity means better performance.

TABLE 92

| | Nonaqueous Electrolyte Solution No | DC Resistance (Relative Value) After Initial Charging and Discharging at −20° C. | Capacity (Relative Value) After 400 Cycles at 50° C. |
|---|---|---|---|
| Comp. Ex. 1-4-1 | 1-(1b)-100-(0)-LiPO$_2$F$_2$-0.5-FB-5-Dod-0.5-PS-0.5 | 100 | 100 |
| Ex. 1-4-1 | 1-(1b)-100-(2b)-0.12-LiPO$_2$F$_2$-0.5-FB-5-Dod-0.5-PS-0.5 | 98 | 100 |
| Comp. Ex. 1-4-2 | 1-(1b)-100-(2b)-30-LiPO$_2$F$_2$-0.5-FB-5-Dod-0.5-PS-0.5 | 91 | 93 |
| Comp. Ex. 1-4-3 | 1-(1b)-100-(0)-LiPO$_2$F$_2$-0.5-FB-5-Dod-0.5-LiBF$_4$-0.5 | 100 | 100 |
| Ex. 1-4-2 | 1-(1b)-100-(2b)-0.12-LiPO$_2$F$_2$-0.5-FB-5-Dod-0.5-LiBF$_4$-0.5 | 97 | 100 |
| Comp. Ex. 1-4-4 | 1-(1b)-100-(2b)-30-LiPO$_2$F$_2$-0.5-FB-5-Dod-0.5-LiBF$_4$-0.5 | 91 | 93 |
| Comp. Ex. 1-4-5 | 1-(1b)-100-(0)-LiPO$_2$F$_2$-0.5-FB-5-Dod-0.5-LiFSI-0.5 | 100 | 100 |
| Ex. 1-4-3 | 1-(1b)-100-(2b)-0.12-LiPO$_2$F$_2$-0.5-FB-5-Dod-0.5-LiFSI-0.5 | 97 | 100 |
| Comp. Ex. 1-4-6 | 1-(1b)-100-(2b)-30-LiPO$_2$F$_2$-0.5-FB-5-Dod-0.5-LiFSI-0.5 | 91 | 92 |
| Comp. Ex. 1-4-7 | 1-(1b)-100-(0)-LiPO$_2$F$_2$-0.5-FB-5-Dod-0.5-LiTFSI-0.5 | 100 | 100 |
| Ex. 1-4-4 | 1-(1b)-100-(2b)-0.12-LiPO$_2$F$_2$-0.5-FB-5-Dod-0.5-LiTFSI-0.5 | 98 | 100 |
| Comp. Ex. 1-4-8 | 1-(1b)-100-(2b)-30-LiPO$_2$F$_2$-0.5-FB-5-Dod-0.5-LiTFSI-0.5 | 93 | 93 |
| Comp. Ex. 1-4-9 | 1-(1b)-100-(0)-LiPO$_2$F$_2$-0.5-FB-5-Dod-0.5-LiBETI-0.5 | 100 | 100 |
| Ex. 1-4-5 | 1-(1b)-100-(2b)-0.12-LiPO$_2$F$_2$-0.5-FB-5-Dod-0.5-LiBETI-0.5 | 97 | 100 |
| Comp. Ex. 1-4-10 | 1-(1b)-100-(2b)-30-LiPO$_2$F$_2$-0.5-FB-5-Dod-0.5-LiBETI-0.5 | 90 | 92 |
| Comp. Ex. 1-4-11 | 1-(1b)-100-(0)-LiPO$_2$F$_2$-0.5-FB-5-Dod-0.5-LiSO$_3$F-0.5 | 100 | 100 |

TABLE 92-continued

| | Nonaqueous Electrolyte Solution No | DC Resistance (Relative Value) After Initial Charging and Discharging at −20° C. | Capacity (Relative Value) After 400 Cycles at 50° C. |
|---|---|---|---|
| Ex. 1-4-6 | 1-(1b)-100-(2b)-0.12-LiPO$_2$F$_2$-0.5-FB-5-Dod-0.5-LiSO$_3$F-0.5 | 97 | 100 |
| Comp. Ex. 1-4-12 | 1-(1b)-100-(2b)-30-LiPO$_2$F$_2$-0.5-FB-5-Dod-0.5-LiSO$_3$F-0.5 | 90 | 94 |

A lower value of DC resistance means better performance.
A higher value of capacity means better performance.

TABLE 93

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-4-13 | 1-(1f)-100-(0)-LiPO$_2$F$_2$-0.5-FB-5-Dod-0.5-PS-0.5 | 100 | 100 |
| Ex. 1-4-7 | 1-(1f)-100-(2f)-0.12-LiPO$_2$F$_2$-0.5-FB-5-Dod-0.5-PS-0.5 | 95 | 100 |
| Comp. Ex. 1-4-14 | 1-(1f)-100-(2f)-30-LiPO$_2$F$_2$-0.5-FB-5-Dod-0.5-PS-0.5 | 88 | 90 |
| Comp. Ex. 1-4-15 | 1-(1f)-100-(0)-LiPO$_2$F$_2$-0.5-FB-5-Dod-0.5-LiBF$_4$-0.5 | 100 | 100 |
| Ex. 1-4-8 | 1-(1f)-100-(2f)-0.12-LiPO$_2$F$_2$-0.5-FB-5-Dod-0.5-LiBF$_4$-0.5 | 96 | 100 |
| Comp. Ex. 1-4-16 | 1-(1f)-100-(2f)-30-LiPO$_2$F$_2$-0.5-FB-5-Dod-0.5-LiBF$_4$-0.5 | 89 | 91 |
| Comp. Ex. 1-4-17 | 1-(1f)-100-(0)-LiPO$_2$F$_2$-0.5-FB-5-Dod-0.5-LiFSI-0.5 | 100 | 100 |
| Ex. 1-4-9 | 1-(1f)-100-(2f)-0.12-LiPO$_2$F$_2$-0.5-FB-5-Dod-0.5-LiFSI-0.5 | 95 | 100 |
| Comp. Ex. 1-4-18 | 1-(1f)-100-(2f)-30-LiPO$_2$F$_2$-0.5-FB-5-Dod-0.5-LiFSI-0.5 | 86 | 90 |
| Comp. Ex. 1-4-19 | 1-(1f)-100-(0)-LiPO$_2$F$_2$-0.5-FB-5-Dod-0.5-LiTFSI-0.5 | 100 | 100 |
| Ex. 1-4-10 | 1-(1f)-100-(2f)-0.12-LiPO$_2$F$_2$-0.5-FB-5-Dod-0.5-LiTFSI-0.5 | 93 | 100 |
| Comp. Ex. 1-4-20 | 1-(1f)-100-(2f)-30-LiPO$_2$F$_2$-0.5-FB-5-Dod-0.5-LiTFSI-0.5 | 89 | 92 |
| Comp. Ex. 1-4-21 | 1-(1f)-100-(0)-LiPO$_2$F$_2$-0.5-FB-5-Dod-0.5-LiBETI-0.5 | 100 | 100 |
| Ex. 1-4-11 | 1-(1f)-100-(2f)-0.12-LiPO$_2$F$_2$-0.5-FB-5-Dod-0.5-LiBETI-0.5 | 95 | 100 |
| Comp. Ex. 1-4-22 | 1-(1f)-100-(2f)-30-LiPO$_2$F$_2$-0.5-FB-5-Dod-0.5-LiBETI-0.5 | 90 | 91 |
| Comp. Ex. 1-4-23 | 1-(1f)-100-(0)-LiPO$_2$F$_2$-0.5-FB-5-Dod-0.5-LiSO$_3$F-0.5 | 100 | 100 |
| Ex. 1-4-12 | 1-(1f)-100-(2f)-0.12-LiPO$_2$F$_2$-0.5-FB-5-Dod-0.5-LiSO$_3$F-0.5 | 94 | 100 |
| Comp. Ex. 1-4-24 | 1-(1f)-100-(2f)-30-LiPO$_2$F$_2$-0.5-FB-5-Dod-0.5-LiSO$_3$F-0.5 | 88 | 91 |

A lower value of DC resistance means better performance.
A higher value of capacity means better performance.

TABLE 94

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-4-25 | 1-(1h)-100-(0)-LiPO$_2$F$_2$-0.5-FB-5-Dod-0.5-PS-0.5 | 100 | 100 |
| Ex. 1-4-13 | 1-(1h)-100-(2h)-0.12-LiPO$_2$F$_2$-0.5-FB-5-Dod-0.5-PS-0.5 | 96 | 100 |
| Comp. Ex. 1-4-26 | 1-(1h)-100-(2h)-30-LiPO$_2$F$_2$-0.5-FB-5-Dod-0.5-PS-0.5 | 87 | 92 |

TABLE 94-continued

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-4-27 | 1-(1h)-100-(0)-LiPO$_2$F$_2$-0.5-FB-5-Dod-0.5-LiBF$_4$-0.5 | 100 | 100 |
| Ex. 1-4-14 | 1-(1h)-100-(2h)-0.12-LiPO$_2$F$_2$-0.5-FB-5-Dod-0.5-LiBF$_4$-0.5 | 96 | 100 |
| Comp. Ex. 1-4-28 | 1-(1h)-100-(2h)-30-LiPO$_2$F$_2$-0.5-FB-5-Dod-0.5-LiBF$_4$-0.5 | 90 | 93 |
| Comp. Ex. 1-4-29 | 1-(1h)-100-(0)-LiPO$_2$F$_2$-0.5-FB-5-Dod-0.5-LiFSI-0.5 | 100 | 100 |
| Ex. 1-4-15 | 1-(1h)-100-(2h)-0.12-LiPO$_2$F$_2$-0.5-FB-5-Dod-0.5-LiFSI-0.5 | 96 | 100 |
| Comp. Ex. 1-4-30 | 1-(1h)-100-(2h)-30-LiPO$_2$F$_2$-0.5-F13-5-Dod-0.5-LiFSI-0.5 | 90 | 91 |
| Comp. Ex. 1-4-31 | 1-(1h)-100-(0)-LiPO$_2$F$_2$-0.5-FB-5-Dod-0.5-LiTFSI-0.5 | 100 | 100 |
| Ex. 1-4-16 | 1-(1h)-100-(2h)-0.12-LiPO$_2$F$_2$-0.5-FB-5-Dod-0.5-LiTFSI-0.5 | 94 | 100 |
| Comp. Ex. 1-4-32 | 1-(1h)-100-(2h)-30-LiPO$_2$F$_2$-0.5-FB-5-Dod-0.5-LiTFSI-0.5 | 91 | 92 |
| Comp. Ex. 1-4-33 | 1-(1h)-100-(0)-LiPO$_2$F$_2$-0.5-FB-5-Dod-0.5-LiBETI-0.5 | 100 | 100 |
| Ex. 1-4-17 | 1-(1h)-100-(2h)-0.12-LiPO$_2$F$_2$-0.5-FB-5-Dod-0.5-LiBETI-0.5 | 95 | 100 |
| Comp. Ex. 1-4-34 | 1-(1h)-100-(2h)-30-LiPO$_2$F$_2$-0.5-FB-5-Dod-0.5-LiBETI-0.5 | 91 | 91 |
| Comp. Ex. 1-4-35 | 1-(1h)-100-(0)-LiPO$_2$F$_2$-0.5-FB-5-Dod-0.5-LiSO$_3$F-0.5 | 100 | 100 |
| Ex. 1-4-18 | 1-(1h)-100-(2h)-0.12-LiPO$_2$F$_2$-0.5-FB-5-Dod-0.5-LiSO$_3$F-0.5 | 96 | 100 |
| Comp. Ex. 1-4-36 | 1-(1h)-100-(2h)-30-LiPO$_2$F$_2$-0.5-FB-5-Dod-0.5-LiSO$_3$F-0.5 | 92 | 91 |

A lower value of DC resistance means better performance.
A higher value of capacity means better performance.

TABLE 95

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-4-37 | 1-(1j)-100-(0)-LiPO$_2$F$_2$-0.5-FB-5-Dod-0.5-PS-0.5 | 100 | 100 |
| Ex. 1-4-19 | 1-(1j)-100-(2j)-0.12-LiPO$_2$F$_2$-0.5-FB-5-Dod-0.5-PS-0.5 | 93 | 100 |
| Comp. Ex. 1-4-38 | 1-(1j)-100-(2j)-30-LiPO$_2$F$_2$-0.5-FB-5-Dod-0.5-PS-0.5 | 82 | 90 |
| Comp. Ex. 1-4-39 | 1-(1j)-100-(0)-LiPO$_2$F$_2$-0.5-FB-5-Dod-0.5-LiBF$_4$-0.5 | 100 | 100 |
| Ex. 1-4-20 | 1-(1j)-100-(2j)-0.12-LiPO$_2$F$_2$-0.5-FB-5-Dod-0.5-LiBF$_4$-0.5 | 91 | 100 |
| Comp. Ex. 1-4-40 | 1-(1j)-100-(2j)-30-LiPO$_2$F$_2$-0.5-FB-5-Dod-0.5-LiBF$_4$-0.5 | 81 | 89 |
| Comp. Ex. 1-4-41 | 1-(1j)-100-(0)-LiPO$_2$F$_2$-0.5-FB-5-Dod-0.5-LiFSI-0.5 | 100 | 100 |
| Ex. 1-4-21 | 1-(1j)-100-(2j)-0.12-LiPO$_2$F$_2$-0.5-FB-5-Dod-0.5-LiFSI-0.5 | 93 | 100 |
| Comp. Ex. 1-4-42 | 1-(1j)-100-(2j)-30-LiPO$_2$F$_2$-0.5-FB-5-Dod-0.5-LiFSI-0.5 | 84 | 90 |
| Comp. Ex. 1-4-43 | 1-(1j)-100-(0)-LiPO$_2$F$_2$-0.5-FB-5-Dod-0.5-LiTFSI-0.5 | 100 | 100 |
| Ex. 1-4-22 | 1-(1j)-100-(2j)-0.12-LiPO$_2$F$_2$-0.5-FB-5-Dod-0.5-LiTFSI-0.5 | 92 | 100 |
| Comp. Ex. 1-4-44 | 1-(1j)-100-(2j)-30-LiPO$_2$F$_2$-0.5-FB-5-Dod-0.5-LiTFSI-0.5 | 85 | 88 |
| Comp. Ex. 1-4-45 | 1-(1j)-100-(0)-LiPO$_2$F$_2$-0.5-FB-5-Dod-0.5-LiBETI-0.5 | 100 | 100 |
| Ex. 1-4-23 | 1-(1j)-100-(2j)-0.12-LiPO$_2$F$_2$-0.5-FB-5-Dod-0.5-LiBETI-0.5 | 92 | 100 |
| Comp. Ex. 1-4-46 | 1-(1j)-100-(2j)-30-LiPO$_2$F$_2$-0.5-FB-5-Dod-0.5-LiBETI-0.5 | 82 | 89 |

TABLE 95-continued

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-4-47 | 1-(1j)-100-(0)-LiPO$_2$F$_2$-0.5-FB-5-Dod-0.5-LiSO$_2$F-0.5 | 100 | 100 |
| Ex. 1-4-24 | 1-(1j)-100-(2j)-0.12-LiPO$_2$F$_2$-0.5-FB-5-Dod-0.5-LiSO$_3$F-0.5 | 91 | 100 |
| Comp. Ex. 1-4-48 | 1-(1j)-100-(2j)-30-LiPO$_2$F$_2$-0.5-FB-5-Dod-0.5-LiSO$_3$F-0.5 | 81 | 90 |

A lower value of DC resistance means better performance.
A higher value of capacity means better performance.

TABLE 96

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-5-1 | 1-(1b)-100-(0)-LiPO$_2$F$_2$-0.5-FB-5-Dod-0.5-PS-0.2-LiFSI-0.3 | 100 | 100 |
| Ex. 1-5-1 | 1-(1b)-100-(2b)-0.12-LiPO$_2$F$_2$-0.5-FB-5-Dod-0.5-PS-0.2-LiFSI-0.3 | 96 | 100 |
| Comp. Ex. 1-5-2 | 1-(1b)-100-(2b)-30-LiPO$_2$F$_2$-0.5-FB-5-Dod-0.5-PS-0.2-LiFSI-0.3 | 87 | 91 |
| Comp. Ex. 1-5-3 | 1-(1b)-100-(0)-LiPO$_2$F$_2$-0.5-FB-5-Dod-0.5-PS-0.2-LiTFSI-0.3 | 100 | 100 |
| Ex. 1-5-2 | 1-(1b)-100-(2b)-0.12-LiPO$_2$F$_2$-0.5-FB-5-Dod-0.5-PS-0.2-LiTFSI-0.3 | 94 | 100 |
| Comp. Ex. 1-5-4 | 1-(1b)-100-(2b)-30-LiPO$_2$F$_2$-0.5-FB-5-Dod-0.5-PS-0.2-LiTFSI-0.3 | 91 | 88 |
| Camp. Ex. 1-5-5 | 1-(1b)-100-(0)-LiPO$_2$F$_2$-0.5-FB-5-Dod-0.5-PS-0.2-LiBETI-0.3 | 100 | 100 |
| Ex. 1-5-3 | 1-(1b)-100-(2b)-0.12-LiPO$_2$F$_2$-0.5-FB-5-Dod-0.5-PS-0.2-LiBETI-0.3 | 96 | 100 |
| Comp. Ex. 1-5-6 | 1-(1b)-100-(2b)-30-LiPO$_2$F$_2$-0.5-FB-5-Dod-0.5-PS-02-LiBETI-0.3 | 89 | 90 |
| Comp. Ex. 1-5-7 | 1-(1b)-100-(0)-LiPO$_2$F$_2$-0.5-FB-5-Dod-0.5-PS-0.2-LiSO$_3$F-0.3 | 100 | 100 |
| Ex. 1-5-4 | 1-(1b)-100-(2b)-0.12-LiPO$_2$F$_2$-0.5-FB-5-Dod-0.5-PS-0.2-LiSO$_3$F-0.3 | 95 | 100 |
| Comp. Ex. 1-5-8 | 1-(1b)-100-(2b)-30-LiPO$_2$F$_2$-0.5-FB-5-Dod-0.5-PS-0.2-LiSO$_3$F-0.3 | 91 | 91 |
| Comp. Ex. 1-5-9 | 1-(1b)-100-(0)-LiPO$_2$F$_2$-0.5-FB-5-Dod-0.5-PS-0.2-LiBF$_4$-0.3 | 100 | 100 |
| Ex. 1-5-5 | 1-(1b)-100-(2b)-0.12-LiPO$_2$F$_2$-0.5-93-5-Dod-0.5-PS-0.2-LiBF$_4$-0.3 | 96 | 100 |
| Comp. Ex. 1-5-10 | 1-(1b)-100-(2b)-30-LiPO$_2$F$_2$-0.5-FB-5-Dod-0.5-PS-0.2-LiBF$_4$-0.3 | 90 | 89 |
| Comp. Ex. 1-5-11 | 1-(1b)-100-(0)-LiPO$_2$F$_2$-0.5-FB-5-pDod-0.5-PS-0.2-LiFSI-0.3 | 100 | 100 |
| Ex. 1-5-6 | 1-(1b)-100-(2b)-0.12-LiPO$_2$F$_2$-0.5-FB-5-pDod-0.5-PS-0.2-LiFSI-0.3 | 96 | 100 |
| Comp. Ex. 1-5-12 | 1-(1b)-100-(2b)-30-LiPO$_2$F$_2$-0.5-FB-5-pDod-0.5-PS-0.2-LiFSI-0.3 | 90 | 88 |
| Comp. Ex. 1-5-13 | l-(1b)-100-(0)-LiPO$_2$F$_2$-0.5-FB-5-Dad-0.5-PS-0.2-LiTFSI-0.3 | 100 | 100 |
| Ex. 1-5-7 | 1-(1b)-100-(2b)-0.12-LiPO$_2$F$_2$-0.5-FB-5-Dad-0.5-PS-0.2-LiTFSI-0.3 | 96 | 100 |
| Comp. Ex. 1-5-14 | 1-(1b)-100-(2b)-30-LiPO$_2$F$_2$-0.5-FB-5-Dad-0.5-PS-0.2-LiTFSI-0.3 | 89 | 89 |

A lower value of DC resistance means better performance.
A higher value of capacity means better performance.

TABLE 97

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-5-15 | 1-(1f)-100-(0)-LiPO$_2$F$_2$-0.5-FB-5-Dod-0.5-PS-0.2-LiFSI-0.3 | 100 | 100 |
| Ex. 1-5-8 | 1-(1f)-100-(2f)-0.12-LiPO$_2$F$_2$-0.5-FB-5-Dod-0.5-PS-0.2-LiFSI-0.3 | 93 | 100 |
| Comp. Ex. 1-5-16 | 1-(1f)-100-(2f)-30-LiPO$_2$F$_2$-0.5-FB-5-Dod-0.5-PS-0.2-LiFSI-0.3 | 84 | 90 |
| Comp. Ex. 1-5-17 | 1-(1f)-100-(0)-LiPO$_2$F$_2$-0.5-FB-5-Dod-0.5-PS-0.2-LiTFSI-0.3 | 100 | 100 |
| Ex. 1-5-9 | 1-(1f)-100-(2f)-0.12-LiPO$_2$F$_2$-0.5-FB-5-Dod-0.5-PS-0.2-LiTFSI-0.3 | 92 | 100 |
| Comp. Ex. 1-5-18 | 1-(1f)-100-(2f)-30-LiPO$_2$F$_2$-0.5-FB-5-Dod-0.5-PS-0.2-LiTFSI-0.3 | 81 | 88 |
| Comp. Ex. 1-5-19 | 1-(1f)-100-(0)-LiPO$_2$F$_2$-0.5-FB-5-Dod-0.5-PS-0.2-LiBETI-0.3 | 100 | 100 |
| Ex. 1-5-10 | I -(1f)-100-(2f)-0.12-LiPO$_2$F$_2$-0.5-FB-5-Dod-0.5-PS-0.2-LiBETI-0.3 | 83 | 100 |
| Comp. Ex. 1-5-20 | 1-(1f)-100-(2f)-30-LiPO$_2$F$_2$-0.5-FB-5-Dod-0.5-PS-0.2-LiBETI-0.3 | 83 | 89 |
| Comp. Ex. 1-5-21 | 1-(1f)-100-(0)-LiPO$_2$F$_2$-0.5-FB-5-Dod-0.5-PS-0.2-LiSO$_3$F-0.3 | 100 | 100 |
| Ex. 1-5-11 | 1-(1f)-1110-(2f)-0.19-LiPO$_2$F$_2$-0.5-FB-5-Dod-0.5-PS-0.2-LiSO$_3$F-0.3 | 94 | 100 |
| Comp. Ex. 1-5-22 | 1-(1f)-100-(2f)-30-LiPO$_2$F$_2$-0.5-FB-5-Dod-0.5-PS-0.2-LiSO$_3$F-0.3 | 86 | 90 |
| Camp. Ex. 1-5-23 | 1-(1f)-100-(0)-LiPO$_2$F$_2$-0.5-FB-5-Dod-0.5-PS-0.2-LiBF$_4$-0.3 | 100 | 100 |
| Ex. 1-5-12 | 1-(1f)-100-(2f)-0.12-LiPO$_2$F$_2$-0.5-FB-5-Dod-0.5-PS-0.2-LiBF$_4$-0.3 | 92 | 100 |
| Comp. Ex. 1-5-24 | 1-(1f)-100-(2f)-30-LiPO$_2$F$_2$-0.5-FB-5-Dod-0.5-PS-0.2-LiBF$_4$-0.3 | 81 | 90 |
| Comp. Ex. 1-5-25 | 1-(1f)-100-(0)-LiPO$_2$F$_2$-0.5-FB-5-pDod-0.5-PS-0.2-LiFSI-0.3 | 100 | 100 |
| Ex. 1-5-13 | 1-(1f)-100-(2f)-0.12-LiPO$_2$F$_2$-0.5-FB-5-pDod-0.5-PS-0.2-LiFSI-0.3 | 93 | 100 |
| Comp. Ex. 1-5-26 | 1-(1f)-100-(2f)-30-LiPO$_2$F$_2$-0.5-FB-5-pDod-0.5-PS-0.2-LiFSI-0.3 | 83 | 88 |
| Comp. Ex. 1-5-27 | I -(1f)-100-(0)-LiPO$_2$F$_2$-0.5-FB-5-Dad-0.5-PS-0.2-LiTFSI-0.3 | 100 | 100 |
| Ex. 1-5-14 | 1-(1f)-100-(2f)-0.12-LiPO$_2$F$_2$-0.5-FB-5-Dad-0.5-PS-0.2-LiTFSI-0.3 | 92 | 100 |
| Comp. Ex. 1-5-28 | 1-(1f)-100-(2f)-30-LiPO$_2$F$_2$-0.5-FB-5-Dad-0.5-PS-0.2-LiTFSI-0.3 | 83 | 90 |

A lower value of DC resistance means better performance.
A higher value of capacity means better performance.

TABLE 98

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-5-29 | 1-(1h)-100-(0)-LiPO$_2$F$_2$-0.5-FB-5-Dod-0.5-PS-0.2-LiFSI-0.3 | 100 | 100 |
| Ex. 1-5-15 | 1-(1h)-100-(2h)-0.12-LiPO$_2$F$_2$-0.5-FB-5-Dod-0.5-PS-0.2-LiFSI-0.3 | 97 | 100 |
| Comp. Ex. 1-5-30 | 1-(1h)-100-(2h)-30-LiPO$_2$F$_2$-0.5-FB-5-Dod-0.5-PS-0.2-LiFSI-0.3 | 90 | 93 |
| Comp. Ex. 1-5-31 | 1-(1h)-100-(0)-LiPO$_2$F$_2$-0.5-FB-5-Dod-0.5-PS-0.2-LiTFSI-0.3 | 100 | 100 |
| Ex. 1-5-16 | 1-(1h)-100-(2h)-0.12-LiPO$_2$F$_2$-0.5-FB-5-Dod-0.5-PS-0.2-LiTFSI-0.3 | 95 | 100 |
| Comp. Ex. 1-5-32 | 1-(1h)-100-(2h)-30- LiPO$_2$F$_2$-0.5-FB-5-Dod-0.5-PS-0.2-LiTFSI-0.3 | 90 | 95 |
| Comp. Ex. 1-5-33 | 1-(1h)-100-(0)-LiPO$_2$F$_2$-0.5-FB-5-Dod-0.5-PS-0.2-LiBETI-0.3 | 100 | 100 |
| Ex. 1-5-17 | 1-(1h)-100-(2h)-0.12-LiPO$_2$F$_2$-0.5-FB-5-Dod-0.5-PS-0.2-Li8ETI-0.3 | 95 | 100 |
| Comp. Ex. 1-5-34 | 1-(1h)-100-(2h)-30-LiPO$_2$F$_2$-0.5-FB-5-Dod-0.5-PS-0.2-LiBETI-0.3 | 89 | 93 |

TABLE 98-continued

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-5-35 | 1-(1h)-100-(0)-LiPO$_2$F$_2$-0.5-FB-5-Dod-0.5-PS-0.2-LiSO$_3$F-0.3 | 100 | 100 |
| Ex. 1-5-18 | 1-(1h)-100-(2h)-0.12-LiPO$_2$F$_2$-0.5-FB-5-Dod-0.5-PS-0.2-LiSO$_3$F-0.3 | 95 | 100 |
| Comp. Ex. 1-5-36 | 1-(1h)-100-(2h)-30-LiPO$_2$F$_2$-0.5-F6-5-Dod-0.5-PS-0.2-LiSO$_3$F-0.3 | 90 | 93 |
| Comp. Ex. 1-5-37 | 1-(1h)-100-(0)-LiPO$_2$F$_2$-0.5-FB-5-Dod-0.5-PS-0.2-LiBF$_4$-0.3 | 100 | 100 |
| Ex. 1-5-19 | 1-(1h)-100-(2h)-0.12-LiPO$_2$F$_2$-0.5-FB-5-Dod-0.5-PS-0.2-LiBF$_4$-0.3 | 95 | 100 |
| Comp. Ex. 1-5-38 | 1-(1h)-100-(2h)-30-LiPO$_2$F$_2$-0.5-FB-5-Dod-0.5-PS-0.2-LiBF$_4$-0.3 | 91 | 92 |
| Comp. Ex. 1-5-39 | 1-(1h)-100-(0)-LiPO$_2$F$_2$-0.5-FB-5-pDod-0.5-PS-0.2-LiFSI-0.3 | 100 | 100 |
| Ex. 1-5-20 | 1-(1h)-100-(2h)-0.12-LiPO$_2$F$_2$-0.5-FB-5-pDod-0.5-PS-0.2-LiFSI-0.3 | 96 | 100 |
| Comp. Ex. 1-5-40 | 1-(1h)-100-(2h)-30-LiPO$_2$F$_2$-0.5-FB-5-pDod-0.5-PS-0.2-LiFSI-0.3 | 92 | 92 |
| Comp. Ex. 1-5-41 | 1-(1h)-100-(0)-LiPO$_2$F$_2$-0.5-FB-5-Dad-0.5-PS-0.2-LiTFSI-0.3 | 100 | 100 |
| Ex. 1-5-21 | 1-(1h)-100-(2h)-0.12-LiPO$_2$F$_2$-0.5-FB-5-Dad-0.5-PS-0.2-LiTFSI-0.3 | 95 | 100 |
| Camp. Ex. 1-5-42 | 1-(1l1)-100-(2h)-30-LiPO$_2$F$_2$-0.5-FB-5-Dad-0.5-PS-0.2-LiTFSI-0.3 | 90 | 93 |

A lower value of DC resistance means better performance.
A higher value of capacity means better performance.

TABLE 99

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-5-43 | 1-(1j)-100-(0)-LiPO$_2$F$_2$-0.5-FB-5-Dod-0.5-PS-0.2-LiFSI-0.3 | 100 | 100 |
| Ex. 1-5-22 | 1-(1j)-100-(2j)-0.12-LiPO$_2$F$_2$-0.5-FB-5-Dod-0.5-PS-0.2-LiFSI-0.3 | 96 | 100 |
| Comp. Ex. 1-5-44 | 1-(1j)-100-(2j)-30-LiPO$_2$F$_2$-0.5-FB-5-Dod-0.5-PS-0.2-LiFSI-0.3 | 87 | 92 |
| Comp. Ex. 1-5-45 | 1-(1j)-100-(0)-LiPO$_2$F$_2$-0.5-FB-5-Dod-0.5-PS-0.2-LiTFSI-0.3 | 100 | -100 |
| Ex. 1-5-23 | 1-(1j)-100-(24)-0.12-LiPO$_2$F$_2$-0.5-FB-5-Dod-0.5-PS-0.2-LiTFSI-0.3 | 94 | 100 |
| Comp. Ex. 1-5-46 | 1-(1j)-100-(2j)-30-LiPO$_2$F$_2$-0.5-FB-5-Dod-0.5-PS-0.2-LiTFSI-0.3 | 90 | 90 |
| Comp. Ex. 1-5-47 | 1-(1j)-100-(0)-LiPO$_2$F$_2$-0.5-FB-5-Dod-0.5-PS-0.2-LiBETI-0.3 | 100 | 100 |
| Ex. 4-5-24 | 1-(1j)-100-(2j)-0.12-LiPO$_2$F$_2$-0.5-FB-5-Dod-0.5-PS-0.2-LiBETI-0.3 | 96 | 100 |
| Comp. Ex. 1-5-48 | 1-(1j)-100-(2j)-30-LiPO$_2$F$_2$-0.5-FB-5-Dod-0.5-PS-0.2-LiBETI-0.2 | 87 | 90 |
| Comp. Ex. 1-5-49 | 1-(1j)-100-(0)-LiPO$_2$F$_2$-0.5-FB-5-Dod-0.5-PS-0.2-LiSO$_3$F-0.3 | 100 | 100 |
| Ex. 1-5-25 | 1-(1j)-100-(2j)-0.12-LiPO$_2$F$_2$-0.5-FB-5-Dod-0.5-PS-0.2-LiSO$_3$F-0.3 | 95 | 100 |
| Comp. Ex. 1-5-50 | 1-(1j)-100-(2j)-30-LiPO$_2$F$_2$-0.5-FB-5-Dod-0.5-PS-0.2-LiSO$_3$F-0.3 | 91 | 91 |
| Comp. Ex. 1-5-51 | 1-(1j)-100-(0)-LiPO$_2$F$_2$-0.5-FB-5-Dod-0.5-PS-0.2-LiBF$_4$-0.3 | 100 | 100 |
| Ex. 1-5-26 | 1-(1j)-100-(2j)-0.12-LiPO$_2$F$_2$-0.5-FB-5-Dod-0.5-PS-0.2-LiBF$_4$-0.3 | 95 | 100 |
| Comp. Ex. 1-5-52 | 1-(1j)-100-(2j)-30-LiPO$_2$F$_2$-0.5-FB-5-Dod-0.5-PS-0.2-LiBF$_4$-0.3 | 92 | 90 |
| Comp. Ex. 1-5-53 | 1-(1j)-100-(0)-LiPO$_2$F$_2$-0.5-FB-5-pDod-0.5-PS-0.2-LiFSI-0.3 | 100 | 400 |
| Ex. 1-5-27 | 1-(1j)-100-(2j)-0.12-LiPO$_2$F$_2$-0.5-FB-5-pDod-0.5-PS-0.2-LiFSI-0.3 | 96 | 100 |
| Comp. Ex. 1-5-54 | 1-(1j)-100-(2j)-30-LiPO$_2$F$_2$-0.5-FB-5-pDod-0.5-PS-0.2-LiFSI-0.3 | 90 | 90 |

TABLE 99-continued

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-5-55 | 1-(1j)-100-(0)-LiPO$_2$F$_2$-0.5-FB-5-Dad-0.5-PS-0.2-LiTFSI-0.3 | 100 | 100 |
| Ex. 1-5-28 | 1-(1j)-100-(2j)-0.12-LiPO$_2$F$_2$-0.5-FB-5-Dad-0.5-PS-0.2-LiTFSI-0.3 | 96 | 100 |
| Comp. Ex. 1-5-56 | 1-(1j)-100-(2j)-30-LiPO$_2$F$_2$-0.5-FB-5-Dad-0.5-PS-0.2-LiTFSI-0.3 | 90 | 90 |

A lower value of DC resistance means better performance.
A higher value of capacity means better performance.

TABLE 100

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-6-1 | 1-(1b)-100-(0)-LiPO$_2$F$_2$-0.5-FB-5-p Dod-0.3-PS-0.2-LiBF$_4$-0.3-LiSO$_3$F-0.2 | 100 | 100 |
| Ex. 1-6-1 | 1-(1b)-100-(2b)-0.12-LiPO$_2$F$_2$-0.5-FB-5-pDod-0.3-PS-0.2-LiBF$_4$-0.3-LiSO$_3$F-0.2 | 97 | 100 |
| Comp. Ex. 1-6-2 | 1-(1b)-100-(2b)-30-LiPO$_2$F$_2$-0.5-FB-5-pDod-0.3-PS-0.2-LiBF$_4$-0.3-LiSO$_3$F-0.2 | 89 | 93 |
| Comp. Ex. 1-6-3 | 1-(1b)-100-(0)-LiPO$_2$F$_2$-0.5-FB-5-Dad-0.3-PS-0.2-LiBF$_4$-0.3-LiSO$_3$F-0.2 | 100 | 100 |
| Ex. 1-6-2 | 1-(1b)-100-(2b)-0.12-LiPO$_2$F$_2$-0.5-FB-5-Dad-0.3-PS-0.2-LiBF$_4$-0.3-LiSO$_3$F-0.2 | 95 | 100 |
| Camp. Ex. 1-6-4 | 1-(1b)-100-(2b)-30-LiPO$_2$F$_2$-0.5-FB-5-Dad-0.3-PS-0.2-LiBF$_4$-0.3-LiSO$_3$F-0.2 | 89 | 92 |
| Comp. Ex. 1-6-5 | 1-(1b)-100-(0)-LiPO$_2$F$_2$-0.5-FB-5-Dod-0.3-PS-0.2-LiBF$_4$-0.3-LiSO$_3$F-0.2 | 100 | 100 |
| Ex. 1-6-3 | 1-(1b)-100-(2b)-0.12-LiPO$_2$F-0.5-FB-5-Dod-0.3-PS-0.2-LiBF$_4$-0.3-LiSO$_3$F-0.2 | 97 | 100 |
| Camp. Ex. 1-6-6 | 1-(1b)-100-(2b)-30-LiPO$_2$F$_2$-0.5-FB-5-Dod-0.3-PS-0.2-LiBF$_4$-0.3-LiSO$_3$F-0.2 | 90 | 92 |
| Comp. Ex. 1-6-7 | 1-(1b)-100-(0)-LiPO$_2$F$_2$-0.5-FB-5-Dod-0.3-PS-0.2-LiBF$_4$-0.3-LiFSI-0.2 | 100 | 100 |
| Ex. 1-6-4 | 1-(1b)-100-(2b)-0.12-LiPO$_2$F$_2$-0.5-FB-5-Dod-0.3-PS-0.2-LiBF$_4$-0.3-LiFSI-0.2 | 96 | 100 |
| Comp. Ex. 1-6-8 | 1-(1b)-100-(2b)-30-LiPO$_2$F$_2$-0.5-FB-5 -Dod-0.3-PS-0.2-LiBF$_4$-0.3-LiFSI-0.2 | 91 | 93 |
| Comp. Ex. 1-6-9 | 1-(1b)-100-(0)-LiPO$_2$F$_2$-0.5- FB-5-Dod-0.3-PS-0.2-LiBF$_4$-0.3-LiTFSI-0.2 | 100 | 100 |
| Ex. 1-6-5 | 1-(1b)-100-(2b)-0.12-LiPO$_2$F$_2$-0.5-FB-5-Dod-0.3-PS-0.2-LiBF$_4$-0.3-LiTFSI-0.2 | 96 | 100 |
| Comp. Ex. 1-6-10 | 1-(1b)-100-(2b)-30-LiPO$_2$F$_2$-0.5-FB-5-Dod-0.3-PS-0.2-LiBF$_4$-0.3-LiTFSI-0.2 | 90 | 92 |
| Comp. Ex. 1-6-11 | 1-(1b)-100-(0)-LiPO$_2$F$_2$-0.5-FB-5-Dod-0.3-PS-0.2-LiBF$_4$-0.3-LiBETI-0.2 | 100 | 100 |
| Ex. 1-6-6 | 1-(1b)-100-(2b)-0.12-LiPO$_2$F$_2$-0.5-FB-5-Dod-0.3-PS-0.2-LiBF$_4$-0.3-LiBETI-0.2 | 95 | 100 |
| Comp. Ex. 1-6-12 | 1-(1b)-100-(2b)-30-LiPO$_2$F$_2$-0.5-FB-5-Dod-0.3-PS-0.2-LiBF$_4$-0.3-LiBETI-0.2 | 90 | 93 |

A lower value of DC resistance means better performance.
A higher value of capacity means better performance.

TABLE 101

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-6-13 | 1-(1f)-100-(0)-LiPO$_2$F$_2$-0.5-FB-5-pDod-0.3-PS-0.2-LiBF$_4$-0.3-LiSO$_3$F-0.2 | 100 | 100 |
| Ex. 1-6-7 | 1-(1f)-100-(2f)-0.12-LiPO$_2$F$_2$-0.5-FB-5-pDod-0.3-PS-0.2-LiBF$_4$-0.3-LiSO$_3$F-0.2 | 95 | 100 |
| Comp. Ex. 1-6-14 | 1-(1f)-100-(2f)-30-LiPO$_2$F$_2$-0.5-FB-5-pDod-0.3-PS-0.2-LiBF$_4$-0.3-LiSO$_3$F-0.2 | 87 | 90 |

TABLE 101-continued

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-6-15 | 1-(1f)-100-(0)-LiPO$_2$F$_2$-0.5-FB-5-Dad-0.3-PS-0.2-LiBF$_4$-0.3-LiSO$_3$F-0.2 | 100 | 100 |
| Ex. 1-6-8 | 1-(1f)-100-(2f)-0.12-LiSO$_2$F$_2$-0.5-FB-5-Dad-0.3-PS-0.2-LiBF$_4$-0.3-LiSO$_3$F-0.2 | 95 | 100 |
| Comp. Ex. 1-6-16 | 1-(1f)-100-(2f)-30-LiPO$_2$F$_2$-0.5-FB-5-Dad-0.3-PS-0.2-LiBF$_4$-0.3-LiSO$_3$F-0.2 | 88 | 90 |
| Comp. Ex. 1-6-17 | 1-(1f)-100-(0)-LiPO$_2$F$_2$-0.5-FB-5-Dod-0.3-P5-0.2-LiBF$_4$-0.3-LiSO$_3$F-0.2 | 100 | 100 |
| Ex. 1-6-9 | 1-(1f)-100-(2f)-0.12-LiPO$_2$F$_2$-0.5-FB-5-Dod-0.3-PS-0.2-LiBF$_4$-0.3-LiSO$_3$F-0.2 | 95 | 100 |
| Comp. Ex. 1-6-18 | 1-(1f)-100-(2f)-30-LiPO$_2$F$_2$-0.5-FB-5-Dod-0 3-PS-0 2-LiBF$_4$-0.3-LiSO$_3$F-0.2 | 88 | 90 |
| Comp. Ex. 1-6-19 | 1-(1f)-100-(0)-LiPO$_2$F$_2$-0.5-FB-5-Dod-0.3-PS-0.2-LiBF$_4$-0.3-LiFSI-0.2 | 100 | 100 |
| Ex. 1-6-10 | 1-(1f)-100-(2f)-0.12-LiPO$_2$F$_2$-0.5-FB-5-Dod-0.3-PS-0.2-LiBF$_4$-0.3-LiFSI-0.2 | 94 | 100 |
| Comp. Ex. 1-6-20 | 1-(1f)-100-(2f)-30-LiPO$_2$F$_2$-0.5-FB-5-Dod-0.3-PS-0.2-LiBF$_4$-0.3-LiFSI-0.2 | 89 | 91 |
| Comp. Ex. 1-6-21 | 1-(1f)-100-(0)-LiPO$_2$F$_2$-0.5-FB-5-Dod-0.3-PS-0.2-LiBF$_4$-0.3-LiTFSI-0.2 | 100 | 100 |
| Ex. 1-6-11 | 1-(1f)-100-(2f)-0.12-LiPO$_2$F$_2$-0.5-FB-5-Dod-0.3-PS-0.2-LiBF$_4$-0.3-LiTFSI-0.2 | 95 | 100 |
| Comp. Ex. 1-6-22 | 1-(1f)-100-(2f)-30-LiPO$_2$F$_2$-0.5-FB-5-Dod-0.3-PS-0.2-LiBF$_4$-0.3-LiTFSI-0.2 | 89 | 90 |
| Comp. Ex. 1-6-23 | 1-(1f)-100-(0)-LiPO$_2$F$_2$-0.5-FB-5-Dod-0.3-PS-0.2-LiBF$_4$-0.3-LiBETI-0.2 | 100 | 100 |
| Ex. 1-6-12 | 1-(1f)-100-(2f)-0.12-LiPO$_2$F$_2$-0.5-FB-5-Dod-0.3-PS-0.2-LiBF$_4$-0.3-LiBETI-0.2 | 95 | 100 |
| Comp. Ex. 1-6-24 | 1-(1f)-100-(2f)-30-LiPO$_2$F$_2$-0.5-FB-5-Dod-0.3-PS-0.2-LiBF$_4$-0.3-LiBETI-0.2 | 88 | 89 |

A lower value of DC resistance means better performance.
A higher value of capacity means better performance.

TABLE 102

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-6-25 | 1-(1h)-100-(0)-LiPO$_2$F$_2$-0.5-FB-5-pDod-0.3-PS-0.2-LiBF$_4$-0.3-LiSO$_3$F-0.2 | 100 | 100 |
| Ex. 1-6-13 | 1-(1h)-100-(2h)-0.12-LiPO$_2$F$_2$-0.5-FB-5-pDod-0.3-PS-0.2-LiBF$_4$-0.3-LiSO$_3$F-0.2 | 97 | 100 |
| Comp. Ex. 1-6-26 | 1-(1h)-100-(2h)-30-LiPO$_2$F$_2$-0.5-FB-5-pDod-0.3-PS-0.2-LIBF$_4$-0.3-LiSO$_3$F-0.2 | 92 | 93 |
| Comp. Ex. 1-6-27 | 1-(1h)-100-(0)-LiPO$_2$F$_2$-0.5-FB-5-Dod-0.3-PS-0.2-LiBF$_4$-0.3-LiSO$_3$F-0.2 | 100 | 100 |
| Ex. 1-6-14 | 1-(1h)-100-(2h)-0.12-LiPO$_2$F$_2$-0.5-FB-5-Dod-0.3-PS-0.2-LiBF$_4$-0.3-LiSO$_3$F-0.2 | 96 | 100 |
| Comp. Ex. 1-6-28 | 1-(1h)-100-(2h)-30-LiPO$_2$F$_2$-0.5-FB-5-Dod-0.3-PS-0.2-LiBF$_4$-0.3-LiSO$_3$F-0.2 | 89 | 92 |
| Comp. Ex. 1-6-29 | 1-(1h)-100-(0)-LiPO$_2$F$_2$-0.5-FB-5-Dod-0.3-PS-0.2-LiBF$_4$-0.3-LiSO$_3$F-0.2 | 100 | 100 |
| Ex. 1-6-15 | 1-(1h)-100-(2h)-0.12-LiPO$_2$F$_2$-0.5-FB-5-Dod-0.3-PS-0,2-LiBF$_4$-0.3-LiSO$_3$F-0.2 | 96 | 100 |
| Comp. Ex. 1-6-30 | 1-(1h)-100-(2h)-30-LiPO$_2$F$_2$-0.5-FB-5-Dod-0.3-PS-0.2-LiBF$_4$-0.3-LiSO$_3$F-0.2 | 91 | 91 |
| Comp. Ex. 1-6-31 | 1-(1h)-100-(0)-LiPO$_2$F$_2$-0.5-FB-5-Dod-0.3-PS-0.2-LiBF$_4$-0.3-LiFSI-0.2 | 100 | 100 |
| Ex. 1-6-16 | 1-(lh)-100-(2h)-0.12-LiPO$_2$F$_2$-0.5-FB-5-Dod-0.3-PS-0.2-LiBF$_4$-0.3-LiFSI-0.2 | 97 | 100 |
| Comp. Ex. 1-6-32 | 1-(1h)-100-(2h)-30-LiPO$_2$F$_2$-0.5-FB-5-Dod-0.3-PS-0.2-LiBF$_4$-0.3-LiFSI-0.2 | 93 | 93 |
| Comp. Ex. 1-6-33 | (1h)-100-(0)-LiPO$_2$F$_2$-0.5-FB-5-Dod-0.3-PS-0.2-LiBF$_4$-0.3-LiTFSI-0.2 | 100 | 100 |
| Ex. 1-6-17 | 1-(1h)-100-(2h)-0.12-LiPO$_2$F$_2$-0.5-FB-5-Dod-0.3-PS-0.2-LiBF$_4$-0.3-LiTFSI-0.2 | 96 | 100 |

TABLE 102-continued

|  | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-6-34 | 1-(1h)-100-(2h)-30-LiPO$_2$F$_2$-0.5-FB-5-Dod-0.3-PS-0.2-LiBF$_4$-0.3-LiTFSI-0.2 | 91 | 93 |
| Comp. Ex. 1-6-35 | 1-(1h)-100-(0)-LiPO$_2$F$_2$-0.5-FB-5-Dod-0.3-PS-0.2-LiBF$_4$-0.3-LiBETI-0.2 | 100 | 100 |
| Ex. 1-6-18 | 1-(1h)-100-(2h)-0.12-LiPO$_2$F$_2$-0.5-FB-5-Dod-0.3-PS-0.2-LiBF$_4$-0.3-LiBETI-0.2 | 96 | 100 |
| Comp. Ex. 1-6-36 | 1-(1h)-100-(2h)-30-LiPO$_2$F$_2$-0.5-FB-5-Dod-0.3-PS-0.2-LiBF$_4$-0.3-LiBETI-0.2 | 91 | 92 |

A lower value of DC resistance means better performance.
A higher value of capacity means better performance.

TABLE 103

|  | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 1-6-37 | 1-(1j)-100-(0)-LiPO$_2$F$_2$-0.5-FB-5-pDod-0.3-PS-0.2-LiBF$_4$-0.3-LiSO$_3$F-0.2 | 100 | 100 |
| Ex. 1-6-19 | 1-(1j)-100-(2j)-0.12-LiPO$_2$F$_2$-0.5-FB-5-pDod-0.3-PS-0.2-LiBF$_4$-0.3-LiSO$_3$F-0.2 | 94 | 100 |
| Comp. Ex. 1-6-38 | 1-(1j)-100-(2j)-30-LiPO$_2$F$_2$-0.5-FB-5-pDod-0.3-PS-0.2-LiBF$_4$-0.3-LiSO$_3$F-0.2 | 85 | 89 |
| Comp. Ex. 1-6-39 | 1-(1j)-100-(0)-LiPO$_2$F$_2$-0.5-FB-5-Dod-0.3-PS-0.2-LiBF$_4$-0.3-LiSO$_3$F-0.2 | 100 | 100 |
| Ex. 1-6-20 | 1-(1j)-100-(2j)-0.12-LiPO$_2$F$_2$-0.5-FB-5-Dod-0.3-PS-0.2-LiBF$_4$-0.3-LiSO$_3$F-0.2 | 94 | 100 |
| Comp. Ex. 1-6-40 | 1-(1j)-100-(2j)-30-LiPO$_2$F$_2$-0.5-FB-5-Dod-0.3-PS-0.2-LiBF$_4$-0.3-LiSO$_3$F-0.2 | 85 | 88 |
| Comp. Ex. 1-6-41 | 1-(1j)-100-(0)-LiPO$_2$F$_2$-0.5-FB-5-Dod-0.3-PS-0.2-LiBF$_4$-0.3-LiSO$_3$F-0.2 | 100 | 100 |
| Ex. 1-6-21 | 1-(1j)-100-(2j)-0.12-LiPO$_2$F$_2$-0.5-FB-5-Dod-0.3-PS-0.2-LiBF$_4$-0.3-LiSO$_3$F-0.2 | 94 | 100 |
| Comp. Ex. 1-6-42 | 1-(1j)-100-(2j)-30-LiPO$_2$F$_2$-0.5-FB-5-Dod-0.3-PS-0.2-LiBF$_4$-0.3-LiSO$_3$F-0.2 | 84 | 90 |
| Comp. Ex. 1-6-43 | 1-(1j)-100-(0)-LiPO$_2$F$_2$-0.5-FB-5-Dod-0.3-PS-0.2-LiBF$_4$-0.3-LiFSI-0.2 | 100 | 100 |
| Ex. 1-6-22 | 1-(1j)-100-(2j)-0.12-LiPO$_2$F$_2$-0.5-FB-5-Dod-0.3-PS-0.2-LiBF$_4$-0.3-LiFSI-0.2 | 93 | 100 |
| Comp. Ex. 1-6-44 | 1-(1j)-100-(2j)-30-LiPO$_2$F$_2$-0.5-FB-5-Dod-0.3-PS-0.2-LiBF$_4$-0.3-LiFSI-0.2 | 83 | 87 |
| Comp. Ex. 1-6-45 | 1-(1j)-100-(0)-LiPO$_2$F$_2$-0.5-FB-5-Dod-0.3-PS-0.2-LiBF$_4$-0.3-LiTFSI-0.2 | 100 | 100 |
| Ex. 1-6-23 | 1-(1j)-100-(2j)-0.12-LiPO$_2$F$_2$-0.5-FB-5-Dod-0.3-PS-0.2-LiBF$_4$-0.3-LiTFSI-0.2 | 91 | 100 |
| Comp. Ex. 1-6-46 | 1-(1j)-100-(2j)-30-LiPO$_2$F$_2$-0.5-FB-5-Dod-0.3-PS-0.2-LiBF$_4$-0.3-LiTFSI-0.2 | 85 | 88 |
| Comp. Ex. 1-6-47 | 1-(1j)-100-(0)-LiPO$_2$F$_2$-0.5-FB-5-Dod-0.3-PS-0.2-LIBF$_4$-0.3-LiBETI-0.2 | 100 | 100 |
| Ex. 1-6-24 | 1-(1j)-100-(2j)-0.12-LiPO$_2$F$_2$-0.5-FB-5-Dod-0.3-PS-0.2-LiBF$_4$-0.3-LiBETI-0.2 | 93 | 100 |
| Comp. Ex. 1-6-48 | 1-(1j)-100-(2j)-30-LiPO$_2$F$_2$-0.5-FB-5-Dod-0.3-PS-0.2-LiBF$_4$-0.3-LiBETI-0.2 | 81 | 89 |

A lower value of DC resistance means better performance.
A higher value of capacity means better performance.

Figure 2:
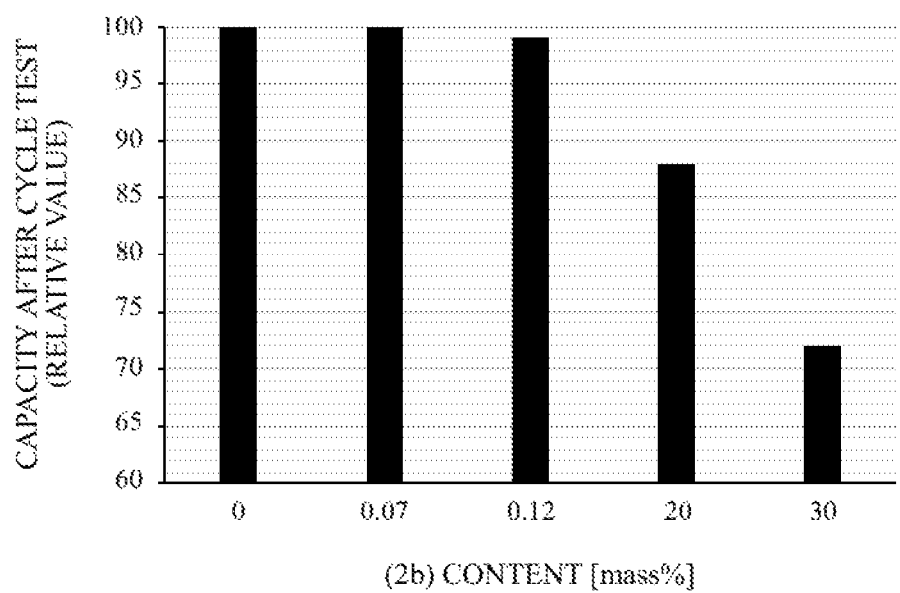
FIG. 2 is a graph of the capacity (as a relative value) after cycle test relative to the content of the silicon compound (2b).

As is seen from the test results shown in TABLE 78, the battery achieved, with good balance, the cycle characteristics and a decrease of the absolute value of the resistance under low-temperature conditions by the use of the nonaqueous electrolyte solution according to the present invention in which the nonaqueous organic solvent, the solute and the silicon compounds (1) and (2) were contained with the concentration of the silicon compound (2) being in the range of 0.05 to 25.0 mass % with respect to 100 mass % of the silicon compound For example, Example 1-0-4 in which the silicon compound (2b) was contained at a concentration of 0.7 mass % had an effect of suppressing an increase of the absolute value of the resistance under low-temperature conditions with almost no impairment of the cycle characteristics, as shown in FIGS. 1 and 2, as compared to Comparative Example 1-0-2 in which no silicon compound (2) was contained.

Example 1-0-5 in which the silicon compound (2b) was contained at a concentration of 0.12 mass % had an effect of more suppressing an increase of the absolute value of the resistance under low-temperature conditions with almost no impairment of the cycle characteristics.

Example 1-0-6 in which the silicon compound (2b) was contained at a concentration of 20 mass % had a large effect of suppressing an increase of the absolute value of the resistance. Even through the cycle characteristics were deteriorated, the degree of deterioration of the cycle characteristics was small. It can be thus said that the cycle characteristics and a decreased absolute value of the resistance under low-temperature conditions were achieved with good balance in this Example.

Even when the electrolyte solutions shown in TABLES 79 to 103 were used in which one to six kinds of the other solutes or additives was additionally contained, the test results showed a tendency similar to the above results. In TABLES 79 to 103, it seems that there did not apparently occur large impairment of the cycle characteristics in Comparative Examples in which the silicon compound (2) was contained at a concentration of 30 mass %. The reason for this is that deterioration of the battery was difficult to see by the addition effect (durability improvement effect) of the other solute or additive component. In the case where the other solute or additive component was additionally contained as in the above case, almost no impairment of the cycle characteristics occurred by the use of the nonaqueous electrolyte solution according to the present invention in which the concentration of the silicon compound (2) was in the range of 0.05 to 25.0 mass % with respect to 100 mass % of the silicon compound (1) (see e.g. Example 1-1-1 etc.); whereas there was actually seen some impairment of the cycle characteristics by the use of the nonaqueous electrolyte solution in which the concentration of the silicon compound (2) exceeded 25 mass % (see e.g. Comparative Example 1-1-2).

Using the electrolyte solution 1-(1b)-100-(2b)-0.12 in which the compounds (1b) and (2b) were respectively contained as the silicon compounds (1) and (2) and the electrolyte solutions in which the other solute or additive component was additionally contained as shown in TABLE 104, aluminum laminate type batteries were produced in the same manner as in Example 1-0-1. The respective batteries were subjected to initial charging and discharging in the same manner as above. Then, low-temperature resistance evaluation and cycle characteristic evaluation were performed on the respective batteries in the same manner as above.

In TABLE 104, the absolute value of the direct current resistance and the capacity after 400 cycles are expressed as relative values, with the absolute value of the direct current resistance and the capacity after 400 cycles in Example 1(1b, 2b)-0-1 being defined as 100, respectively.

TABLE 104

| NonaqueousElectrolyte Solution No. | | DC Resistance (Relative Value) After Initial Charging and Discharging at −20° C. | Capacity (Relative Value) After 400 Cycles at 50° C. |
|---|---|---|---|
| Ex. 1(1b, 2b)-0-1 | 1-(1b)-100-(2b)-0.12 | 100 | 100 |
| Ex. 1(1b, 2b)-1-1 | 1-(1b)-100-(2b)-0.12-LiFSI-2 | 95 | 105 |
| Ex. 1(1b, 2b)-1-2 | 1-(1b)-100-(2b)-0.12-LiSO$_3$F-1 | 99 | 107 |
| Ex. 1(1b, 26)-1-3 | 1-(1b)-100-(2b)-0,12-LDFBOP-1 | 85 | 120 |
| Ex. 1(16, 26)-1-4 | 1-(1b)-100-(2b)-0.12-ESF-0.5 | 88 | 100 |
| Ex. 1(1b, 2b)-1-5 | 1-(1b)-100-(2b)-0.12-LiPO$_2$F$_2$-1 | 83 | 110 |
| Ex. 1(1b, 2b)-1-6 | 1-(1b)-100-(2b)-0.12-LiTFSI-1 | 100 | 103 |
| Ex. 1(1b, 26)-1-7 | 1-(1b)-100-(2b)-0.12-LIBETI-1 | 100 | 102 |
| Ex. 1(1b, 2b)-1-8 | 1-(1b)-100-(2b)-0.12-LiBF$_4$-0.2 | 98 | 99 |

A lower value of the DC resistance means better performance.
A higher value of the capacity means better performance, Using the electrolyte solution 1-(1b)-100-(2b)-0.12 in which the compounds (1b) and (2b) were respectively contained as the silicon compounds (1) and (2) and the electrolyte solutions in which the other solute or additive component was additionally contained as shown in TABLE 105, aluminum laminate type batteries were used in the same manner as in Example 1-0-1. The respective batteries were subjected to initial charging and discharging in the same manner as above. Then, low-temperature resistance evaluation and cycle characteristic evaluation were performed on the respective batteries in the same manner as above.

In TABLE 105, the absolute value of the direct current resistance and the capacity after 400 cycles are expressed as relative values, with the absolute value of the direct current resistance and the capacity after 400 cycles in Example 1(1b, 2b)-0-1 being defined as 100, respectively.

TABLE 105

| Nonaqueous Electrolyte Solution No. | | DC Resistance (Relative Value) After Initial Charging and Discharging at −20° C. | Capacity (Relative Value) After 400 Cycles at 50° C. |
|---|---|---|---|
| Ex. 1(1b ,2b)-0-1 | 1-(1b)-100-(2b)-0.12 | 100 | 100 |
| Ex. 1(1b, 2b)-1-9 | 1-(1b)-100-(2b)-0.12-FB-5 | 98 | 100 |
| Ex. 1(1b, 2b)-1-10 | 1-(1b)-100-(2b)-0.12-Dod-0.5 | 85 | 107 |
| Ex. 1(1b, 2b)-1-11 | 1-(1b)-100-(2b)-0.12-pDod-0.5 | 100 | 106 |
| Ex. 1(1b, 2b)-1-12 | 1-(1b)-100-(2b)-0.12-Dod-0.5 | 95 | 105 |
| Ex. 1(1b, 2b)-1-13 | 1-(1b)-100-(2b)-0.12-PS-0.2 | 101 | 102 |

A lower value of the DC resistance means better performance.
A higher value of the capacity means better performance.

[Production of Nonaqueous Electrolyte Batteries] NCM811/Graphite

Aluminum laminate type batteries according to Examples 2-1 to 2-19 and Comparative Examples 2-1 to 2-38 were produced in the same manner as the battery according to Example 1-0-1, except that: the above-formed NCM811 positive electrodes were used as positive electrodes of the respective batteries; and the nonaqueous electrolyte solutions shown in TABLES 106 and 107 were used as electrolyte solutions of the respective batteries (i.e. the reference electrolyte solution 2 was used in place of the reference electrolyte solution 1). The capacity of each of the produced batteries as normalized by the weight of the positive electrode active material was 73 mAh.

[Initial Charging and Discharging] [Direct Current Resistance Measurement Test after Initial Charging and Discharging] [Capacity Measurement Test after 400 Cycles]

The respective batteries were subjected to initial charging and discharging in the same manner as in Example 1-0-1, except that the maximum charge voltage was set to 4.2 V. Then, low-temperature resistance evaluation and cycle characteristic evaluation were performed on the respective batteries in the same manner as in Example 1-0-1.

Assuming the electrolyte solution compositions in which the silicon compound (2) was not contained as Comparative Examples, the absolute value of the direct current resistance and the capacity after 400 cycles in each Example are expressed as relative values in TABLES 106 and 107, with the absolute value of the direct current resistance and the capacity after 400 cycles in the corresponding Comparative Example being defined as 100, respectively.

TABLE 106

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 2-1 | 2-(1b)-100-(0) | 100 | 100 |
| Ex. 2-1 | 2-(1b)-100-(2b)-0.12 | 96 | 99 |
| Comp. Ex. 2-2 | 2-(1b)-100-(2b)-30 | 75 | 68 |
| Comp. Ex. 2-3 | 2-(1b)-100-(0)-LiFSI-2 | 100 | 100 |
| Ex. 2-2 | 2-(1b)-100-(2b)-0.12-LiFSI-2 | 97 | 100 |
| Comp. Ex. 2-4 | 2-(1b)-100-(2b)-30-LiFSI-2 | 86 | 94 |
| Comp. Ex. 2-5 | 2-(1b)-100-(0)-LiSO$_3$F-1 | 100 | 100 |
| Ex. 2-3 | 2-(1b)-100-(2b)-0.12-LiSO$_3$F-1 | 96 | 100 |
| Comp. Ex. 2-6 | 2-(1b)-100-(2b)-30-LiSO$_3$F-1 | 87 | 98 |
| Camp. Ex. 2-7 | 2-(1b)-100-(0)-LDFBOP-1 | 100 | 100 |
| Ex. 2-4 | 2-(1b)-100-(2b)-0.12-LDFBOP-1 | 98 | 100 |
| Comp. Ex. 2-8 | 2-(1b)-100-(2b)-30-LDFBOP-1 | 90 | 97 |
| Comp. Ex. 2-9 | 2-(1b)-100-(0)-LDFPI-1 | 100 | 100 |
| Ex. 2-5 | 2-(1b)-100-(2b)-0.12-LDFPI-1 | 98 | 100 |
| Comp. Ex. 2-10 | 2-(1b)-100-(2b)-30-LDFPI-1 | 89 | 90 |
| Comp. Ex. 2-11 | 2-(1i)-100-(0) | 100 | 100 |
| Ex. 2-6 | 2-(1i)-100-(2j)-0.12 | 89 | 100 |
| Comp. Ex. 2-12 | 2-(1i)-100-(2j)-30 | 67 | 70 |
| Comp. Ex. 2-13 | 2-(1i)-100-(0)-LiFSI-2 | 100 | 100 |
| Ex. 2-7 | 2-(1i)-100-(2j)-0.12-LiFSI-2 | 91 | 100 |
| Comp. Ex. 2-14 | 2-(1i)-100-(2j)-30-LiFSI-2 | 82 | 92 |
| Comp. Ex. 2-15 | 2-(1i)-100-(0)-LiSO$_3$F-1 | 100 | 100 |
| Ex. 2-8 | 2-(1i)-100-(2j)-0.12-LiSO$_3$F-1 | 94 | 100 |
| Comp. Ex. 2-16 | 2-(1i)-100-(2j)-30-LiSO$_3$F-1 | 82 | 97 |
| Comp. Ex. 2-17 | 2-(1g)-100-(0) | 100 | 100 |
| Ex. 2-9 | 2-(1g)-100-(2h)-0.12 | 80 | 100 |
| Comp. Ex. 2-18 | 2-(1g)-100-(2h)-30 | 64 | 71 |
| Comp. Ex. 2-19 | 2-(1g)-100-(0)-LiFSI-2 | 100 | 100 |
| Ex. 2-10 | 2-(1g-100-(2h)-0.12-LiFSI-2 | 90 | 100 |
| Comp. Ex. 2-20 | 2-(1g)-100-(2h)-30-LiFSI-2 | 81 | 92 |
| Comp. Ex. 2-21 | 2-(1g)-100-(0)-LiSO$_3$F-1 | 100 | 100 |
| Ex. 2-11 | 2-(1g)-100-(2h)-0.12-LiSO$_3$F-1 | 88 | 100 |
| Comp. Ex. 2-22 | 2-(1g)-100-(2h)-30-LiSO$_3$F-1 | 80 | 98 |

A lower value of DC resistance means better performance.
A higher value of capacity means better performance.

TABLE 107

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 2-23 | 2-(1b)-100-(0)-ESF-0.5 | 100 | 100 |
| Ex. 2-12 | 2-(1b)-100-(2b)-0.12-ESF-0.5 | 95 | 100 |
| Comp. Ex. 2-24 | 2-(1b)-100-(2b)-30-ESF-0.5 | 85 | 96 |
| Comp. Ex. 2-25 | 2-(1f)-100-(0)-TSF-0.5 | 100 | 100 |
| Ex. 2-13 | 2-(1f)-100-(2f)-0.12-TSF-0.5 | 94 | 100 |
| Comp. Ex. 2-26 | 2-(1f)-100-(2f)-30-TSF-0.5 | 76 | 96 |
| Comp. Ex. 2-27 | 2-(1b)-100-(0)-LDFBOP-0.5-LiFSI-1 | 100 | 100 |
| Ex. 2-14 | 2-(1b)-100-(2b)-0.12-LDFBOP-0.5-LiFSI-1 | 95 | 100 |
| Comp. Ex. 2-28 | 2-(1b)-100-(2b)-30-LDFBOP-0.5-LiFSI-1 | 89 | 96 |
| Comp. Ex. 2-29 | 2-(1b)-100-(0)-LDFBOP-1-LiPO$_2$F$_2$-0.5 | 100 | 100 |
| Ex. 2-15 | 2-(1b)-100-(2b)-0.12-LDFBOP-1-LiPO$_2$F$_2$-0.5 | 96 | 100 |
| Comp. Ex. 2-30 | 2-(1b)-100-(2b)-30-LDFBOP-1-LiPO$_2$F$_2$-0.5 | 89 | 93 |
| Comp. Ex. 2-31 | 2-(1b)-100-(0)-LDFBOP-1-ESF-0.5 | 100 | 100 |
| Ex. 2-16 | 2-(1b)-100-(2b)-0.12-LDFBOP-1-ESF-0.5 | 95 | 100 |
| Comp. Ex. 2-32 | 2-(1b)-100-(2b)-30-LDFBOP-1-ESF-0.5 | 86 | 95 |
| Comp. Ex. 2-33 | 2-(1f)-100-(0)-LDFBOP-0.5-LiSO$_3$F-1 | 100 | 100 |
| Ex. 2-17 | 2-(1f)-100-(2f)-0.12-LDFBOP-0.5-LiSO$_3$F-1 | 94 | 100 |
| Comp. Ex. 2-34 | 2-(1f)-100-(2f)-30-LDFBOP-0.5-LiSO$_3$F-1 | 88 | 95 |
| Comp. Ex. 2-35 | 2-(1f)-100-(0)-LDFBOP-1-LiPO$_2$F$_2$-0.5 | 100 | 100 |
| Ex. 2-18 | 2-(1f)-100-(2f)-0.12-LDFBOP-1-LiPO$_2$F$_2$-0.5 | 97 | 100 |
| Comp. Ex. 2-36 | 2-(1f)-100-(2f)-30-LDFBOP-1-LiPO$_2$F$_2$-0.5 | 90 | 95 |
| Comp. Ex. 2-37 | 2-(1f)-100-(0)-LDFBOP-1-TSF-0.5 | 100 | 100 |
| Ex. 2-19 | 2-(1f)-100-(2f)-0.12-LDFBOP-1-TSF-0.5 | 95 | 100 |
| Comp. Ex. 2-38 | 2-(1f)-100-(2f)-30-LDFBOP-1-TSF-0.5 | 86 | 96 |

A lower value of DC resistance means better performance.
A higher value of capacity means better performance.

[Production of Nonaqueous Electrolyte Batteries] NCM811/Silicon-Containing Graphite Aluminum laminate type batteries according to Examples 3-1 to 3-19 and Comparative Examples 3-1 to 3-38 were produced in the same manner as the battery according to Example 1-0-1, except that: the above-formed NCM811 positive electrodes were used as positive electrodes of the respective batteries; the above-formed silicon-containing graphite negative electrodes were used as negative electrodes of the respective batteries; and the nonaqueous electrolyte solutions shown in TABLES 108 and 109 were used as electrolyte solutions of the respective batteries (i.e. the reference electrolyte solution 3 was used in place of the reference electrolyte solution 1). The capacity of each of the produced batteries as normalized by the weight of the positive electrode active material was 73 mAh.

[Initial Charging and Discharging] [Direct Current Resistance Measurement Test after Initial Charging and Discharging] [Capacity Measurement Test after 200 Cycles]

The respective batteries were subjected to initial charging and discharging in the same manner as in Example 1-0-1, except that: the maximum charge voltage was set to 4.2 V; and the number of cycles was set to 200. Then, low-temperature resistance evaluation and cycle characteristic evaluation were performed on the respective batteries in the same manner as in Example 1-0-1.

Assuming the electrolyte solution compositions in which the silicon compound (2) was not contained as Comparative Examples, the absolute value of the direct current resistance and the capacity after 200 cycles in each Example are expressed as relative values in TABLES 108 and 109, with the absolute value of the direct current resistance and the capacity after 200 cycles in the corresponding Comparative Example being defined as 100, respectively.

TABLE 108

| | Nonaqueous Electrolyte Solution No. | DC Resistance (Relative Value) After Initial Charging and Discharging at −20° C. | Capacity (Relative Value) After 200 Cycles at 50° C. |
|---|---|---|---|
| Comp. Ex. 3-1 | 3-(1c)-100-(0) | 100 | 100 |
| Ex. 3-1 | 3-(1c)-100-(2b)-0.12 | 96 | 99 |
| Comp. Ex. 3-2 | 3-(1c)-100-(2b)-30 | 81 | 83 |
| Comp. Ex. 3-3 | 3-(1c)-100-(0)-LiPO$_2$F$_2$-1 | 100 | 100 |
| Ex. 3-2 | 3-(1c)-100-(2b)-0.12-LiPO$_2$F$_2$-1 | 98 | 100 |
| Comp. Ex. 3-4 | 3-(1c)-100-(2b)-30-LiPO$_2$F$_2$-1 | 89 | 95 |
| Comp. Ex. 3-5 | 3-(1o)-100-(0)-LiSO$_3$F-1 | 100 | 100 |
| Ex. 3-3 | 3-(1c)-100-(2b)-0.12-LiSO$_3$F-1 | 97 | 100 |
| Comp. Ex. 3-6 | 3-(1o)-100-(2b)-30-LiSO$_3$F-1 | 85 | 98 |
| Comp. Ex. 3-7 | 3-(1j)-100-(0) | 100 | 100 |
| Ex. 3-4 | 3-(1j)-100-(2j)-0.12 | 88 | 100 |
| Comp. Ex. 3-8 | 3-(1j)-100-(2j)-30 | 80 | 80 |
| Comp. Ex. 3-9 | 3-(1j)-100-(0)-LiPO$_2$F$_2$-1 | 100 | 100 |
| Ex. 3-5 | 3-(1j)-100-(2j)-0.12-LiPO$_2$F$_2$-1 | 93 | 100 |
| Comp. Ex. 3-10 | 3-(1j)-100-(2j)-30-LiPO$_2$F$_2$-1 | 85 | 94 |
| Comp. Ex. 3-11 | 3-(1j)-100-(0)-LiSO$_3$F-1 | 100 | 100 |
| Ex. 3-6 | 3-(1j)-100-(2j)-0.12-LiSO$_3$F-1 | 89 | 100 |
| Comp. Ex. 3-12 | 3-(1j)-100-(2j)-30-LiSO$_3$F-1 | 80 | 97 |
| Comp. Ex. 3-13 | 3-(1j)-100-(0)-LDFOB-1 | 100 | 100 |
| Ex. 3-7 | 3-(1j)-100-(2j)-0.12-LDFOB-1 | 90 | 100 |
| Comp. Ex. 3-14 | 3-(1j)-100-(2j)-30-LDFOB-1 | 80 | 95 |
| Comp. Ex. 3-15 | 3-(1j)-100-(0)-LTFFSI-1 | 100 | 100 |
| Ex. 3-8 | 3-(1j)-100-(2j)-0.12-LTFFSI-1 | 90 | 100 |
| Comp. Ex. 3-16 | 3-(1j)-100-(2j)-30-LTFFSI-1 | 83 | 93 |
| Comp. Ex. 3-17 | 3-(1p)-100-(0) | 100 | 100 |
| Ex. 3-9 | 3-(1p)-100-(2h)-0.12 | 81 | 99 |
| Comp. Ex. 3-18 | 3-(1p)-100-(2h)-30 | 75 | 85 |
| Comp. Ex. 3-19 | 3-(1p)-100-(0)-LiPO$_2$F$_2$-1 | 100 | 100 |
| Ex. 3-10 | 3-(1p)-100-(2h)-0.12-LiPO$_2$F$_2$-1 | 94 | 100 |
| Comp. Ex. 3-20 | 3-(1p)-100-(2h)-30-LiPO$_2$F$_2$-1 | 86 | 93 |
| Comp. Ex. 3-21 | 3-(1p)-100-(0)-LiSO$_3$F-1 | 100 | 100 |
| Ex. 3-11 | 3-(1p)-100-(2h)-0.12-LiSO$_3$F-1 | 90 | 100 |
| Comp. Ex. 3-22 | 3-(1p)-100-(2h)-30-LiSO$_3$F-1 | 78 | 98 |

A lower value of DC resistance means better performance.
A higher value of capacity means better performance.

TABLE 109

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 3-23 | 3-(1h)-100-(0)-PDFP-1 | 100 | 100 |
| Ex. 3-12 | 3-(1h)-100-(2h)-0.12-PDFP-1 | 92 | 100 |
| Comp. Ex. 3-24 | 3-(1h)-100-(2h)-30-PDFP-1 | 76 | 94 |
| Comp. Ex. 3-25 | 3-(1j)-100-(0)-MSF-0.5 | 100 | 100 |
| Ex. 3-13 | 3-(1j)-100-(2h)-0.12-MSF-0.5 | 94 | 100 |
| Comp. Ex. 3-26 | 3-(1j)-100-(2j)-30-MSF-0.5 | 87 | 92 |
| Comp. Ex. 3-27 | 3-(1h)-100-(0)-LDFBOP-0.5-LiFSI-1 | 100 | 100 |
| Ex. 3-14 | 3-(1h)-100-(2h)-0.12-LDFBOP-0.5-LiFSI-1 | 95 | 100 |
| Comp. Ex. 3-28 | 3-(1h)-100-(2h)-30-LDFBOP-0.5-LiFSI-1 | 86 | 95 |
| Comp. Ex. 3-29 | 3-(1h)-100-(0)-LDFBOP-0.5-LiSO$_3$F-1 | 100 | 100 |
| Ex. 3-15 | 3-(1h)-100-(2h)-0.12-LDFBOP-0.5-LiSO$_3$F-1 | 97 | 100 |
| Comp. Ex. 3-30 | 3-(1h)-100-(2h)-30-LDFBOP-0.5-LiSO$_3$F-1 | 90 | 95 |
| Comp. Ex. 3-31 | 3-(1h)-100-(0)-LDFBOP-1-PDFP-0.5 | 100 | 100 |
| Ex. 3-16 | 3-(1h)-100-(2h)-0.12-LDFBOP-1-PDFP-0.5 | 93 | 100 |
| Comp. Ex. 3-32 | 3-(1h)-100-(2h)-30-LDFBOP-1-PDFP-0.5 | 88 | 95 |
| Comp. Ex. 3-33 | 3-(1j)-100-(0)-LDFBOP-0.5-LDFPFSI-1 | 100 | 100 |
| Ex. 3-17 | 3-(1j)-100-(2j)-0.12-LDFBOP-0.5-LDFPFSI-1 | 95 | 100 |
| Comp. Ex. 3-34 | 3-(1j)-100-(2j)-30-LDFBOP-0.5-LDFPFSI-1 | 88 | 96 |
| Comp. Ex. 3-35 | 3-(1j)-100-(0)-LDFBOP-1-LiPO$_2$F$_2$-0.5 | 100 | 100 |
| Ex. 3-18 | 3-(1j)-100-(2j)-0.12-LDFBOP-1-LiPO$_2$F$_2$-0.5 | 93 | 100 |
| Comp. Ex. 3-36 | 3-(1j)-100-(2j)-30-LDFBOP-1-LiPO$_2$F$_2$-0.5 | 85 | 94 |
| Comp. Ex. 3-37 | 3-(1j)-100-(0)-LDFBOP-1-MSF-0.5 | 100 | 100 |
| Ex. 3-19 | 3-(1j)-100-(2j)-0.12-LDFBOP-1-MSF-0.5 | 95 | 100 |
| Comp. Ex. 3-38 | 3-(1j)-100-(2j)-30-LDFBOP-1-MSF-0.5 | 89 | 95 |

A lower value of DC resistance means better performance.
A higher value of capacity means better performance.

[Production of Nonaqueous Electrolyte Batteries] NCA/Graphite

Aluminum laminate type batteries according to Examples 4-1 to 4-19 and Comparative Examples 4-1 to 4-38 were produced in the same manner as the battery according to Example 1-0-1, except that: the above-formed NCA positive electrodes were used as positive electrodes of the respective batteries; and the nonaqueous electrolyte solutions shown in TABLES 110 and 111 were used as electrolyte solutions of the respective batteries (i.e. the reference electrolyte solution 4 was used in place of the reference electrolyte solution 1). The capacity of each of the produced batteries as normalized by the weight of the positive electrode active material was 70 mAh.

[Initial Charging and Discharging] [Direct Current Resistance Measurement Test after Initial Charging and Discharging] [Capacity Measurement Test after 400 Cycles]

The respective batteries were subjected to initial charging and discharging in the same manner as in Example 1-0-1, except that: the maximum charge voltage was set to 4.1 V; and the minimum discharge voltage was set to 2.7 V. Then, low-temperature resistance evaluation and cycle characteristic evaluation were performed on the respective batteries in the same manner as in Example 1-0-1.

Assuming the electrolyte solution compositions in which the silicon compound (2) was not contained as Comparative Examples, the absolute value of the direct current resistance and the capacity after 400 cycles in each Example are expressed as relative values in TABLES 110 and 111, with the absolute value of the direct current resistance and the capacity after 400 cycles in the corresponding Comparative Example being defined as 100, respectively.

TABLE 110

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 4-1 | 4-(1a)-100-(0) | 100 | 100 |
| Ex. 4-1 | 4-(1a)-100-(2f)-0.12 | 96 | 100 |
| Comp. Ex. 4-2 | 4-(1a)-100-(2f)-30 | 68 | 78 |
| Comp. Ex. 4-3 | 4-(1a)-100-(0)-LTFOP-1 | 100 | 100 |
| Ex. 4-2 | 4-(1a)-100-(2f)-0.12-LTFOP-1 | 98 | 100 |
| Comp. Ex. 4-4 | 4-(1a)-100-(2f)-30-LTFOP-1 | 86 | 97 |
| Comp. Ex. 4-5 | 4-(1a)-100-(0)-LiSO₃F-1 | 100 | 100 |
| Ex. 4-3 | 4-(1a)-100-(2f)-0.12-LiSO₃F-1 | 97 | 100 |
| Comp. Ex. 4-6 | 4-(1a)-100-(2f)-30-LiSO₃F-1 | 80 | 98 |
| Comp. Ex. 4-7 | 4-(1e)-100-(0) | 100 | 100 |
| Ex. 4-4 | 4-(1e)-100-(2b)-0.12 | 95 | 99 |
| Comp. Ex. 4-8 | 4-(1e)-100-(2b)-30 | 74 | 75 |
| Comp. Ex. 4-9 | 4-(1e)-100-(0)-LTFOP-1 | 100 | 100 |
| Ex. 4-5 | 4-(1e)-100-(2b)-0.12-LTFOP-1 | 97 | 100 |
| Comp. Ex. 4-10 | 4-(1e)-100-(2b)-30-LTFOP-1 | 86 | 97 |
| Comp. Ex. 4-11 | 4-(1e)-100-(0)-LiSO₃F-1 | 100 | 100 |
| Ex. 4-6 | 4-(1e)-100-(2b)-0.12-LiSO₃F-1 | 97 | 100 |
| Comp. Ex. 4-12 | 4-(1e)-100-(2b)-30-LiSO₃F-1 | 83 | 98 |
| Comp. Ex. 4-13 | 4-(1h)-100-(0) | 100 | 100 |
| Ex. 4-7 | 4-(1h)-100-(2h)-0.12 | 82 | 99 |
| Comp. Ex. 4-14 | 4-(1h)-100-(2h)-30 | 66 | 76 |
| Comp. Ex. 4-15 | 4-(1h)-100-(0)-LTFOP-1 | 100 | 100 |
| Ex. 4-8 | 4-(1h)-100-(2h)-0.12-LTFOP-1 | 94 | 100 |
| Comp. Ex. 4-16 | 4-(1h)-100-(2h)-30-LTFOP-1 | 87 | 97 |
| Comp. Ex. 4-17 | 4-(1h)-100-(0)-LiSO₃F-1 | 100 | 100 |
| Ex. 4-9 | 4-(1h)-100-(2h)-0.12-LiSO₃F-1 | 93 | 100 |
| Comp. Ex. 4-18 | 4-(1h)-100-(2h)-30-LiSO₃F-1 | 84 | 97 |
| Comp. Ex. 4-19 | 4-(1h)-100-(0)-LDFOB-1 | 100 | 100 |
| Ex. 4-10 | 4-(1h)-100-(2h)-0.12-LDFOB-1 | 96 | 100 |
| Comp. Ex. 4-20 | 4-(1h)-100-(2h)-30-LDFOB-1 | 89 | 94 |
| Comp. Ex. 4-21 | 4-(1h)-100-(0)-LTFFSI-1 | 100 | 100 |
| Ex. 4-11 | 4-(1h)-100-(2h)-0.12-LTFFSI-1 | 93 | 100 |
| Comp. Ex. 4-22 | 4-(1h)-100-(2h)-30-LTFFSI-1 | 81 | 91 |

A lower value of DC resistance means better performance.
A higher value of capacity means better performance.

TABLE 111

| | Nonaqueous Electrolyte Solution No. | DC Resistance (Relative Value) After Initial Charging and Discharging at −20° C. | Capacity (Relative Value) After 400 Cycles at 50° C. |
|---|---|---|---|
| Comp. Ex. 4-23 | 4-(1b)-100-(0)-ESF-0.5 | 100 | 100 |
| Ex. 4-12 | 4-(1b)-100-(2b)-0.12-ESF-0.5 | 97 | 100 |
| Comp. Ex. 4-24 | 4-(1b)-100-(2b)-30-ESF-0.5 | 87 | 96 |
| Comp. Ex. 4-25 | 4-(1j)-100-(0)-MSF-0.5 | 100 | 100 |
| Ex. 4-13 | 4-(1j)-100-(2j)-0.12-MSF-0.5 | 96 | 100 |
| Comp. Ex. 4-26 | 4-(1j)-100-(2j)-30-MSF-0.5 | 91 | 94 |
| Comp. Ex. 4-27 | 4-(1b)-100-(0)-LDFBOP-0.5-LiFSI-1 | 100 | 100 |
| Ex. 4-14 | 4-(1b)-100-(2b)-0.12-LDFBOP-0.5-LiFSI-1 | 97 | 100 |
| Comp. Ex. 4-28 | 4-(1b)-100-(2b)-30-LDFBOP-0.5-LiFSI-1 | 92 | 95 |
| Comp. Ex. 4-29 | 4-(1b)-100-(0)-LDFBOP-1-LiPO₂F₂-0.5 | 100 | 100 |
| Ex. 4-15 | 4-(1b)-100-(2b)-0.12-LDFBOP-1-LiPO₂F₂-0.5 | 97 | 100 |
| Comp. Ex. 4-30 | 4-(1b)-100-(2b)-30-LDFBOP-1-LiPO₂F₂-0.5 | 90 | 94 |
| Comp. Ex. 4-31 | 4-(1b)-100-(0)-LDFBOP-1-ESF-0.5 | 100 | 100 |
| Ex. 4-16 | 4-(1b)-100-(2b)-0.12-LDFBOP-1-ESF-0.5 | 97 | 100 |
| Comp. Ex. 4-32 | 4-(1b)-100-(2b)-30-LDFBOP-1-ESF-0.5 | 90 | 95 |
| Comp. Ex. 4-33 | 4-(1j)-100-(0)-LDFBOP-0.5-LDFPFSI-1 | 100 | 100 |
| Ex. 4-17 | 4-(1j)-100-(2j)-0.12-LDFBOP-0.5-LDFPFSI-1 | 98 | 100 |
| Comp. Ex. 4-34 | 4-(1j)-100-(2j)-30-LDFBOP-0.5-LDFPFSI-1 | 93 | 96 |
| Comp. Ex. 4-35 | 4-(1j)-100-(0)-LDFBOP-1-LiPO₂F₂-0.5 | 100 | 100 |
| Ex. 4-18 | 4-(1j)-100-(2j)-0.12-LDFBOP-1-LiPO₂F₂-0.5 | 98 | 100 |
| Comp. Ex. 4-36 | 4-(1j)-100-(2j)-30-LDFBOP-1-LiPO₂F₂-0.5 | 91 | 95 |
| Comp. Ex. 4-37 | 4-(1j)-100-(0)-LDFBOP-1-MSF-0.5 | 100 | 100 |
| Ex. 4-19 | 4-(1j)-100-(2j)-0.12-LDFBOP-1-MSF-0.5 | 98 | 100 |
| Comp. Ex. 4-38 | 4-(1j)-100-(2j)-30-LDFBOP-1-MSF-0.5 | 92 | 96 |

A lower value of DC resistance means better performance.
A higher value of capacity means better performance.

[Production of Nonaqueous Electrolyte Batteries] NCA/Silicon-Containing Graphite Aluminum laminate type batteries according to Examples 5-1 to 5-19 and Comparative Examples 5-1 to 5-38 were produced in the same manner as the battery according to Example 1-0-1, except that: the above-formed NCA positive electrodes were used as positive electrodes of the respective batteries; the above-formed silicon-containing graphite negative electrodes were used as negative electrodes of the respective batteries; and the nonaqueous electrolyte solutions shown in TABLES 112 and 113 were used as electrolyte solutions of the respective batteries (i.e. the reference electrolyte solution 5 was used in place of the reference electrolyte solution 1). The capacity of each of the produced batteries as normalized by the weight of the positive electrode active material was 70 mAh.

[Initial Charging and Discharging] [Direct Current Resistance Measurement Test after Initial Charging and Discharging] [Capacity Measurement Test after 200 Cycles]

The respective batteries were subjected to initial charging and discharging in the same manner as in Example 1-0-1, except that: the maximum charge voltage was set to 4.1 V; the minimum discharge voltage was set to 2.7 V; and the number of cycles was set to 200. Then, low-temperature resistance evaluation and cycle characteristic evaluation were performed on the respective batteries in the same manner as in Example 1-0-1.

Assuming the electrolyte solution compositions in which the silicon compound (2) was not contained as Comparative Examples, the absolute value of the direct current resistance and the capacity after 200 cycles in each Example are expressed as relative values in TABLES 112 and 113, with the absolute value of the direct current resistance and the capacity after 200 cycles in the corresponding Comparative Example being defined as 100, respectively.

TABLE 112

| Nonaqueous Electrolyte Solution No. | | DC Resistance (Relative Value) After Initial Charging and Discharging at −20° C. | Capacity (Relative Value) After 200 Cycles at 50° C. |
|---|---|---|---|
| Comp. Ex. 5-1 | 5-(1f)-100-(0) | 100 | 100 |
| Ex. 5-1 | 5-(1f)-100-(2f)-0.12 | 94 | 100 |
| Comp. Ex. 5-2 | 5-(1f)-100-(2f)-30 | 78 | 79 |
| Comp. Ex. 5-3 | 5-(1f)-100-(0)-LTFOP-1 | 100 | 100 |
| Ex. 5-2 | 5-(1f)-100-(2f)-0.12-LTFOP-1 | 97 | 100 |
| Comp. Ex. 5-4 | 5-(1f)-100-(2f)-30-LTFOP-1 | 85 | 97 |
| Comp. Ex. 5-5 | 5-(1f)-100-(0)-LiPO$_2$F$_2$-1 | 100 | 100 |
| Ex. 5-3 | 5-(1f)-100-(2f)-0.12-LiPO$_2$F$_2$-1 | 98 | 100 |
| Comp. Ex. 5-6 | 5-(1f)-100-(2f)-30-LiPO$_2$F$_2$-1 | 89 | 95 |
| Comp. Ex. 5-7 | 5-(1b)-100-(0)-LDFBOP-1 | 100 | 100 |
| Ex. 5-4 | 5-(1b)-100-(2b)-0.12-LDFBOP-1 | 98 | 100 |
| Comp. Ex. 5-8 | 5-(1b)-100-(2b)-30-LDFBOP-1 | 88 | 98 |
| Comp. Ex. 5-9 | 5-(1b)-100-(0)-LEFP-0.5 | 100 | 100 |
| Ex. 5-5 | 5-(1b)-100-(2b)-0.12-LEFP-0.5 | 96 | 100 |
| Comp. Ex. 5-10 | 5-(1b)-100-(2b)-30-LEFP-0.5 | 80 | 93 |
| Comp. Ex. 5-11 | 5-(1k)-100-(0) | 100 | 100 |
| Ex. 5-6 | 5-(1k)-100-(2b)-0.12 | 96 | 100 |
| Comp. Ex. 5-12 | 5-(1k)-100-(2b)-30 | 83 | 81 |
| Comp. Ex. 5-13 | 5-(1k)-100-(0)-LTFOP-1 | 100 | 100 |
| Ex. 5-7 | 5-(1k)-100-(2b)-0.12-LTFOP-1 | 97 | 100 |
| Comp. Ex. 5-14 | 5-(1k)-100-(2b)-30-LTFOP-1 | 89 | 98 |
| Comp. Ex. 5-15 | 5-(1k)-100-(0)-LiPO$_2$F$_2$-1 | 100 | 100 |
| Ex. 5-8 | 5-(1k)-100-(2b)-0.12-LiPO$_2$F$_2$-1 | 98 | 100 |
| Comp. Ex. 5-16 | 5-(1k)-100-(2b)-30-LiPO$_2$F$_2$-1 | 89 | 94 |
| Comp. Ex. 5-17 | 5-(1q)-100-(0) | 100 | 100 |
| Ex. 5-9 | 5-(1q)-100-(2h)-0.12 | 80 | 100 |
| Comp. Ex. 5-18 | 5-(1q)-100-(2h)-30 | 77 | 77 |
| Comp. Ex. 5-19 | 5-(1q)-100-(0)-LTFOP-1 | 100 | 100 |
| Ex. 5-10 | 5-(1q)-100-(2h)-0.12-LTFOP-1 | 94 | 100 |
| Comp. Ex. 5-20 | 5-(1q)-100-(2h)-30-LTFOP-1 | 84 | 97 |
| Comp. Ex. 5-21 | 5-(1q)-100-(0)-LiPO$_2$F$_2$-1 | 100 | 100 |
| Ex. 5-11 | 5-(1q)-100-(2h)-0.12-LiPO$_2$F$_2$-1 | 96 | 100 |
| Comp. Ex. 5-22 | 5-(1q)-100-(2h)-30-LiPO$_2$F$_2$-1 | 87 | 93 |

A lower value of DC resistance means better performance.
A higher value of capacity means better performance.

TABLE 113

| Nonaqueous Electrolyte Solution No. | | DC Resistance (Relative Value) After Initial Charging and Discharging at −20° C. | Capacity (Relative Value) After 400 Cycles at 50° C. |
|---|---|---|---|
| Comp. Ex. 5-23 | 5-(1f)-100-(0)-TSF-0.5 | 100 | 100 |
| Ex. 5-12 | 5-(1f)-100-(2f)-0.12-TSF-0.5 | 94 | 100 |
| Comp. Ex. 5-24 | 5-(1f)-100-(2f)-30-TSF-0.5 | 76 | 96 |
| Comp. Ex. 5-25 | 5-(1h)-100-(0)-PDFP-1 | 100 | 100 |
| Ex. 5-13 | 5-(1h)-100-(2h)-0.12-PDFP-1 | 91 | 100 |
| Comp. Ex. 5-26 | 5-(1h)-100-(2h)-30-PDFP-1 | 76 | 92 |
| Comp. Ex. 5-27 | 5-(1f)-100-(0)-LDFBOP-0.5-LiSO$_3$F-1 | 100 | 100 |
| Ex. 5-14 | 5-(1f)-100-(2f)-0.12-LDFBOP-0.5-LiSO$_3$F-1 | 94 | 100 |
| Comp. Ex. 5-28 | 5-(1f)-100-(2f)-30-LDFBOP-0.5-LiSO$_3$F-1 | 90 | 95 |
| Comp. Ex. 5-29 | 5-(1f)-100-(0)-LDFBOP-1-LiPO$_2$F$_2$-0.5 | 100 | 100 |
| Ex. 5-15 | 5-(1f)-100-(2f)-0.12-LDFBOP-1-LiPO$_2$F$_2$-0.5 | 96 | 100 |
| Comp. Ex. 5-30 | 5-(1f)-100-(2f)-30-LDFBOP-1-LiPO$_2$F$_2$-0.5 | 89 | 96 |
| Comp. Ex. 5-31 | 5-(1f)-100-(0)-LDFBOP-1-TSF-0.5 | 100 | 100 |
| Ex. 5-16 | 5-(1f)-100-(2f)-0.12-LDFBOP-1-TSF-0.5 | 95 | 100 |
| Comp. Ex. 5-32 | 5-(1f)-100-(2f)-30-LDFBOP-1-TSF-0.5 | 89 | 96 |
| Comp. Ex. 5-33 | 5-(1h)-100-(0)-LDFBOP-0.5-LiFSI-1 | 100 | 100 |
| Ex. 5-17 | 5-(1h)-100-(2h)-0.12-LDFBOP-0.5-LiFSI-1 | 95 | 100 |
| Comp. Ex. 5-34 | 5-(1h)-100-(2h)-30-LDFBOP-0.5-LiFSI-1 | 89 | 95 |
| Comp. Ex. 5-35 | 5-(1h)-100-(0)-LDFBOP-0.5-LiSO$_3$F-1 | 100 | 100 |
| Ex. 5-18 | 5-(1h)-100-(2h)-0.12-LDFBOP-0.5-LiSO$_3$F-1 | 93 | 100 |
| Comp. Ex. 5-36 | 5-(1h)-100-(2h)-30-LDFBOP-0.5-LiSO$_3$F-1 | 89 | 97 |
| Comp. Ex. 5-37 | 5-(1h)-100-(0)-LDFBOP-1-PDFP-0.5 | 100 | 100 |
| Ex. 5-19 | 5-(1h)-100-(2h)-0.12-LDFBOP-1-PDFP-0.5 | 97 | 100 |
| Comp. Ex. 5-38 | 5-(1h)-100-(2h)-30-LDFBOP-1-PDFP-0.5 | 92 | 96 |

A lower value of DC resistance means better performance.
A higher value of capacity means better performance.

It is seen from the test results shown in TABLES 106 to 113 that, even in the case where the reference electrode, the positive electrode and the negative electrode were changed, the battery achieved, with good balance, the cycle characteristics and a decrease of the absolute value of the resistance under low-temperature conditions by the use of the nonaqueous electrolyte solution according to the present invention in which the nonaqueous organic solvent, the solute and the silicon compounds (1) and (2) were contained with the concentration of the silicon compound (2) being in the range of 0.05 to 25.0 mass % with respect to 100 mass % of the silicon compound (1).

Using the nonaqueous electrolyte solutions, the positive electrodes and the negative electrodes as shown in TABLE 114, nonaqueous electrolyte batteries were produced in the same manner as in Example 1-0-1. The respective batteries were subjected to repeated cycles of charging and discharging in the same manner as above (more specifically, the number of cycles was 400 in the case of using the graphite negative electrode; the number of cycles was 200 in the case of using the silicon-containing graphite negative electrode; the maximum charge voltage was 4.2 V in the case of using the NCM811 positive electrode; the maximum charge voltage and the minimum discharge voltage were 4.1 V and 2.7 V, respectively, in the case of using the NCA positive electrode). The batteries were then subjected to decomposition under an environment of non-exposure to air. After that, the negative electrodes were dismounted from the batteries. Each of the dismounted negative electrodes was washed with dimethyl carbonate, followed by cutting away the active material on the collector of the negative electrode and thereby sampling the active material. The sampled negative electrode active material was added into 14 mass % aqueous high-purity nitric acid solution. The negative electrode active material solution was heated at 150° C. for 2 hours. The whole of the resulting residue was dissolved in ultrapure water. The thus-obtained aqueous solution was measured with an inductively coupled plasma emission spectrometer (ICPS-7510 manufactured by Shimadzu Corporation) to determine the amount of Ni component contained in the negative electrode active material in units of [μg/g] (Ni component/negative electrode active material). In the negative electrode active material before use, no Ni component was contained. It can be thus said that all of the quantified Ni component was an eluate from the positive electrode active material.

In TABLE 114, the elution amount was expressed as a relative value, with the elution amount in Reference Example using which the electrolyte solution with no "other additive" being defined as 100.

Figure 3:
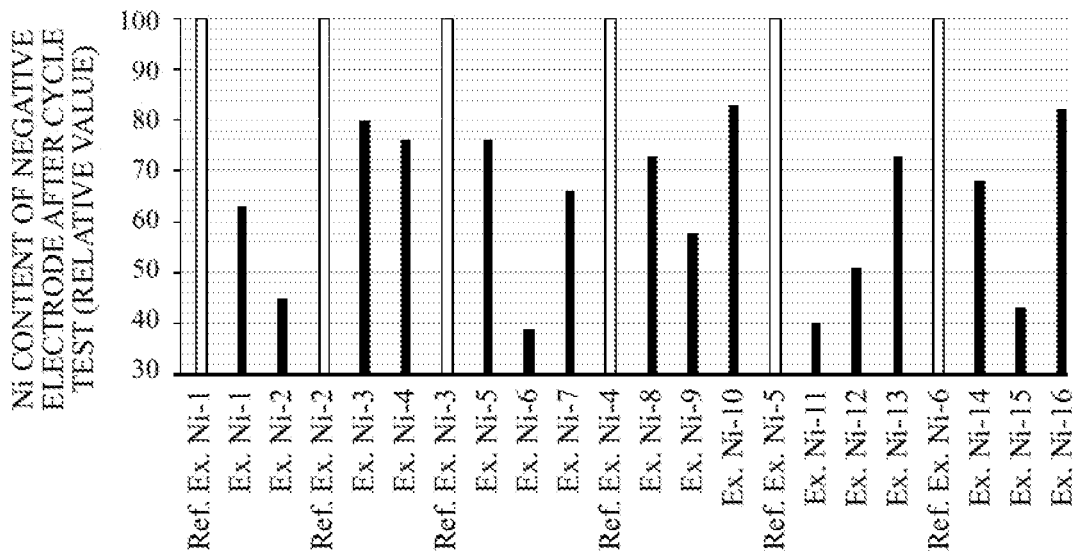
FIG. 3 is a graph of the Ni elution amount in Reference Samples Ni-1 to Ni-6 and in Examples Ni-1 to Ni-16.

It is seen from the test results shown in TABLE 114 and FIG. 3 that, in the case where the Ni-containing electrode was used, the elution of Ni from the electrode into the electrolyte solution was reduced by the addition of, as the other additive, at least one kind selected from the group consisting of lithium difluorophosphate ($LiPO_2F_2$), lithium ethylfluorophosphate (LEFP), lithium bis(difluorophosphonyl)imide (LDFPI), lithium tetrafluorooxalatophosphate (LTFOP), lithium difluorobis(oxalato)phosphate (LDFBOP), lithium difluorooxalatoborate (LDFOB), lithium fluorosulfonate ($LiSO_3F$), lithium bis(fluorosulfonyl)imide (LiFSI) and lithium (trifluoromethanesulfonyl)(fluorosulfonyl)imide (LTFFSI).

TABLE 114

| | Nonaqueous Electrolyte Solution No. | Positive Electrode | Negative Electrode | Amount of Ni (Relative Value) Contained in Negative Electrode After Cycles |
|---|---|---|---|---|
| Ref. Ex. Ni-1 | 1-(1a)-100-(2f)-0.12 | NCM622 | graphite | 100 |
| Ex. Ni-1 | 1-(1a)-100-(2f)-0.12-LiSO₃F-1 | | | 63 |
| Ex. Ni-2 | 1-(1a)-100-(2f)-0.12-LTFOP-1 | | | 45 |
| Ref. Ex. Ni-2 | 1-(1b)-100-(2b)-0.12 | | | 100 |
| Ex. Ni-3 | 1-(1b)-100-(2b)-0.12-LiFSI-2 | | | 80 |
| Ex. Ni-4 | 1-(1b)-100-(2b)-0.12-LiSO₃F-1 | | | 76 |
| Ref. Ex. Ni-3 | 2-(1b)-100-(2b)-0.12 | NCM811 | graphite | 100 |
| Ex. Ni-5 | 2-(1b)-100-(2b)-0.12-LiFSI-2 | | | 76 |
| Ex. Ni-6 | 2-(1b)-100-(2b)-0.12-LDFBOP-1 | | | 39 |
| Ex. Ni-7 | 2-(1b)-100-(2b)-0.12-LDFPI-1 | | | 66 |
| Ref. Ex. Ni-4 | 3-(1j)-100-(2j)-0.12 | NCM811 | silicon-containing graphite | 100 |
| Ex. Ni-8 | 3-(1j)-100-(2j)-0.12-LiPO₂F₂-1 | | | 73 |
| Ex. Ni-9 | 3-(1j)-100-(2j)-0.12-LDFOB-1 | | | 58 |
| Ex. Ni-10 | 3-(1j)-100-(2j)-0.12-LTFFSI-1 | | | 83 |
| Ref. Ex. Ni-5 | 4-(1h)-100-(2h)-0.12 | NCA | graphite | 100 |
| Ex. Ni-11 | 4-(1h)-100-(2h)-0.12-LTFOP-1 | | | 40 |
| Ex. Ni-12 | 4-(1h)-100-(2h)-0.12-LDFOB-1 | | | 51 |
| Ex. Ni-13 | 4-(1h)-100-(2h)-0.12-LTFFSI-1 | | | 73 |
| Ref. Ex. Ni-6 | 5-(1b)-100-(2b)-0.12 | NCA | silicon-containing graphite | 100 |
| Ex. Ni-14 | 5-(1b)-100-(2b)-0.12-LiPO₂F₂-1 | | | 68 |
| Ex. Ni-15 | 5-(1b)-100-(2b)-0.12-LDFBOP-1 | | | 43 |
| Ex. Ni-16 | 5-(1b)-100-(24)-0.12-LEFP-0.5 | | | 82 |

Furthermore, nonaqueous electrolyte solutions were each prepared by mixing the silicon compounds (1) and (2) as shown in TABLE 115, adding the mixture in an amount of 0.3 mass % into the reference electrolyte solution 1 and dissolving the added mixture in the electrolyte solution with stirring.

TABLE 115

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | | Concentration (mass %) in Electrolyte Solution |
| | No. | mass ratio | No. | mass ratio | Kind | |
| 1-(1a)-100-(2b)-0.12 | (1a) | 100 | (2b) | 0.12 | none | |
| 1-(1b)-100-(2b)-0.12 | (1b) | | | | | |
| 1-(1c)-100-(2b)-0.12 | (1c) | | | | | |

TABLE 115-continued

| Nonaqueous Electrolyte Solution No. | Combination of Silicon Compounds (1) and (2) | | | | Other Solute or Additive Component | |
|---|---|---|---|---|---|---|
| | Silicon Compound (1) | | Silicon Compound (2) | | Concentration (mass %) in Electrolyte | |
| | No. | mass ratio | No. | mass ratio | Kind | Solution |
| 1-(1d)-100-(2b)-0.12 | (1d) | | | | | |
| 1-(1f)-100-(2b)-0.12 | (1f) | | | | | |
| 1-(1g)-100-(2b)-0.12 | (1g) | | | | | |
| 1-(1h)-100-(2b)-0.12 | (1h) | | | | | |
| 1-(1i)-100-(2b)-0.12 | (1i) | | | | | |
| 1-(1j)-100-(2b)-0.12 | (1j) | | | | | |
| 1-(1k)-100-(2b)-0.12 | (1k) | | | | | |
| 1-(1m)-100-(2b)-0.12 | (1m) | | | | | |
| 1-(1n)-100-(2b)-0.12 | (1n) | | | | | |
| 1-(1o)-100-(2b)-0.12 | (1o) | | | | | |
| 1-(1p)-100-(2b)-0.12 | (1p) | | | | | |
| 1-(1q)-100-(2b)-0.12 | (1q) | | | | | |
| 1-(1l)-100-(2b)-0.12 | (1l) | | | | | |

Using the nonaqueous electrolyte solutions shown in TABLE 115, batteries were produced in the same manner as in Example 1-0-1. After 400 cycles of charging and discharging, capacity measurement test (cycle characteristic evaluation) were performed on the respective batteries. The test results are shown in TABLE 116. In TABLE 116, the capacity after 400 cycles in each Example is expressed as a relative value, with the capacity after 400 cycles in Example 6-16 in which the nonaqueous electrolyte solution 1-(1l)-100-(2b)-0.12 was used being defined as 100.

TABLE 116

| | Nonaqueous Electrolyte Solution No. | Total Number of Ethenyl and Ethynyl Groups Among Three $R^1$ in General Formula (1) | Capacity (Relative Value) After 400 Cycles at 50° C. |
|---|---|---|---|
| Ex. 6-1 | 1-(1a)-100-(2b)-0.12 | 3 | 104 |
| Ex. 6-2 | 1-(1b)-100-(2b)-0.12 | 3 | 104 |
| Ex. 6-3 | 1-(1c)-100-(2b)-0.12 | 3 | 102 |
| Ex. 6-4 | 1-(1d)-100-(2b)-0.12 | 3 | 107 |
| Ex. 6-5 | 1-(1f)-100-(2b)-0.12 | 3 | 105 |
| Ex. 6-6 | 1-(1g)-100-(2b)-0.12 | 3 | 103 |
| Ex. 6-7 | 1-(1h)-100-(2b)-0.12 | 3 | 105 |
| Ex. 6-8 | 1-(1i)-100-(2b)-0.12 | 3 | 104 |
| Ex. 6-9 | 1-(1j)-100-(20-0.12 | 4 | 105 |
| Ex. 6-10 | 1-(1k)-100-(2b)-0.12 | 4 | 107 |
| Ex. 6-11 | 1-(1m)-100-(2b)-0.12 | 3 | 104 |
| Ex. 6-12 | 1-(1n)-100-(2b)-0.12 | 3 | 105 |
| Ex. 6-13 | 1-(1o)-100-(2b)-0.12 | 4 | 110 |
| Ex. 6-14 | 1-(1p)-100-(2b)-0.12 | 3 | 107 |
| Ex. 6-15 | 1-(1q)-100-(2b)-0.12 | 4 | 113 |
| Ex. 6-16 | 1-(1l)-100-(2b)-0.12 | 2 | 100 |

A higher value of capacity means better performance.

Figure 4:
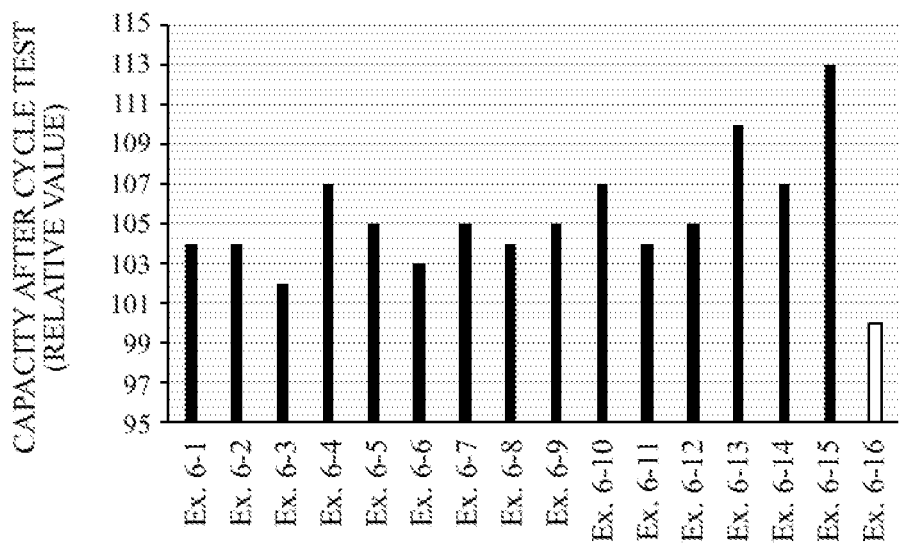
FIG. 4 is a graph of the capacity (as a relative value) after cycle test in Examples 6-1 to 6-16.

As is seen from the test results shown in TABLE 116 and FIG. 4, the durability improvement effect was greater in the case where each of the compounds (1a) to (1d), (1f) to (1k) and (1m) to (1q), in which at least two of three $R^1$ in the general formula (1) were ethenyl, ethynyl or both thereof, was used.

The invention claimed is:
1. An electrolyte solution for a nonaqueous electrolyte battery, comprising the following components:
(I) a nonaqueous organic solvent;
(II) an ionic salt as a solute;
(III) at least one additive compound represented by the general formula (1)

(1)

wherein each $R^1$ is independently a substituent group having at least one unsaturated bond or aromatic ring; and (IV) at least one additive compound selected from the group consisting of

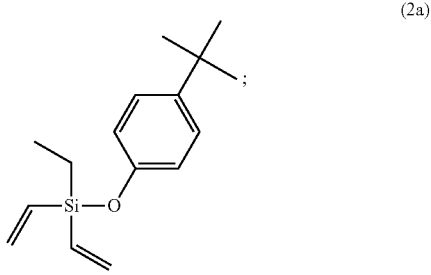

(2a)

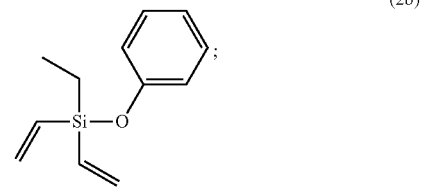

(2b)

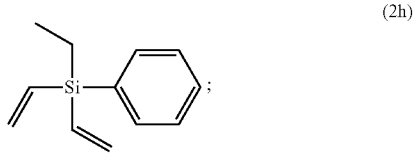

(2h)

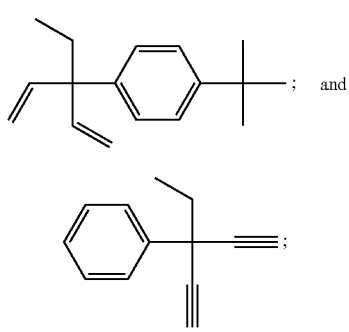
(2i)

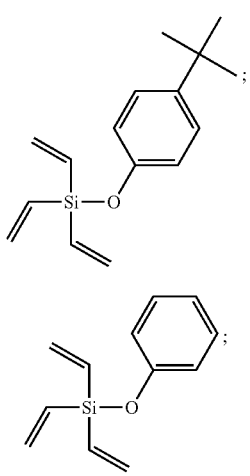
(2n)

and
wherein the concentration of the component (IV) is 0.05 to 25.0 mass % with respect to 100 mass % of the component (III).

2. The electrolyte solution for the nonaqueous electrolyte battery according to claim 1, wherein the substituent group $R^1$ is a group selected from an alkenyl group, an allyl group, an alkynyl group, an aryl group, an alkenyloxy group, an allyloxy group, an alkynyloxy group, and an aryloxy group.

3. The electrolyte solution for the nonaqueous electrolyte battery according to claim 2,
wherein the alkenyl group is ethenyl,
wherein the allyl group is 2-propenyl,
wherein the alkynyl group is ethynyl,
wherein the aryl group is phenyl, 2-methylphenyl, 4-methylphenyl, 4-fluorophenyl, 4-tert-butylphenyl or 4-tert-amylphenyl,
wherein the alkenyloxy group is vinyloxy,
wherein the allyloxy group is 2-propenyloxy,
wherein the alkynyloxy group is propargyloxy, and
wherein the aryloxy group is phenoxy, 2-methylphenoxy, 4-methylphenoxy, 4-fluorophenoxy, 4-tert-butylphenoxy or 4-tert-amylphenoxy.

4. The electrolyte solution for the nonaqueous electrolyte battery according to claim 1, wherein at least two of three $R^1$ in the general formula (1) are ethenyl or ethynyl.

5. The electrolyte solution for the nonaqueous electrolyte battery according to claim 1,
wherein the at least one additive compound represented by the general formula (1) is selected from the group consisting of

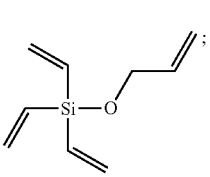
(1c)

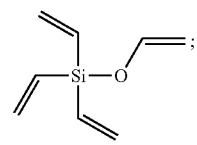
(1d)

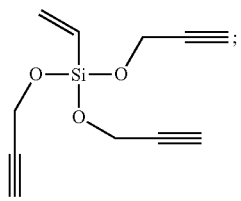
(1e)

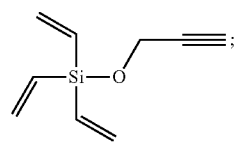
(1f)

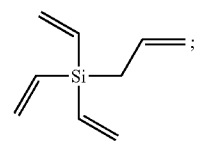
(1g)

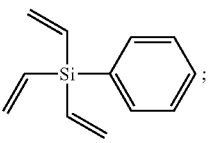
(1h)

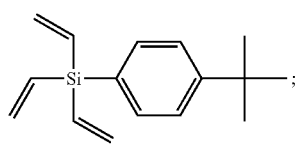
(1i)

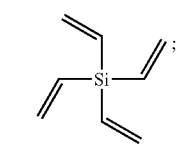
(1j)

(1k)

(1l)

(1a)

(1b)

-continued

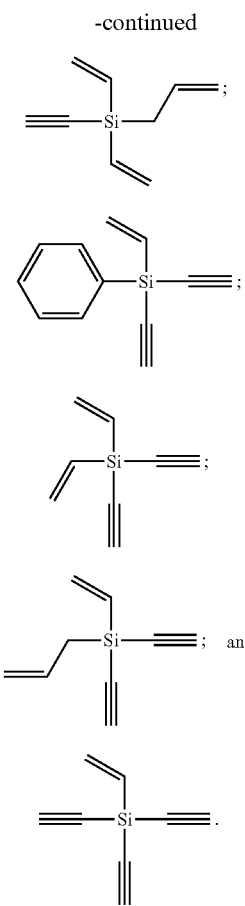

(1m)

(1n)

(1o)

(1p)

(1q)

6. The electrolyte solution for the nonaqueous electrolyte battery according to claim 5,
wherein the component (III) is at least one selected from the group consisting of the compounds (1a), (1b), (1c), (1e), (1f), (1g), (1h), (1i), (1j), (1k), (1p) and (1q), and
wherein the component (IV) is at least one selected from the group consisting of the compounds (2b) and (2h).

7. The electrolyte solution for the nonaqueous electrolyte battery according to claim 1, wherein the nonaqueous organic solvent contains at least one compound selected from the group consisting of cyclic carbonate and chain carbonate.

8. The electrolyte solution for the nonaqueous electrolyte battery according to claim 7,
wherein the cyclic carbonate is at least one compound selected from the group consisting of ethylene carbonate, propylene carbonate and fluoroethylene carbonate, and
wherein the chain carbonate is at least one compound selected from the group consisting of ethyl methyl carbonate, dimethyl carbonate, diethyl carbonate, and methyl propyl carbonate.

9. The electrolyte solution for the nonaqueous electrolyte battery according to claim 1, wherein the solute is an ionic salt having: at least one cation selected from the group consisting of alkali metal ions and alkaline-earth metal ions; and at least one anion selected from the group consisting of hexafluorophosphate anion, tetrafluoroborate anion, trifluoromethanesulfonate anion, fluorosulfonate anion, bis(trifluoromethanesulfonyl)imide anion, bis(pentafluoroethanesulfonyl)imide anion, bis(fluorosulfonyl)imide anion, (trifluoromethanesulfonyl)(fluorosulfonyl)imide anion, bis(difluorophosphonyl)imide anion, (difluorophosphonyl)(fluorosulfonyl)imide anion and (difluorophosphonyl)(trifluoromethanesulfonyl)imide anion.

10. The electrolyte solution for the nonaqueous electrolyte battery according to claim 9,
wherein the cation of the solute in lithium cation, sodium cation, potassium cation or magnesium cation; and
wherein the anion of the solute is at least one anion selected from the group consisting of hexafluorophosphate anion, tetrafluoroborate anion, trifluoromethanesulfonate anion, bis(trifluoromethanesulfonyl)imide anion, bis(fluorosulfonyl)imide anion, bis(difluorophosphonyl)imide anion and (difluorophosphonyl)(fluorosulfonyl)imide anion.

11. The electrolyte solution for the nonaqueous electrolyte battery according to claim 1, wherein the electrolyte solution contains at least one species selected from the group consisting of a lithium salt of an oxalic acid group-containing boron complex, a lithium salt of an oxalic acid group-containing phosphorus complex, a O=S—F bond-containing compound and a O=P—F bond-containing compound.

12. The electrolyte solution for the nonaqueous electrolyte battery according to claim 11,
wherein the lithium salt of the oxalic acid group-containing boron complex is lithium difluorooxalatoborate,
wherein the lithium salt of the oxalic acid group-containing phosphorus complex is at least one salt selected from the group consisting of lithium tetrafluorooxalatophosphate and lithium difluorobis(oxalate)phosphate,
wherein the O=S—F bond-containing compound is at least one compound selected form the group consisting of lithium fluorosulfonate, lithium bis(fluorosulfonyl)imide and lithium (trifluoromethanesulfonyl)(fluorosulfonyl)imide, and
wherein the O=P—F bond-containing compound is at least one compound selected from the group consisting of lithium difluorophosphate, lithium ethylfluorophosphate and lithium bis(difluorophosphonyl)imide.

13. The electrolyte solution for the nonaqueous electrolyte battery according to claim 1, wherein the electrolyte solution contains at least one salt selected from the group consisting of lithium difluorophosphate, lithium ethylfluorophosphate, lithium tetrafluorooxalatophosphate, lithium difluorobis(oxalate)phosphate, lithium difluorooxalatoborate, lithium fluorosulfonate, lithium bis(fluorosulfonyl)imide, lithium (trifluoromethanesulfonyl)(fluorosulfonyl)imide and lithium bis(difluorophosphonyl)imide.

14. A nonaqueous electrolyte battery comprising:
a positive electrode;
a negative electrode comprising at least one material selected from the group consisting of a negative electrode material containing lithium metal and a negative electrode material capable of occluding and releasing lithium, sodium, potassium or magnesium; and
the electrolyte solution for the nonaqueous electrolyte battery according to claim 1.

15. The electrolyte solution for the nonaqueous electrolyte battery according to claim 1, further comprising, as an additional additive, at least one species selected from the group consisting of cyclohexylbenzene, cyclohexylfluorobenzene, fluorobenzene, biphenyl, difluoroanisole, tert-butylbenzene, tert-amylbenzene, 2-fluorotoluene, 2-fluorobiphenyl, vinylene carbonate, dimethylvinylene carbonate, vinylethylene carbonate, fluoroethylene carbonate, methyl propargyl carbonate, ethyl propargyl carbonate, dipropargyl carbonate, maleic anhydride, succinic anhydride, propanesultone, 1,3-propanesultone, butanesultone, methylene methane disulfonate, dimethylene methane disulfonate, trimethylene methane disulfonate, a compound represented by the following general formula (3), methyl methanesulfonate, lithium difluorobis(oxalate)phosphate, sodium difluorobis(oxalate)phosphate, potassium difluorobis(oxalate)phosphate, lithium difluorooxalatoborate, sodium difluorooxalatoborate, potassium difluorooxalatoborate, lithium dioxolatoborate, sodium dioxalatoborate, potassium dioxalatoborate, lithium tetrafluorooxalatophosphate, sodium tetrafluorooxalatophosphate, potassium tetrafluorooxalatophosphate, lithium tris(oxalate)phosphate, lithium difluorophosphate, lithium ethylfluorophosphate, lithium propylfluorophosphate, lithium fluorophosphate, ethenesulfonyl fluoride, trifluoromethanesulfonyl fluoride, methanesulfonyl fluoride and phenyl difluorophosphate

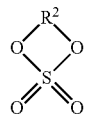

(3)

wherein $R^2$ is a hydrocarbon group of 2 to 5 carbon atoms, optionally wherein when $R^2$ has 3 or more carbon atoms, $R^2$ is branched; and optionally wherein $R^2$ contains a halogen atom, a hetero atom, or an oxygen atom.

16. The electrolyte solution for the nonaqueous electrolyte battery according to claim 15, wherein the compound represented by the general formula (3) is contained as the additional additive, and wherein the hydrocarbon group $R^2$ in the general formula (3) is an ethylene group, a propylene group, a butylene group, a pentylene group or a —CH—CH($C_3H_7$)— group.

17. The electrolyte solution for the nonaqueous electrolyte battery according to claim 15, wherein the additional additive is at least one compound selected from the group consisting of fluorobenzene, 1,3-propanesultone and the compound represented by the general formula (3) where $R^2$ is an ethylene group, the compound represented by the general formula (3) where $R^2$ is a propylene group and the compound represented by the general formula (3) where $R^2$ is a —$CH_2$—CH($C_3H_7$)— group.

18. The electrolyte solution for the nonaqueous electrolyte battery according to claim 15, wherein the additional additive is contained in an amount of 0.01 to 8.00 mass % in the electrolyte solution.

19. The electrolyte solution for the nonaqueous electrolyte battery according to claim 1, wherein the concentration of the component (IV) is 0.10 to 20.0 mass % with respect to 100 mass % of the component (III).

20. The electrolyte solution for the nonaqueous electrolyte battery according to claim 19, wherein the at least one additive compound represented by the general formula (1) is selected from the group consisting of

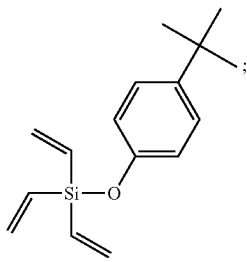
(1a)

(1b)

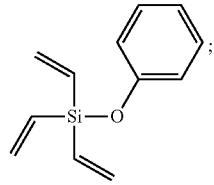
(1c)

(1d)

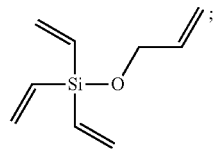
(1e)

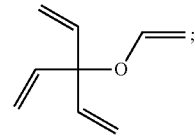
(1f)

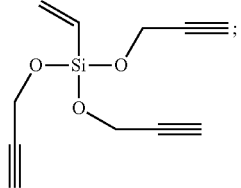
(1g)

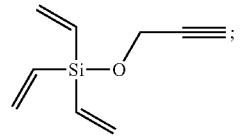
(1h)

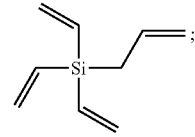

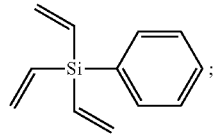
(1i)

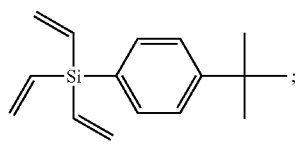

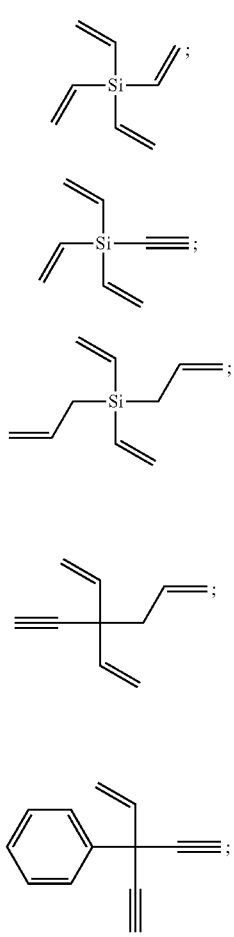

(1j)

(1k)

(1l)

(1m)

(1n)

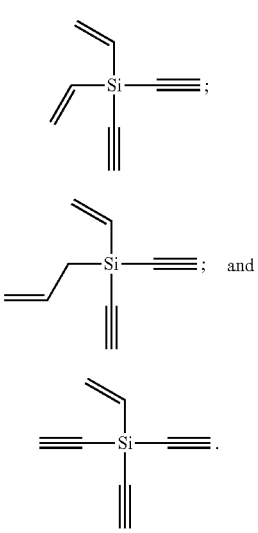

(1o)

(1p) and (1q)

21. The electrolyte solution for the nonaqueous electrolyte battery according to claim 20, wherein the component (III) is at least one selected from the group consisting of the compounds (1a), (1b), (1c), (1e), (1f), (1g), (1h), (1i), (1j), (1k), (1p) and (1q), and wherein the component (IV) is at least one selected from the group consisting of the compounds (2b) and (2h).

22. The electrolyte solution for the nonaqueous electrolyte battery according to claim 21, wherein the combination of the components (III) and (IV) is combination of the compounds (1b) and (2b), or combination of the compounds (1h) and (2h).

* * * * *